United States Patent [19]

Grau

[11] 4,396,995

[45] Aug. 2, 1983

[54] ADAPTER FOR INTERFACING BETWEEN TWO BUSES

[75] Inventor: Richard S. Grau, Bloomington, Minn.

[73] Assignee: NCR Corporation, Dayton, Ohio

[21] Appl. No.: 238,172

[22] Filed: Feb. 25, 1981

[51] Int. Cl.[3] .................... G06F 3/00

[52] U.S. Cl. .................... 364/900

[58] Field of Search ... 364/200 MS File, 900 MS File

[56] References Cited

U.S. PATENT DOCUMENTS

| | | | |
|---|---|---|---|
| 3,818,458 | 6/1974 | Deese | 364/200 |
| 4,069,510 | 1/1978 | Carlow et al. | 364/200 |

*Primary Examiner*—Raulfe B. Zache

*Attorney, Agent, or Firm*—J. T. Cavender; Edward Dugas

[57] ABSTRACT

An asynchronous interface adapter for interfacing two bidirectional data buses. Data transfer between buses may occur simultaneously with provision made for storing bus data from a first bus until a receiver on the second bus is available. The adapter provides bus requests and grant logic, parity checking, time of day clocking, and is adapted to handle variable-length bus messages with the message bytes being carried in a bit-parallel byte-serial form, asynchronously and generally in a bidirectional manner.

13 Claims, 172 Drawing Figures

* NOT TRUE GPIB LINES--JUST STATES OF DEVICES ON THE BUS THAT HAVE RECEIVED CONTROL MESSAGES MAKING THEM TALKER ADDRESSED AND LISTENER/S ADDRESSED.

KEY 2

KEY 2

KEY 3

KEY 6

KEY 7

KEY 7

KEY 7

KEY 8

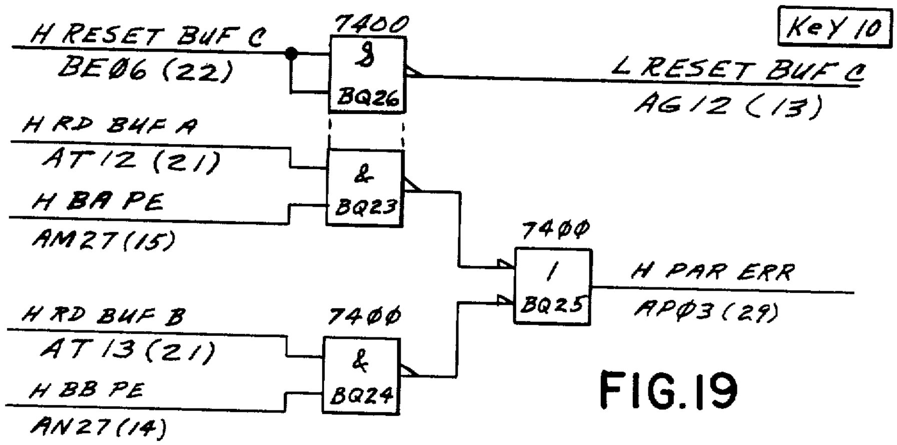
FIG. 19
FIG. 20
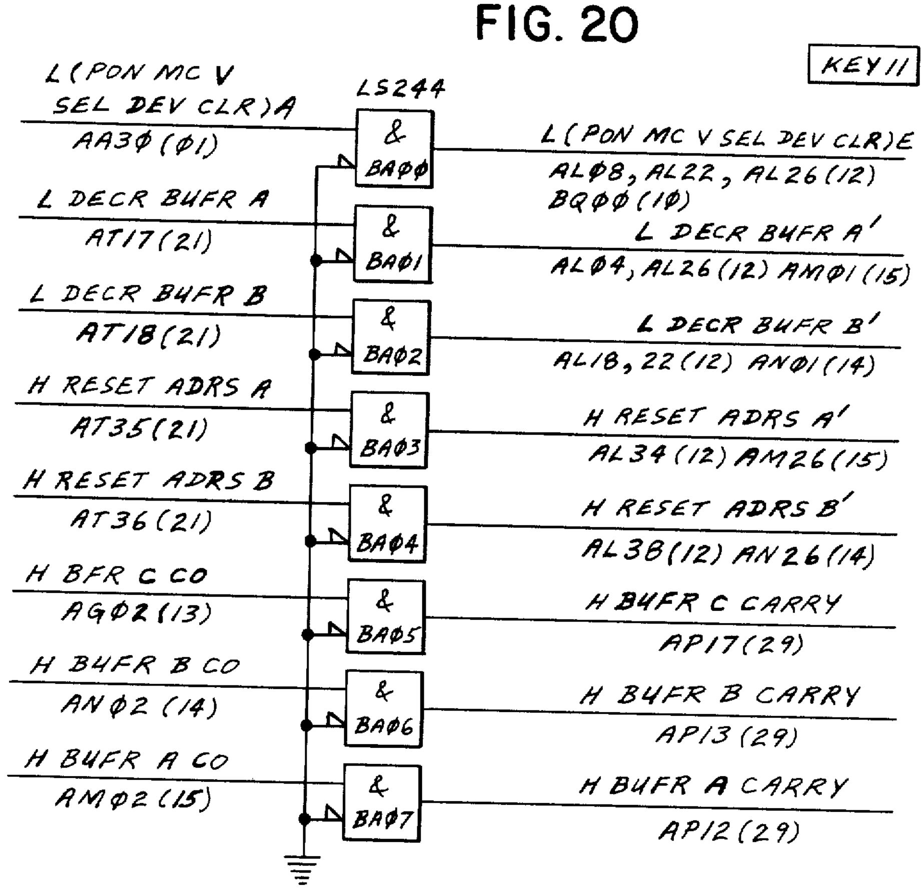

KEY 11

KEY 11

KEY 12

KEY 14

KEY 14

KEY 15

KEY 15

KEY 16

KEY 17

KEY 17

KEY 17

KEY 19

KEY 19

KEY 20

KEY 24

KEY 24

H SYNC IN
AH24(25)
H DY DATA Φ
BT17(34)
H DY DATA 1
BT18(34)
H DY DATA 2
BT19(34)
H DY DATA 3
BT2Φ(34)
H MASTER
AH25, AHΦ1, Φ2(25)
CFΦ4(32)
74367A
AJ51
AJ52
AJ53
AJ54
AJ55
+5V
2.2K
CP
AJ4Φ
AJ41
AJ42
AJ43
MR
74LS174
BUS IN ONLY
AJ36
AJ37
AJ38
AJ39
H DATA 3 (L)
AJ17(24)
L DATA 3 (K)
AJ16(24)
H DATA 2 (P)
AJ19(24)
L DATA 2 (M)
AJ18(24)
H DATA 1 (R)
AJ21(24)
L DATA 1 (N)
AJ2Φ(24)
H DATA Φ (U)
AJ23(24)
L DATA Φ (S)
AJ22(24)
H SYNC IN A
AH24(25)
H ACTIVE (V)
H DIS DY DATA
AV18(19)

KEY 25

KEY 27

KEY 27

KEY 34

KEY 2B

KEY 30

KEY 36

POWER ON RESET LOGIC

PARITY ERROR LOGIC

KEY 38

KEY 41

KEY 42

KEY 43

6M104-000

| ADDRESS | | | | | | | | DATA | | | | DISCRIPTION |
|---|---|---|---|---|---|---|---|---|---|---|---|---|
| $2^7$ | $2^6$ | $2^5$ | $2^4$ | $2^3$ | $2^2$ | $2^1$ | $2^0$ | $2^3$ | $2^2$ | $2^1$ | $2^0$ | |
| X | 0 | 0 | 1 | 0 | 1 | 0 | 0 | 0 | 0 | 1 | 0 | DEVICE CLEAR |
| X | 0 | 0 | 1 | 1 | 0 | 0 | 0 | 0 | 0 | 0 | 1 | SERIAL POLL ENABLE |
| X | 0 | 0 | 1 | 1 | 0 | 0 | 1 | 1 | 0 | 0 | 0 | SERIAL POLL DISABLE |
| 1 | 0 | 0 | 0 | 0 | 1 | 0 | 0 | 0 | 1 | 0 | 0 | SELECTED DEVICE CLEAR |
| ALL OTHER | | | | | | | | 0 | 0 | 0 | 0 | DO NOTHING |

| ADDRESS | | | | | DATA | | | | | | | |
|---|---|---|---|---|---|---|---|---|---|---|---|---|
| $2^4$ | $2^3$ | $2^2$ | $2^1$ | $2^0$ | $2^7$ | $2^6$ | $2^5$ | $2^4$ | $2^3$ | $2^2$ | $2^1$ | $2^0$ |
| 0 | 0 | 0 | 0 | 0 | 0 | 0 | 0 | 0 | 0 | 0 | 0 | 1 |
| ↓ | ↓ | ↓ | ↓ | ↓ | ↓ | ↓ | ↓ | ↓ | ↓ | ↓ | ↓ | ↓ |
| 1 | 0 | 0 | 0 | 1 | 0 | 0 | 0 | 0 | 0 | 0 | 0 | 1 |
| 1 | 0 | 0 | 1 | 0 | 0 | 0 | 0 | 0 | 0 | 0 | 1 | 0 |
| ↓ | ↓ | ↓ | ↓ | ↓ | ↓ | ↓ | ↓ | ↓ | ↓ | ↓ | ↓ | ↓ |
| 1 | 1 | 1 | 1 | 1 | 0 | 0 | 0 | 0 | 0 | 0 | 1 | 0 |

| ADDRESS | | | | | DATA | | | | | | | |
|---|---|---|---|---|---|---|---|---|---|---|---|---|
| $2^4$ | $2^3$ | $2^2$ | $2^1$ | $2^0$ | $2^7$ | $2^6$ | $2^5$ | $2^4$ | $2^3$ | $2^2$ | $2^1$ | $2^0$ |
| 0 | 0 | 0 | 0 | 0 | 0 | 0 | 0 | 0 | 0 | 0 | 0 | 1 |
| ↓ | ↓ | ↓ | ↓ | ↓ | ↓ | ↓ | ↓ | ↓ | ↓ | ↓ | ↓ | ↓ |
| 1 | 0 | 0 | 1 | 0 | 0 | 0 | 0 | 0 | 0 | 0 | 0 | 1 |
| 1 | 0 | 0 | 1 | 1 | 0 | 0 | 0 | 0 | 0 | 1 | 0 | 1 |
| 1 | 0 | 1 | 0 | 0 | 0 | 0 | 0 | 0 | 0 | 0 | 0 | 1 |
| ↓ | ↓ | ↓ | ↓ | ↓ | ↓ | ↓ | ↓ | ↓ | ↓ | ↓ | ↓ | ↓ |
| 1 | 1 | 0 | 0 | 0 | 0 | 0 | 0 | 0 | 0 | 0 | 0 | 1 |
| 1 | 1 | 0 | 0 | 1 | 0 | 0 | 0 | 0 | 0 | 0 | 1 | 0 |
| 1 | 1 | 0 | 1 | 0 | 0 | 0 | 0 | 0 | 0 | 1 | 1 | 0 |
| ↓ | ↓ | ↓ | ↓ | ↓ | ↓ | ↓ | ↓ | ↓ | ↓ | ↓ | ↓ | ↓ |
| 1 | 1 | 1 | 1 | 1 | 0 | 0 | 0 | 0 | 0 | 1 | 1 | 0 |

| ADDRESS | | | | | DATA | | | | | | | |
|---|---|---|---|---|---|---|---|---|---|---|---|---|
| $2^4$ | $2^3$ | $2^2$ | $2^1$ | $2^0$ | $2^7$ | $2^6$ | $2^5$ | $2^4$ | $2^3$ | $2^2$ | $2^1$ | $2^0$ |
| 0 | 0 | 0 | 0 | 0 | 0 | 0 | 0 | 0 | 0 | 0 | 0 | 1 |
| ↓ | ↓ | ↓ | ↓ | ↓ | ↓ | ↓ | ↓ | ↓ | ↓ | ↓ | ↓ | ↓ |
| 1 | 0 | 1 | 0 | 0 | 0 | 0 | 0 | 0 | 0 | 0 | 0 | 1 |
| 1 | 0 | 1 | 0 | 1 | 0 | 0 | 0 | 0 | 0 | 0 | 1 | 0 |
| ↓ | ↓ | ↓ | ↓ | ↓ | ↓ | ↓ | ↓ | ↓ | ↓ | ↓ | ↓ | ↓ |
| 1 | 1 | 1 | 1 | 1 | 0 | 0 | 0 | 0 | 0 | 0 | 1 | 0 |

| ADDRESS | | | | | DATA | | | | | | | |
|---|---|---|---|---|---|---|---|---|---|---|---|---|
| $2^4$ | $2^3$ | $2^2$ | $2^1$ | $2^0$ | $2^7$ | $2^6$ | $2^5$ | $2^4$ | $2^3$ | $2^2$ | $2^1$ | $2^0$ |
| 0 | 0 | 0 | 0 | 0 | 0 | 0 | 0 | 0 | 0 | 0 | 0 | 1 |
| ↓ | ↓ | ↓ | ↓ | ↓ | ↓ | ↓ | ↓ | ↓ | ↓ | ↓ | ↓ | ↓ |
| 1 | 1 | 0 | 0 | 0 | 0 | 0 | 0 | 0 | 0 | 0 | 0 | 1 |
| 1 | 1 | 0 | 0 | 1 | 0 | 0 | 0 | 0 | 0 | 0 | 1 | 0 |
| ↓ | ↓ | ↓ | ↓ | ↓ | ↓ | ↓ | ↓ | ↓ | ↓ | ↓ | ↓ | ↓ |
| 1 | 1 | 1 | 1 | 1 | 0 | 0 | 0 | 0 | 0 | 0 | 1 | 0 |

FIG. 63

6MI03 INTERRUPT DECODE PROM

| ADDRESS | | | | | | | | | DATA | | | | |
|---|---|---|---|---|---|---|---|---|---|---|---|---|---|
| $2^8$ | $2^7$ | $2^6$ | $2^5$ | $2^4$ | $2^3$ | $2^2$ | $2^1$ | $2^0$ | $2^3$ | $2^2$ | $2^1$ | $2^0$ | |
| BUF C OVERFLOW | FORCED READ | PAR ERR A OR B | LOST DATA | PAR ERR C | CMD REJECT | BUF A OR B OVF | DEVICE END | DATA READY | BUF OVERFLOW | UNIT CHECK | PAR ERROR | NOT USED | DISCRIPTION ∧ = AND |
| X | X | 0 | X | 0 | X | 1 | X | X | 1 | 1 | 0 | 1 | BUFFER OVERFLOW |
| 1 | X | 0 | X | 0 | X | 0 | X | X | 1 | 1 | 0 | 1 | BUFFER OVERFLOW |
| | | | | | | | | | | | | | |
| X | X | X | X | 1 | X | 1 | X | X | 1 | 1 | 1 | 1 | PAR ERR ∧ BUFFER OVERFLOW |
| X | X | 1 | X | 0 | X | 1 | X | X | 1 | 1 | 1 | 1 | PAR ERR ∧ BUFFER OVERFLOW |
| 1 | X | X | X | 1 | X | 0 | X | X | 1 | 1 | 1 | 1 | PAR ERR ∧ BUFFER OVERFLOW |
| 1 | X | 1 | X | 0 | X | 0 | X | X | 1 | 1 | 1 | 1 | PAR ERR ∧ BUFFER OVERFLOW |
| | | | | | | | | | | | | | |
| 0 | X | 0 | X | 0 | 1 | 0 | X | X | 0 | 1 | 0 | 1 | CMD REJECT |
| | | | | | | | | | | | | | |
| 0 | X | 0 | 1 | 0 | 0 | 0 | X | X | 0 | 1 | 0 | 1 | LOST DATA |
| | | | | | | | | | | | | | |
| 0 | X | X | X | 1 | X | 0 | X | X | 0 | 1 | 1 | 1 | PAR ERROR |
| 0 | X | 1 | X | 0 | X | 0 | X | X | 0 | 1 | 1 | 1 | PAR ERROR |

| ADDRESS | | | | | | | | DATA | | | | DESCRIPTION |
|---|---|---|---|---|---|---|---|---|---|---|---|---|
| $2^7$ | $2^6$ | $2^5$ | $2^4$ | $2^3$ | $2^2$ | $2^1$ | $2^0$ | $2^3$ | $2^2$ | $2^1$ | $2^0$ | |
| 0 | 1 | 0 | 0 | 0 | 0 | 0 | 0 | 1 | 0 | 0 | 0 | |
| ↓ | ↓ | ↓ | ↓ | ↓ | ↓ | ↓ | ↓ | ↓ | ↓ | ↓ | ↓ | OTHER TALK ADDRESS |
| 0 | 1 | 0 | 1 | 1 | 1 | 1 | 0 | 1 | 0 | 0 | 0 | (OTA) |
| X | 1 | 0 | 1 | 1 | 1 | 1 | 1 | 1 | 0 | 0 | 0 | UNTALK |
| 1 | 0 | 1 | 0 | 0 | 0 | 0 | 0 | 1 | 1 | 0 | 0 | MY LISTEN |
| ↓ | ↓ | ↓ | ↓ | ↓ | ↓ | ↓ | ↓ | ↓ | ↓ | ↓ | ↓ | ADDRESS |
| 1 | 0 | 1 | 1 | 1 | 1 | 1 | 0 | 1 | 1 | 0 | 0 | |
| X | 0 | 1 | 1 | 1 | 1 | 1 | 1 | 0 | 0 | 1 | 0 | UNLISTEN |
| 1 | 1 | 0 | 0 | 0 | 0 | 0 | 0 | 0 | 0 | 1 | 1 | MY TALK |
| ↓ | ↓ | ↓ | ↓ | ↓ | ↓ | ↓ | ↓ | ↓ | ↓ | ↓ | ↓ | ADDRESS |
| 1 | 1 | 0 | 1 | 1 | 1 | 1 | 0 | 0 | 0 | 1 | 1 | |
| ALL OTHER | | | | | | | | 0 | 0 | 0 | 0 | DO NOTHING |

FIG. 65

6M104-02 COMMAND CODE SELECT

| ADDRESS | | | | | | | | DATA | | | | DESCRIPTION |
|---|---|---|---|---|---|---|---|---|---|---|---|---|
| $2^7$ | $2^6$ | $2^5$ | $2^4$ | $2^3$ | $2^2$ | $2^1$ | $2^0$ | $2^3$ | $2^2$ | $2^1$ | $2^0$ | |
| 0 | 0 | 0 | 1 | 0 | 0 | 0 | 0 | 1 | 0 | 0 | 1 | LOAD RECORD COUNTER COMMAND |
| 0 | 0 | 1 | 0 | 0 | 0 | 0 | 0 | 0 | 0 | 1 | 0 | ADAPTER ENABLE COMMAND |
| 0 | 0 | 1 | 1 | 0 | 0 | 0 | 0 | 0 | 0 | 1 | 1 | ADAPTER DISABLE COMMAND |
| 0 | 1 | 0 | 0 | 0 | 0 | 0 | 0 | 0 | 0 | 0 | 1 | LOAD TIME OF-DAY COUNTER COMMAND |
| 0 | 1 | 0 | 1 | 0 | 0 | 0 | 0 | 0 | 1 | 0 | 0 | MAINTENANCE WRITE ENABLE COMMAND |
| 0 | 1 | 1 | 0 | 0 | 0 | 0 | 0 | 0 | 0 | 0 | 1 | FORCED READ COMMAND |
| 0 | 1 | 1 | 1 | 0 | 0 | 0 | 0 | 0 | 1 | 0 | 1 | MAINTENANCE WRITE DISABLE COMMAND |
| 1 | 0 | 0 | 0 | 0 | 0 | X | X | 0 | 1 | 1 | 0 | PARITY DISABLE COMMAND |
| 1 | 0 | 0 | 1 | 0 | 0 | 0 | 0 | 0 | 1 | 1 | 1 | PARITY ENABLE COMMAND |
| ALL OTHER | | | | | | | | 0 | 0 | 0 | 0 | DO NOTHING |

FIG. 66A

6MI07-000 WRITE BUFFER A/B CONTROL

| ADDRESS | | | | | | | | | -00 DATA | | | | -01 DATA | | | | DESCRIPTION |
|---|---|---|---|---|---|---|---|---|---|---|---|---|---|---|---|---|---|
| $2^8$ | $2^7$ | $2^6$ | $2^5$ | $2^4$ | $2^3$ | $2^2$ | $2^1$ | $2^0$ | $2^3$ | $2^2$ | $2^1$ | $2^0$ | $2^3$ | $2^2$ | $2^1$ | $2^0$ | |
| BUSY IN | LAST RECORD REC'D | BUFR B EMPTY | BUFR A EMPTY | DYN ENABLE | LAST STATE | | | | NOT USED | NOT USED | WR BUFR A | WR BUFR B | NEXT STATE | | | | |
| | | | | | $2^3$ | $2^2$ | $2^1$ | $2^0$ | | | | | $2^3$ | $2^2$ | $2^1$ | $2^0$ | |
| 0 | 0 | 0 | 1 | 1 | 0 | 0 | 0 | 0 | | 0 | 0 | 0 | 0 | 1 | 1 | 1 | B=F → STATE 7 |
| 0 | 0 | 1 | 0 | 1 | 0 | 0 | 0 | 0 | | 0 | 0 | 0 | 0 | 0 | 1 | 0 | A=F → STATE 2 |
| 1 | 0 | 0 | 1 | 1 | 0 | 0 | 0 | 0 | | 0 | 0 | 0 | 1 | 0 | 0 | 0 | BUSY ∧ B=F → STATE 8 |
| 1 | 0 | 1 | 0 | 1 | 0 | 0 | 0 | 0 | | 0 | 0 | 0 | 0 | 0 | 1 | 1 | BUSY ∧ A=F → STATE 3 |
| | | | | | | | | | | | | | | | | | |
| 1 | 0 | 1 | 1 | 1 | 0 | 0 | 0 | 0 | | 0 | 1 | 0 | 0 | 0 | 0 | 1 | A=B=E, BUSY ↑ WR BUFR A ↑ |
| 1 | 0 | X | X | 1 | 0 | 0 | 0 | 1 | | 0 | 1 | 0 | 0 | 0 | 0 | 1 | |
| 0 | 0 | X | X | 1 | 0 | 0 | 0 | 1 | | 0 | 1 | 0 | 0 | 0 | 0 | 1 | BUSY ↓ |
| | | | | | | | | | | | | | | | | | |
| 0 | 1 | X | X | 1 | 0 | 0 | 0 | 1 | | 0 | 0 | 0 | 0 | 0 | 1 | 0 | LAST RECORD REC'D ↑ WR BUFR A ↓ |
| 0 | 1 | X | X | 1 | 0 | 0 | 1 | 0 | | 0 | 0 | 0 | 0 | 0 | 1 | 0 | |
| 0 | 0 | 1 | 0 | 1 | 0 | 0 | 1 | 0 | | 0 | 0 | 0 | 0 | 0 | 1 | 0 | LAST RECORD REC'D ↓ |

FIG. 66B

| | | | | | | | | | | | | | | | | | | |
|---|---|---|---|---|---|---|---|---|---|---|---|---|---|---|---|---|---|---|
| 0 | 0 | 1 | 1 | 1 | 0 | 0 | 1 | 0 | | 0 | 0 | 0 | 0 | 0 | 1 | 0 | A STILL EMPTY WAIT FOR A = F |
| 1 | 0 | 1 | 1 | 1 | 0 | 0 | 1 | 0 | | 0 | 1 | 0 | 0 | 0 | 0 | 1 | A WENT EMPTY ∧ BUSY ↑ → STATE 1 |
| X | X | X | X | 0 | 0 | 0 | 0 | 1 | | 0 | 1 | 0 | 0 | 0 | 0 | 1 | AD DISABLED → HOLD AT STATE 1 |
| X | X | X | X | 0 | 0 | 0 | 1 | 0 | | 0 | 0 | 0 | 0 | 0 | 1 | 0 | AD DISABLED → HOLD AT STATE 2 |
| 1 | 1 | 1 | 0 | 1 | 0 | 0 | 1 | 0 | | 0 | 0 | 0 | 0 | 0 | 0 | 0 | BUSY ∧ LAST RECORD REC'D ∧ A = F → INVALID |
| X | 1 | X | X | 0 | 0 | 0 | 0 | 1 | | 0 | 0 | 0 | 0 | 0 | 1 | 0 | |
| 1 | 0 | 1 | 0 | 1 | 0 | 0 | 1 | 0 | | 0 | 0 | 1 | 0 | 0 | 1 | 1 | BUSY ↑ WR BUFR B ↑ |
| 1 | 0 | X | X | 1 | 0 | 0 | 1 | 1 | | 0 | 0 | 1 | 0 | 0 | 1 | 1 | SS |
| 0 | 0 | X | X | 1 | 0 | 0 | 1 | 1 | | 0 | 0 | 1 | 0 | 0 | 1 | 1 | BUSY ↓ |
| | | | | | | | | | | | | | | | | | |
| 0 | 1 | X | X | 1 | X | 0 | 1 | 1 | | 0 | 0 | 0 | 0 | 1 | 0 | 0 | LAST RECORD ↑ WR BUFR B ↓ |
| 0 | 1 | X | X | 1 | X | 1 | 0 | 0 | | 0 | 0 | 0 | 0 | 1 | 0 | 0 | SS |
| 0 | 0 | 0 | 0 | 1 | 0 | 1 | 0 | 0 | | 0 | 0 | 0 | 0 | 1 | 0 | 0 | A = B = F → HOLD |
| 0 | 0 | 1 | 0 | 1 | 0 | 1 | 0 | 0 | | 0 | 0 | 0 | 0 | 1 | 0 | 0 | |
| 0 | 0 | 0 | 1 | 1 | 0 | 1 | 0 | 0 | | 0 | 0 | 0 | 0 | 1 | 1 | 1 | A EMPTIED → STATE 7, B = F ONLY |
| 1 | 0 | 0 | 1 | 1 | 0 | 1 | 0 | 0 | | 0 | 0 | 0 | 0 | 1 | 1 | 1 | B FULL, A = E, BUSY ↑ → STATE 7 |
| X | X | X | X | 0 | 0 | 1 | 0 | 0 | | 0 | 0 | 0 | 0 | 1 | 0 | 0 | AD DISABLED → HOLD |
| X | 0 | X | X | 0 | 0 | 0 | 1 | 1 | | 0 | 0 | 1 | 0 | 0 | 1 | 1 | B WAS FILLING, AD ENABLE ↑, HOLD |
| X | 1 | X | X | 0 | 0 | 0 | 1 | 1 | | 0 | 0 | 0 | 0 | 1 | 0 | 0 | |
| 1 | 1 | 0 | 0 | 1 | 0 | 1 | 0 | 0 | | 0 | 0 | 0 | 0 | 0 | 0 | 0 | LAST RECORD ∧ BUSY ∧ BUFRS A = B = E → INVALID |
| 1 | 0 | 0 | 0 | 1 | 0 | 1 | 0 | 0 | | 0 | 0 | 0 | 0 | 1 | 0 | 1 | BUSY ↑ → LOST DATA |
| 1 | 0 | X | X | 1 | 0 | 1 | 0 | 1 | | 0 | 0 | 0 | 0 | 1 | 0 | 1 | |

FIG. 66C

| | | | | | | | | | | | | | | | | | |
|---|---|---|---|---|---|---|---|---|---|---|---|---|---|---|---|---|---|
| 0 | 0 | 0 | 0 | X | 0 | 1 | 0 | 1 | | 0 | 0 | 0 | 0 | 1 | 0 | 0 | BUSY ↓ → STATE 4 |
| | | | | | | | | | | | | | | | | | |
| 0 | 0 | 0 | 1 | 1 | 0 | 1 | 1 | 1 | | 0 | 0 | 0 | 0 | 1 | 1 | 1 | B = FULL ONLY — SS |
| | | | | | | | | | | | | | | | | | |
| 1 | 0 | 1 | 1 | 1 | 0 | 1 | 1 | 1 | | 0 | 0 | 0 | 0 | 0 | 0 | 1 | B EMPTIED ∧ BUSY ↑ → STATE 1 |
| 1 | 1 | 0 | 1 | 1 | 0 | 1 | 1 | 1 | | 0 | 0 | 0 | 0 | 1 | 1 | 1 | BUSY ∧ $N^{TH}$ RECORD ↑ → HOLD |
| | | | | | | | | | | | | | | | | | |
| 1 | 0 | X | X | 0 | 0 | 1 | 1 | 1 | | 0 | 0 | 0 | 0 | 1 | 1 | 1 | AD DIS → HOLD |
| 0 | 0 | X | X | 0 | 0 | 1 | 1 | 1 | | 0 | 0 | 0 | 0 | 1 | 1 | 1 | AD DIS → HOLD |
| 1 | 0 | 0 | 1 | 1 | 0 | 1 | 1 | 1 | | 0 | 1 | 0 | 1 | 0 | 0 | 0 | BUSY ↑ WR BUFR A ↑ |
| 1 | 0 | X | X | 1 | 1 | 0 | 0 | 0 | | 0 | 1 | 0 | 1 | 0 | 0 | 0 | SS |
| 0 | 0 | X | X | 1 | 1 | 0 | 0 | 0 | | 0 | 1 | 0 | 1 | 0 | 0 | 0 | BUSY ↓ |
| | | | | | | | | | | | | | | | | | |
| 0 | 1 | X | X | 1 | 1 | 0 | 0 | 0 | | 0 | 0 | 0 | 1 | 0 | 0 | 1 | LAST RECORD ↑ WR BUFR A ↓ |
| 0 | 1 | X | X | 1 | 1 | 0 | 0 | 1 | | 0 | 0 | 0 | 1 | 0 | 0 | 1 | |
| 0 | 0 | 0 | 0 | 1 | 1 | 0 | 0 | 1 | | 0 | 0 | 0 | 1 | 0 | 0 | 1 | LAST RECORD ↓ SS |
| 0 | 0 | 1 | 0 | 1 | 1 | 0 | 0 | 1 | | 0 | 0 | 0 | 0 | 0 | 1 | 0 | B EMPTIED → STATE 2 |
| 1 | 0 | 1 | 0 | 1 | 1 | 0 | 0 | 1 | | 0 | 0 | 0 | 0 | 0 | 1 | 0 | B EMPTIED BUSY ↑ → STATE 2 |
| 1 | 1 | 1 | 0 | 1 | 1 | 0 | 0 | 1 | | 0 | 0 | 0 | 0 | 0 | 0 | 0 | INVALID INPUT COMBINATION |
| 1 | 0 | 0 | 0 | 1 | 1 | 0 | 0 | 1 | | 0 | 0 | 0 | 1 | 0 | 1 | 0 | BUSY ↑, LOST DATA |
| 1 | 0 | X | X | 1 | 1 | 0 | 1 | 0 | | 0 | 0 | 0 | 1 | 0 | 1 | 0 | |

| | | | | | | | | | | | | | | | | | |
|---|---|---|---|---|---|---|---|---|---|---|---|---|---|---|---|---|---|
| 0 | 0 | 0 | 0 | X | 1 | 0 | 1 | 0 | | 0 | 0 | 0 | 1 | 0 | 0 | 1 | BUSY ↓ ⟶ STATE 9 |
| | | | | | | | | | | | | | | | | | |
| 0 | 0 | 1 | 0 | 0 | 1 | 0 | 1 | 0 | | 0 | 0 | 0 | 0 | 0 | 1 | 0 | B EMPTIED ⟶ STATE 2 |
| X | 0 | X | X | 0 | 1 | 0 | 0 | 0 | | 0 | 1 | 0 | 1 | 0 | 0 | 0 | AD DISABLED — HOLD |
| X | X | X | X | 0 | 1 | 0 | 0 | 1 | | 0 | 0 | 0 | 1 | 0 | 0 | 1 | AD DISABLED — HOLD |
| | | | | | | | | | | | | | | | | | |
| X | 1 | X | X | 0 | 1 | 0 | 0 | 0 | | 0 | 0 | 0 | 1 | 0 | 0 | 1 | |

6M105-00,01,02
COMMAND CONTROL SEQUENCER

| ADDRESS | | | | | | | | | | -00 DATA | | | | -01 DATA | | | | -02 DATA | | | | |
|---|---|---|---|---|---|---|---|---|---|---|---|---|---|---|---|---|---|---|---|---|---|---|
| $2^9$ | $2^8$ | $2^7$ | $2^6$ | $2^5$ | $2^4$ | $2^3$ | $2^2$ | $2^1$ | $2^0$ | $2^3$ | $2^2$ | $2^1$ | $2^0$ | $2^3$ | $2^2$ | $2^1$ | $2^0$ | $2^3$ | $2^2$ | $2^1$ | $2^0$ | |
| LSN ACT & DAV | EOI IN | COMMAND SELECT | | | | LAST STATE | | | | | | STROBE COMMAND | LATCH STROBE | SET LATCH = 1 | LATCH CODE | | LOAD RCD COUNT | NEXT STATE | | | | LATCH CODE<br>00 = ADAPTER ENABLE<br>01 = DISABLE PARITY<br>11 = ENABLE MAINTENANCE PARITY<br>DESCRIPTION |
| | | $2^2$ | $2^1$ | $2^0$ | $2^3$ | $2^3$ | $2^2$ | $2^1$ | $2^0$ | | | | | | $2^1$ | $2^0$ | | $2^3$ | $2^2$ | $2^1$ | $2^0$ | |
| 0 | X | X | X | X | X | 0 | 0 | 0 | 0 | | | 0 | 0 | 0 | 1 | 0 | 0 | 0 | 0 | 0 | 0 | IDLE |
| 1 | 0 | 0 | 0 | 0 | 0 | 0 | 0 | 0 | 0 | | | 1 | 0 | 0 | 1 | 0 | 0 | 0 | 0 | 1 | 1 | FIRST BYTE, CMD = Ø, STR CMD ↑ |
| | | | | | | | | | | | | | | | | | | | | | | |
| 1 | 0 | X | X | X | X | 0 | 0 | 1 | 0 | | | 0 | 1 | 0 | 1 | 0 | 0 | 0 | 0 | 1 | 1 | STR CMD ↓, LATCH STR ↑ |
| 1 | 0 | X | X | X | X | 0 | 0 | 1 | 1 | | | 0 | 0 | 0 | 1 | 0 | 0 | 0 | 0 | 1 | 1 | LATCH STR ↓ - STEADY STATE |
| 0 | X | X | X | X | X | 0 | 0 | 1 | 1 | | | 0 | 0 | 0 | 1 | 0 | 0 | 0 | 0 | 1 | 0 | DAV ↓ |
| 0 | X | X | X | X | X | 0 | 0 | 1 | 0 | | | 0 | 0 | 0 | 1 | 0 | 0 | 0 | 0 | 1 | 0 | STEADY STATE |
| | | | | | | | | | | | | | | | | | | | | | | |

FIG. 67B

| | | | | | | | | | | | | | | | | | | | | | | |
|---|---|---|---|---|---|---|---|---|---|---|---|---|---|---|---|---|---|---|---|---|---|---|
| 1 | 1 | X | X | X | X | 0 | 0 | 1 | 0 | | | 0 | 1 | 0 | 1 | 0 | 0 | 0 | 1 | 0 | 0 | DAV & EOI ↑, LATCH STR ↑ |
| 1 | 1 | X | X | X | X | 0 | 1 | 0 | 0 | | | 0 | 0 | 0 | 1 | 0 | 0 | 0 | 1 | 0 | 0 | LATCH STR ↓ - STEADY STATE |
| 0 | X | X | X | X | X | 0 | 1 | 0 | 0 | | | 0 | 0 | 0 | 1 | 0 | 0 | 0 | 0 | 0 | 0 | DAV & EOI ↓ → STATE Ø |
| | | | | | | | | | | | | | | | | | | | | | | |
| 1 | 0 | 0 | 0 | 1 | 0 | 0 | 0 | 0 | 0 | | | 1 | 0 | 0 | 1 | 0 | 0 | 0 | 0 | 0 | 1 | STROBE CMD ↑, CMD = 1 |
| 1 | 0 | 0 | 0 | 1 | 0 | 0 | 0 | 0 | 1 | | | 0 | 0 | 0 | 1 | 0 | 0 | 0 | 0 | 1 | 1 | STROBE CMD ↓ |
| | | | | | | | | | | | | | | | | | | | | | | |
| 1 | 0 | 0 | 1 | 0 | 0 | 0 | 0 | 0 | 0 | | | 0 | 0 | 1 | 0 | 0 | 0 | 0 | 1 | 0 | 0 | ADAPTER ENABLE, CMD = 2 |
| 1 | 0 | 0 | 1 | 0 | 0 | 0 | 1 | 0 | 0 | | | 0 | 1 | 1 | 0 | 0 | 0 | 0 | 1 | 0 | 0 | LATCH STROBE ↑ |
| 1 | 0 | 0 | 1 | 0 | 0 | 0 | 1 | 0 | 1 | | | 0 | 0 | 1 | 0 | 0 | 0 | 0 | 0 | 1 | 1 | LATCH STROBE ↓ |
| | | | | | | | | | | | | | | | | | | | | | | |
| 1 | 0 | 0 | 1 | 1 | 0 | 0 | 0 | 0 | 0 | | | 0 | 0 | 0 | 0 | 0 | 0 | 0 | 0 | 0 | 1 | ADAPTER DISABLE, CMD = 3 |
| 1 | 0 | 0 | 1 | 1 | 0 | 0 | 0 | 0 | 1 | | | 0 | 1 | 0 | 0 | 0 | 1 | 0 | 0 | 0 | 0 | LATCH STROBE ↑ |
| 1 | 0 | 0 | 1 | 1 | 0 | 1 | 0 | 0 | 0 | | | 0 | 0 | 0 | 0 | 0 | 0 | 0 | 0 | 1 | 1 | LATCH STROBE ↓ |
| | | | | | | | | | | | | | | | | | | | | | | |
| 1 | 0 | 1 | 0 | 0 | 0 | 0 | 0 | 0 | 0 | | | 0 | 0 | 1 | 1 | 1 | 0 | 0 | 0 | 0 | 1 | ENABLE MAINT WRITE, CMD = 4 |
| 1 | 0 | 1 | 0 | 0 | 0 | 0 | 0 | 0 | 1 | | | 0 | 1 | 1 | 1 | 1 | 0 | 1 | 0 | 0 | 0 | LATCH STROBE ↑ |
| 1 | 0 | 1 | 0 | 0 | 0 | 1 | 0 | 0 | 0 | | | 0 | 0 | 1 | 1 | 1 | 0 | 0 | 0 | 1 | 1 | LATCH STROBE ↓ |
| | | | | | | | | | | | | | | | | | | | | | | |
| 1 | 0 | 1 | 0 | 1 | 0 | 0 | 0 | 0 | 0 | | | 0 | 0 | 0 | 1 | 1 | 0 | 0 | 0 | 0 | 1 | DISABLE MAINT WRITE, CMD = 5 |
| 1 | 0 | 1 | 0 | 1 | 0 | 0 | 0 | 0 | 1 | | | 0 | 1 | 0 | 1 | 1 | 0 | 1 | 0 | 0 | 0 | LATCH STROBE ↑ |
| 1 | 0 | 1 | 0 | 1 | 0 | 1 | 0 | 0 | 0 | | | 0 | 0 | 0 | 1 | 1 | 0 | 0 | 0 | 1 | 1 | LATCH STROBE ↓ |

| | | | | | | | | | | | | | | | | | | | | | | |
|---|---|---|---|---|---|---|---|---|---|---|---|---|---|---|---|---|---|---|---|---|---|---|
| 1 | 0 | 1 | 1 | 0 | 0 | 0 | 0 | 0 | 0 | | | 0 | 0 | 1 | 0 | 1 | 0 | 0 | 0 | 0 | 1 | DISABLE PARITY, CMD = 6 |
| 1 | 0 | 1 | 1 | 0 | 0 | 0 | 0 | 0 | 1 | | | 0 | 1 | 1 | 0 | 1 | 0 | 1 | 0 | 0 | 0 | LATCH STROBE ↑ |
| 1 | 0 | 1 | 1 | 0 | 0 | 1 | 0 | 0 | 0 | | | 0 | 0 | 1 | 0 | 1 | 0 | 0 | 0 | 1 | 1 | LATCH STROBE ↓ |
| | | | | | | | | | | | | | | | | | | | | | | |
| 1 | 0 | 1 | 1 | 1 | 0 | 0 | 0 | 0 | 0 | | | 0 | 0 | 0 | 0 | 1 | 0 | 0 | 0 | 0 | 1 | ENABLE PARITY, CMD = 7 |
| 1 | 0 | 1 | 1 | 1 | 0 | 0 | 0 | 0 | 1 | | | 0 | 1 | 0 | 0 | 1 | 0 | 1 | 0 | 0 | 0 | LATCH STROBE ↑ |
| 1 | 0 | 1 | 1 | 1 | 0 | 1 | 0 | 0 | 0 | | | 0 | 0 | 0 | 0 | 1 | 0 | 0 | 0 | 1 | 1 | LATCH STROBE ↓ |
| | | | | | | | | | | | | | | | | | | | | | | |
| 1 | 0 | 0 | 0 | 1 | 1 | 0 | 0 | 0 | 0 | | | 0 | 1 | 0 | 1 | 0 | 0 | 1 | 0 | 0 | 1 | LOAD RECORD COUNTER, BYTE Ø CMD = 9 |
| 1 | 0 | X | X | X | X | 1 | 0 | 0 | 1 | | | 0 | 0 | 0 | 1 | 0 | 0 | 1 | 0 | 0 | 1 | STEADY STATE |
| 0 | X | X | X | X | X | 1 | 0 | 0 | 1 | | | 0 | 0 | 0 | 1 | 0 | 0 | 1 | 0 | 1 | 0 | DAV ↓ |
| 0 | X | X | X | X | X | 1 | 0 | 1 | 0 | | | 0 | 0 | 0 | 1 | 0 | 0 | 1 | 0 | 1 | 0 | STEADY STATE |
| 1 | 0 | X | X | X | X | 1 | 0 | 1 | 0 | | | 0 | 0 | 0 | 1 | 0 | 1 | 1 | 0 | 1 | 1 | DAV ↑, 2ND BYTE, STROBE RCD CNTR |
| 1 | 0 | X | X | X | X | 1 | 0 | 1 | 1 | | | 0 | 0 | 0 | 1 | 0 | 0 | 1 | 0 | 1 | 1 | STEADY STATE |
| 0 | X | X | X | X | X | 1 | 0 | 1 | 1 | | | 0 | 0 | 0 | 1 | 0 | 0 | 0 | 0 | 1 | 1 | DAV ↓ |
| | | | | | | | | | | | | | | | | | | | | | | |
| 1 | 1 | X | X | X | X | 0 | 0 | 0 | 0 | | | 0 | 0 | 0 | 1 | 0 | 0 | 1 | 1 | 0 | 0 | FIRST BYTE IS LAST |
| 1 | 1 | X | X | X | X | 1 | 1 | 0 | 0 | | | 0 | 1 | 0 | 1 | 0 | 0 | 0 | 1 | 0 | 0 | LATCH STR |

6 M159 LOAD TIME OF DAY COUNTER CONTROL

| ADDRESS | | | | | | | | | DATA | | | | | | | | | | | | |
|---|---|---|---|---|---|---|---|---|---|---|---|---|---|---|---|---|---|---|---|---|---|
| 100 HZ PULSE | LISN ACC & DAV IN | EN LOAD TO D | LAST STATE | | | | | | H DIS ACCEPT | ACCECT 1 | CLOCK | OUTPUT ENABLE | TO D CNTR SEL | | NEXT STATE | | | | | | DESCRIPTION |
| | | | $2^5$ | $2^4$ | $2^3$ | $2^2$ | $2^1$ | $2^0$ | | | | | $2^1$ | $2^0$ | $2^5$ | $2^4$ | $2^3$ | $2^2$ | $2^1$ | $2^0$ | |
| X | 1 | 1 | 0 | 0 | 0 | 0 | 0 | 0 | 0 | 0 | 0 | 0 | 0 | 0 | 0 | 0 | 0 | 0 | 0 | 1 | CMD BUTE RCD, WRITE TIME STAMP |
| X | 1 | X | 0 | 0 | 0 | 0 | 0 | 1 | 0 | 0 | 0 | 0 | 0 | 0 | 0 | 0 | 0 | 0 | 0 | 1 | |
| X | 0 | X | 0 | 0 | 0 | 0 | 0 | 1 | 0 | 0 | 0 | 0 | 0 | 0 | 0 | 0 | 0 | 0 | 1 | 0 | DAV 1 |
| X | 0 | X | 0 | 0 | 0 | 0 | 1 | 0 | 1 | 0 | 0 | 0 | 0 | 0 | 0 | 0 | 0 | 0 | 1 | 0 | |
| 0 | 1 | X | 0 | 0 | 0 | 0 | 1 | 0 | 1 | 0 | 0 | 0 | 0 | 0 | 0 | 0 | 0 | 0 | 1 | 0 | DAV 1, 2ND BUTE - HOURS |
| 1 | 1 | X | 0 | 0 | 0 | 0 | 1 | 0 | 1 | 0 | 0 | 0 | 0 | 0 | 0 | 0 | 0 | 0 | 1 | 1 | 100 HZ PUL 1 |
| 1 | 1 | X | 0 | 0 | 0 | 0 | 1 | 1 | 1 | 0 | 0 | 0 | 0 | 0 | 0 | 0 | 0 | 0 | 1 | 1 | SS |
| 0 | 1 | X | 0 | 0 | 0 | 0 | 1 | 1 | 1 | 0 | 0 | 1 | 0 | 0 | 0 | 0 | 0 | 1 | 0 | 0 | 100 HZ PUL 1 |
| 0 | 1 | X | 0 | 0 | 0 | 1 | 0 | 0 | 1 | 0 | 1 | 1 | 0 | 0 | 0 | 0 | 0 | 1 | 0 | 1 | CLK HOURS 1 |
| 0 | 1 | X | 0 | 0 | 0 | 1 | 0 | 1 | 1 | 1 | 0 | 1 | 0 | 0 | 0 | 0 | 0 | 1 | 1 | 0 | CLK HOURS 1 ACC 1 |
| 0 | 1 | X | 0 | 0 | 0 | 1 | 1 | 0 | 1 | 1 | 0 | 0 | 0 | 0 | 0 | 0 | 0 | 1 | 1 | 1 | |
| X | 1 | X | 0 | 0 | 0 | 1 | 1 | 1 | 1 | 0 | 0 | 0 | 0 | 0 | 0 | 0 | 0 | 1 | 1 | 1 | ACC 1 |
| X | 0 | X | 0 | 0 | 0 | 1 | 1 | 1 | 1 | 0 | 0 | 0 | 0 | 0 | 0 | 0 | 1 | 0 | 0 | 0 | DAV 1 |
| X | 0 | X | 0 | 0 | 1 | 0 | 0 | 0 | 1 | 0 | 0 | 0 | 0 | 1 | 0 | 0 | 1 | 0 | 0 | 0 | STEADY STATE |

FIG. 68B

| | | | | | | | | | | | | | | | | | | | | | |
|---|---|---|---|---|---|---|---|---|---|---|---|---|---|---|---|---|---|---|---|---|---|
| | | | | | | | | | | | | | | | | | | | | | |
| 0 | 1 | X | 0 | 0 | 1 | 0 | 0 | 0 | 1 | 0 | 0 | 0 | 0 | 1 | 0 | 0 | 1 | 0 | 0 | 0 | DAV 1, 3RD BUTE - MINUTES |
| 1 | 1 | X | 0 | 0 | 1 | 0 | 0 | 0 | 1 | 0 | 0 | 0 | 0 | 1 | 0 | 0 | 1 | 0 | 0 | 1 | 100 HZ PUL 1 |
| 1 | 1 | X | 0 | 0 | 1 | 0 | 0 | 1 | 1 | 0 | 0 | 0 | 0 | 1 | 0 | 0 | 1 | 0 | 0 | 1 | |
| 0 | 1 | X | 0 | 0 | 1 | 0 | 0 | 1 | 1 | 0 | 0 | 1 | 0 | 1 | 0 | 0 | 1 | 0 | 1 | 0 | 100 HZ PUL 1, OUTPUT ENBL 1 |
| 0 | 1 | X | 0 | 0 | 1 | 0 | 1 | 0 | 1 | 0 | 1 | 1 | 0 | 1 | 0 | 0 | 1 | 0 | 1 | 1 | CLK MINUTES 1 |
| 0 | 1 | X | 0 | 0 | 1 | 0 | 1 | 1 | 1 | 1 | 0 | 1 | 0 | 1 | 0 | 0 | 1 | 1 | 0 | 0 | CLK MINUTES 1, ACC 1 |
| 0 | 1 | X | 0 | 0 | 1 | 1 | 0 | 0 | 1 | 1 | 0 | 0 | 0 | 1 | 0 | 0 | 1 | 1 | 0 | 1 | |
| X | 1 | X | 0 | 0 | 1 | 1 | 0 | 1 | 1 | 0 | 0 | 0 | 0 | 1 | 0 | 0 | 1 | 1 | 0 | 1 | ACC 1 |
| X | 0 | X | 0 | 0 | 1 | 1 | 0 | 1 | 1 | 0 | 0 | 0 | 0 | 1 | 0 | 0 | 1 | 1 | 1 | 0 | DAV 1 |
| X | 0 | X | 0 | 0 | 1 | 1 | 1 | 0 | 1 | 0 | 0 | 0 | 1 | 0 | 0 | 0 | 1 | 1 | 1 | 0 | STEADY STATE |
| | | | | | | | | | | | | | | | | | | | | | |
| 0 | 1 | X | 0 | 0 | 1 | 1 | 1 | 0 | 1 | 0 | 0 | 0 | 1 | 0 | 0 | 0 | 1 | 1 | 1 | 0 | DAV 1, 4TH BUTE - SECONDS |
| 1 | 1 | X | 0 | 0 | 1 | 1 | 1 | 0 | 1 | 0 | 0 | 0 | 1 | 0 | 0 | 0 | 1 | 1 | 1 | 1 | 100 HZ PUL 1 |
| 1 | 1 | X | 0 | 0 | 1 | 1 | 1 | 1 | 1 | 0 | 0 | 0 | 1 | 0 | 0 | 0 | 1 | 1 | 1 | 1 | STEADY STATE |
| 0 | 1 | X | 0 | 0 | 1 | 1 | 1 | 1 | 1 | 0 | 0 | 1 | 1 | 0 | 0 | 1 | 0 | 0 | 0 | 0 | 100 HZ PUL 1, OUTPUT ENBL 1 |
| 0 | 1 | X | 0 | 1 | 0 | 0 | 0 | 0 | 1 | 0 | 1 | 1 | 1 | 0 | 0 | 1 | 0 | 0 | 0 | 1 | CLK SEC 1 |
| 0 | 1 | X | 0 | 1 | 0 | 0 | 0 | 1 | 1 | 1 | 0 | 1 | 1 | 0 | 0 | 1 | 0 | 0 | 1 | 0 | CLK SEC 1, ACC 1 |
| 0 | 1 | X | 0 | 1 | 0 | 0 | 1 | 0 | 1 | 1 | 0 | 0 | 1 | 0 | 0 | 1 | 0 | 0 | 1 | 1 | |
| X | 1 | X | 0 | 1 | 0 | 0 | 1 | 1 | 1 | 0 | 0 | 0 | 1 | 0 | 0 | 1 | 0 | 0 | 1 | 1 | ACC 1 STEADY STATE |
| | | | | | | | | | | | | | | | | | | | | | |
| X | 0 | X | 0 | 1 | 0 | 0 | 1 | 0 | 0 | 0 | 0 | 0 | 0 | 0 | 0 | 0 | 0 | 0 | 0 | 0 | DAV 1 |

FIG. 69A

6M109 READ A/B CONTROL

| ADDRESS | | | | | | | | | -00 DATA | | | | -01 DATA | | | | DESCRIPTION |
|---|---|---|---|---|---|---|---|---|---|---|---|---|---|---|---|---|---|
| $2^8$ | $2^7$ | $2^6$ | $2^5$ | $2^4$ | $2^3$ | $2^2$ | $2^1$ | $2^0$ | $2^3$ | $2^2$ | $2^1$ | $2^0$ | $2^3$ | $2^2$ | $2^1$ | $2^0$ | |
| TALKER ACTIVE | DAV & EOI OUT | BUF A FULL | BUF B FULL | LAST STATE | | | | | READ BUF A | READ BUF B | CLEAR BUF | | | | | | |
| | | | | $2^4$ | $2^3$ | $2^2$ | $2^1$ | $2^0$ | | | | $2^4$ | $2^3$ | $2^2$ | $2^1$ | $2^0$ | |
| 0 | X | 1 | 0 | 0 | 0 | 0 | 0 | 0 | 0 | 0 | 0 | 0 | 0 | 0 | 0 | 1 | A = FULL |
| 0 | X | 1 | 0 | 0 | 0 | 0 | 0 | 1 | 0 | 0 | 0 | 0 | 0 | 0 | 0 | 1 | |
| | | | | | | | | | | | | | | | | | |
| 0 | X | 0 | 1 | 0 | 0 | 0 | 0 | 0 | 0 | 0 | 0 | 0 | 0 | 0 | 1 | 0 | B = FULL |
| 0 | X | 0 | 1 | 0 | 0 | 0 | 1 | 0 | 0 | 0 | 0 | 0 | 0 | 0 | 1 | 0 | |
| | | | | | | | | | | | | | | | | | |
| 0 | X | 1 | 1 | 0 | 0 | 0 | 0 | 1 | 0 | 0 | 0 | 0 | 0 | 0 | 1 | 1 | A = B = FULL A 1ST |
| 0 | X | 1 | 1 | 0 | 0 | 0 | 1 | 1 | 0 | 0 | 0 | 0 | 0 | 0 | 1 | 1 | |
| | | | | | | | | | | | | | | | | | |
| 0 | X | 1 | 1 | 0 | 0 | 0 | 1 | 0 | 0 | 0 | 0 | 0 | 0 | 1 | 0 | 0 | A = B = FULL B 1ST |

FIG. 69B

| | | | | | | | | | | | | | | | | | |
|---|---|---|---|---|---|---|---|---|---|---|---|---|---|---|---|---|---|
| 0 | X | 1 | 1 | 0 | 0 | 1 | 0 | 0 | 0 | 0 | 0 | 0 | 0 | 1 | 0 | 0 | |
| | | | | | | | | | | | | | | | | | |
| 1 | 0 | 1 | 1 | 0 | 0 | 0 | 1 | 1 | 1 | 0 | 0 | 0 | 1 | 1 | 0 | 0 | A = B = FULL A 1ST |
| 1 | 0 | 1 | X | 0 | 1 | 1 | 0 | 0 | 1 | 0 | 0 | 0 | 1 | 1 | 0 | 0 | STEADY STATE |
| 1 | 1 | 1 | X | 0 | 1 | 1 | 0 | 0 | 1 | 0 | 0 | 0 | 1 | 1 | 0 | 1 | LAST BYTE ↑ |
| 1 | 1 | 1 | X | 0 | 1 | 1 | 0 | 1 | 1 | 0 | 0 | 0 | 1 | 1 | 0 | 1 | |
| X | 0 | 1 | X | 0 | 1 | 1 | 0 | 1 | 1 | 0 | 1 | 0 | 1 | 1 | 1 | 0 | LAST BYTE ↓ CLR A 1 |
| X | X | X | X | 0 | 1 | 1 | 1 | 0 | 1 | 0 | 1 | 0 | 1 | 1 | 1 | 1 | |
| 1 | X | X | X | 0 | 1 | 1 | 1 | 1 | 0 | 0 | 0 | 0 | 1 | 1 | 1 | 1 | CLR A 1 - HOLD |
| 0 | 0 | 0 | 1 | 0 | 1 | 1 | 1 | 1 | 0 | 0 | 0 | 0 | 0 | 0 | 1 | 0 | TACS 1 B = F → ST 2 |
| 0 | 0 | 1 | 1 | 0 | 1 | 1 | 1 | 1 | 0 | 0 | 0 | 0 | 0 | 1 | 0 | 0 | TACS 1 A = B = F BIST → ST 4 |
| 1 | 0 | 1 | 0 | 0 | 0 | 0 | 0 | 1 | 1 | 0 | 0 | 0 | 0 | 1 | 0 | 1 | A = F TACS ↑ |
| 1 | 0 | 1 | X | 0 | 0 | 1 | 0 | 1 | 1 | 0 | 0 | 0 | 0 | 1 | 0 | 1 | A = FULL |
| 1 | 1 | 1 | X | 0 | 0 | 1 | 0 | 1 | 1 | 0 | 0 | 0 | 0 | 1 | 1 | 0 | LAST BYTE ↑ |
| 1 | 1 | 1 | X | 0 | 0 | 1 | 1 | 0 | 1 | 0 | 0 | 0 | 0 | 1 | 1 | 0 | STEADY STATE |
| X | 0 | 1 | X | 0 | 0 | 1 | 1 | 0 | 1 | 0 | 1 | 0 | 0 | 1 | 1 | 1 | CLR A ↑ - LAST BYTE ↓ |
| X | X | X | X | 0 | 0 | 1 | 1 | 1 | 1 | 0 | 1 | 1 | 0 | 1 | 0 | 0 | |
| 1 | X | X | X | 1 | 0 | 1 | 0 | 0 | 0 | 0 | 0 | 1 | 0 | 1 | 0 | 0 | CLR A ↓ - HOLD |
| | | | | | | | | | | | | | | | | | |
| 1 | 0 | 0 | 1 | 0 | 0 | 0 | 1 | 0 | 0 | 1 | 0 | 0 | 1 | 0 | 0 | 0 | B = F TACS ↑ |
| 1 | 0 | X | 1 | 0 | 1 | 0 | 0 | 0 | 0 | 1 | 0 | 0 | 1 | 0 | 0 | 0 | STEADY STATE |
| 1 | 1 | X | 1 | 0 | 1 | 0 | 0 | 0 | 0 | 1 | 0 | 0 | 1 | 0 | 0 | 1 | LAST BYTE ↑ |

FIG. 69C

| | | | | | | | | | | | | | | | | | |
|---|---|---|---|---|---|---|---|---|---|---|---|---|---|---|---|---|---|
| 1 | 1 | X | 1 | 0 | 1 | 0 | 0 | 1 | 0 | 1 | 0 | 0 | 1 | 0 | 0 | 1 | STEADY STATE |
| X | 0 | X | 1 | 0 | 1 | 0 | 0 | 1 | 0 | 1 | 1 | 0 | 1 | 0 | 1 | 0 | LAST BYTE ↓ CLR B ↑ |
| X | X | X | X | 0 | 1 | 0 | 1 | 0 | 0 | 1 | 1 | 0 | 1 | 0 | 1 | 1 | |
| 1 | X | X | X | 0 | 1 | 0 | 1 | 1 | 0 | 0 | 0 | 0 | 1 | 0 | 1 | 1 | CLR B ↓ → HOLD |
| 0 | 0 | 1 | 0 | 0 | 1 | 0 | 1 | 1 | 0 | 0 | 0 | 0 | 0 | 0 | 0 | 1 | TACS ↓ A = F → ST1 |
| 0 | 0 | 1 | 1 | 0 | 1 | 0 | 1 | 1 | 0 | 0 | 0 | 0 | 0 | 0 | 1 | 1 | TACS ↓ A = B = F A 1ST → ST3 |
| 1 | 0 | 0 | 0 | 0 | 0 | 0 | 0 | 0 | 0 | 0 | 0 | 0 | 0 | 0 | 0 | 0 | |
| | | | | | | | | | | | | | | | | | |
| 0 | 0 | 0 | 1 | 1 | 0 | 1 | 0 | 0 | 0 | 0 | 0 | 0 | 0 | 0 | 1 | 0 | TACS ↓ B = F → ST2 |
| 0 | 0 | 1 | 1 | 1 | 0 | 1 | 0 | 0 | 0 | 0 | 0 | 0 | 0 | 1 | 0 | 0 | TACS ↓ A = F → ST4 |
| | | | | | | | | | | | | | | | | | |
| 1 | 0 | 1 | 1 | 0 | 0 | 1 | 0 | 0 | 0 | 1 | 0 | 1 | 0 | 0 | 0 | 0 | A = B = F – B 1ST |
| 1 | 0 | X | 1 | 1 | 0 | 0 | 0 | 0 | 0 | 1 | 0 | 1 | 0 | 0 | 0 | 0 | |
| 1 | 1 | X | 1 | 1 | 0 | 0 | 0 | 0 | 0 | 1 | 0 | 1 | 0 | 0 | 0 | 1 | LAST BYTE ↑ |
| 1 | 1 | X | 1 | 1 | 0 | 0 | 0 | 1 | 0 | 1 | 0 | 1 | 0 | 0 | 0 | 1 | |
| X | 0 | X | 1 | 1 | 0 | 0 | 0 | 1 | 0 | 1 | 1 | 1 | 0 | 0 | 1 | 0 | CLR B ↑ |
| X | X | X | X | 1 | 0 | 0 | 1 | 0 | 0 | 1 | 1 | 1 | 0 | 0 | 1 | 1 | |
| 1 | X | X | X | 1 | 0 | 0 | 1 | 1 | 0 | 0 | 0 | 1 | 0 | 0 | 1 | 1 | CLR B ↓ - HOLD |
| 0 | 0 | 1 | 0 | 1 | 0 | 0 | 1 | 1 | 0 | 0 | 0 | 0 | 0 | 0 | 0 | 1 | TACS ↓ A = F → ST1 |
| 0 | 0 | 1 | 1 | 1 | 0 | 0 | 1 | 1 | 0 | 0 | 0 | 0 | 0 | 0 | 1 | 1 | TACS ↓ A = B = F - A 1ST → ST3 |

FIG. 70A

6M99 - 00.01 BUS GRANT SEQUENCER

| ADDRESS $2^8$ BUF A & BUF B FULL | $2^7$ LAST STATE $2^2$ | $2^6$ BUS REQ OUT | $2^5$ BUS MASTER | $2^4$ SYNC | $2^3$ * BUS REQ IN | $2^2$ BUS BUSY IN | $2^1$ LAST STATE $2^1$ | $2^0$ LAST STATE $2^0$ | 00 DATA $2^3$ | 00 DATA $2^2$ | 00 DATA $2^1$ NEXT STATE $2^2$ | 00 DATA $2^0$ GRANT ADAPTER | 01 DATA $2^3$ ENABLE SYNC OUT | 01 DATA $2^2$ GRANT OUT | 01 DATA $2^1$ NEXT STATE $2^1$ | 01 DATA $2^0$ NEXT STATE $2^0$ | DESCRIPTION |
|---|---|---|---|---|---|---|---|---|---|---|---|---|---|---|---|---|---|
| 0 | 0 | 0 | 1 | X | 1 | 0 | 0 | 0 | | | 0 | 0 | 0 | 1 | 0 | 1 | REQUEST IN ↑, RAISE GRANT OUT |
| X | 0 | X | 1 | X | X | 0 | 0 | 1 | | | 0 | 0 | 0 | 1 | 0 | 1 | STEADY STATE |
| X | 0 | X | 1 | X | X | 1 | 0 | 1 | | | 0 | 0 | 0 | 0 | 1 | 0 | BUSY IN ↑ DROP GRANT OUT |
| X | 0 | X | 1 | 1 | X | 1 | 1 | 0 | | | 0 | 0 | 0 | 0 | 1 | 0 | SYNC IS HIGH-WAIT FOR LOW |
| X | 0 | X | 1 | 0 | X | 1 | 1 | 0 | | | 1 | 0 | 1 | 0 | 1 | 1 | SYNC HIGH-ENABLE SYNC |
| X | 1 | X | 1 | X | X | 1 | 1 | 1 | | | 1 | 0 | 1 | 0 | 1 | 1 | STEADY STATE |
| X | 1 | X | 1 | 1 | X | 0 | 1 | 1 | | | 1 | 0 | 1 | 0 | 1 | 1 | BUSY IN ↓ BUT SYNC HIGH-WAIT |
| X | 1 | X | 1 | 0 | X | 0 | 1 | 1 | | | 0 | 0 | 0 | 0 | 0 | 0 | SYNC & BUSY IN LOW-EXIT |
| | | | | | | | | | | | | | | | | | |
| X | 0 | 1 | 1 | X | X | 0 | 0 | 0 | | | 1 | 1 | 0 | 0 | 0 | 0 | REQ OUT ↑ GRANT A.D. |
| X | 1 | X | 1 | X | X | 0 | 0 | 0 | | | 1 | 1 | 0 | 0 | 0 | 0 | STEADY STATE |
| X | 1 | X | 1 | X | X | 1 | 0 | 0 | | | 1 | 0 | 0 | 0 | 0 | 1 | BUSY ↑ DROP GRANT |
| X | 1 | X | 1 | 1 | X | 1 | 0 | 1 | | | 1 | 0 | 0 | 0 | 0 | 1 | SYNC HIGH-WAIT FOR LOW |

* THIS INPUT BECOMES GRANT IN WHEN NOT MASTER

FIG. 70B

| | | | | | | | | | | | | | | | | | |
|---|---|---|---|---|---|---|---|---|---|---|---|---|---|---|---|---|---|
| X | 1 | X | 1 | 0 | X | 1 | 0 | 1 | | | 1 | 0 | 1 | 0 | 1 | 0 | SYNC LOW-ENABLE SYNC |
| X | 1 | X | 1 | X | X | 1 | 1 | 0 | | | 1 | 0 | 1 | 0 | 1 | 0 | STEADY STATE |
| X | 1 | X | 1 | 1 | X | 0 | 1 | 0 | | | 1 | 0 | 1 | 0 | 1 | 0 | BUSY ↓ BUT SYNC HIGH-<br>WAIT FOR LOW |
| X | 1 | X | 1 | 0 | X | 0 | 1 | 0 | | | 0 | 0 | 0 | 0 | 0 | 0 | SYNC LOW-EXIT |
| | | | | | | | | | | | | | | | | | |
| X | 0 | 0 | 0 | X | 1 | 0 | 0 | 0 | | | 0 | 0 | 0 | 1 | 0 | 1 | GRANT IN ↑ RAISE GRANT OUT |
| X | 0 | 0 | 0 | X | 1 | 0 | 0 | 1 | | | 0 | 0 | 0 | 1 | 0 | 1 | STEADY STATE |
| X | 0 | X | 0 | X | X | 1 | 0 | 1 | | | 0 | 0 | 0 | 0 | 1 | 1 | BUSY ↑-DROP GRANT OUT |
| X | 0 | X | 0 | X | X | 1 | 1 | 1 | | | 0 | 0 | 0 | 0 | 1 | 1 | STEADY STATE |
| X | 0 | X | 0 | X | X | 0 | 1 | 1 | | | 0 | 0 | 0 | 0 | 0 | 0 | BUSY ↓ EXIT |
| X | 0 | 0 | 0 | X | 0 | 0 | 0 | 1 | | | 0 | 0 | 0 | 0 | 0 | 1 | GRANT IN ↓ DROP GRANT OUT-<br>WAIT FOR BUSY |
| | | | | | | | | | | | | | | | | | |
| X | 0 | 1 | 0 | X | 0 | 0 | 0 | 0 | | | 0 | 0 | 0 | 0 | 0 | 1 | REQ OUT ↑ |
| X | 0 | 1 | 0 | X | 0 | 0 | 0 | 1 | | | 0 | 0 | 0 | 0 | 0 | 1 | STEADY STATE |
| X | 0 | 1 | 0 | X | 1 | 0 | 0 | 1 | | | 0 | 1 | 0 | 0 | 1 | 0 | GRANT IN ↑ - RAISE GRANT A.D. |
| X | 0 | X | 0 | X | 1 | 0 | 1 | 0 | | | 0 | 1 | 0 | 0 | 1 | 0 | STEADY STATE |
| X | 0 | X | 0 | X | 0 | 0 | 1 | 0 | | | 0 | 0 | 0 | 0 | 1 | 0 | GRANT IN ↓ - DROP GRANT A.D. - WAIT |
| X | 0 | X | 0 | X | X | 1 | 1 | 0 | | | 1 | 0 | 0 | 0 | 0 | 1 | BUSY ↑ |
| X | 1 | X | 0 | X | X | 1 | 0 | 1 | | | 1 | 0 | 0 | 0 | 0 | 1 | STEADY STATE |
| X | 1 | X | 0 | X | X | 0 | 0 | 1 | | | 0 | 0 | 0 | 0 | 0 | 0 | BUSY ↓ - EXIT |
| | | | | | | | | | | | | | | | | | |
| X | 0 | 1 | 0 | X | 1 | 0 | 0 | 0 | | | 0 | 1 | 0 | 0 | 1 | 0 | REQ OUT AND GRANT IN - GRANT A.D. |

FIG. 71

6M100 BUS REQUEST CONTROL

| ADDRESS | | | | | | | | | DATA | | | | |
|---|---|---|---|---|---|---|---|---|---|---|---|---|---|
| $2^8$ | $2^7$ | $2^6$ | $2^5$ | $2^4$ | $2^3$ | $2^2$ | $2^1$ | $2^0$ | $2^3$ | $2^2$ | $2^1$ | $2^0$ | |
| | | SYNC | BUF C EMPTY | BUS GRANT IN | LAST BYTE RECORD | BUSY IN | LAST STATE | | REQ OUT | BUSY OUT | NEXT STATE | | DESCRIPTION |
| | | | | | | | $2^1$ | $2^0$ | | | $2^1$ | $2^0$ | |
| 0 | 0 | 0 | 0 | 0 | 1 | 0 | 0 | 0 | 1 | 0 | 0 | 1 | LAST BYTE REC'D↑-RAISE REQ OUT |
| 0 | 0 | 0 | 0 | 0 | X | 0 | 0 | 1 | 1 | 0 | 0 | 1 | STABLE STATE |
| 0 | 0 | 0 | 0 | 1 | X | 0 | 0 | 1 | 0 | 1 | 1 | 0 | GRANT ↑ - DROP REQ OUT - RAISE BUSY |
| 0 | 0 | X | 0 | X | X | X | 1 | 0 | 0 | 1 | 1 | 0 | STABLE STATE |
| 0 | 0 | 0 | 1 | 0 | 0 | 1 | 1 | 0 | 0 | 0 | 0 | 0 | BUF C EMPTY - DROP BUSY OUT |
| | | | | | | | | | | | | | |
| 0 | 0 | 0 | 0 | 0 | 1 | 1 | 0 | 0 | 0 | 0 | 1 | 1 | BUSY ↑ → OTHER DEVICE BUSY |
| 0 | 0 | X | X | X | 1 | 1 | 1 | 1 | 0 | 0 | 1 | 1 | STEADY STATE |
| 0 | 0 | X | 0 | 0 | X | 0 | 1 | 1 | 0 | 0 | 0 | 0 | BUSY ↓ - EXIT |

FIG. 72

6M1Ø1-ØØ BYTE COUNT DECODER - UPPER

| ADDRESS | | | | | | | | DATA | | | | DESCRIPTION |
|---|---|---|---|---|---|---|---|---|---|---|---|---|
| $2^7$ | $2^6$ | $2^5$ | $2^4$ | $2^3$ | $2^2$ | $2^1$ | $2^0$ | $2^3$ | $2^2$ | $2^1$ | $2^0$ | |
| 0 | 0 | 0 | 0 | 0 | 0 | 0 | 0 | 0 | 0 | 1 | 1 | COUNT = 0 |
| 0 | 0 | 0 | 1 | 0 | 0 | 0 | 0 | 1 | 1 | 0 | 0 | COUNT = 10 HEX |
| ALL OTHERS | | | | | | | | 0 | 0 | 0 | 0 | |

FIG. 73

6M1Ø1-Ø1 BYTE COUNT DECODER - LOWER

| ADDRESS | | | | | | | | DATA | | | | DESCRIPTION |
|---|---|---|---|---|---|---|---|---|---|---|---|---|
| $2^7$ | $2^6$ | $2^5$ | $2^4$ | $2^3$ | $2^2$ | $2^1$ | $2^0$ | $2^3$ | $2^2$ | $2^1$ | $2^0$ | |
| 0 | 0 | 0 | 0 | 0 | 0 | 0 | 0 | 1 | 1 | 0 | 1 | COUNT = 0 |
| 0 | 0 | 0 | 0 | 0 | 0 | 0 | 1 | 0 | 0 | 1 | 0 | COUNT = 1 |
| ALL OTHERS | | | | | | | | 0 | 0 | 0 | 0 | |

6MII0 WRITE SIGNAL CONTROL

FIG. 74A

| ADDRESS | | | | | | | | | 00 DATA | | | | 01 DATA | | | | 02 DATA | | | | DISCRIPTION |
|---|---|---|---|---|---|---|---|---|---|---|---|---|---|---|---|---|---|---|---|---|---|
| $2^8$ | $2^7$ | $2^6$ | $2^5$ | $2^4$ | $2^3$ | $2^2$ | $2^1$ | $2^0$ | $2^3$ | $2^2$ | $2^1$ | $2^0$ | $2^3$ | $2^2$ | $2^1$ | $2^0$ | $2^3$ | $2^2$ | $2^1$ | $2^0$ | |
| | START RECORD | SYNC | LAST STATE | | | | | | WRITE UPPER | WRITE LOWER | ENABLE WRITE TOD | TIME OF-DAY SELECT | | | NEXT STATE | | | | | | |
| | | | $2^5$ | $2^4$ | $2^3$ | $2^2$ | $2^1$ | $2^0$ | | | | $2^2$ | $2^1$ | $2^0$ | $2^5$ | $2^4$ | $2^3$ | $2^2$ | $2^1$ | $2^0$ | |
| 0 | 1 | 1 | 0 | 0 | 0 | 0 | 0 | 0 | 0 | 0 | 0 | 0 | 0 | 0 | 0 | 0 | 0 | 0 | 0 | 1 | SYNC ↑ |
| 0 | 1 | 1 | 0 | 0 | 0 | 0 | 0 | 1 | 0 | 0 | 1 | 0 | 0 | 0 | 0 | 0 | 0 | 0 | 1 | 0 | ENABLE HOURS UPPER |
| 0 | 1 | X | 0 | 0 | 0 | 0 | 1 | 0 | 1 | 0 | 1 | 0 | 0 | 0 | 0 | 0 | 0 | 0 | 1 | 1 | WRITE UPPER ↑ |
| 0 | 1 | X | 0 | 0 | 0 | 0 | 1 | 1 | 1 | 0 | 1 | 0 | 0 | 0 | 0 | 0 | 0 | 1 | 0 | 0 | |
| 0 | 1 | X | 0 | 0 | 0 | 1 | 0 | 0 | 0 | 0 | 1 | 0 | 0 | 0 | 0 | 0 | 0 | 1 | 0 | 1 | WRITE UPPER ↓ |
| 0 | 1 | X | 0 | 0 | 0 | 1 | 0 | 1 | 0 | 0 | 1 | 0 | 0 | 1 | 0 | 0 | 0 | 1 | 1 | 0 | ENABLE HOURS LOWER |
| 0 | 1 | X | 0 | 0 | 0 | 1 | 1 | 0 | 0 | 1 | 1 | 0 | 0 | 1 | 0 | 0 | 0 | 1 | 1 | 1 | WRITE LOWER ↑ |
| 0 | 1 | X | 0 | 0 | 0 | 1 | 1 | 1 | 0 | 1 | 1 | 0 | 0 | 1 | 0 | 0 | 1 | 0 | 0 | 0 | |
| 0 | 1 | X | 0 | 0 | 1 | 0 | 0 | 0 | 0 | 0 | 1 | 0 | 0 | 1 | 0 | 0 | 1 | 0 | 0 | 1 | WRITE LOWER ↓ |
| 0 | 1 | X | 0 | 0 | 1 | 0 | 0 | 1 | 0 | 0 | 1 | 0 | 1 | 0 | 0 | 0 | 1 | 0 | 1 | 0 | ENABLE MINUTES UPPER |
| 0 | 1 | X | 0 | 0 | 1 | 0 | 1 | 0 | 1 | 0 | 1 | 0 | 1 | 0 | 0 | 0 | 1 | 0 | 1 | 1 | WRITE UPPER ↑ |
| 0 | 1 | X | 0 | 0 | 1 | 0 | 1 | 1 | 1 | 0 | 1 | 0 | 1 | 0 | 0 | 0 | 1 | 1 | 0 | 0 | |

FIG. 74B

| | | | | | | | | | | | | | | | | | | | | | |
|---|---|---|---|---|---|---|---|---|---|---|---|---|---|---|---|---|---|---|---|---|---|
| 0 | 1 | X | 0 | 0 | 1 | 1 | 0 | 0 | 0 | 0 | 1 | 0 | 1 | 0 | 0 | 0 | 1 | 1 | 0 | 1 | WRITE UPPER ↓ |
| 0 | 1 | X | 0 | 0 | 1 | 1 | 0 | 1 | 0 | 0 | 1 | 0 | 1 | 1 | 0 | 0 | 1 | 1 | 1 | 0 | ENABLE MINUTES LOWER |
| 0 | 1 | X | 0 | 0 | 1 | 1 | 1 | 0 | 0 | 1 | 1 | 0 | 1 | 1 | 0 | 0 | 1 | 1 | 1 | 1 | WRITE LOWER ↑ |
| 0 | 1 | X | 0 | 0 | 1 | 1 | 1 | 1 | 0 | 1 | 1 | 0 | 1 | 1 | 0 | 1 | 0 | 0 | 0 | 0 | |
| 0 | 1 | X | 0 | 1 | 0 | 0 | 0 | 0 | 0 | 0 | 1 | 0 | 1 | 1 | 0 | 1 | 0 | 0 | 0 | 1 | WRITE LOWER ↓ |
| 0 | 1 | X | 0 | 1 | 0 | 0 | 0 | 1 | 0 | 0 | 1 | 1 | 0 | 0 | 0 | 1 | 0 | 0 | 1 | 0 | ENABLE SECONDS UPPER |
| 0 | 1 | X | 0 | 1 | 0 | 0 | 1 | 0 | 1 | 0 | 1 | 1 | 0 | 0 | 0 | 1 | 0 | 0 | 1 | 1 | WRITE UPPER ↑ |
| 0 | 1 | X | 0 | 1 | 0 | 0 | 1 | 1 | 1 | 0 | 1 | 1 | 0 | 0 | 0 | 1 | 0 | 1 | 0 | 0 | |
| 0 | 1 | X | 0 | 1 | 0 | 1 | 0 | 0 | 0 | 0 | 1 | 1 | 0 | 0 | 0 | 1 | 0 | 1 | 0 | 1 | WRITE UPPER ↓ |
| 0 | 1 | X | 0 | 1 | 0 | 1 | 0 | 1 | 0 | 0 | 1 | 1 | 0 | 1 | 0 | 1 | 0 | 1 | 1 | 0 | ENABLE SECONDS LOWER |
| 0 | 1 | X | 0 | 1 | 0 | 1 | 1 | 0 | 0 | 1 | 1 | 1 | 0 | 1 | 0 | 1 | 0 | 1 | 1 | 1 | WRITE LOWER ↑ |
| 0 | 1 | X | 0 | 1 | 0 | 1 | 1 | 1 | 0 | 1 | 1 | 1 | 0 | 1 | 0 | 1 | 1 | 0 | 0 | 0 | |
| 0 | 1 | X | 0 | 1 | 1 | 0 | 0 | 0 | 0 | 0 | 1 | 1 | 0 | 1 | 0 | 1 | 1 | 0 | 0 | 1 | WRITE LOWER ↓ |
| 0 | 1 | X | 0 | 1 | 1 | 0 | 0 | 1 | 0 | 0 | 1 | 1 | 1 | 0 | 0 | 1 | 1 | 0 | 1 | 0 | ENABLE HUNDREDS UPPER |
| 0 | 1 | X | 0 | 1 | 1 | 0 | 1 | 0 | 1 | 0 | 1 | 1 | 1 | 0 | 0 | 1 | 1 | 0 | 1 | 1 | WRITE UPPER ↑ |
| 0 | 1 | X | 0 | 1 | 1 | 0 | 1 | 1 | 1 | 0 | 1 | 1 | 1 | 0 | 0 | 1 | 1 | 1 | 0 | 0 | |
| 0 | 1 | X | 0 | 1 | 1 | 1 | 0 | 0 | 0 | 0 | 1 | 1 | 1 | 0 | 0 | 1 | 1 | 1 | 0 | 1 | WRITE UPPER ↓ |
| 0 | 1 | X | 0 | 1 | 1 | 1 | 0 | 1 | 0 | 0 | 1 | 1 | 1 | 1 | 0 | 1 | 1 | 1 | 1 | 0 | ENABLE HUNDREDS LOWER |
| 0 | 1 | X | 0 | 1 | 1 | 1 | 1 | 0 | 0 | 1 | 1 | 1 | 1 | 1 | 0 | 1 | 1 | 1 | 1 | 1 | WRITE LOWER ↑ |
| 0 | 1 | X | 0 | 1 | 1 | 1 | 1 | 1 | 0 | 1 | 1 | 1 | 1 | 1 | 1 | 0 | 0 | 0 | 0 | 0 | |
| 0 | 1 | X | 1 | 0 | 0 | 0 | 0 | 0 | 0 | 0 | 1 | 1 | 1 | 1 | 1 | 0 | 0 | 0 | 0 | 1 | WRITE LOWER ↓ |
| 0 | 1 | X | 1 | 0 | 0 | 0 | 0 | 1 | 0 | 0 | 1 | 1 | 1 | 1 | 1 | 0 | 0 | 0 | 1 | 0 | |
| 0 | 1 | X | 1 | 0 | 0 | 0 | 1 | 0 | 0 | 0 | 0 | 0 | 0 | 0 | 1 | 0 | 0 | 0 | 1 | 1 | DISABLE TIME-OF-DAY WRITE |
| 0 | 1 | X | 1 | 0 | 0 | 0 | 1 | 1 | 1 | 0 | 0 | 0 | 0 | 0 | 1 | 0 | 0 | 1 | 0 | 0 | WRITE UPPER ↑ |

| | | | | | | | | | | | | | | | | | | | | | |
|---|---|---|---|---|---|---|---|---|---|---|---|---|---|---|---|---|---|---|---|---|---|
| 0 | 1 | X | 1 | 0 | 0 | 1 | 0 | 0 | 1 | 0 | 0 | 0 | 0 | 0 | 1 | 0 | 0 | 1 | 0 | 1 | (FIRST NIBBLE) |
| 0 | 1 | X | 1 | 0 | 0 | 1 | 0 | 1 | 0 | 0 | 0 | 0 | 0 | 0 | 1 | 0 | 0 | 1 | 1 | 0 | WRITE UPPER ↓ |
| 0 | 1 | 1 | 1 | 0 | 0 | 1 | 1 | 0 | 0 | 0 | 0 | 0 | 0 | 0 | 1 | 0 | 0 | 1 | 1 | 0 | SYNC STILL HIGH |
| 0 | 1 | 0 | 1 | 0 | 0 | 1 | 1 | 0 | 0 | 0 | 0 | 0 | 0 | 0 | 1 | 0 | 0 | 1 | 1 | 1 | SYNC ↓ |
| 0 | 1 | 0 | 1 | 0 | 0 | 1 | 1 | 1 | 0 | 0 | 0 | 0 | 0 | 0 | 1 | 0 | 0 | 1 | 1 | 1 | STEADY STATE |
| 0 | 1 | 1 | 1 | 0 | 0 | 1 | 1 | 1 | 0 | 1 | 0 | 0 | 0 | 0 | 1 | 0 | 1 | 0 | 0 | 0 | SYNC ↑ (SECOND NIBBLE) - WRITE LOW |
| 0 | 1 | 1 | 1 | 0 | 1 | 0 | 0 | 0 | 0 | 1 | 0 | 0 | 0 | 0 | 1 | 0 | 1 | 0 | 0 | 1 | |
| 0 | 1 | 1 | 1 | 0 | 1 | 0 | 0 | 1 | 0 | 0 | 0 | 0 | 0 | 0 | 1 | 0 | 1 | 0 | 0 | 1 | WRITE LOWER ↓ - STEADY STATE |
| | | | | | | | | | | | | | | | | | | | | | |
| 0 | 1 | 0 | 1 | 0 | 1 | 0 | 0 | 1 | 0 | 0 | 0 | 0 | 0 | 0 | 1 | 0 | 1 | 0 | 1 | 0 | SYNC ↓ |
| 0 | 1 | 0 | 1 | 0 | 1 | 0 | 1 | 0 | 0 | 0 | 0 | 0 | 0 | 0 | 1 | 0 | 1 | 0 | 1 | 0 | STEADY STATE |
| | | | | | | | | | | | | | | | | | | | | | |
| 0 | 1 | 1 | 1 | 0 | 1 | 0 | 1 | 0 | | 1 | 0 | 0 | 0 | 0 | 1 | 0 | 1 | 0 | 1 | 1 | SYNC ↑ - WRITE UPPER ↑ |
| 0 | 1 | 1 | 1 | 0 | 1 | 0 | 1 | 1 | | 1 | 0 | 0 | 0 | 0 | 1 | 0 | 1 | 1 | 0 | 0 | |
| 0 | 1 | 1 | 1 | 0 | 1 | 1 | 0 | 0 | | 0 | 0 | 0 | 0 | 0 | 1 | 0 | 1 | 1 | 0 | 0 | WRITE UPPER ↓ - STEADY STATE |
| | | | | | | | | | | | | | | | | | | | | | |
| 0 | 1 | 0 | 1 | 0 | 1 | 1 | 0 | 0 | | 0 | 0 | 0 | 0 | 0 | 1 | 0 | 0 | 1 | 1 | 1 | SYNC ↓ |

6M162 READ BUFFER CONDITION CONTROL

| ADDRESS | | | | | | | | | DATA | | | | | | |
|---|---|---|---|---|---|---|---|---|---|---|---|---|---|---|---|
| WRITE BUFFER A | WRITE BUFFER B | CLEAR BUFFER | LAST STATE | | | | | | A = FULL | B = FULL | NEXT STATE | | | | DISCRIPTION |
| | | | $2^3$ | $2^2$ | $2^1$ | $2^0$ | | | | | $2^3$ | $2^2$ | $2^1$ | $2^0$ | |
| 0 | 1 | 0 | 0 | 0 | 0 | 0 | | | 0 | 0 | 1 | 0 | 0 | 1 | WRITE BUFFER B — A EMPTY |
| 1 | 0 | 0 | 0 | 0 | 0 | 0 | | | 0 | 0 | 0 | 0 | 0 | 1 | WRITE BUFFER A — B EMPTY |
| 1 | 0 | 0 | 0 | 0 | 0 | 1 | | | 0 | 0 | 0 | 0 | 0 | 1 | |
| 0 | 0 | 0 | 0 | 0 | 0 | 1 | | | 1 | 0 | 0 | 0 | 1 | 0 | WRITE BUFFER A↓ — A = FULL |
| 0 | 0 | 0 | 0 | 0 | 1 | 0 | | | 1 | 0 | 0 | 0 | 1 | 0 | A = FULL |
| 0 | 1 | 0 | 0 | 0 | 1 | 0 | | | 1 | 0 | 0 | 0 | 1 | 1 | WRITE BUFFER B↑ — A = FULL |
| 0 | 1 | 1 | 0 | 0 | 1 | 0 | | | 0 | 0 | 1 | 1 | 0 | 1 | WRITE BUFFER B↑ ∧ CLEAR BUFFER A↑ |
| 0 | 1 | 1 | 1 | 1 | 0 | 1 | | | 0 | 0 | 1 | 1 | 0 | 1 | |
| 0 | 1 | 0 | 1 | 1 | 0 | 1 | | | 0 | 0 | 1 | 0 | 0 | 1 | CLEAR BUFFER↓ |
| 0 | 0 | 0 | 1 | 1 | 0 | 1 | | | 0 | 0 | 0 | 1 | 1 | 0 | WRITE BUFFER B↓ ∧ CLEAR BUFFER B |
| 0 | 1 | 0 | 1 | 0 | 0 | 1 | | | 0 | 0 | 1 | 0 | 0 | 1 | WRITE BUFFER B↑ |
| 0 | 0 | 0 | 1 | 0 | 0 | 1 | | | 0 | 0 | 0 | 1 | 1 | 0 | WRITE BUFFER B↓ — B = FULL |
| 0 | 0 | 0 | 0 | 1 | 1 | 0 | | | 0 | 1 | 0 | 1 | 1 | 0 | B = FULL |

FIG. 75B

| | | | | | | | | | | | | | | | | |
|---|---|---|---|---|---|---|---|---|---|---|---|---|---|---|---|---|
| 0 | 0 | 1 | 0 | 1 | 1 | 0 | | | 0 | 0 | 0 | 0 | 0 | 0 | CLEAR BUFFER B |
| 1 | 0 | 0 | 0 | 1 | 1 | 0 | | | 0 | 1 | 0 | 1 | 1 | 1 | WRITE BUFFER A — B = FULL |
| 1 | 0 | 1 | 0 | 1 | 1 | 0 | | | 0 | 1 | 1 | 1 | 0 | 0 | WRITE BUFFER A ↑ — ∧ CLEAR BUFFER ↑ — HOLD |
| 1 | 0 | 1 | 1 | 1 | 0 | 0 | | | 0 | 0 | 1 | 1 | 0 | 0 | B = EMPTY — A FILLING |
| 1 | 0 | 0 | 1 | 1 | 0 | 0 | | | 0 | 0 | 0 | 0 | 0 | 1 | CLEAR BUFFER ↓ → STATE 1 |
| 0 | 0 | 1 | 1 | 1 | 0 | 0 | | | 1 | 0 | 1 | 1 | 0 | 0 | WRITE BUFFER A ↓ — A = FULL |
| 0 | 0 | 0 | 1 | 1 | 0 | 0 | | | 1 | 0 | 0 | 0 | 1 | 0 | CLEAR BUFFER ↓ → STATE 2 |
| 0 | 1 | 0 | 0 | 0 | 1 | 1 | | | 1 | 0 | 0 | 0 | 1 | 1 | B FILLING — A = FULL |
| 0 | 0 | 0 | 0 | 0 | 1 | 1 | | | 1 | 1 | 0 | 1 | 0 | 0 | A = B = FULL — A FIRST |
| X | X | 0 | 0 | 1 | 0 | 0 | | | 1 | 1 | 0 | 1 | 0 | 0 | |
| X | X | 1 | 0 | 1 | 0 | 0 | | | 0 | 1 | 1 | 0 | 1 | 0 | CLEAR BUFFER A — B = FULL |
| X | X | 1 | 1 | 0 | 1 | 0 | | | 0 | 1 | 1 | 0 | 1 | 0 | |
| 0 | 0 | 1 | 1 | 0 | 1 | 0 | | | 0 | 1 | 0 | 1 | 1 | 0 | B = FULL ONLY → STATE 6 |
| 1 | 0 | 0 | 1 | 0 | 1 | 0 | | | 0 | 1 | 0 | 1 | 1 | 1 | B = FULL — A FILLING → STATE 7 |
| 0 | 0 | 1 | 0 | 0 | 1 | 1 | | | 0 | 1 | 1 | 0 | 1 | 0 | CLEAR BUFFER A — B = FULL |
| 0 | 1 | 1 | 0 | 0 | 1 | 1 | | | 0 | 0 | 1 | 1 | 0 | 1 | B FILLING — CLEAR BUFFER A → STATE B |
| 1 | 0 | 0 | 0 | 1 | 1 | 1 | | | 0 | 1 | 0 | 1 | 1 | 1 | |
| 0 | 0 | 0 | 0 | 1 | 1 | 1 | | | 1 | 1 | 1 | 0 | 0 | 0 | WRITE BUFFER A ↓ — A = B = FULL — B FIRST |
| X | X | 0 | 1 | 0 | 0 | 0 | | | 1 | 1 | 1 | 0 | 0 | 0 | A = B = FULL — B FIRST |
| X | X | 1 | 1 | 0 | 0 | 0 | | | 1 | 0 | 1 | 0 | 1 | 1 | CLEAR BUFFER B — A = FULL ONLY |
| X | X | 1 | 1 | 0 | 1 | 1 | | | 1 | 0 | 1 | 0 | 1 | 1 | |
| 0 | 0 | 0 | 1 | 0 | 1 | 1 | | | 1 | 0 | 0 | 0 | 1 | 0 | A = FULL ONLY → STATE 2 |
| 0 | 1 | 0 | 1 | 0 | 1 | 1 | | | 1 | 0 | 0 | 0 | 1 | 1 | WRITE BUFFER B ↑ — A = FULL → STATE 3 |
| 1 | 0 | 1 | 0 | 1 | 1 | 1 | | | 0 | 0 | 1 | 1 | 0 | 0 | A FILLING — CLEAR BUFFER B → STATE C |
| 0 | 0 | 1 | 0 | 1 | 1 | 1 | | | 1 | 0 | 1 | 0 | 1 | 1 | CLEAR BUFFER B — A = FULL ONLY → STATE B |

FIG. 76

6M94 ACCEPTOR HANDSHAKE

| ADDRESS | | | | | | | | -00 DATA | | | | -01 DATA | | | | DESCRIPTION |
|---|---|---|---|---|---|---|---|---|---|---|---|---|---|---|---|---|
| $2^7$ | $2^6$ | $2^5$ | $2^4$ | $2^3$ | $2^2$ | $2^1$ | $2^0$ | $2^3$ | $2^2$ | $2^1$ | $2^0$ | $2^3$ | $2^2$ | $2^1$ | $2^0$ | |
| GROUND | ATN IN | LSNR ACT | DATA ACCEPT | DAV IN | LAST STATE | | | NU | NU | NOT DAC | NOT RFD | NOT USED | NEXT STATE | | | |
| | | | | | $2^2$ | $2^1$ | $2^0$ | | | | | | $2^2$ | $2^1$ | $2^0$ | |
| 0 | 0 | 0 | 0 | X | X | X | X | 0 | 0 | 0 | 0 | 0 | 0 | 0 | 0 | ACC IDLE, DAC & RFD ↑ |
| 0 | 1 | X | X | 0 | 0 | 0 | 0 | 0 | 0 | 1 | 1 | 0 | 0 | 0 | 1 | ATN ↑→ DAC & RFD ↓ |
| 0 | 1 | X | X | X | 0 | 0 | 1 | 0 | 0 | 1 | 0 | 0 | 0 | 1 | 0 | RFD ↑ |
| 0 | 1 | X | X | 0 | 0 | 1 | 0 | 0 | 0 | 1 | 0 | 0 | 0 | 1 | 0 | STABLE STATE |
| 0 | 1 | X | X | 1 | 0 | 1 | 0 | 0 | 0 | 1 | 1 | 1 | 1 | 0 | 0 | DAV ↑→ RFD ↓ |
| 0 | 1 | X | X | 1 | 1 | 0 | 0 | 0 | 0 | 0 | 1 | 0 | 1 | 0 | 0 | DAC ↑ - STABLE STATE |
| 0 | 1 | X | X | 0 | 1 | 0 | 0 | 0 | 0 | 1 | 1 | 0 | 0 | 1 | 0 | DAV ↓→ DAC ↓ |
| 0 | 1 | X | X | 1 | 0 | 0 | 1 | 0 | 0 | 1 | 0 | 0 | 0 | 1 | 0 | DAC ↓, RFD ↑ |
| 0 | 0 | 1 | 0 | 0 | 0 | 1 | 0 | 0 | 0 | 1 | 0 | 0 | 0 | 1 | 0 | LSNR ACTIVE |
| 0 | 0 | 1 | 0 | 1 | 0 | 1 | 0 | 0 | 0 | 1 | 1 | 1 | 1 | 0 | 0 | DAV ↑→ RFD ↓ |
| 0 | 0 | 1 | 0 | 1 | 1 | 0 | 0 | 0 | 0 | 1 | 1 | 0 | 1 | 0 | 0 | STEADY STATE — WAIT FOR ACCEPT |
| 0 | 0 | 1 | 1 | 1 | 1 | 0 | 0 | 0 | 0 | 0 | 1 | 0 | 1 | 0 | 1 | ACCEPT ↑→ DAC ↑ |
| 0 | 0 | 1 | X | 1 | 1 | 0 | 1 | 0 | 0 | 0 | 1 | 0 | 1 | 0 | 1 | STEADY STATE |
| 0 | 0 | 1 | 0 | 0 | 1 | 0 | 1 | 0 | 0 | 1 | 1 | 0 | 0 | 1 | 0 | DAV ↓→ DAC ↓ |
| 0 | 0 | 1 | 0 | 0 | 0 | 0 | 0 | 0 | 0 | 1 | 0 | 0 | 0 | 1 | 0 | |
| 0 | 0 | 1 | 1 | 1 | 0 | 1 | 0 | 0 | 0 | 1 | 1 | 1 | 1 | 0 | 0 | |
| 0 | 0 | 1 | 1 | 0 | 0 | 1 | 0 | 0 | 0 | 1 | 1 | 0 | 0 | 1 | 0 | |
| 0 | 0 | 1 | 1 | 0 | 1 | 0 | 0 | 0 | 0 | 1 | 1 | 0 | 0 | 1 | 0 | |

FIG. 77

6M108-00 COMMAND DECODER

| ADDRESS | | | | | | | | DATA | | | | DESCRIPTION |
|---|---|---|---|---|---|---|---|---|---|---|---|---|
| $2^7$ | $2^6$ | $2^5$ | $2^4$ | $2^3$ | $2^2$ | $2^1$ | $2^0$ | $2^3$ | $2^2$ | $2^1$ | $2^0$ | |
| 0 | 1 | 0 | 0 | 0 | 0 | 0 | 0 | 0 | 1 | 1 | 1 | L ENABLE LOAD TIME-OF-DAY |
| 0 | 1 | 1 | 0 | 0 | 0 | 0 | 0 | 1 | 1 | 1 | 0 | L SET FORCED READ |
| 1 | 0 | 1 | 0 | 0 | 0 | 0 | 0 | 1 | 0 | 1 | 1 | L SET ADAPTER WRITE |
| ALL OTHERS | | | | | | | | 1 | 1 | 0 | 1 | L SET COMMAND REJECT |

FIG. 78

6M95-00 LISTENER FUNCTION

| ADDRESS | | | | | | | | DATA | | | | DESCRIPTION |
|---|---|---|---|---|---|---|---|---|---|---|---|---|
| $2^7$ | $2^6$ | $2^5$ | $2^4$ | $2^3$ | $2^2$ | $2^1$ | $2^0$ | $2^3$ | $2^2$ | $2^1$ | $2^0$ | |
| GROUND | GROUND | ATN IN | DAV IN | MY LISTEN ADDR | UNLSN OR MY TLK ADDR'D | LAST STATE: LSN ACT | LAST STATE: LSN ADDR'D | | | LSN ACTIVE | LSN ADDR'D | |
| 0 | 0 | 1 | 1 | 1 | 0 | 0 | 0 | 0 | 0 | 0 | 1 | ATN ∧ DAV ∧ MLA — LSN ADDR'D |
| 0 | 0 | 1 | 0 | X | X | 0 | 1 | 0 | 0 | 0 | 1 | STEADY STATE |
| 0 | 0 | 1 | 1 | X | 0 | 0 | 1 | 0 | 0 | 0 | 1 | |
| | | | | | | | | | | | | |
| 0 | 0 | 0 | X | X | X | 0 | 1 | 0 | 0 | 1 | 0 | ATN ↓ → LSN ACTIVE |
| 0 | 0 | 0 | X | X | X | 1 | 0 | 0 | 0 | 1 | 0 | |
| 0 | 0 | 1 | 0 | X | X | 0 | 1 | 0 | 0 | 0 | 1 | ATN ↑ → LSN ADDR'D |
| 0 | 0 | 1 | 0 | X | X | 1 | 0 | 0 | 0 | 0 | 1 | ATN ↑ → LSN ADDR'D |
| 0 | 0 | 1 | 1 | 0 | 0 | 0 | 1 | 0 | 0 | 0 | 1 | ATN ↓ → LSN ACTIVE |
| 0 | 0 | 1 | 1 | 0 | 1 | 0 | 1 | 0 | 0 | 0 | 0 | UNLISTEN OR MY TALK ADDR |

FIG. 79A

6M093 SOURCE HANDSHAKE CONTROL

| ADDRESS | | | | | | | | | | 000 DATA | | | | 001 DATA | | | | |
|---|---|---|---|---|---|---|---|---|---|---|---|---|---|---|---|---|---|---|
| $2^9$ ATN IN | $2^8$ TALKER ACTIVE | $2^7$ SERIAL POLL ACTIVE | $2^6$ RFD IN | $2^5$ DAC IN | $2^4$ DATA READY | $2^3$ LAST BYTE | LAST STATE $2^2$ | $2^1$ | $2^0$ | $2^3$ | $2^2$ | $2^1$ DISABLE DATA | $2^0$ EOI OUT | $2^3$ DAV OUT | NEXT STATE $2^2$ | $2^1$ | $2^0$ | DESCRIPTION |
| 0 | 0 | 1 | 1 | 0 | X | X | 0 | 0 | 0 | | | 0 | 1 | 1 | 0 | 0 | 1 | SERIAL POLL ACTIVE ↑ & RFD |
| 0 | 0 | 1 | X | 0 | X | X | 0 | 0 | 1 | | | 0 | 1 | 1 | 0 | 0 | 1 | STEADY STATE |
| 0 | 0 | 1 | X | 1 | X | X | 0 | 0 | 1 | | | 0 | 0 | 0 | 0 | 1 | 0 | DAC ↑ |
| 0 | 0 | 1 | X | X | X | X | 0 | 1 | 0 | | | 0 | 0 | 0 | 0 | 1 | 0 | WAIT FOR SERIAL POLL ACTIVE ↓ |
| | | | | | | | | | | | | | | | | | | |
| 0 | 1 | 0 | 0 | X | X | X | 0 | 0 | 0 | | | 0 | 0 | 0 | 0 | 0 | 1 | TALKER ACTIVE |
| 0 | 1 | 0 | 0 | X | X | X | 0 | 0 | 1 | | | 0 | 0 | 0 | 0 | 0 | 1 | STEADY STATE |
| 0 | 1 | 0 | 1 | 0 | 0 | X | 0 | 0 | 1 | | | 0 | 0 | 0 | 0 | 1 | 0 | NO DATA READY |
| 0 | 1 | 0 | 1 | 0 | 0 | X | 0 | 1 | 0 | | | 0 | 0 | 0 | 0 | 1 | 1 | NO DATA READY |
| 0 | 1 | 0 | 1 | 0 | 0 | X | 0 | 1 | 1 | | | 0 | 0 | 0 | 1 | 1 | 0 | NO DATA READY |
| 0 | 1 | 0 | 1 | 0 | 0 | X | 1 | 1 | 0 | | | 0 | 0 | 0 | 1 | 1 | 1 | NO DATA READY |

| | | | | | | | | | | | | | | | | | | |
|---|---|---|---|---|---|---|---|---|---|---|---|---|---|---|---|---|---|---|
| 0 | 1 | 0 | 1 | 0 | 0 | X | 1 | 1 | 1 | | | 0 | 0 | 0 | 1 | 0 | 0 | NO DATA READY — EXIT |
| 0 | 1 | 0 | 1 | X | 1 | 0 | 0 | 0 | 1 | | | 0 | 0 | 0 | 0 | 1 | 0 | RFD IN ↑ & DATA RDY ↑ — WAIT CYCLE |
| 0 | 1 | 0 | 1 | X | 1 | 0 | 0 | 1 | 0 | | | 0 | 0 | 1 | 0 | 1 | 1 | DATA READY ↑ — RAISE DAV OUT |
| 0 | 1 | 0 | X | 0 | 1 | 0 | 0 | 0 | 1 | | | 0 | 0 | 1 | 0 | 1 | 1 | STEADY STATE |
| 0 | 1 | 0 | X | 1 | 1 | 0 | 0 | 1 | 1 | | | 0 | 0 | 0 | 0 | 0 | 1 | DAC IN ↑ — DROP DAV OUT |
| | | | | | | | | | | | | | | | | | | |
| 0 | 1 | 0 | 1 | X | 1 | 1 | 0 | 0 | 1 | | | 0 | 0 | 0 | 0 | 1 | 0 | RFD IN ↑ - DATA RDY & LAST BYTE ↑-WAIT |
| 0 | 1 | 0 | 1 | X | 1 | 1 | 0 | 1 | 0 | | | 0 | 1 | 1 | 1 | 0 | 0 | RAISE DAV OUT & EOI OUT |
| 0 | 1 | 0 | X | 0 | X | X | 1 | 0 | 0 | | | 0 | 1 | 1 | 1 | 0 | 0 | STEADY STATE |
| 0 | 1 | 0 | X | 1 | X | X | 1 | 0 | 0 | | | 0 | 0 | 0 | 1 | 0 | 1 | DAC IN ↑ DROP DAV OUT & EOI OUT |
| 0 | 1 | 0 | X | X | X | X | 1 | 0 | 1 | | | 0 | 0 | 0 | 1 | 0 | 1 | STEADY STATE |
| 0 | 1 | 0 | 1 | 1 | 1 | 0 | 0 | 0 | 1 | | | 0 | 0 | 0 | 0 | 0 | 1 | |
| 0 | 1 | 0 | 1 | 0 | 1 | 0 | 1 | 1 | X | | | 0 | 0 | 1 | 0 | 1 | 1 | |
| 0 | 1 | 0 | 1 | 0 | X | X | 0 | 0 | 0 | | | 0 | 0 | 0 | 0 | 0 | 1 | |

6MØ96 SERIAL POLL FUNCTION CONTROL

| ADDRESS | | | | | | | | DATA | | | | |
|---|---|---|---|---|---|---|---|---|---|---|---|---|
| $2^7$ | $2^6$ | $2^5$ | $2^4$ | $2^3$ | $2^2$ | $2^1$ | $2^0$ | $2^3$ | $2^2$ | $2^1$ | $2^0$ | |
| | | ATN IN | SERIAL POLL ENABLE | DAV IN | SERIAL POLL DISABLE | LAST STATE $2^1$ | LAST STATE $2^0$ | | | NEXT STATE $2^1$ | NEXT STATE $2^0$ | DESCRIPTION |
| 0 | 0 | 1 | 1 | 1 | 0 | 0 | 0 | 0 | 0 | 0 | 1 | SERIAL POLL MODE |
| 0 | 0 | 1 | 1 | X | 0 | 0 | 1 | 0 | 0 | 0 | 1 | SERIAL POLL MODE |
| 0 | 0 | 1 | X | 0 | X | 0 | 1 | 0 | 0 | 0 | 1 | SERIAL POLL MODE |
| 0 | 0 | 0 | X | X | X | 0 | 1 | 0 | 0 | 0 | 1 | SERIAL POLL MODE |
| | | | | | | | | | | | | |
| 0 | 0 | 1 | 0 | 1 | 0 | 0 | 1 | 0 | 0 | 0 | 1 | SERIAL POLL MODE |
| 0 | 0 | 1 | 1 | 1 | 0 | 0 | 1 | 0 | 0 | 0 | 1 | SERIAL POLL MODE |
| 0 | 0 | 1 | 0 | 1 | 1 | 0 | 1 | 0 | 0 | 0 | 0 | SERIAL POLL MODE |
| 0 | 0 | 1 | 0 | 1 | 1 | 0 | 0 | 0 | 0 | 0 | 0 | |
| 0 | 0 | 1 | X | 0 | X | 0 | 0 | 0 | 0 | 0 | 0 | |

FIG. 81 A 6M 97 TALKER FUNCTION CONTROL

| ADDRESS | | | | | | | | -00 DATA | | | | -01 DATA | | | | DESCRIPTION |
|---|---|---|---|---|---|---|---|---|---|---|---|---|---|---|---|---|
| $2^7$ | $2^6$ | $2^5$ | $2^4$ | $2^3$ | $2^2$ | $2^1$ | $2^0$ | $2^3$ | $2^2$ | $2^1$ | $2^0$ | $2^3$ | $2^2$ | $2^1$ | $2^0$ | |
| ATN IN | SERIAL POLL MODE | DAV IN | MY TALK ADDRESS | * UNT OR MLA OR OTA | LAST STATE | | | | | | TALKER ACTIVE | SERIAL POLL ACTIVE | NEXT STATE | | | * UNT - UNTALK<br>MLA - MY LISTEN ADDRESS<br>OTA - OTHER TALK ADDRESS |
| | | | | | $2^2$ | $2^1$ | $2^0$ | | | | | | $2^2$ | $2^1$ | $2^0$ | |
| 0 | X | X | X | X | 0 | 0 | 0 | 0 | 0 | 0 | 0 | 0 | 0 | 0 | 0 | TALKER IDLE |
| 1 | X | 0 | X | X | 0 | 0 | 0 | 0 | 0 | 0 | 0 | 0 | 0 | 0 | 0 | ATN ↑ |
| 1 | 0 | 1 | 1 | 0 | 0 | 0 | 0 | 0 | 0 | 0 | 0 | 0 | 0 | 0 | 1 | DAV ∧ MY TALK ADDRESS - TALKER ADDRESSED |
| 1 | 0 | 1 | 1 | 0 | 0 | 0 | 1 | 0 | 0 | 0 | 0 | 0 | 0 | 0 | 1 | STEADY STATE |

FIG. 81 B

| | | | | | | | | | | | | | | | | |
|---|---|---|---|---|---|---|---|---|---|---|---|---|---|---|---|---|
| 1 | 0 | 0 | X | X | 0 | 0 | 1 | 0 | 0 | 0 | 0 | 0 | 0 | 0 | 1 | DAV ↓ |
| 0 | 0 | X | X | X | 0 | 0 | 1 | 0 | 0 | 0 | 1 | 0 | 0 | 1 | 1 | ATN ↓ |
| 0 | 0 | X | X | X | 0 | 1 | 0 | 0 | 0 | 0 | 1 | 0 | 0 | 1 | 0 | STEADY STATE |
| 0 | 0 | X | X | X | 0 | 1 | 1 | 0 | 0 | 0 | 0 | 0 | 0 | 1 | 0 | ATN ↓ WAITE ONE CYCLE |
| 1 | 0 | 0 | X | X | 0 | 1 | 0 | 0 | 0 | 0 | 0 | 0 | 0 | 0 | 1 | ATN ↑ (TALKER ADDRESSED) |
| | | | | | | | | | | | | | | | | |
| 1 | 0 | 1 | 0 | 1 | 0 | 0 | 1 | 0 | 0 | 0 | 0 | 0 | 0 | 0 | 0 | DAV & (OTHER TALK ADD OR UNTALK OR MY LISTEN ADDRESS) |
| 1 | 0 | 1 | 0 | 1 | 0 | 0 | 0 | 0 | 0 | 0 | 0 | 0 | 0 | 0 | 0 | |
| | | | | | | | | | | | | | | | | |
| 1 | 1 | 1 | 0 | 0 | 0 | 0 | 1 | 0 | 0 | 0 | 0 | 0 | 0 | 1 | 1 | DAV ∧ SPM (TALKER ADDRESSED) |
| 1 | 1 | 1 | 0 | 0 | 0 | 1 | 1 | 0 | 0 | 0 | 0 | 0 | 0 | 1 | 1 | |
| 1 | 1 | 0 | X | X | 0 | 1 | 1 | 0 | 0 | 0 | 0 | 0 | 0 | 1 | 1 | |
| 0 | 1 | X | X | X | 0 | 1 | 1 | 0 | 0 | 0 | 0 | 1 | 1 | 0 | 0 | ATN ↓ - SERIAL POLL ACTIVE |
| 0 | 1 | X | X | X | 1 | 0 | 0 | 0 | 0 | 0 | 0 | 1 | 1 | 0 | 0 | |
| | | | | | | | | | | | | | | | | |
| 1 | 1 | 0 | X | X | 1 | 0 | 0 | 0 | 0 | 0 | 0 | 0 | 0 | 1 | 1 | ATN ↑ (SERIAL POLL MODE & TALKER ADDRESSED) |
| | | | | | | | | | | | | | | | | |
| 1 | 0 | 1 | 0 | 0 | 0 | 1 | 1 | 0 | 0 | 0 | 0 | 0 | 0 | 0 | 1 | SERIAL POLL DISABLE (TALKER ADDRESSED) |
| 1 | 0 | 1 | 0 | 0 | 0 | 0 | 1 | 0 | 0 | 0 | 0 | 0 | 0 | 0 | 1 | |
| 1 | 1 | 1 | 0 | 0 | 0 | 0 | 0 | 0 | 0 | 0 | 0 | 0 | 1 | 0 | 1 | SERIAL POLL MODE (TALKER IDLE) |
| 1 | 1 | 1 | 0 | 0 | 1 | 0 | 1 | 0 | 0 | 0 | 0 | 0 | 1 | 0 | 1 | STEADY STATE |
| 1 | 1 | 0 | X | X | 1 | 0 | 1 | 0 | 0 | 0 | 0 | 0 | 1 | 0 | 1 | |

| | | | | | | | | | | | | | | | | |
|---|---|---|---|---|---|---|---|---|---|---|---|---|---|---|---|---|
| 0 | 1 | X | X | X | 1 | 0 | 1 | 0 | 0 | 0 | 0 | 0 | 1 | 1 | 0 | ATN ↓ |
| 0 | 1 | X | X | X | 1 | 1 | 0 | 0 | 0 | 0 | 0 | 0 | 1 | 1 | 0 | |
| 1 | 1 | 1 | 1 | 0 | 1 | 1 | 0 | 0 | 0 | 0 | 0 | 0 | 1 | 1 | 1 | SERIAL POLL MODE ∧ MY TALK ADDRESS |
| 1 | 1 | 1 | 1 | 0 | 1 | 1 | 1 | 0 | 0 | 0 | 0 | 0 | 1 | 1 | 1 | |
| 1 | 1 | 0 | X | X | 1 | 1 | 1 | 0 | 0 | 0 | 0 | 0 | 1 | 1 | 1 | |
| 0 | 1 | X | X | X | 1 | 1 | 1 | 0 | 0 | 0 | 0 | 1 | 1 | 0 | 0 | ATN ↓ SERIAL POLL ACTIVE → ST 4 |
| | | | | | | | | | | | | | | | | |
| 1 | 1 | 1 | 1 | 0 | 1 | 0 | 1 | 0 | 0 | 0 | 0 | 0 | 1 | 1 | 1 | SERIAL POLL MODE & MY TALK ADDRESS → ST 7 |
| | | | | | | | | | | | | | | | | |
| 1 | 1 | 1 | 0 | 1 | 0 | 1 | 1 | 0 | 0 | 0 | 0 | 0 | 1 | 0 | 1 | UNTALK OR OTHER TALK ADDRESS OR MLA |
| | | | | | | | | | | | | | | | | |
| 1 | 1 | 0 | X | X | 1 | 1 | 0 | 0 | 0 | 0 | 0 | 0 | 1 | 0 | 1 | DAV ↓ |
| 1 | 1 | 1 | 0 | 1 | 1 | 1 | 0 | 0 | 0 | 0 | 0 | 0 | 1 | 0 | 1 | SERIAL POLL MODE & (OTHER TALK) |
| 1 | 1 | 1 | 0 | 1 | 1 | 0 | 1 | 0 | 0 | 0 | 0 | 0 | 1 | 0 | 1 | ADDRESS OR UNTALK OR MY LISTEN ADDRESSED |
| | | | | | | | | | | | | | | | | |
| 1 | 0 | 1 | 0 | 0 | 1 | 1 | 1 | 0 | 0 | 0 | 0 | 0 | 0 | 0 | 1 | SERIAL POLL MODE ↓ TALKER ADDRESSED |

6M098-000 SERVICE REQUEST CONTROL

| ADDRESS | | | | | | | | | DATA | | | | |
|---|---|---|---|---|---|---|---|---|---|---|---|---|---|
| $2^8$ | $2^7$ | $2^6$ | $2^5$ | $2^4$ | $2^3$ | $2^2$ | $2^1$ | $2^0$ | $2^3$ | $2^2$ | $2^1$ | $2^0$ | |
| | | | | SERIAL POLL ACT | REQUEST SRV | LAST STATE | | | SRQ | NEXT STATE | | | DESCRIPTION |
| | | | | | | $2^2$ | $2^1$ | $2^0$ | | $2^2$ | $2^1$ | $2^0$ | |
| 0 | 0 | 0 | 0 | 0 | 1 | 0 | 0 | 0 | 1 | 0 | 0 | 1 | REQUEST SERVICE ↑ – SRQ ↑ |
| 0 | 0 | 0 | 0 | 0 | 1 | 0 | 0 | 1 | 1 | 0 | 0 | 1 | STEADY STATE |
| | | | | | | | | | | | | | |
| 0 | 0 | 0 | 0 | 1 | 1 | 0 | 0 | 1 | 0 | 0 | 1 | 0 | SERIAL POLL ACTIVE ↑ |
| 0 | 0 | 0 | 0 | 1 | 1 | 0 | 1 | 0 | 0 | 0 | 1 | 0 | DROP SRQ |
| 0 | 0 | 0 | 0 | 0 | X | 0 | 1 | 0 | 0 | 0 | 1 | 1 | |
| 0 | 0 | 0 | 0 | 0 | X | 0 | 1 | 1 | 0 | 1 | 0 | 0 | |
| 0 | 0 | 0 | 0 | 0 | X | 1 | 0 | 0 | 0 | 1 | 0 | 1 | |
| 0 | 0 | 0 | 0 | 0 | 0 | 1 | 0 | 1 | 0 | 0 | 0 | 0 | REQUEST SERVICE ↓ |
| 0 | 0 | 0 | 0 | 0 | 1 | 1 | 0 | 1 | 1 | 0 | 0 | 1 | REQUEST SERVICE ↑ |

ADAPTER FOR INTERFACING BETWEEN TWO BUSES

BACKGROUND OF THE INVENTION

The present invention is directed to a bus interface adapter and more particularly to an adapter which interfaces two buses to permit communications in a bidirectional manner while also providing a degree of message storage. The present invention is specifically adapted for utilization in a computer activity monitor configuration wherein the usage rate of selected areas of a computer are monitored and data collected so as to derive a statistical representation of the usage efficiency (percent of utilization) that is being made of the computer. In order to provide more meaningful data it is necessary to attach a time of day leader to each block of sampled information to enable identification of critical times when usage may be at the upper and lower extremes of the computer's capability. In addition it is mandatory to provide a storage capability so as to enable real time date, being obtained from the activity sensors, to be recorded and stored until the compiling computer is free to accept the data.

The background art known to the applicants at the time of the filing of this application is as follows:

U.S. Pat. No. 3,699,529, Communication Among Computers, by Beyers et al.,

U.S. Pat. No. 3,830,962, Graphical Data Processor Interfaced, by Ldmailloux,

U.S. Pat. No. 3,940,743, Interconnecting Unit For Independently Operable Data Processing Systems, by D. P. Fitzgerald, U.S. Pat. No. 3,975,712, Asynchronous Communication Interface Adapter, by E. C. Hepworth et al., U.S. Pat. No. 3,979,730, Interface Adapter Having Control Register, by T. H. Bennett et al., U.S. Pat. No. 4,038,644, Destination Selection Apparatus For a Bus Oriented Computer System, by J. R. Duke et al., U.S. Pat. No. 4,041,472, Data Processing Internal Communications System Having Plural Time-Shared Intercommunication Buses and Inter-Bus Communication Means, by M. S Shah et al., U.S. Pat. No. 4,047,162, Interface Circuit For Communicating Between Two Data Highways, by H. A. Dorey et al., U.S. Pat. No. 4,071,887, Synchronous Serial Data Adapter, by T. C. Daly et al., U.S. Pat. No. 4,106,091, Interrupt Status Indication Logic for Polled Interrupt Digital System, by E. C Hepworth et al., U.S. Pat. No. 4,128,883, Shared Busy Means in a Common Bus Environment, by J. R. Duke et al.

SUMMARY OF THE INVENTION

In the preferred embodiment of the invention there is provided an interface adapter comprised of three storage bus buffers a control means and interfacing means for interfacing the three buffers under control of the control means to a first and a second data bus. Parity generating means interfacing with the buffers are utilized to provide parity checks on the data received and transmitted by the adapter. A time of day clock generator generates a time signal that is associated with each received data message. Synchronizing means provides synchronization to received data prior to retransmission.

From the foregoing it can be seen that it is a primary object of the present invention to provide an improved bus adapter.

It is another object of the present invention to provide a bus adapter wherein data may be received and transmitted simultaneously.

It is a further object of the present invention to provide an adapter wherein data may be time tagged and stored until needed.

These and other objects of the present invention will become more apparent when taken in conjunction with the following description and drawings, which drawings form a part of the present application and wherein like characters indicate like parts.

BRIEF DESCRIPTION OF THE DRAWINGS

FIG. 19 illustrates the preferred embodiment in hardware logic form.

FIG. 20 illustrates the preferred embodiment in hardware logic form.

FIG. 59 illustrates the PROM coding and control signals used in the preferred embodiment of the invention.

FIG. 60 illustrates the PROM coding and control signals used in the preferred embodiment of the invention.

FIG. 61 illustrates the PROM coding and control signals used in the preferred embodiment of the invention.

FIG. 62 illustrates the PROM coding and control signals used in the preferred embodiment of the invention.

FIG. 63 illustrates the PROM coding and control signals used in the preferred embodiment of the invention.

FIG. 64 illustrates the PROM coding and control signals used in the preferred embodiment of the invention.

FIG. 65 illustrates the PROM coding and control signals used in the preferred embodiment of the invention.

FIGS. 66A, 66B, 66C and 66D illustrate the PROM coding and control signals used in the preferred embodiment of the invention.

FIGS. 67A, 67B and 67C illustrate the PROM coding and control signals used in the preferred embodiment of the invention.

FIGS. 68A and 68B illustrate the PROM coding and control signals used in the preferred embodiment of the invention.

FIGS. 69A, 69B and 69C illustrate the PROM coding and control signals used in the preferred embodiment of the invention.

FIGS. 70A and 70B illustrate the PROM coding and control signals used in the preferred embodiment of the invention.

FIG. 71 illustrates the PROM coding and control signals used in the preferred embodiment of the invention.

FIG. 72 illustrates the PROM coding and control signals used in the preferred embodiment of the invention.

FIG. 73 illustrates the PROM coding and control signals used in the preferred embodiment of the invention.

FIGS. 74A, 74B and 74C illustrate the PROM coding and control signals used in the preferred embodiment of the invention.

FIGS. 75A and 75B illustrate the PROM coding and control signals used in the preferred embodiment of the invention.

FIG. 76 illustrates the PROM coding and control signals used in the preferred embodiment of the invention.

FIG. 77 illustrates the PROM coding and control signals used in the preferred embodiment of the invention.

FIG. 78 illustrates the PROM coding and control signals used in the preferred embodiment of the invention.

FIGS. 79A and 79B illustrate the PROM coding and control signals used in the preferred embodiment of the invention.

FIG. 80 illustrates the PROM coding and control signals used in the preferred embodiment of the invention.

FIGS. 81A, 81B and 81C illustrate the PROM coding and control signals used in the preferred embodiment of the invention.

FIG. 82 illustrates the PROM coding and control signals used in the preferred embodiment of the invention.

DESCRIPTION OF THE PREFERRED EMBODIMENT OF THE INVENTION

Figure 1:
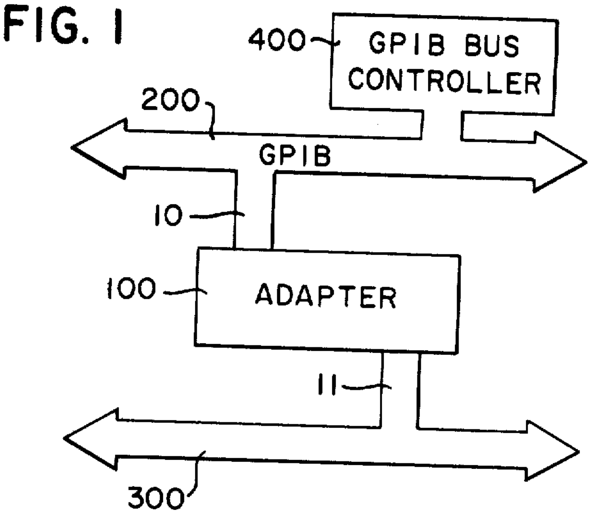
FIG. 1 is a block diagram illustrating the interface adapter connected between two buses.

Referring to FIG. 1, the adapter 100 is connected by means of an electrical cable 10 to a first bus 200 labeled GPIB. The first bus may be of the general purpose interfacing type described in the IEEE Standard 488-1978 (revised 488-1975). The bus described in the reference is an eight bit per byte bidirectional parallel bus requiring an interface cable having twenty-four lines (pins). The adapter 100 may be connected to a second bus 300 by means of an electrical cable 11. In the preferred embodiment bus 300 was a four bit bidirectional bus with the cable 11 being a nineteen line (pin) cable having four dedicated control lines. A GPIB Bus Controller 400 is coupled to bus 200 to control activities on the bus.

Figure 2:
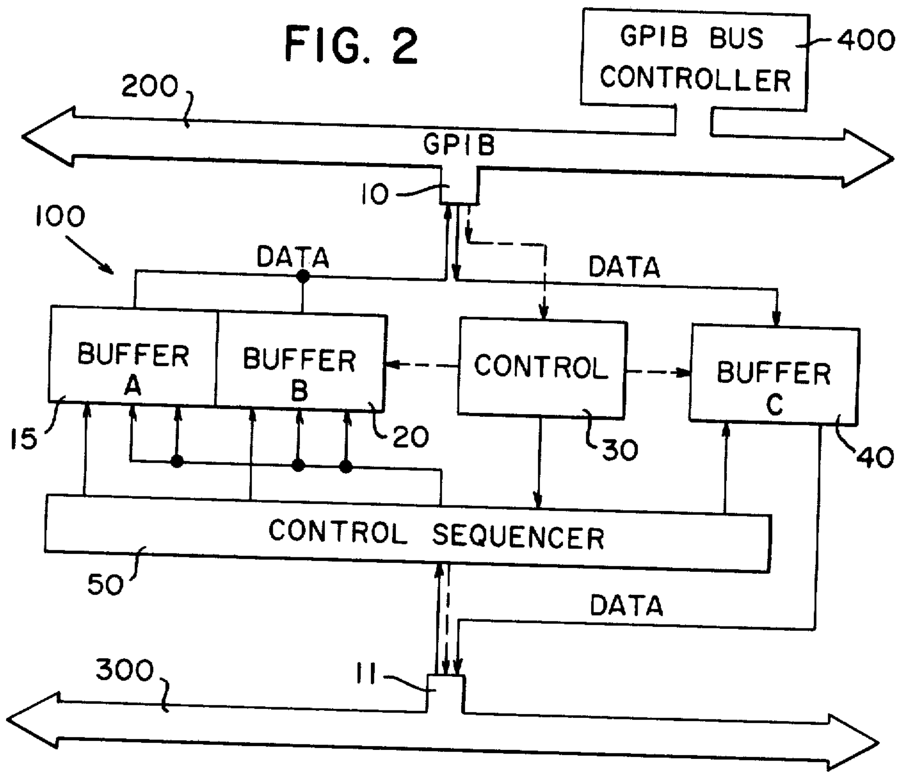
FIG. 2 is a subassembly block diagram illustrating the flow paths of data and control signals within the adapter.

Referring to FIG. 2, the adapter 100 has two buffer memories 15 and 20, labeled A and B, respectively, for storing data received from the bus 300. In the preferred embodiment, buffers 15 and 20 have a capacity of 8,190 four bit characters. Inputs to buffers 15 and 20 are under the control of a control sequencer 50. The outputs from buffers 15 and 20 are directed to the general purpose interfacing bus (GPIB) 200. A buffer 40, labeled C, under control of the control sequencer 50 and a control unit 30 receives data from the bus 200 and at its output directs the data to the bus 300. In the preferred embodiment of the invention buffer 40 has a capacity of 4,095 bytes. Control unit 30 also provides a degree of control to buffers 15 and 20. The adapter does not interpret unit addresses and other information contained within the bus data blocks, but it does store variable length bus records in buffer 15 or 20 for subsequent re-transmission to the bus 200. Data from bus 200 is stored in buffer 40 and when the last byte of a message is received, a Bus Request signal will be transmitted on bus 300. Upon receipt of a Bus Grant signal, the data stored in buffer 40 is transmitted onto bus 300. In the reverse fashion, once enabled, buffers 15 and 20 will begin storing records seen on bus 300 up and until detection of an end of the last bus record signal. The adapter will then generate a Service Request signal which, when acknowledged by a handshake signal from the data bus 200, will cause a response in the adapter that transmits the information in buffers 15 and 20, in an order corresponding to the one that was first filled emptying first.

Data flowing from bus 300 to bus 200 is packed in two 4-bit characters per byte. A 4-bit character received first being placed in the most significant half of the byte, with the next character being placed in the least significant half of the byte. All transfers from bus 300 are an even number of characters so that integer number of bytes are always created. For the data transferred from bus 200 to bus 300 an unpacking operation occurs wherein the most significant 4-bits being transferred first, are followed by the least significant 4-bits.

Figure 3A:
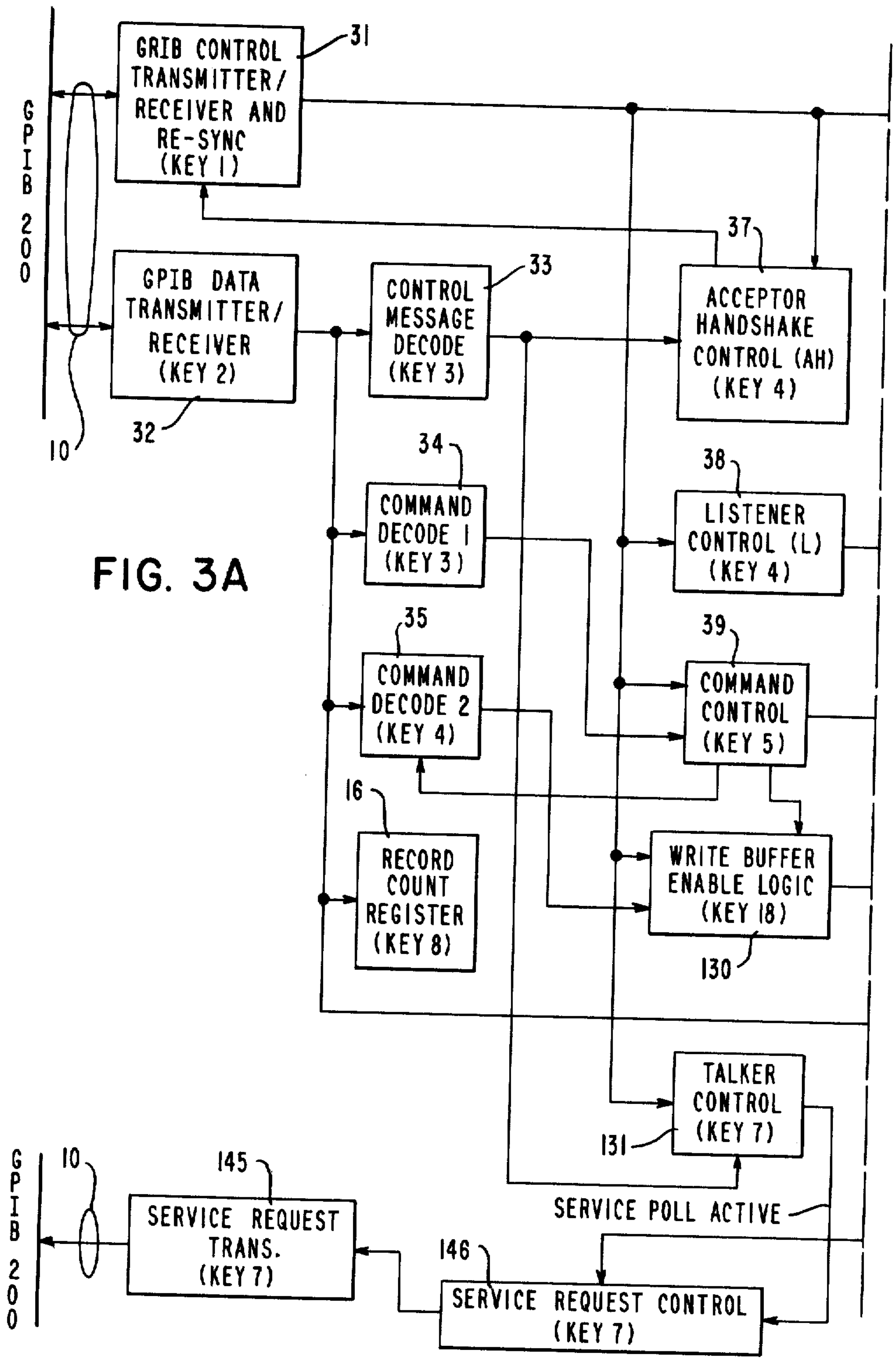
FIGS. 3A, 3B and 3C are block diagrams of the adapter illustrating the block functions used to transmit data in a first direction between two buses.
Figure 3B:
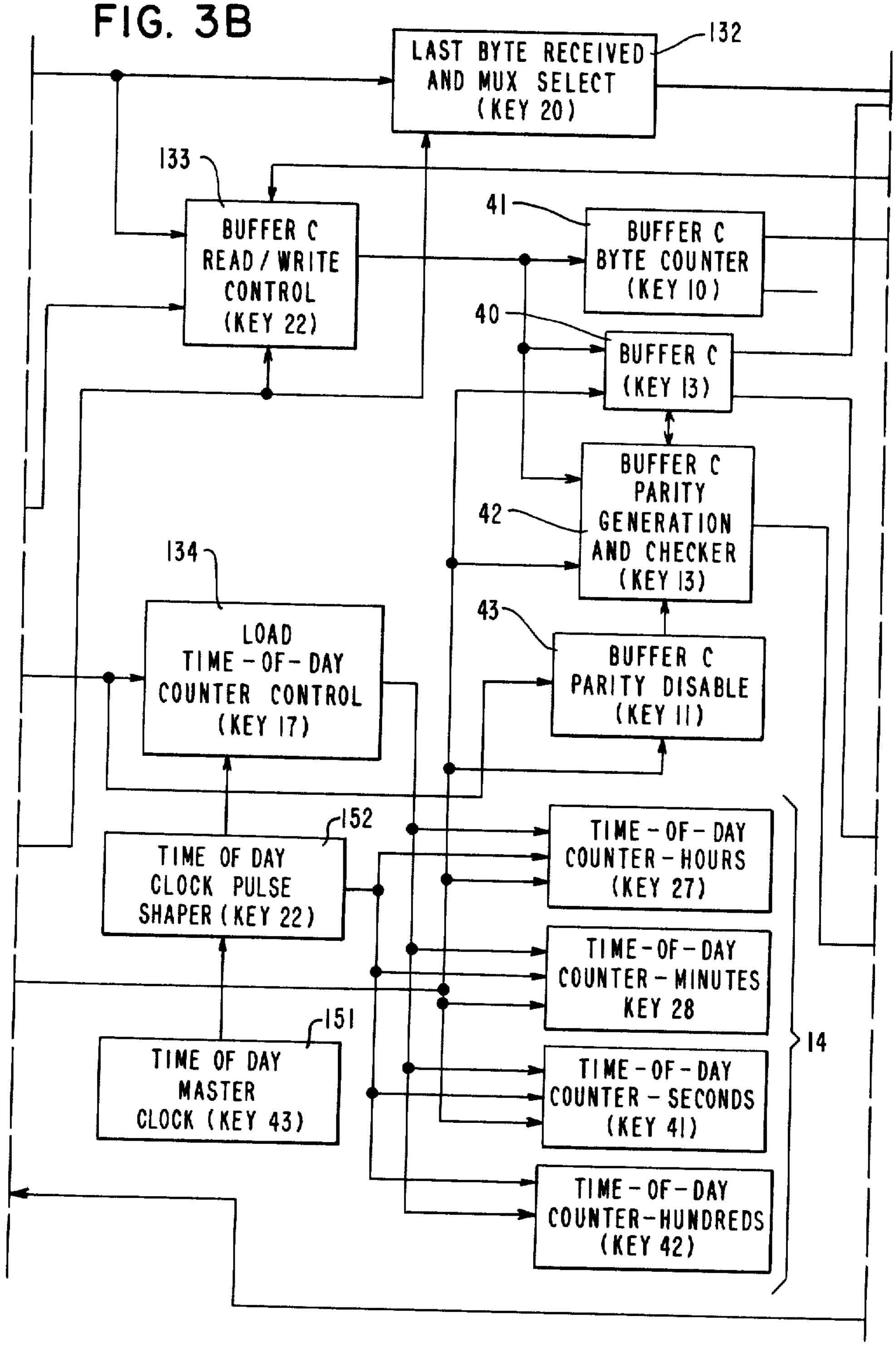
Figure 3C:
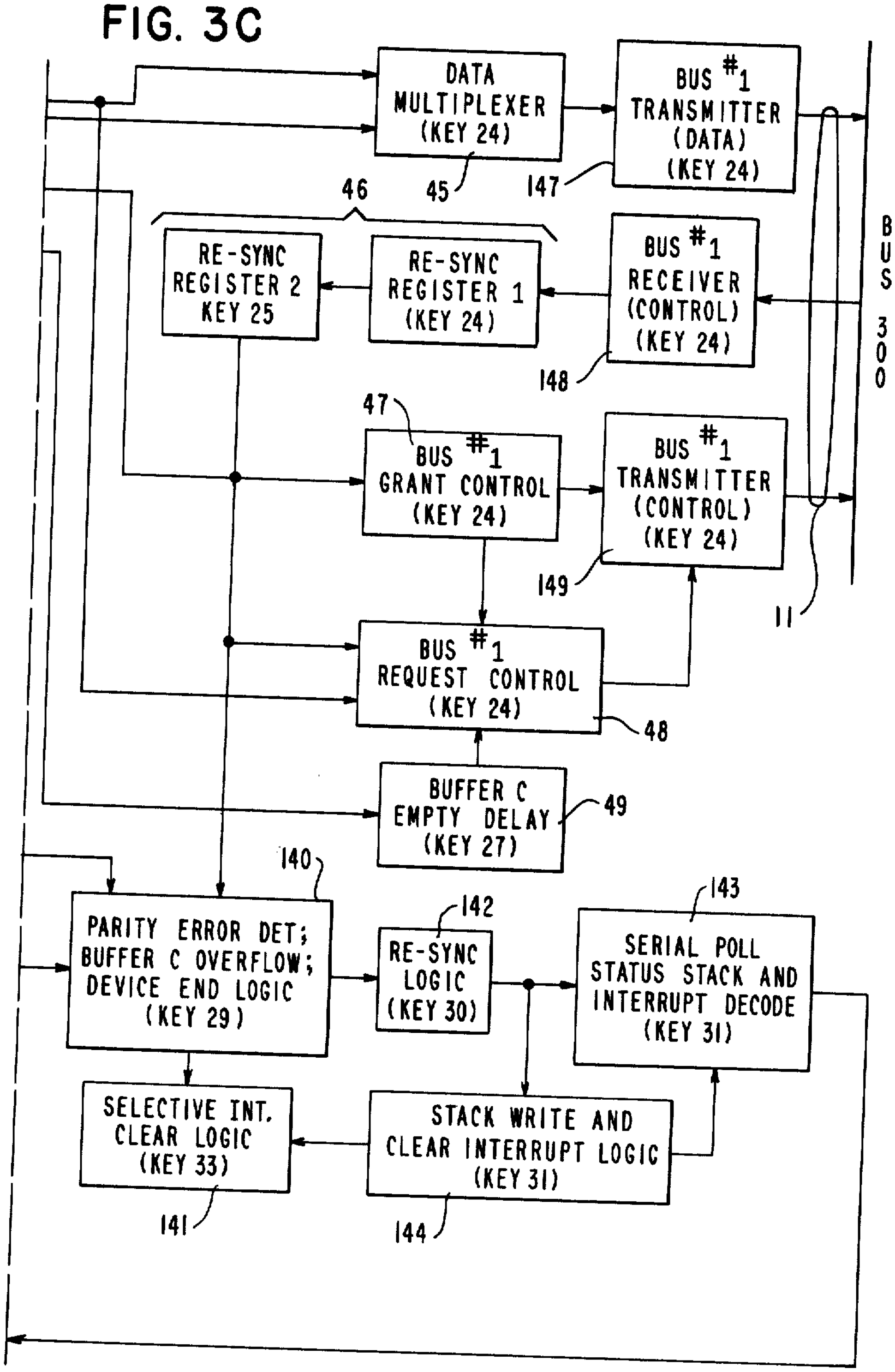
Figure 4A:
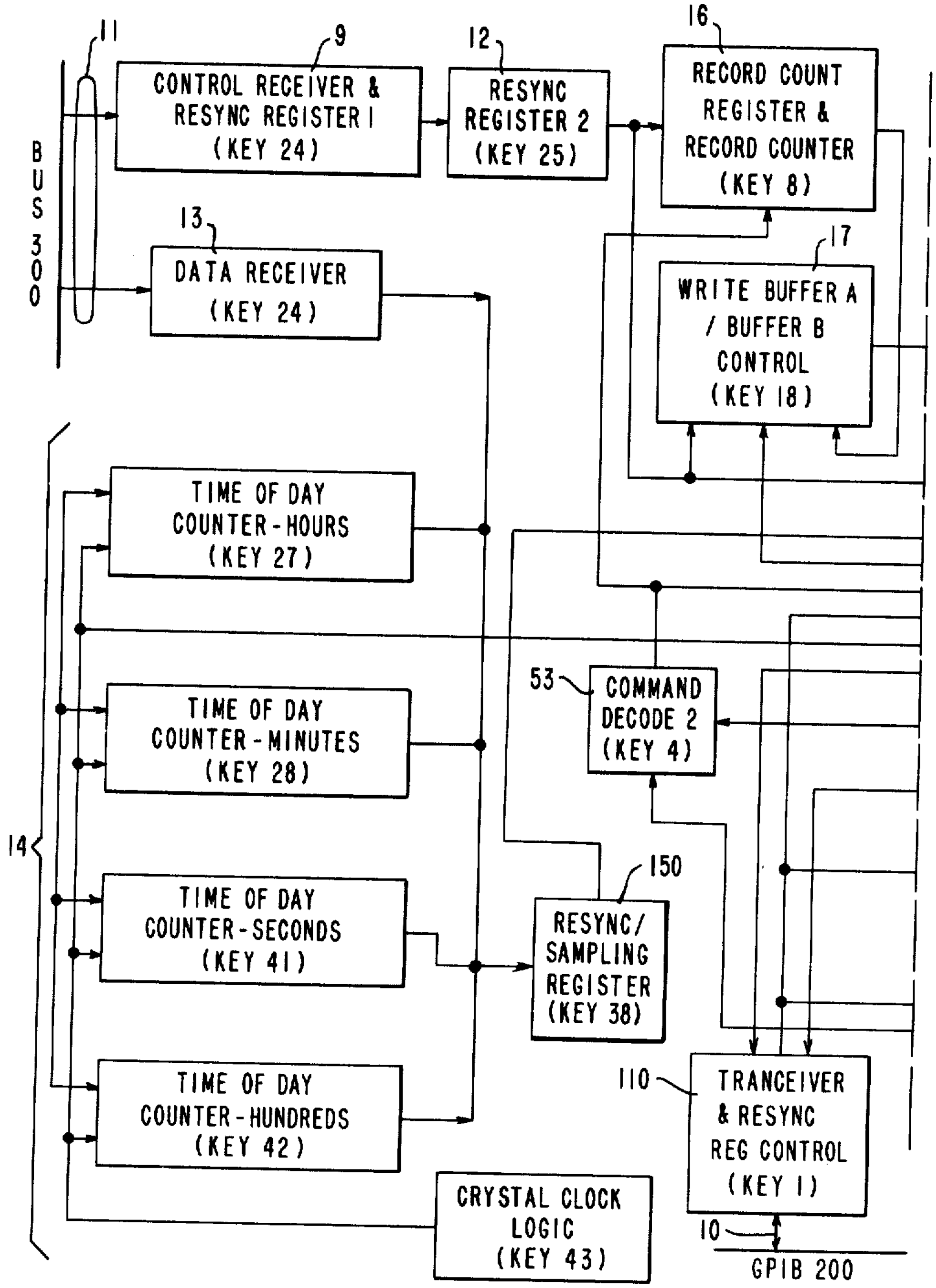
FIGS. 4A, 4B and 4C are block diagrams of the adapter illustrating the block functions used to transmit data in a second direction between the two buses.
Figure 4B:
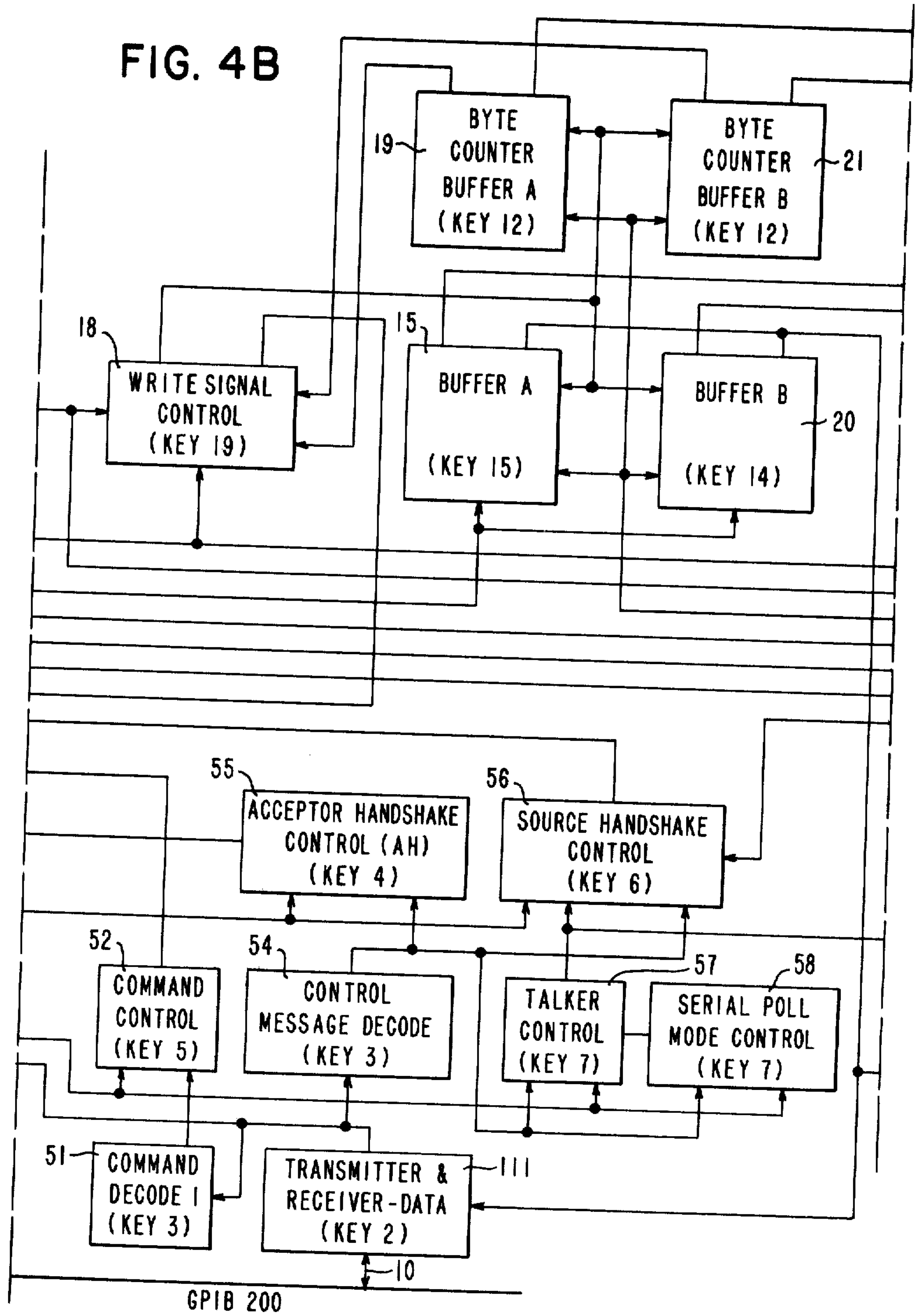
Figure 4C:
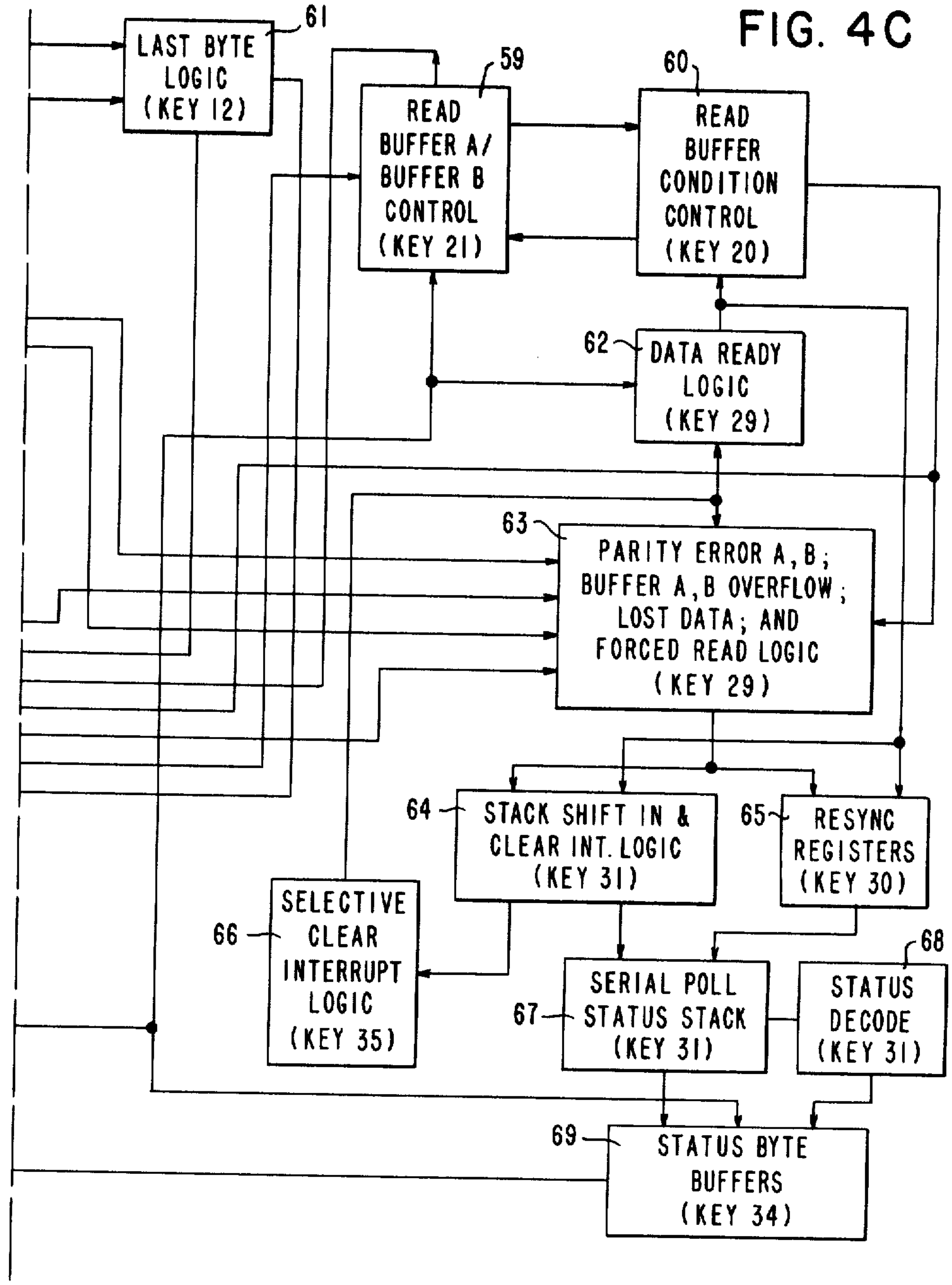

Referring to FIG. 3 wherein the block circuitry for enabling the data path from the GPIB bus 200 to the bus 300 is shown. The major component in this data path is the C buffer 40 and the associated control (command) circuits necessary to control the orderly transfer of data from bus 200 to bus 300. Additionally, there is provided, a time of day counter, parity error detector, and associated service request logic. The GPIB bus 200 is connected by cable 10 to the transmitter/receiver 31 and 32 and to the service request transmitter 145. Each of these units and the remaining units shown in FIGS. 3 and 4 are illustrated in detail in the Figs. bearing the key numbers referenced within respective blocks. The detailed Figs. are adequate to enable any person skilled in the art to reproduce Applicant's invention without a need for undue experimentation. The signal line assignment for cable 10 is as follows:

TABLE 1

| Contact | Signal Line | Contact | Signal Line |
|---|---|---|---|
| 1 | DIO 1 | 13 | DIO 5 |
| 2 | DIO 2 | 14 | DIO 6 |
| 3 | DIO 3 | 15 | DIO 7 |
| 4 | DIO 4 | 16 | DIO 8 |
| 5 | EOI | 17 | REN |
| 6 | DAV | 18 | Gnd, (6) |
| 7 | NRFD | 19 | Gnd, (7) |
| 8 | NDAC | 20 | Gnd, (8) |
| 9 | IFC | 21 | Gnd, (9) |
| 10 | SRQ | 22 | Gnd, (10) |
| 11 | ATN | 23 | Gnd, (11) |
| 12 | SHIELD | 24 | Gnd, LOGIC |

A set of eight interface signal lines labeled DIO carry all data, interface messages, and device dependent messages. The signal line DIO1 (data input/output 1) carries the least significant bit and the signal line DIO8 (data input/output 8) carries the most significant bit. Messages bytes are carried on the DIO signal lines in a bit-parallel byte-serial form, asynchronously, and generally in a bidirectional manner.

A set of three interface signal lines is used to effect the transfer of each byte of data on the DIO signal lines. The signals on these three lines are defined as follows:

(1) DAV (data valid) is used to indicate the condition (availability and validity) of information on the DIO signal lines.

(2) NRFD (not ready for data) is used to indicate the condition of readiness of device(s) to accept data.

(3) NDAC (not data accepted) is used to indicate the condition of acceptance of data by device(s).

The DAV, NRFD, and NDAC signal lines operate in what is called a three-wire (interlocked) handshake process to transfer each data byte across the interface.

Five interface signal lines are used to manage an orderly flow of information across the interface. The signals on these lines are defined as follows:

(1) ATN (attention) is used to specify how data on the DIO signal lines are to be interpreted and which devices must respond to the data. This signal is generated by the GPIB BUS Controller 400.

(2) IFC (interface clear) is used to place the interface system, portions of which are contained in all interconnected devices, in a known quiescent state. This signal is generated by the GPIB BUS Controller 400 only.

(3) SRQ (service request) is used by the adapter to indicate the need for attention and to request an interruption of the current sequence of events. This signal is generated by all devices and is received by the GPIB BUS Controller 400.

(4) REN (remote enable) is used (in conjunction with other messages) to select between two alternate sources of device programming data. The adapter does nothing with the REN signal.

(5) EOI (end of identify) is used to indicate the end of a multiple byte transfer sequence or, in conjunction with ATN, to execute a parallel polling sequence. The adapter does not perform parallel poll.

Figure 5:
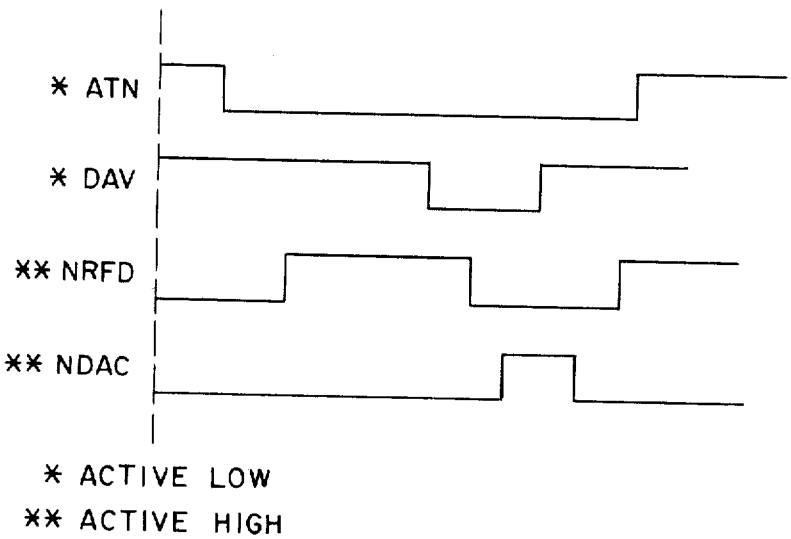
FIG. 5 illustrates control message sequences.
Figure 6:
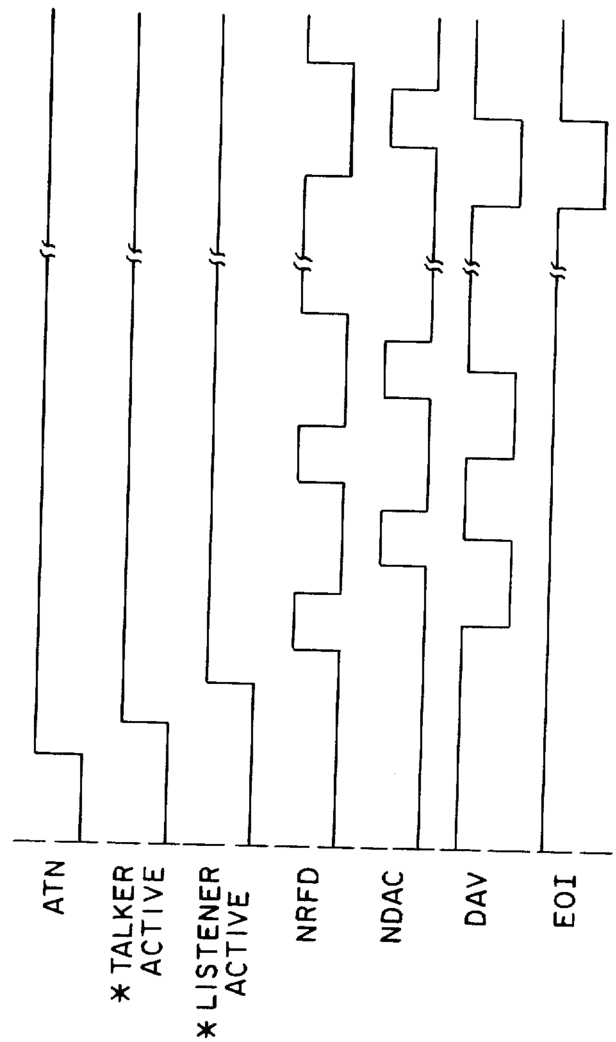
FIG. 6 illustrates signal levels associated with a data transfer sequence.

FIG. 5 illustrates the sequence of the logic states of the signals ATN, DAV, NRFD and NDAC and FIG. 6 illustrates the sequence of the logic states of the signals used for GPIB data transfer sequence. TABLE 2 sets forth the logic state definitions for the GPIB control messages.

TABLE 2

GPIB CONTROL MESSAGE DEFINITION

| OUTPUT DATA LINES | | | | | | | | |
|---|---|---|---|---|---|---|---|---|
| MSB 0 | 1 | 2 | 3 | 4 | 5 | 6 | LSB 7 | DEFINITION |
| X | 0 | 0 | 1 | 0 | 1 | 0 | 0 | *device clear |
| X | 0 | 1 | L | L | L | L | L | listen address |
| X | 1 | 0 | T | T | T | T | T | talk address |
| X | 0 | 0 | 0 | 0 | 1 | 0 | 0 | **selected device clear |
| X | 0 | 0 | 1 | 1 | 0 | 0 | 1 | serial poll disable |
| X | 0 | 0 | 1 | 1 | 0 | 0 | 0 | serial poll enable |
| X | 0 | 1 | 1 | 1 | 1 | 1 | 1 | universal unlisten |
| X | 1 | 0 | 1 | 1 | 1 | 1 | 1 | universal untalk |

NOTE 1:
L represents five bit device address.
T represents five bit device address.
NOTE 2:
Device addresses are defined from zero to 30 (decimal).
X: Indicates a do not care level
*Does nothing to adapter
**Causes adapter to initialize logic known quiescent state. The TOD clock and record counter are not affected.

The bus 300 is connected by cable 11 to bus transmitter (data) 147, bus receiver (for control) 148 and bus transmitter (control) 149. TABLE 3 sets out the signal names assigned to each of the pins of cable 11:

TABLE 3

CABLE 11

| Signal Name | Pin Letters |
|---|---|
| SYN Low/High | A/C |
| BUS GRANT Low/High | B/D |
| BUS REQ Low/High | E/H |
| BUS BUSY Low/High | F/J |
| DATA-3 Low/High | K/L |
| DATA-2 Low/High | M/P |
| DATA-1 Low/High | N/R |
| DATA-0 Low/High | S/U |
| ACTV | V* |
| VCC/GND | W/X |

*V jumpered to X (ACTV GND) on cable from unit that is bus 'master'.

In any system using the present adapter, there can be only one master at any time, all other adapters are slaves. The cable configuration determines which device is to be the bus master. The bus 300 signals are defined as follows:

Bus Request: This line is raised by any device connected to bus 300 to request control of the bus 300 to enable data transmission. A Bus Request can be raised only when the Bus Busy signal is inactive, indicating the bus is not in use by another device.

Bus Grant: This line is raised by the adapter in response to a Bus Request, granting the bus to the requester to allow data transmission.

Bus Busy: The requester raises this line following a Bus Grant, inhibiting other bus requests. It holds this line up until a data record transfer is complete.

Figure 7:
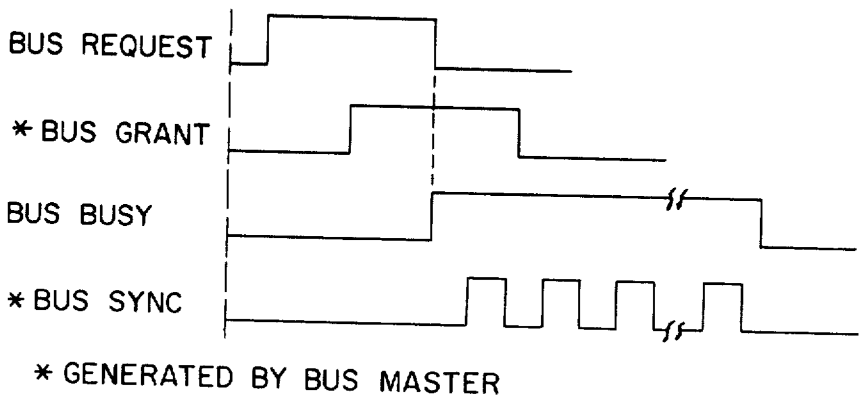
FIG. 7 illustrates bus timing waveforms.

Bus SYNC: This line carries SYNC pulses, generated by the adapter, which provide the clock for data transmission on the bus 300. On the rising edge of the SYNC pulse, data is valid. On the falling edge of SYNC the adapter bus data begins changing. The adapter continues to transmit SYNC pulses until the Bus Busy signal generated by the requester drops, signifying that the data transfer is complete. FIG. 7 illustrates the waveforms and the timing thereof associated with the above defined bus 300 signals.

Data received by the receiver 32 is directed to the buffer 40 under control of a read/write control 133. When the GPIB controller wishes to communicate through the adapter, an ATN (attention) signal coupled with a control message, is placed on bus 300 to address a particular adapter and to indicate whether the adapter is to listen or to talk. Transmitter/receiver 31 receives the signals and acknowledges receipt of the signals by transmitting a handshake signal from the acceptor handshake control 37 through transmitter/receiver 31. The control message is also directed to a listener control 38, a command control 39, a write buffer enable logic 130 and talker control 131. After the last byte of a message has been received, a BUS REQ signal will be generated by the bus request control 48 and subsequently transmitted by a bus transmitter 149 onto bus 300. After the last byte has been sent, a service request (SRQ) will be generated by the logic of block 140, an associated serial poll status byte containing an end bit will be directed to the GPIB bus 200 via the service request control 146 and the service request transmitter 145. If a parity error was detected by the C buffer parity checker 42 and the logic of block 140 during the transmission of the buffer store, it is noted and reported with the device end signal at the time device end is reported. Under control of signals from the command control 39 a parity disable 43 can disable the parity generation and checker logic 42. Also under select control signals from control 39 the LOAD TIME-OF-DAY counter control 134 can be activated to load the time-of-day counters 14. The GPIB data transmitter/receiver 32 receives the control and data messages transmitted on bus 200 the control portions of the received messages are decoded in the control message decode 33, the command decode-1, 34, and the command decode-2, 35.

The record counter 16 counts the number of records received by the adapter. A Last Record Received signal is generated after the number of records specified by the Record Count Register have been received.

The control message decode 33 provides a signal to the talker control logic 131 indicating to the adapter whether the adapter is to be either a talker or a listener. This selection is determined by the received control message. The Command decode logic-1 and decode logic-2 determines when a write or a read of buffer 40 is to occur and depending upon the decoded activity the required logic is enabled.

A serial poll status byte will be stored in the serial poll status stack 143 when the signal DEVICE END becomes active signifying that a buffer from 133 has been transmitted to bus 300. If a parity error occurred, then the parity error will be latched and will be reported with the next serial poll status byte. In addition, a serial poll status byte will be stored in the status stack 143. The parity error latch will be reset when that status byte has been read.

A buffer byte counter 41 counts the bytes received by buffer 40 and directs a count signal to the buffer C empty delay logic 49. The empty delay logic signals bus request control 48 when all information stored in buffer C has been transmitted. The last byte received and MUX select logic 132 provides an output to the bus request control 48 to request the bus upon completion of data storage in buffer C. Mutiplexer 45 connects the output of buffer C to the bus transmitter (data) 147 for transmission of data onto bus 300. BUS REQ signals are generated by bus request control 48. The BUS GRANT signal for the adapter is received by the bus receiver control 148 and is re-synchronized in a re-sync logic circuit 46 comprised of two registers. The BUS GRANT signal (re-synchronized) is directed to a bus grant control circuit 47, which in turn notifies the bus request control 48 that the request has been granted. In addition the transmitter (control) 149 places a BUS GRRANT signal onto bus 300.

A parity generation and checker logic circuit 42 receive parity bits corresponding to the bits transmitted, and determines if an error has occurred. Upon reading of the C buffer 40, an error also may occur. In either event, if an error occurs, logic 140 indicates such an occurrence to the serial poll status stack 143 via a re-sync logic circuit 142. The GPIB bus controller is informed of the occurrence of an error in transmission by the transmission of the error signal stored in the serial poll status stack 143 thru a status byte buffer 69 and transmitter 111 (shown in FIGS. 4C and 4B, respectively). The re-sync logic 142 output is directed to the stack write and clear interrupt logic 144. The interrupt logic may cause a selective internal clear by directing a signal to the clear logic 141 or cause a stack write by directing a write signal to the stack 143.

The time of day clock 14 is comprised of an hours, minutes, seconds and hundreds of a second counter and is initialized by software. Thereafter a write signal from a write signal control logic 18 (shown in FIG. 4B) gates the time-of-day clock signal into the resync/sampling register 150 which feeds into the buffers 15 and 20 so as to provide a time signal with each stored data signal. The time tagging of data enables a user of the system to determine activity rates with respect to time.

Referring specifically to FIG. 4 wherein the circuitry for communicating from the bus 300 to the general purpose bus 200 is shown: two buffer memories 15 and 20 further labeled buffers A and B, respectively, are used to store data received on bus 300. The buffers combined storage depends on the size of the buffers used and, for example purposes, can be identified as N-records of storage. Any records exceeding N after both buffers have filled will cause an overflow condition and data will be lost when the adapter is a slave. The record count register 16 can be set to any integer value of 1 to N and operates to count each record stored in the buffers 15 and 20. When the count reaches N, a GPIB Service Request signal and associated serial poll status byte is generated by the serial poll status stack 143 and service request control 145. Upon being made a talker by the GPIB controller the data in buffers 15 and 20 will be unloaded onto bus 200.

The adapter during initial operation of the system is made to be a talker by the receipt of a talk control byte from the GPIB bus controller. If the adapter is designated a talker the adapter will commence to transmit the first filled buffer memory via transmitter 111. The byte counters 19 and 21 count the number of bytes of data received by buffer 15 and 20 respectively, and provide a buffer full signal to the write signal control 18 to prevent the writing of additional bytes into the buffers and byte counters. When the last byte of the last record satisfying the record counter is received, the write buffer control 17 will terminate writing into the buffer selected (A or B). When this occurs a serial poll status byte will be stored in the status stack 143 which will in turn cause a GPIB service request to be generated. The last byte logic, circuit 61, is used by the source handshake control 56 when the adapter has been made a talker. The last byte signal occurs when the last byte of the buffer being sent is ready for transmission onto bus 200. This signal tells the source handshake controller to raise the EOI signal with the DAV OUT signal thereby signalling the system that the last byte is on the bus 200.

The time of day counter 14 is a 24 hour clock composed of hours, minutes, seconds and hundreds of seconds. The counter uses four 8-bit values to describe time. Each 8-bit value is decimal, 4-bits for the lower digit, and 4-bits for the upper digit. The clock is crystal driven from a crystal clock logic circuit. The time of day signal (leader) is stored before each record that is stored in buffers 15 and 20. The status stack 67 is 16 locations deep and operates on a first-in first-out basis. Any event that occurs that can cause a Service Request will cause a status byte to be stored in the status stack. After a status byte has been read by the GPIB bus 200 controller, it is shifted out of the status byte stack. A Service Request is generated for each status byte in the status byte stack. Resetting of the status byte stack occurs with a power-on request or a selected device-clear signal.

For storing data from bus 300, either buffer 15 or buffer 20 may be loaded first under the control of a write buffer A/buffer B control 17. In the unloading operation, the unloading occurs such that the buffer that was loaded first is unloaded first. An unloading buffer activates an associated parity checker 63. The read out data is directed to transmitter 111 for transmittal onto the GPIB bus 200. If the parity is not correct, a status signal will be generated indicating that an error does exist with the signal appearing at the end of the data signal. A status byte buffer 69 receives a signal from the control message decode 54 via the talker control 57 to send the status byte. The talker control 57 enables the read buffer control 59 so as to permit reading of buffers 15 and 20. In addition, the control signal, serial poll active state (SPAS), is directed to a transmitter 111, and to source handshake control 56 which provides a handshake signal for transmittal onto bus 200 of the status byte to those devices requesting an access to the adapter. The SRQ signal which is the Service Request signal that is used by the adapter to indicate the need for attention, is dropped when the signal serial poll active state (SPAS) is active.

Attached to bus 300, via cable 11 is the control receiver and resync. register-1, 9. This unit receives the control signals on bus 300 and starts the synchronization of the received signals. A resync. register-2, 12 completes the synchronization of the control signals.

A data receiver 13 directs its output directly to buffers 15 and 20. The time-of-day clock outputs are also directed to the buffer 15 and 20 inputs.

A tranceiver and resync. register 110 is connected to bus 200 via cable 10. The receiver portion receives control signals from bus 200 and directs these signals to an acceptor Handshake control 55, the source handshake control 56, the command control 52, the talker control 57, the serial poll mode control 58 and to the read buffer A/buffer B control 59. Under command of selected control signals the various logic circuits are configured to perform the desired functions.

The data transmitter and receiver 111, connected to bus 200, via cable 10, receives select command signals which are directed to the control message decode 54, the command decode-1, 51 and the command decode-2, 53.

ated on accordingly. The adapter stores only data bytes that follow the WRITE command bytes. Data bytes following any other command are ignored. Illegal commands (not shown in Table 4) cause a Service Request to be generated and the command reject bit to be set in a serial pole status byte. Table 4 sets forth the respective commands and their descriptions.

TABLE 4

| COMMAND | | | | |
|---|---|---|---|---|
| BYTE 0 | BYTE 1 | BYTE 2 | BYTE 3 | DESCRIPTION |
| $10_H$ | RECORD $COUNT_H$ | $00_H$ | $00_H$ | LOAD RECORD COUNTER |
| $20_H$ | $00_H$ | $00_H$ | $00_H$ | ENABLE ADAPTER |
| $30_H$ | $00_H$ | $00_H$ | $00_H$ | DISABLE ADAPTER |
| $40_H$ | *HOURS | *MINUTES | *SECONDS | LOAD TIME-OF-DAY CLOCK |
| $60_H$ | $00_H$ | $00_H$ | $00_H$ | FORCED READ |
| $81_H$-$83_H$ | $00_H$ | $00_H$ | $00_H$ | DISABLE PARITY GENERATOR** |
| $90_H$ | $00_H$ | $00_H$ | $00_H$ | ENABLE PARITY GENERATORS |
| $A0_H$ | $00_H$ | $00_H$ | $00_H$ | WRITE ADAPTER |

*Expressed in Decimal - 4 binary bits for each Digit
**81 = Buffer 15; 82 = Buffer 20; 83 = Buffer 40.

These units operate to load the record counter and activate the parity error logic 63.

The read buffer condition control 60 indicates the status of each buffer (15 and 20) as to whether either is considered full. That information is transmitted to Read buffer control 21, and to the Write buffer control 17. The full conditions are used by the write A/B controller to keep track of which buffer is considered full and which one is first. The Read A/B controller uses the full conditions to keep track of which one to empty first. The data ready logic 62 receives the outputs from the Read A/B controller. The data ready signal 21 signals the source handshake control when a buffer is ready to be sent to bus 200. The talker control enables the data ready logic 62 through the Read A/B controller, if the adapter is to be a talker, otherwise the adapter does not forward data.

The stack shift in and clear internal logic circuit 66 provides the clearing signal for logic 63 and the shifting signal for the poll status stack 67. The resync register 65 synchronize the serial poll status stack signal to prepare the signals for transmission onto bus 200. The status decode 68, decodes the status stack signals and forwards the decoded signals to the status byte buffers 69. The status signals are placed onto bus 200 when transmitting a serial poll status byte, through transmitter 111. The data from buffers 15 and 20 are transmitted when the adapter is made a talker and are sent through transmitter 111.

Referring to FIG. 7, the timing of the various bus signals is shown with the BUS REQUEST activated upon going from the low to a high level and upon acknowledgement a BUS GRANT signal goes from a low to a high level. When the BUS GRANT signal is inactivated, it raises the BUS BUSY line and inhibits propagation of either a BUS GRANT or BUS REQUEST signal. The adapter then takes control of the bus and begins transmitting BUS SYNC signals and places the data on the bus. The adapter retains control of the bus until the buffer transfer is complete, at which time the BUS BUSY signal drops to a low level relinquishing control of the bus and causing the cessation of the BUS SYNC signals.

All data transfers are handled with READ or WRITE commands generated by the GPIB bus controller. The first four bytes of each block of WRITE signals to the Adapter are considered command by the adapter. These bytes will be decoded and will be operated on accordingly.

The first command in the table is a LOAD RECORD COUNTER. This command will cause the second byte of the command to be loaded into the record count register 16. This 8-bit field represents the number of records that will be accumulated in each of the buffers before writing into that buffer ceases and a service request (SRQ) will be generated with the data ready bit set in the serial pole status byte.

The command ENABLE ADAPTER affects the adapter in one of two ways, which is dependent upon the mode of operation selected for the adapter. In the slave mode all data from bus 300 is stored in buffers 15 or 20 preceded by a time-of-day stamp until the buffers are filled or until the nth record specified by the record count register has been received. When either of these two conditions is met, a Service Request will be generated and a serial poll status byte will be generated with the data ready bit set. Data can then be transferred. If part of the data from bus 300 causes a buffer to fill, some of the data will be lost causing a buffer overrun. This condition is noted and reported with the data ready signal. As soon as the buffer overrun occurs a Service Request signal is generated, the Data Ready signal is activated and unit check and buffer overrun bits are set in the serial poll status. If additional records are sent then the outer buffer will be used if it is not already full. If the other buffer is full with the received data a lost data condition will occur. If the lost data condition occurs, it will be reported with the next data ready; i.e. after the next buffer fills.

If the adapter is utilized in the master mode a Bus Grant and SYNC will be generated in response to a Bus Request signal if there is a buffer not considered full and the adapter is enabled. The adapter is able to send data onto the data bus 300 regardless of the state of buffers 15 and 20. If another device were to request the bus and buffers 15 and 20 were full then the adapter will block the generation of the Bus Grant signal. This prevents the loss of data from occurring as a result of the adapter being in the full condition with the inability to unload data.

The command LOAD TIME-OF-DAY CLOCK will cause the TIME-OF-DAY counters to be loaded from a software command. Bytes 1, 2 and 3 are hours, minutes and seconds respectively in eight bit decimal (four bits per digit). The hundredths portion of the counter is reset to 0 by receipt of this command.

The loading of the TIME-OF-DAY COUNTER is synchronized to the CLOCK TIME-OF-DAY pulse formed by 152 from the TIME-OF-DAY master clock 151. This is done so that loading the counter can occur at a time when the TIME-OF-DAY clock is not counting.

The FORCED READ command will cause the adapter to do one of the following depending on its state.

A. If both buffers are empty and the bus 300 is not busy, then a bus 200 Service Request will be generated with no Data Ready bit set in the serial pole status byte.

B. If the adapter is storing a bus 300 record the adapter will generate a bus 200 Service Request upon completion of storing the record regardless of the number of records specified by the record count register 16. The Data Ready bit will be active in the serial poll status byte.

C. If the adapter is idle, awaiting another data record from the data bus 300 and at least one buffer has data contained therein then a Service Request for data bus 200 will be generated with the Data Ready bit set in the serial pole status byte.

The command DISABLE PARITY GENERATOR will cause the adapter to disable the parity generator specified by the two least significant bits of the first command byte. Zeros in the two least significant of the first command byte, will result in none being disabled. The following is a description of the codes and which buffer is selected by them:

| COMMAND BYTE | BUFFER | |
|---|---|---|
| 81H | BUFFER 15 | Buffers for Data from Bus 300 |
| 82H | BUFFER 20 | |
| 83H | BUFFER 40 | Buffer for Data to be Sent to Bus 300 |

Only one buffer can be disabled at any time. Every DISABLE PARITY GENERATOR command must be followed by an ENABLE PARITY GENERATOR command at some subsequent time.

The command WRITE ADAPTER will cause the adapter to store data for re-transmission onto data bus 300. The remaining FIGS. 8 thru 47 illustrate the logic schematics for the adapter with vendor part numbers used for the various integrated circuits.

Figure 8A:
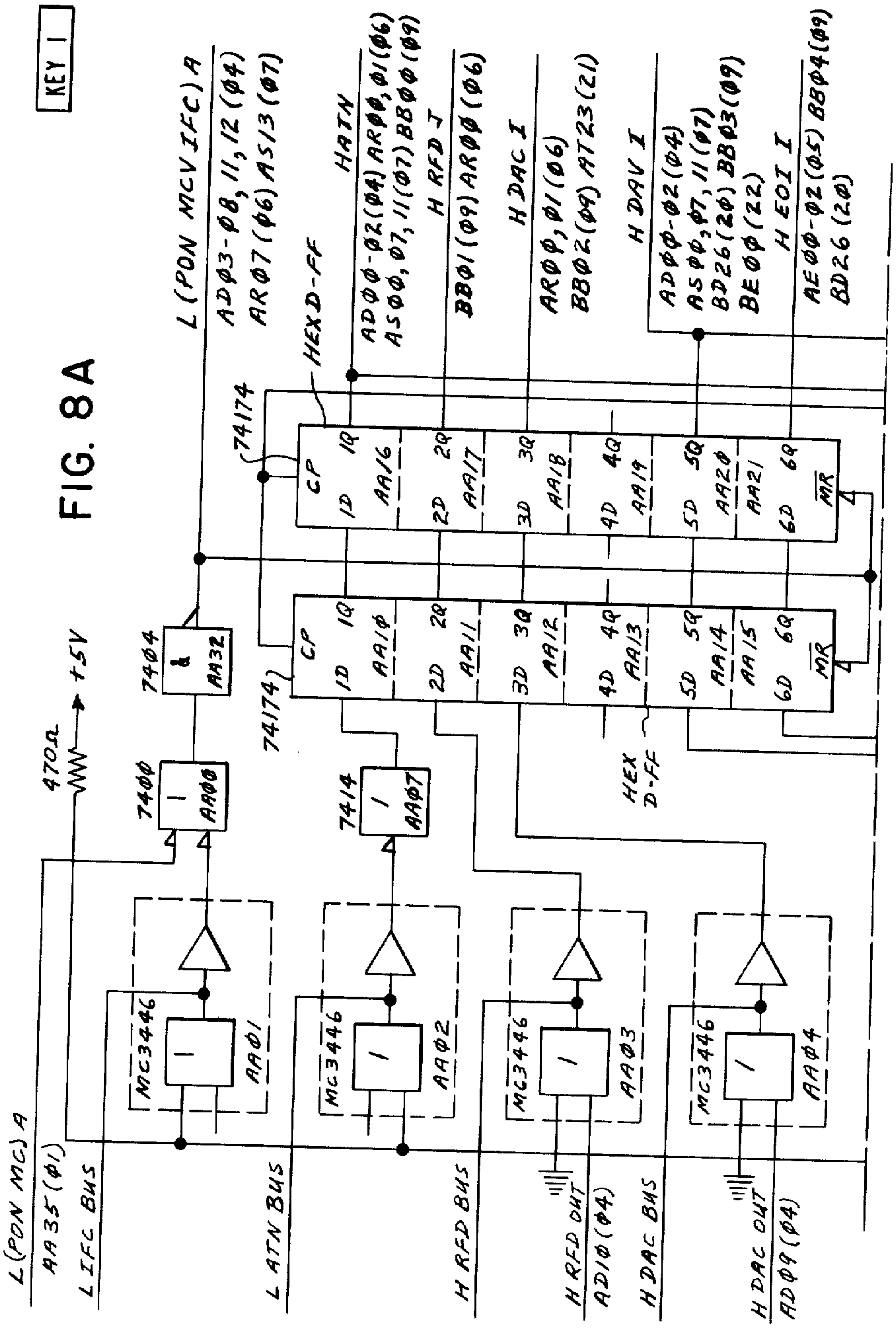
FIGS. 8A, 8B and 8C illustrate the preferred embodiment in hardware logic form.
Figure 8B:
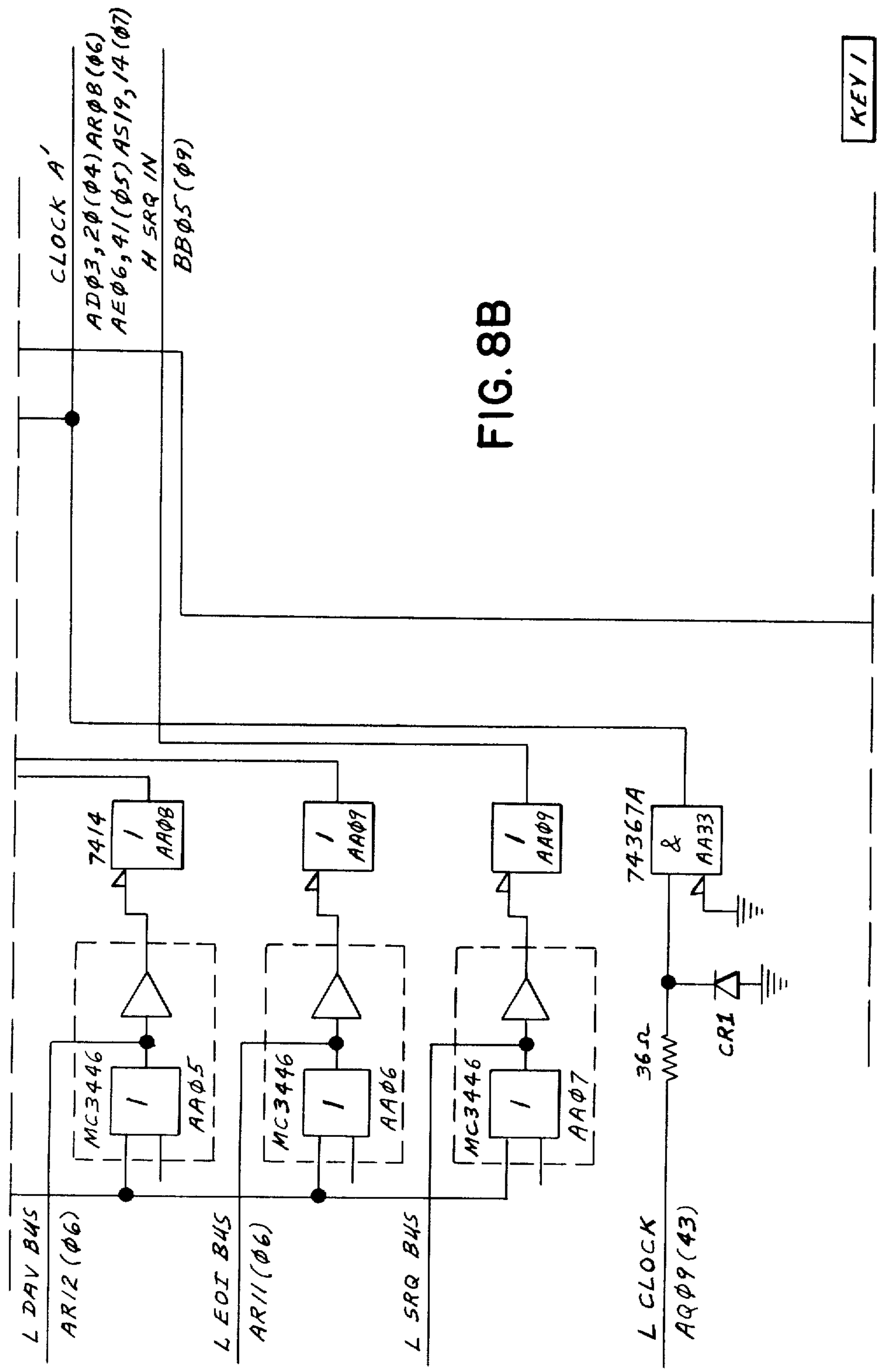
Figure 8C:
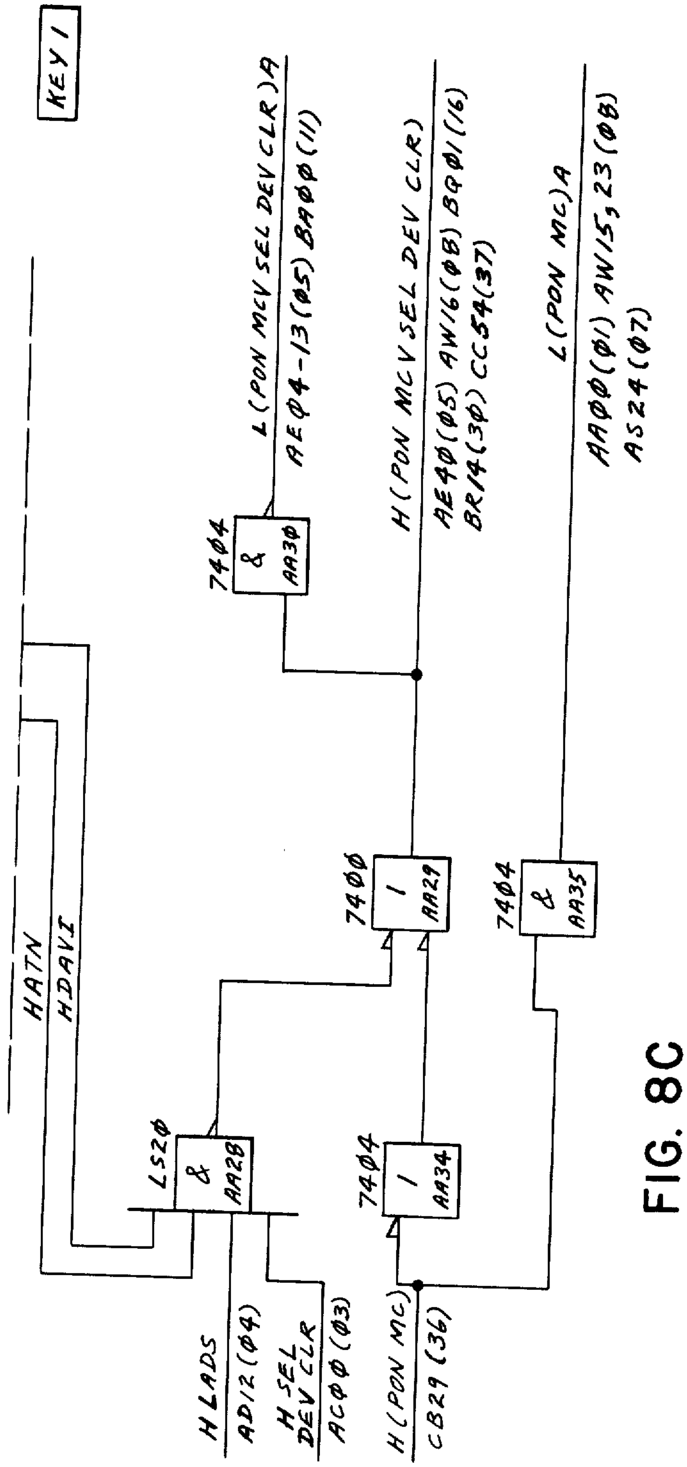
Figure 9A:
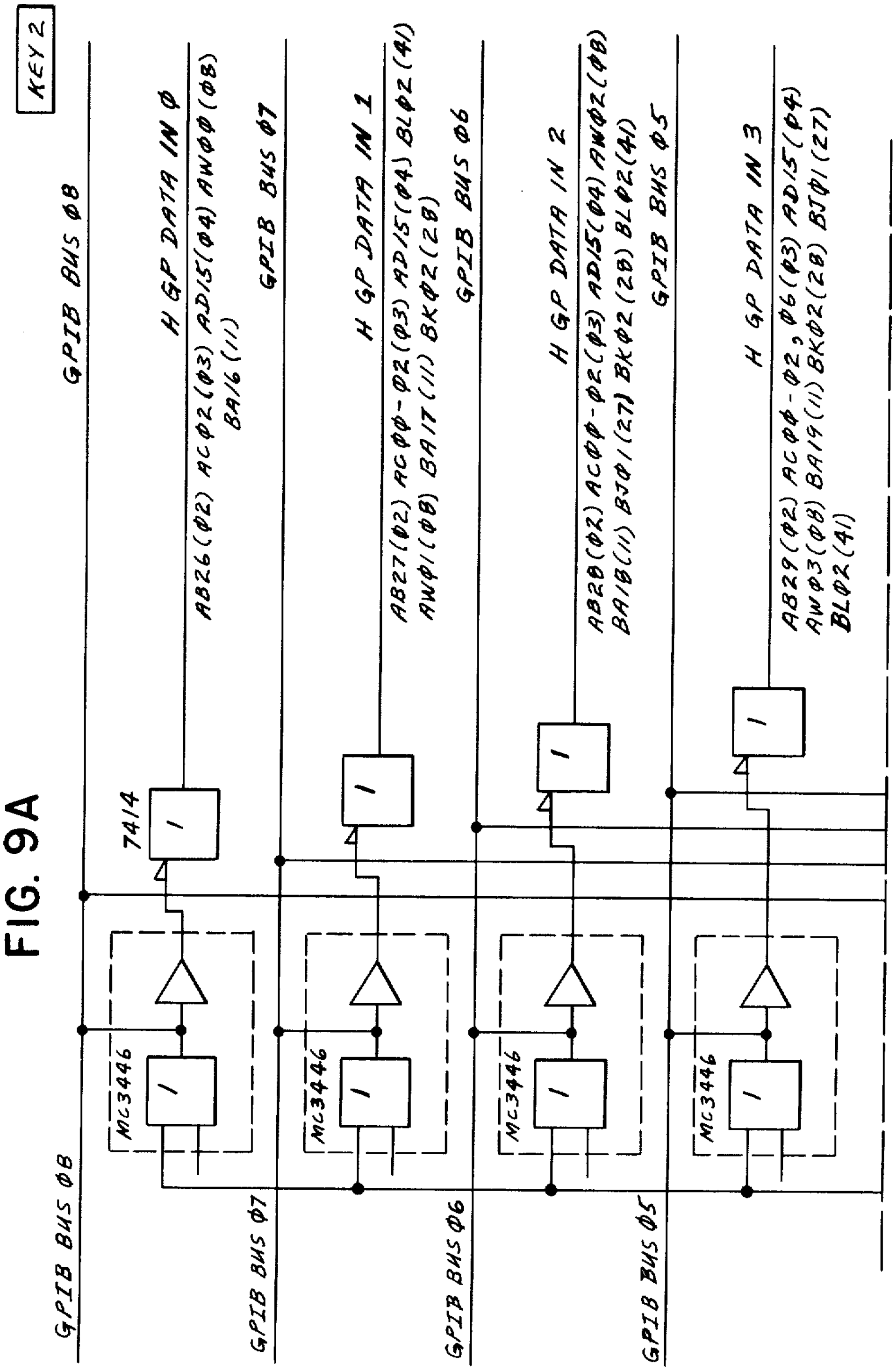
FIGS. 9A, 9B, 9C and 9D illustrate the preferred embodiment in hardware logic form.
Figure 9B:
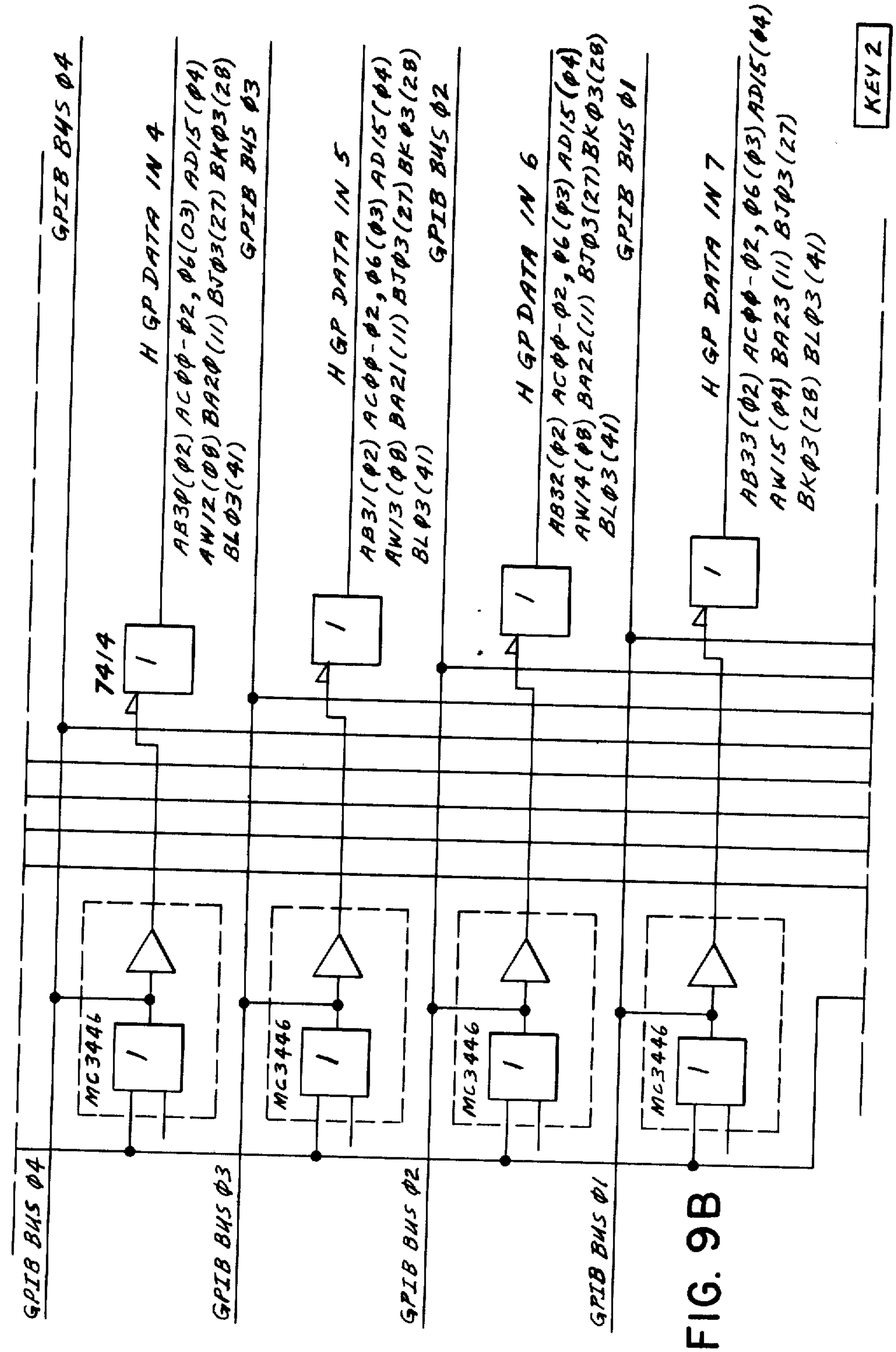
Figure 9C:
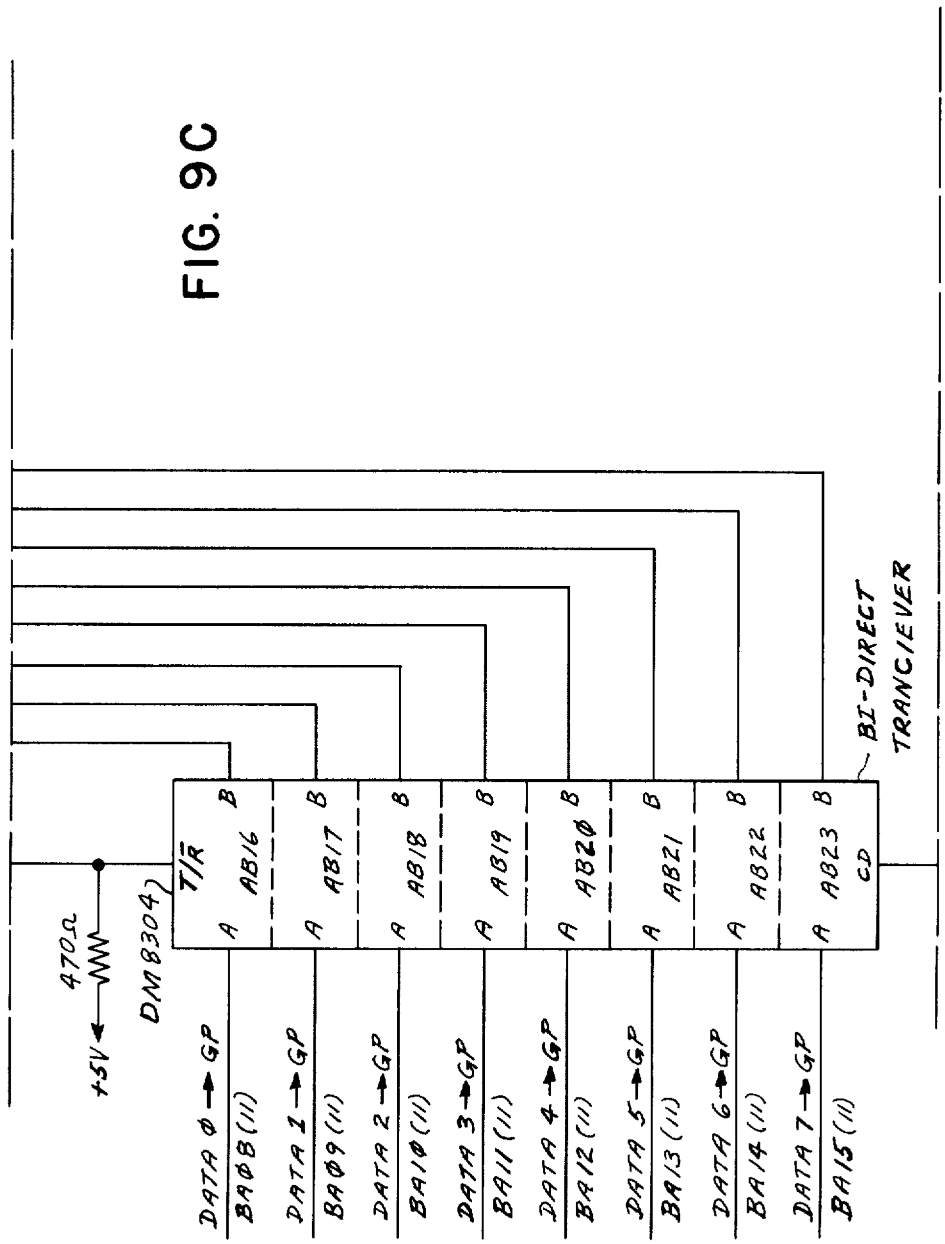
Figure 9D:
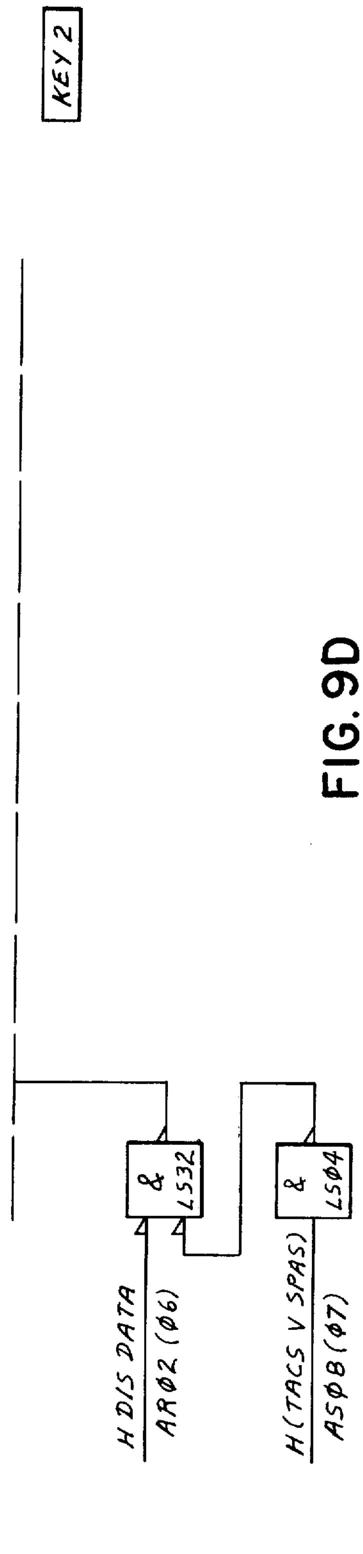
Figure 10A:
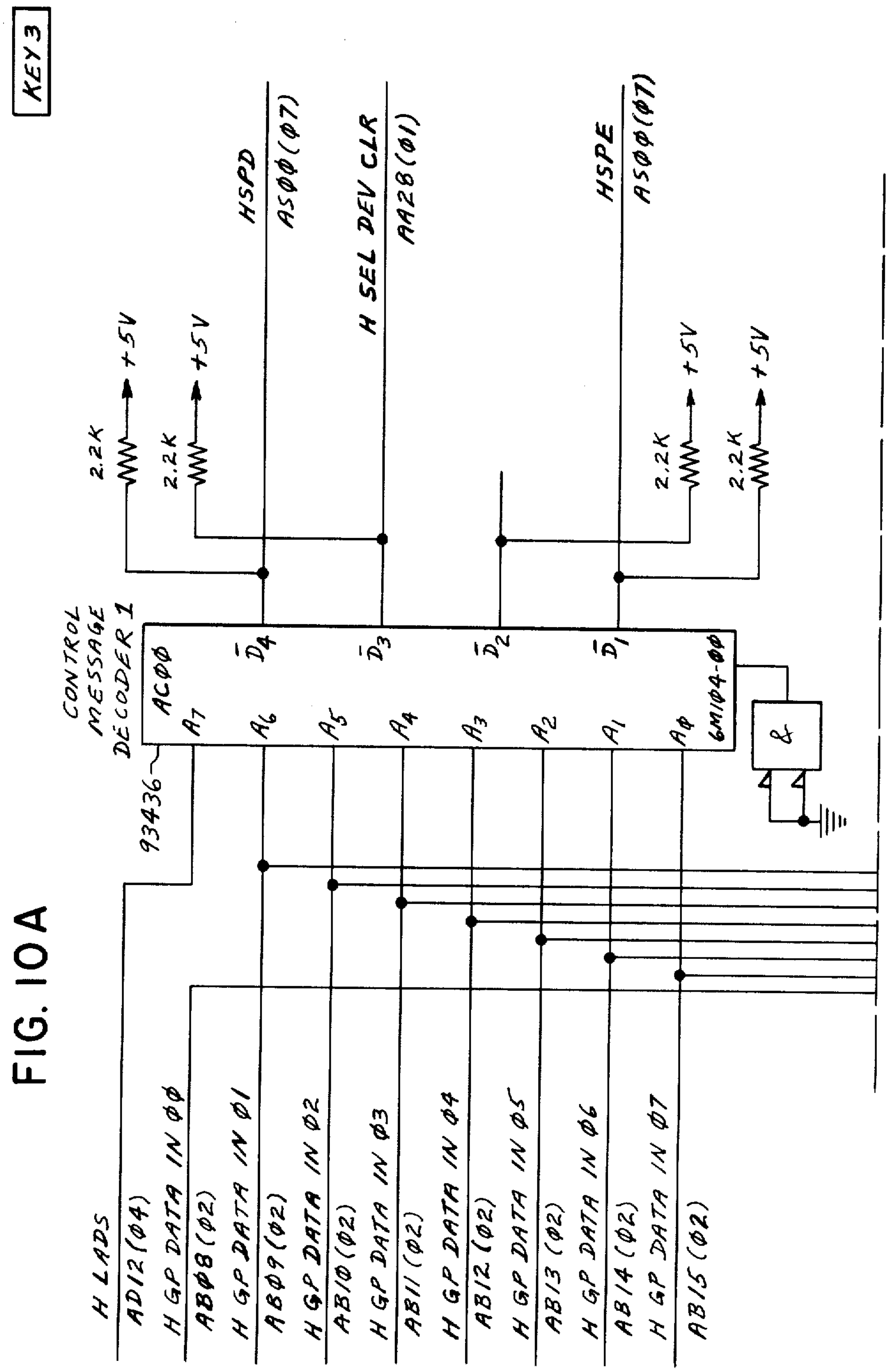
FIGS. 10A, 10B, 10C and 10D illustrate the preferred embodiment in hardware logic form.
Figure 10B:
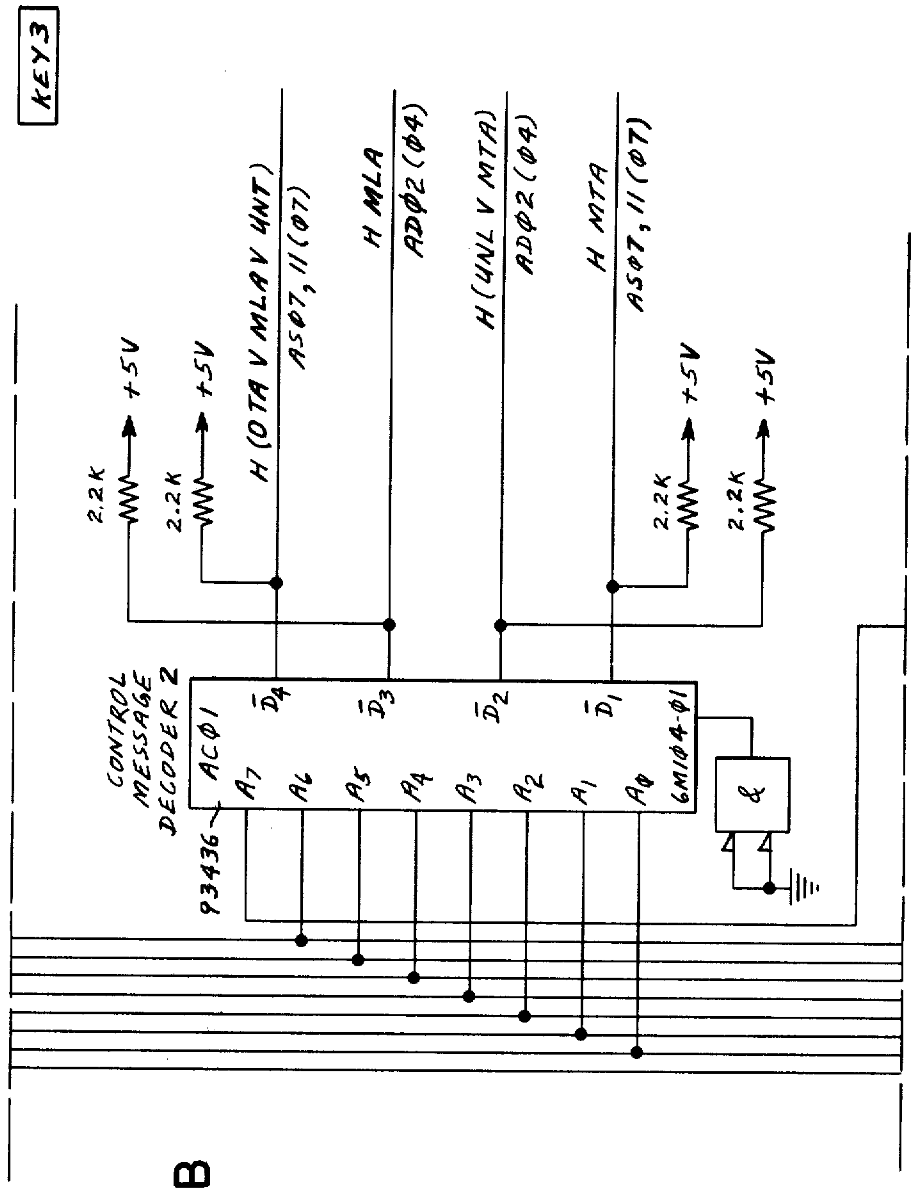
Figure 10C:
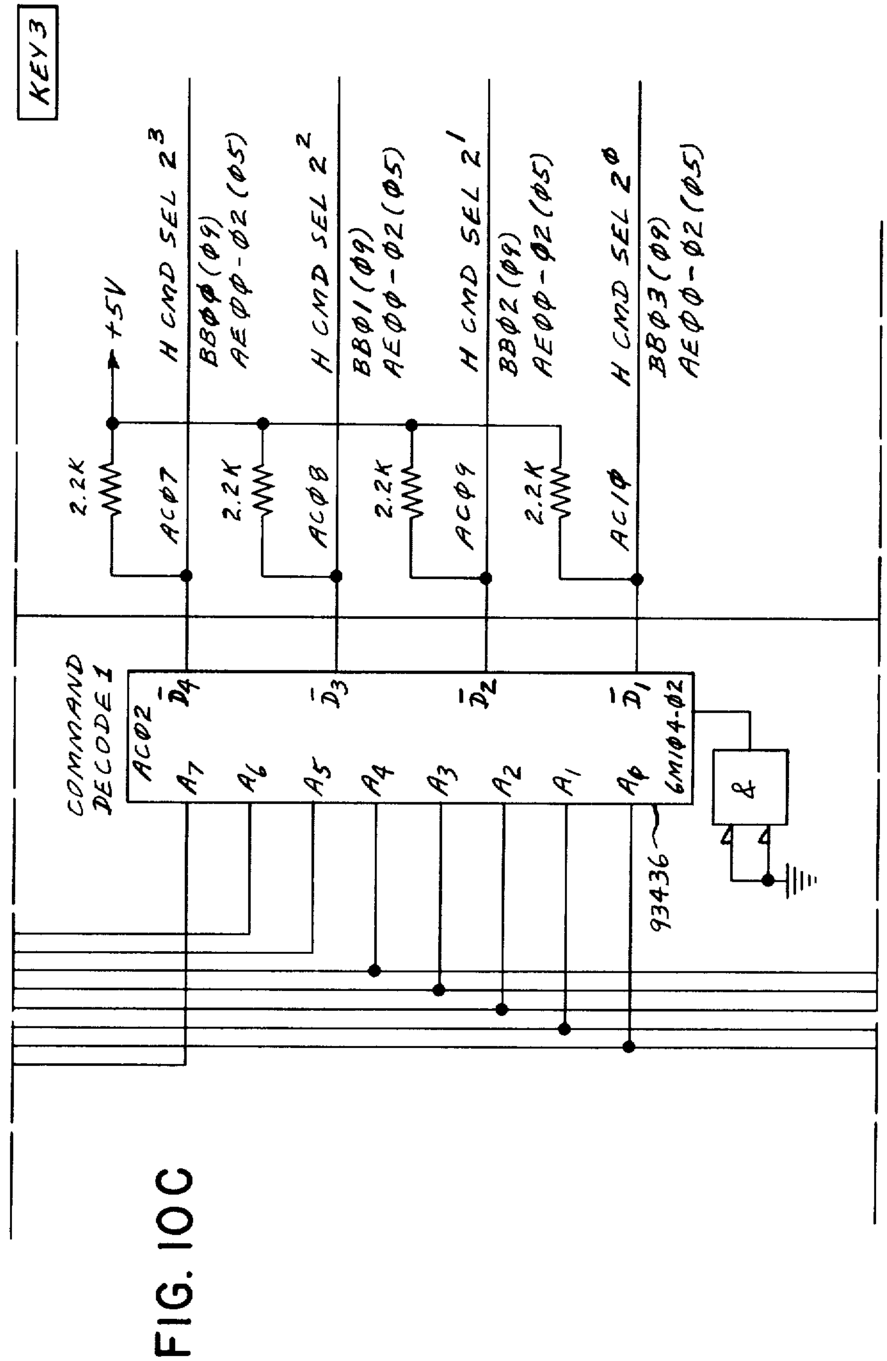
Figure 10D:
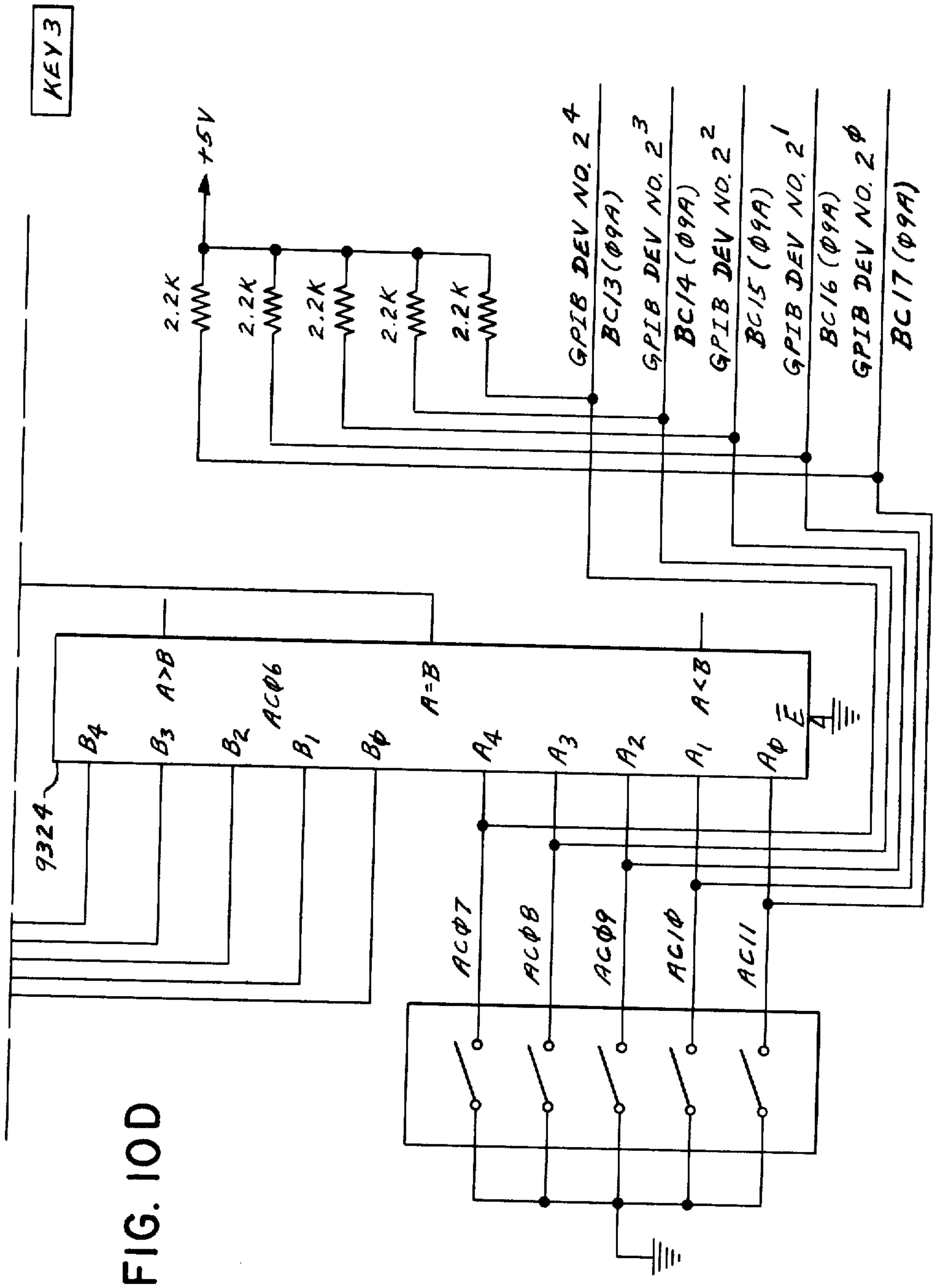
Figure 11A:
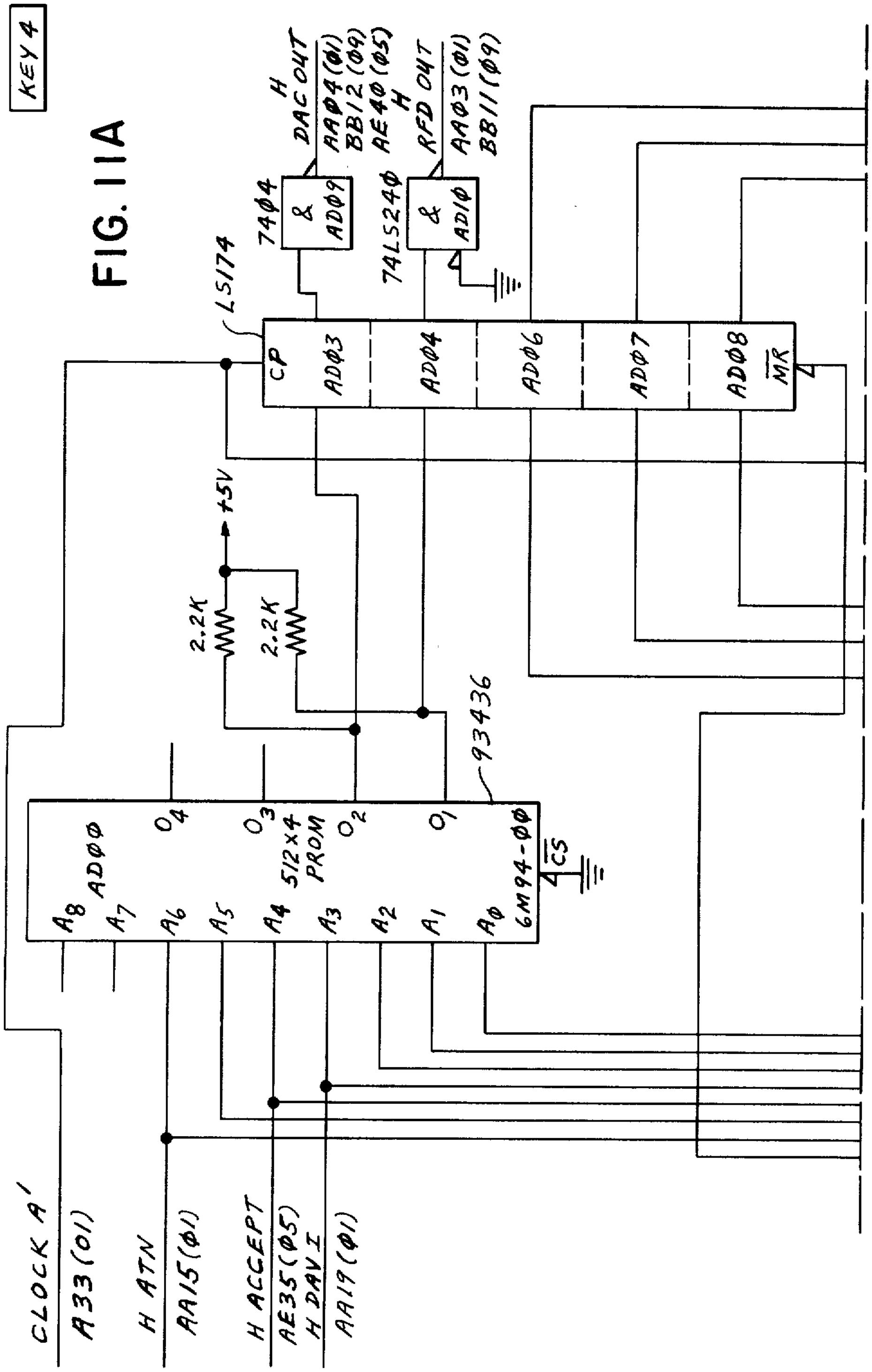
FIGS. 11A, 11B and 11C illustrate the preferred embodiment in hardware logic form.
Figure 11B:
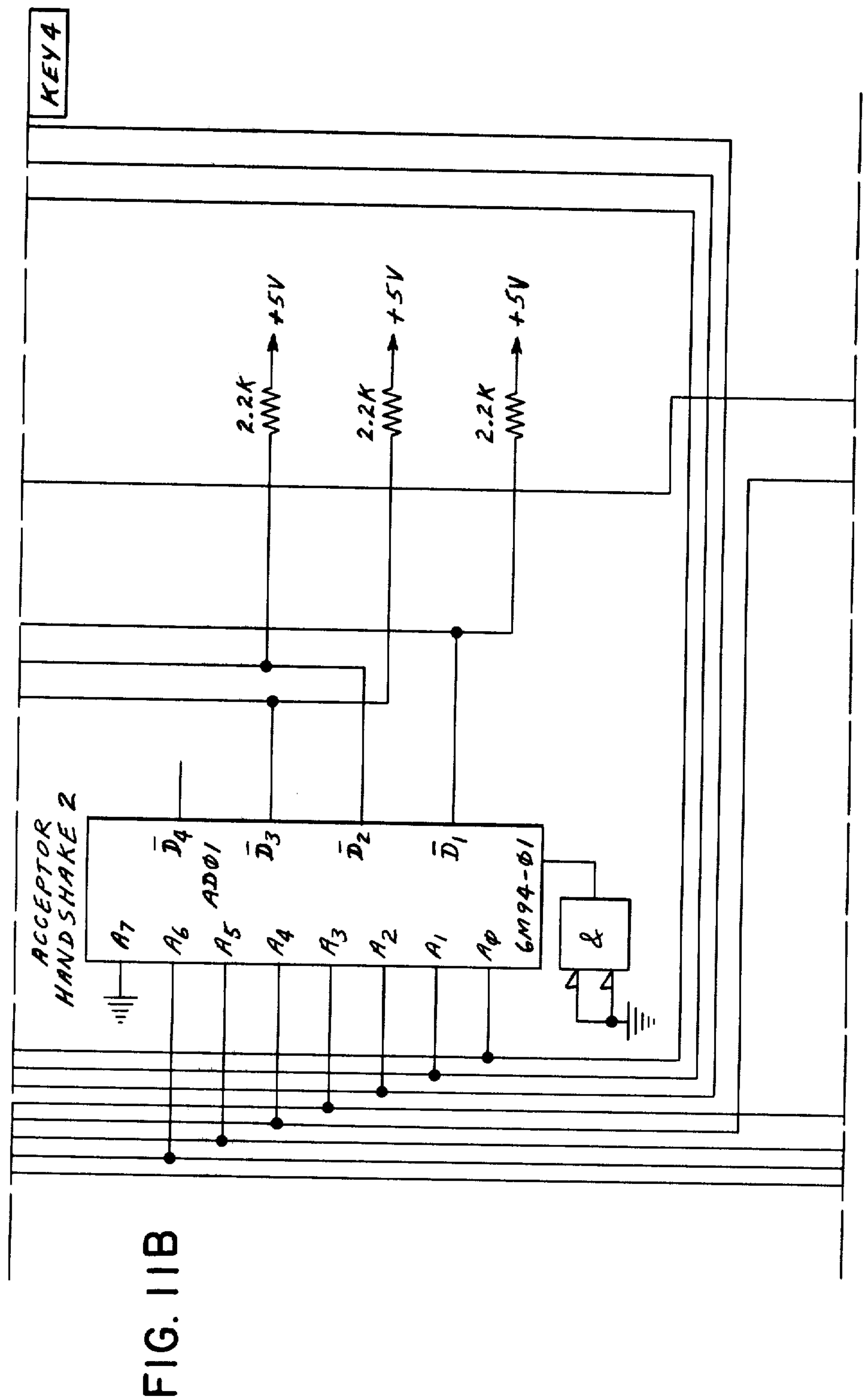
Figure 11C:
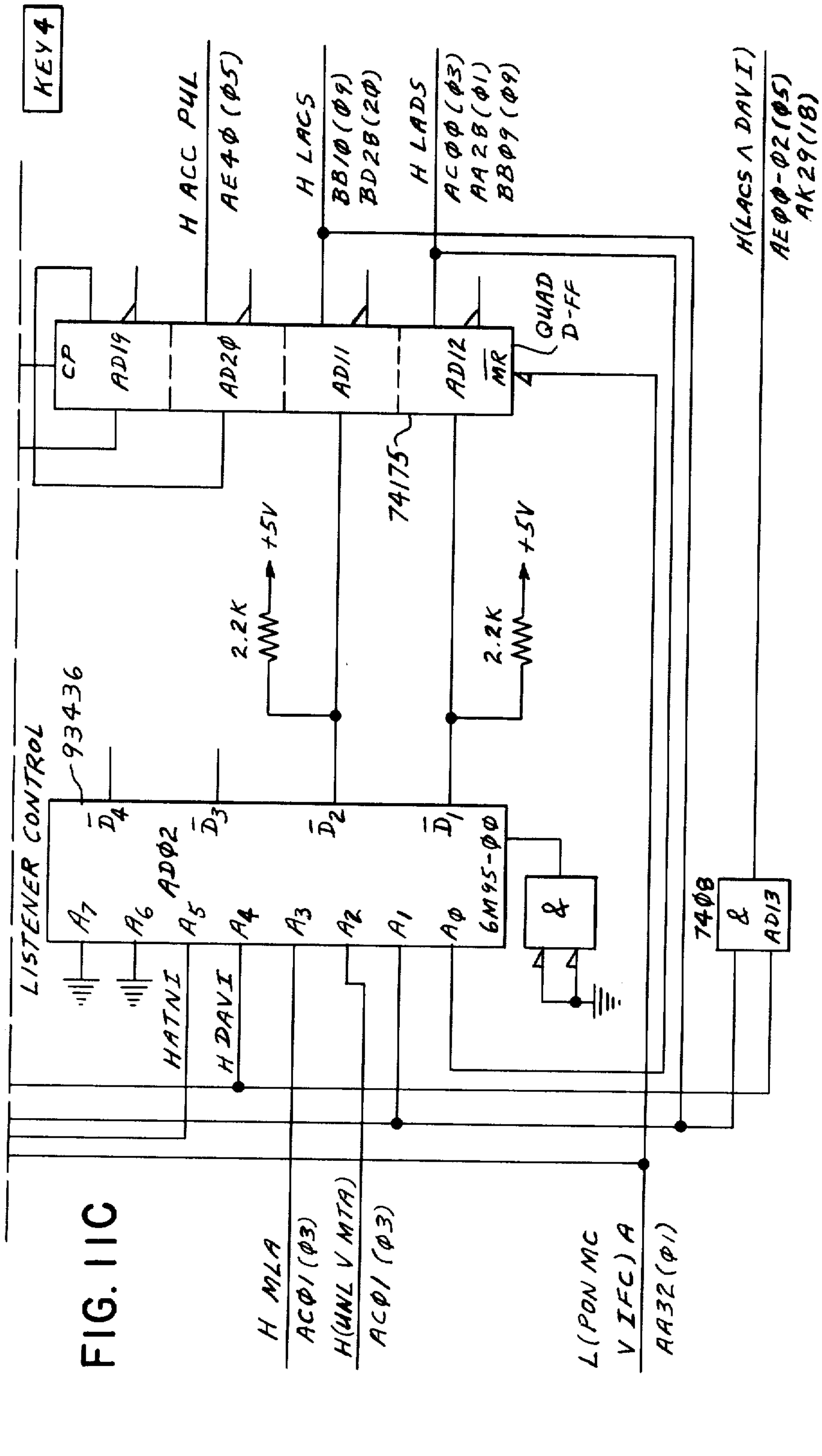
Figure 12:
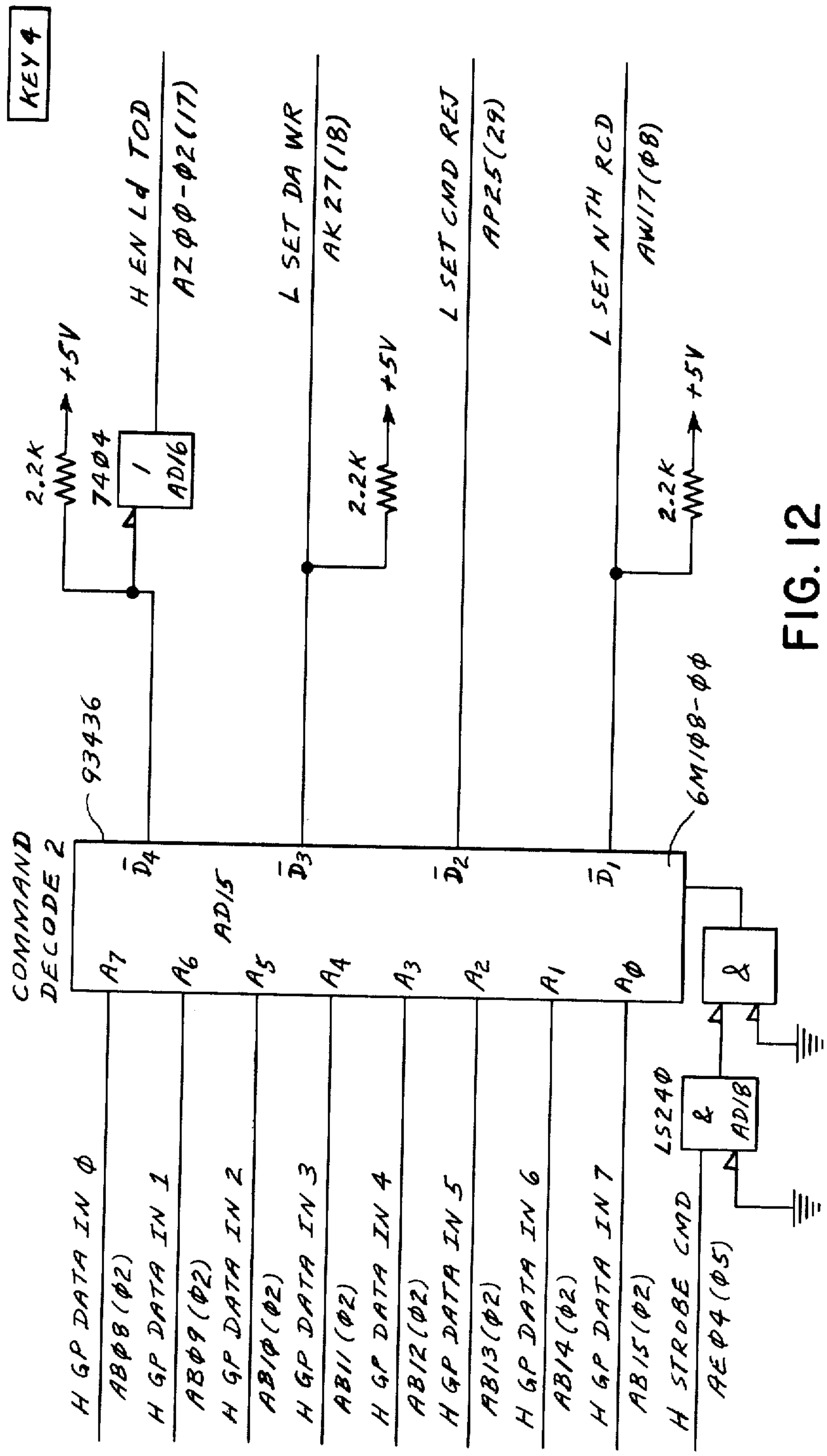
FIG. 12 illustrates the preferred embodiment in hardware logic form.
Figure 13A:
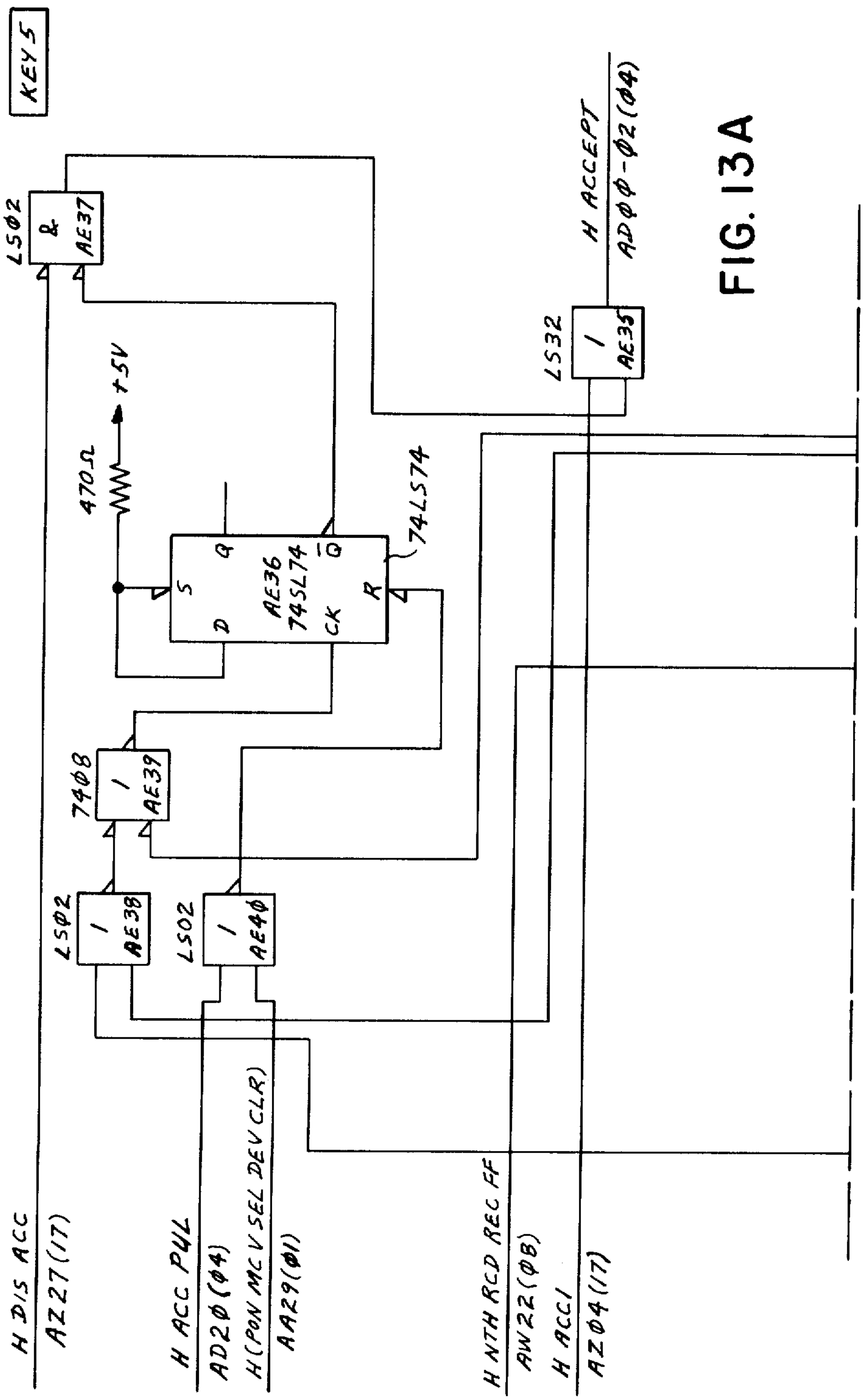
FIGS. 13A, 13B, 13C and 13D illustrate the preferred embodiment in hardware logic form.
Figure 13B:
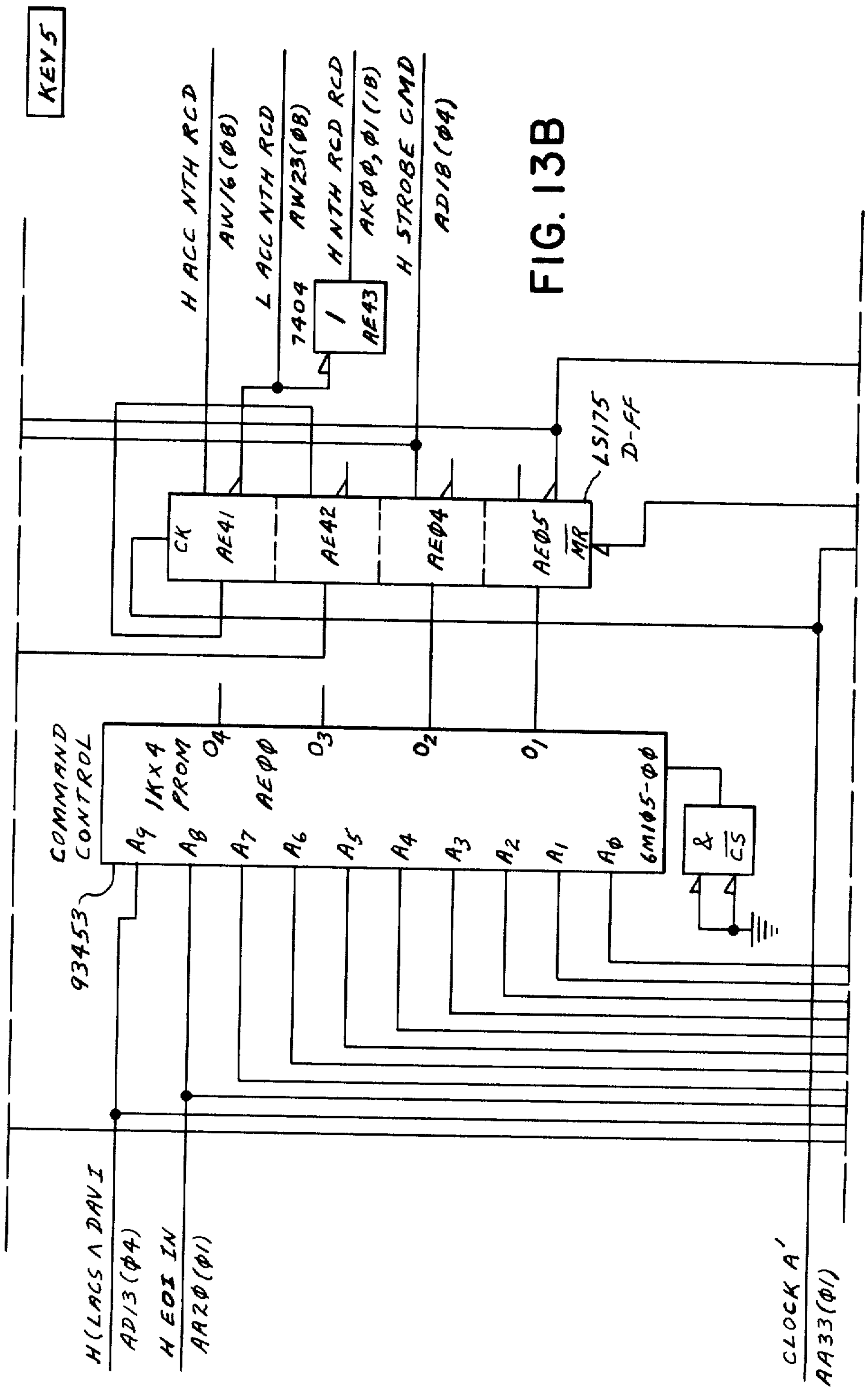
Figure 13C:
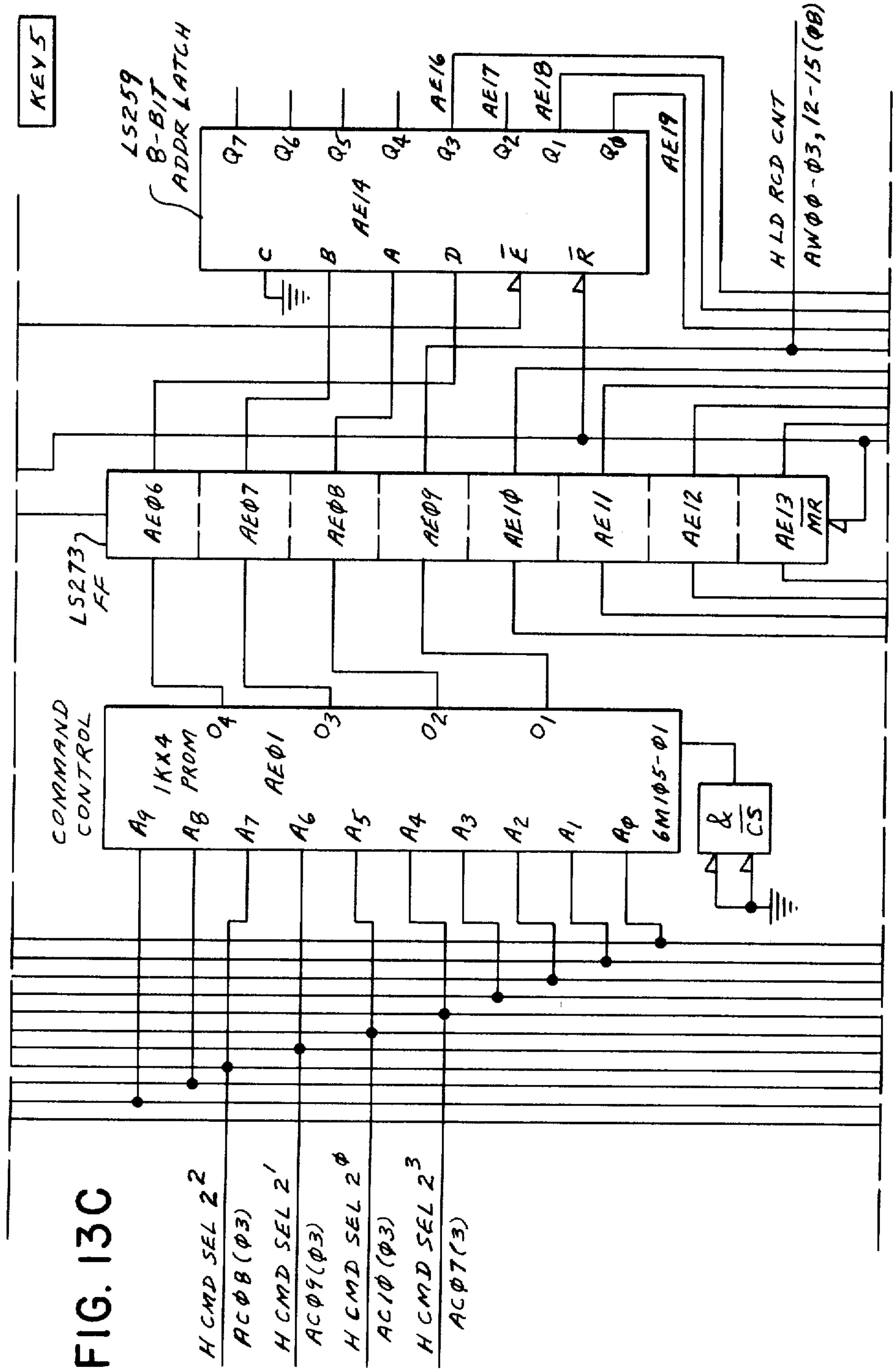
Figure 13D:
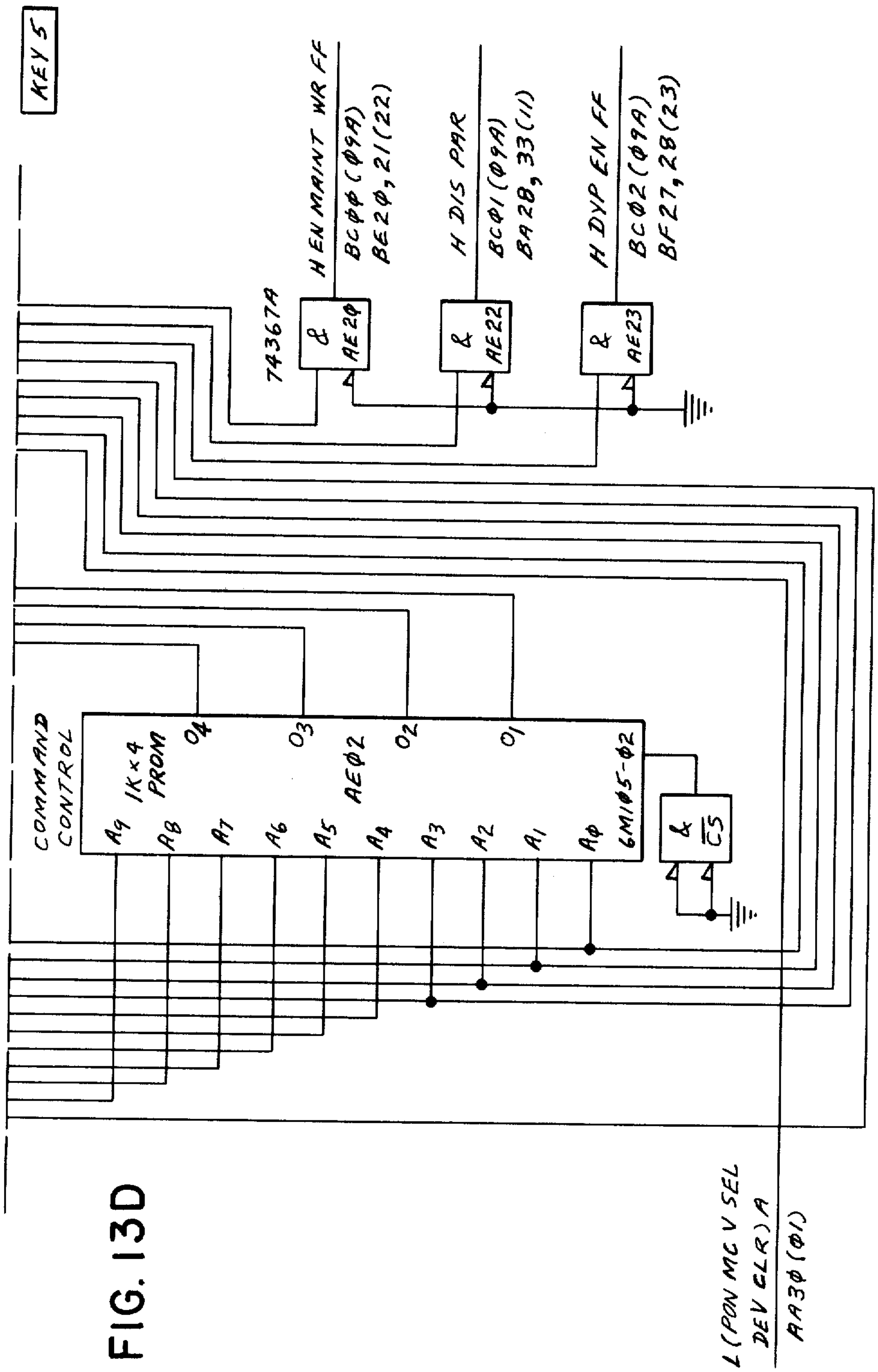
Figure 14A:
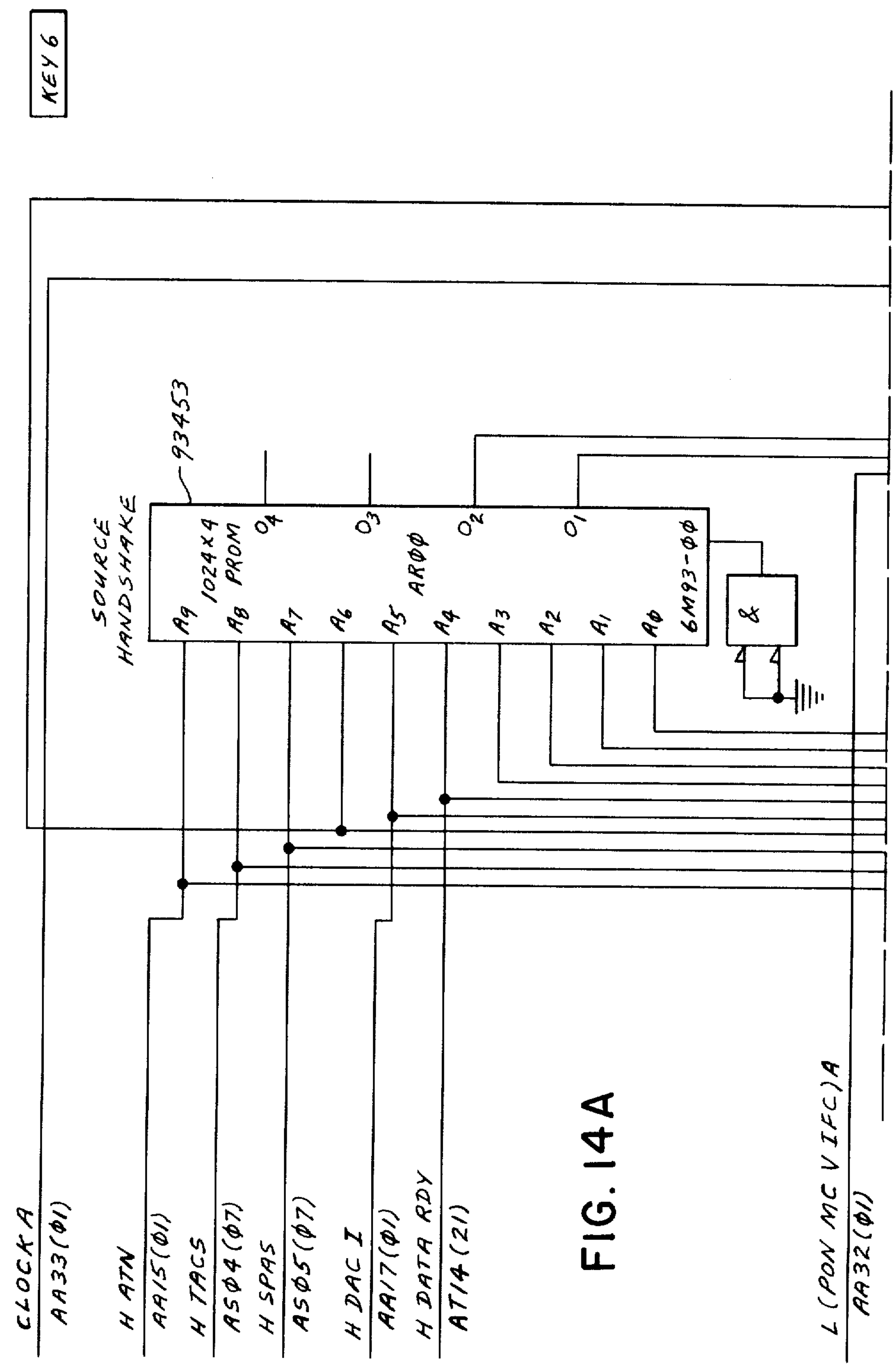
FIGS. 14A and 14B illustrate the preferred embodiment in hardware logic form.
Figure 14B:
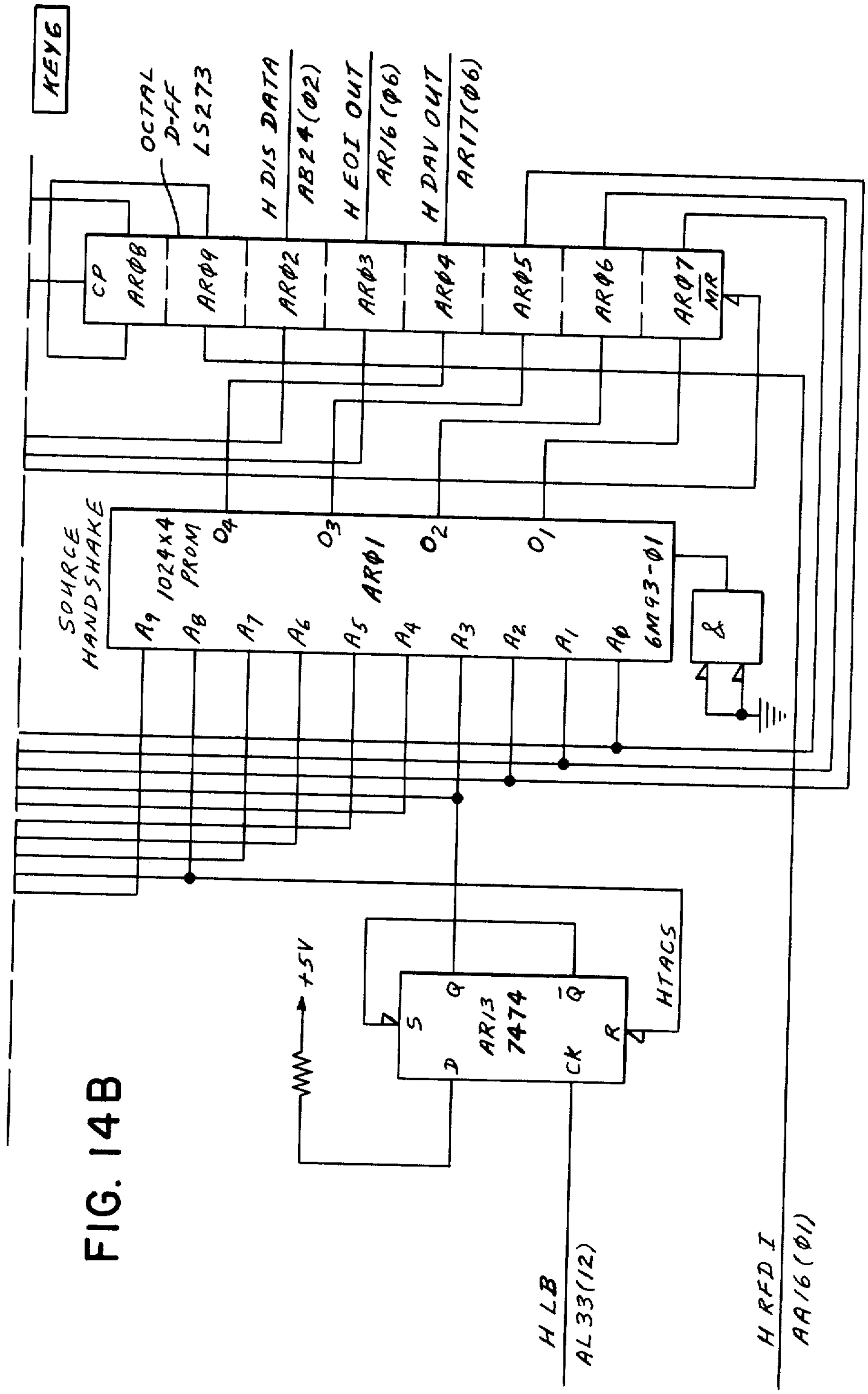
Figure 15:
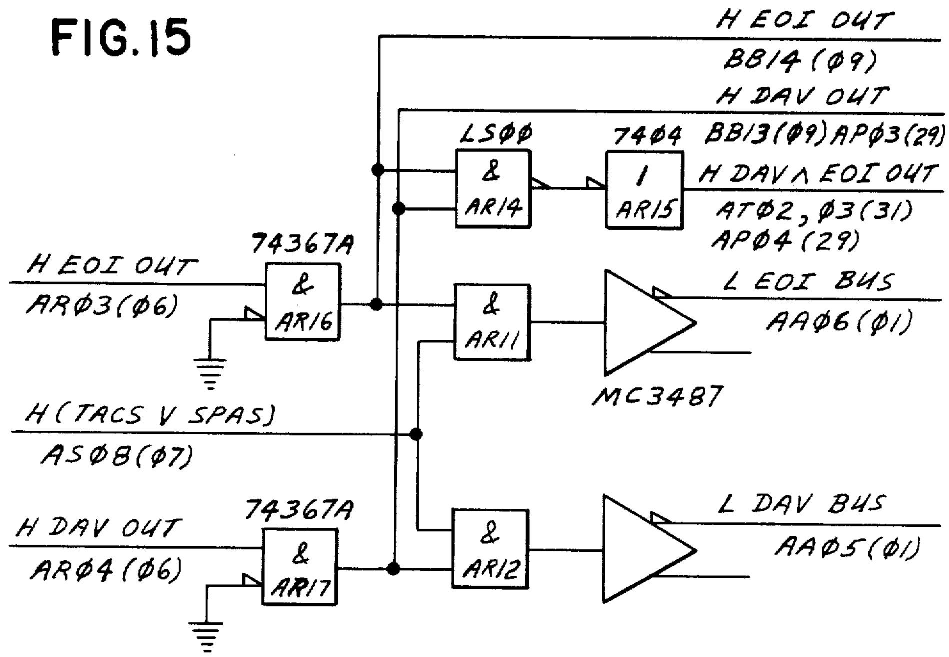
FIG. 15 illustrates the preferred embodiment in hardware logic form.
Figure 16A:
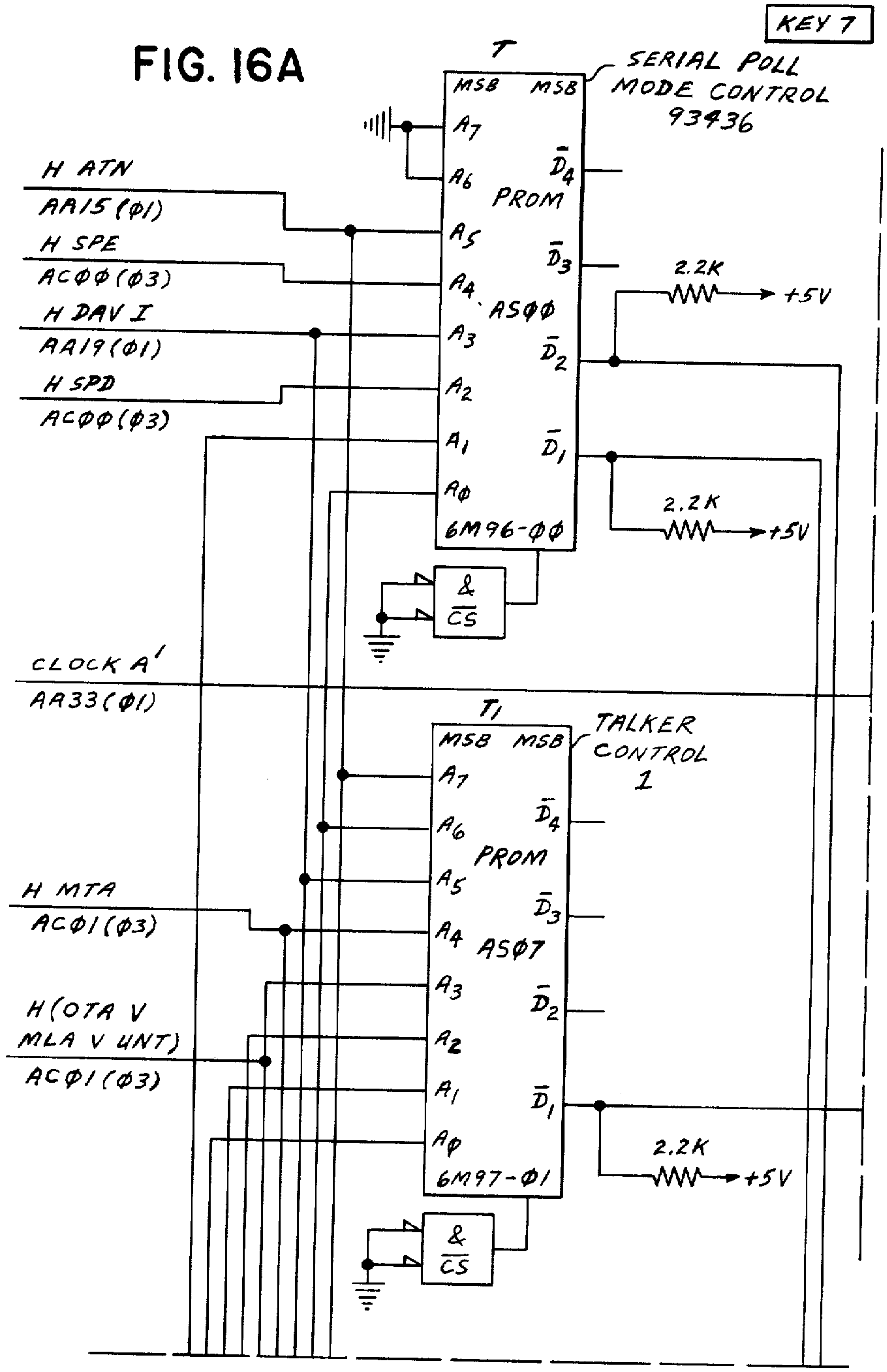
FIGS. 16A, 16B, 16C and 16D illustrate the preferred embodiment in hardware logic form.
Figure 16B:
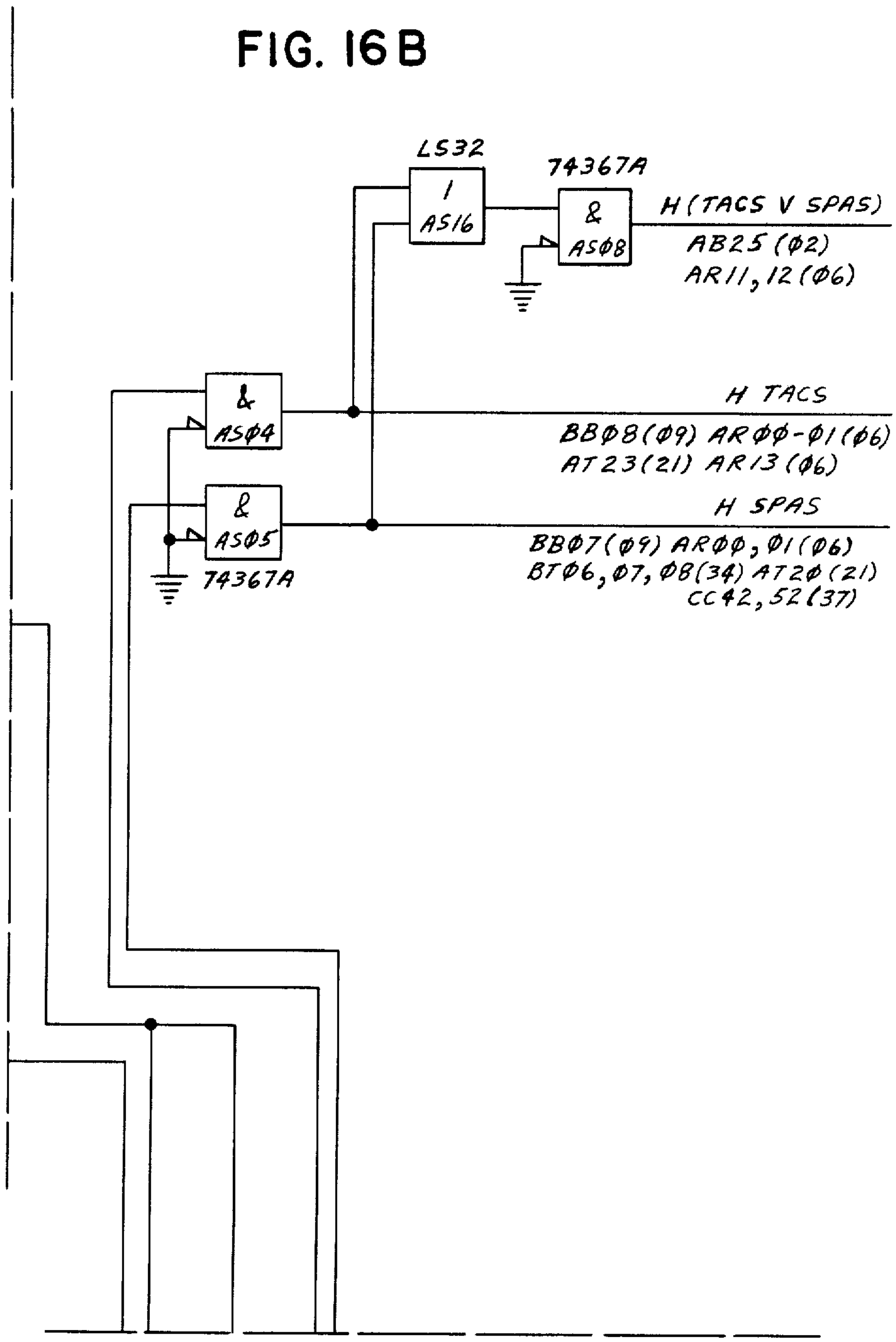
Figure 16:
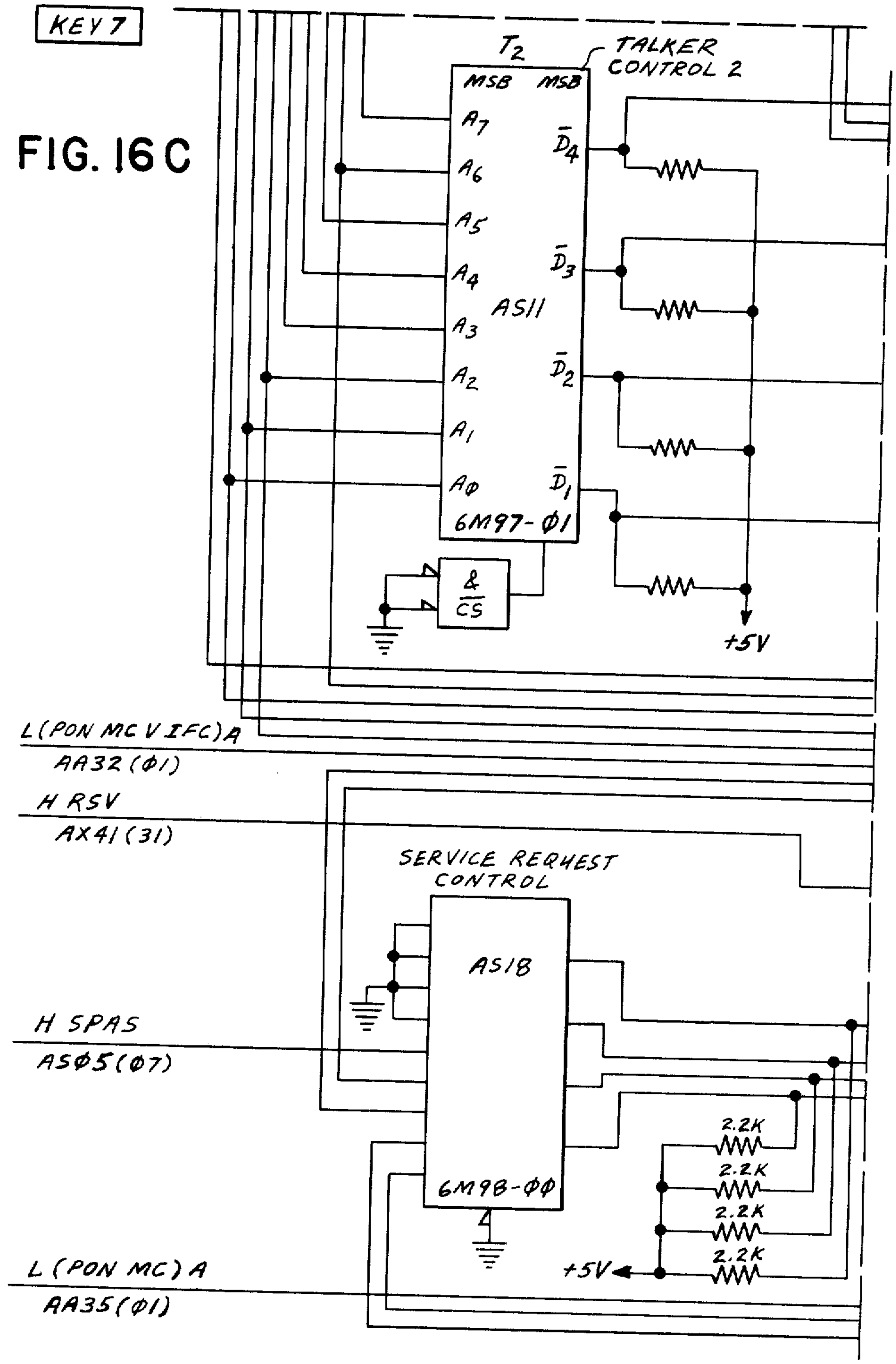
Figure 16D:
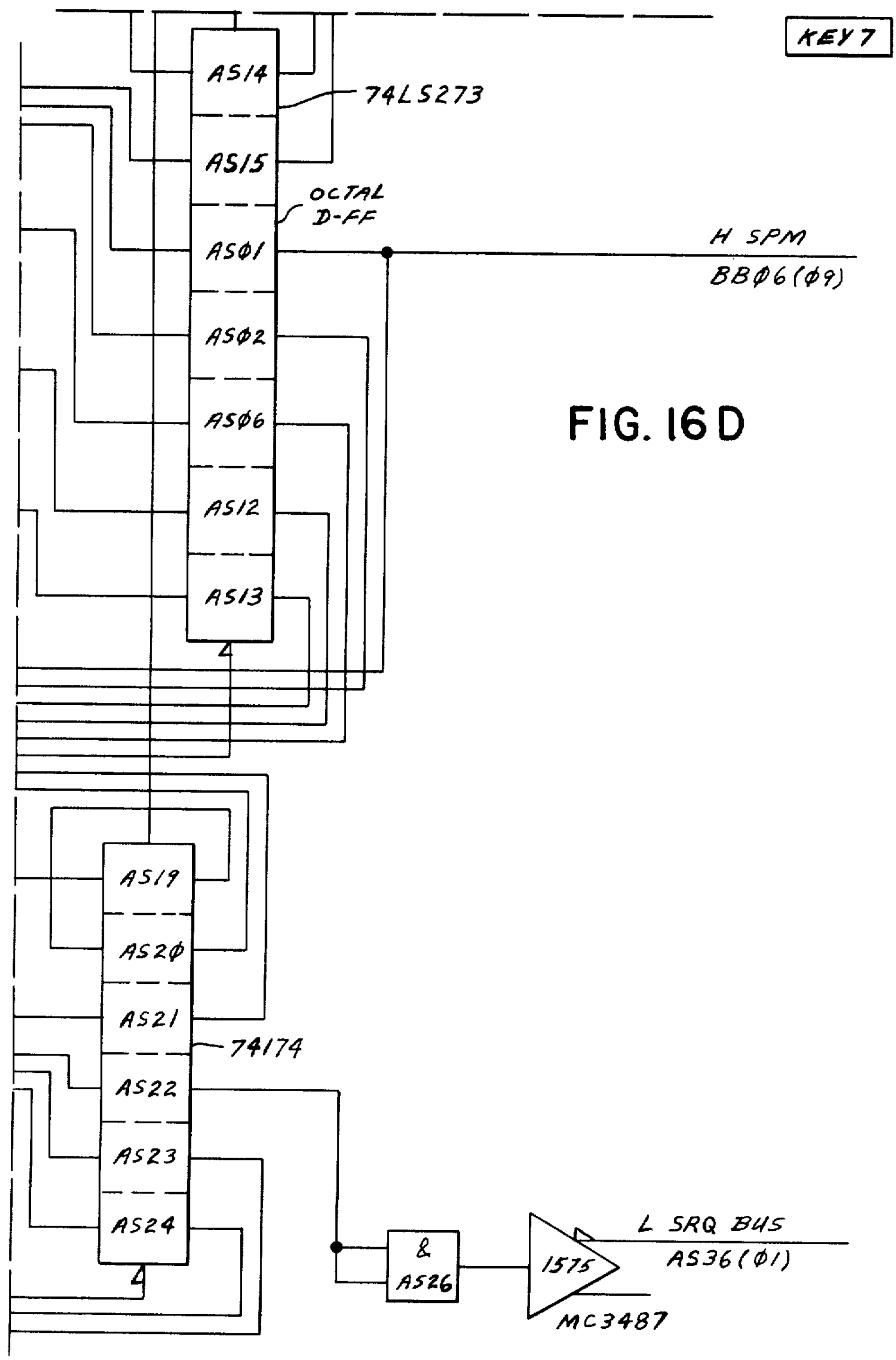
Figure 17A:
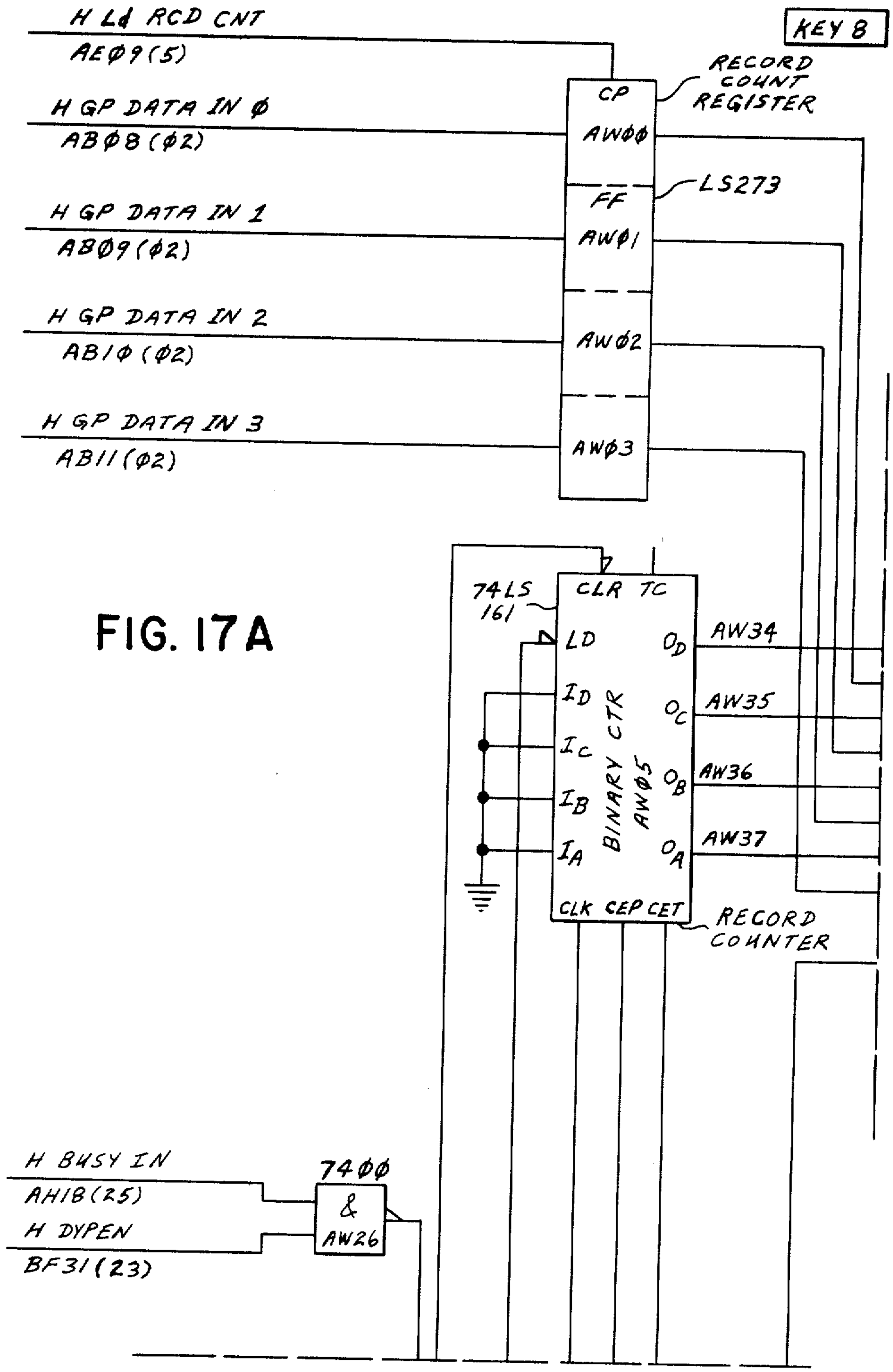
FIGS. 17A, 17B, 17C and 17D illustrate the preferred embodiment in hardware logic form.
Figure 17B:
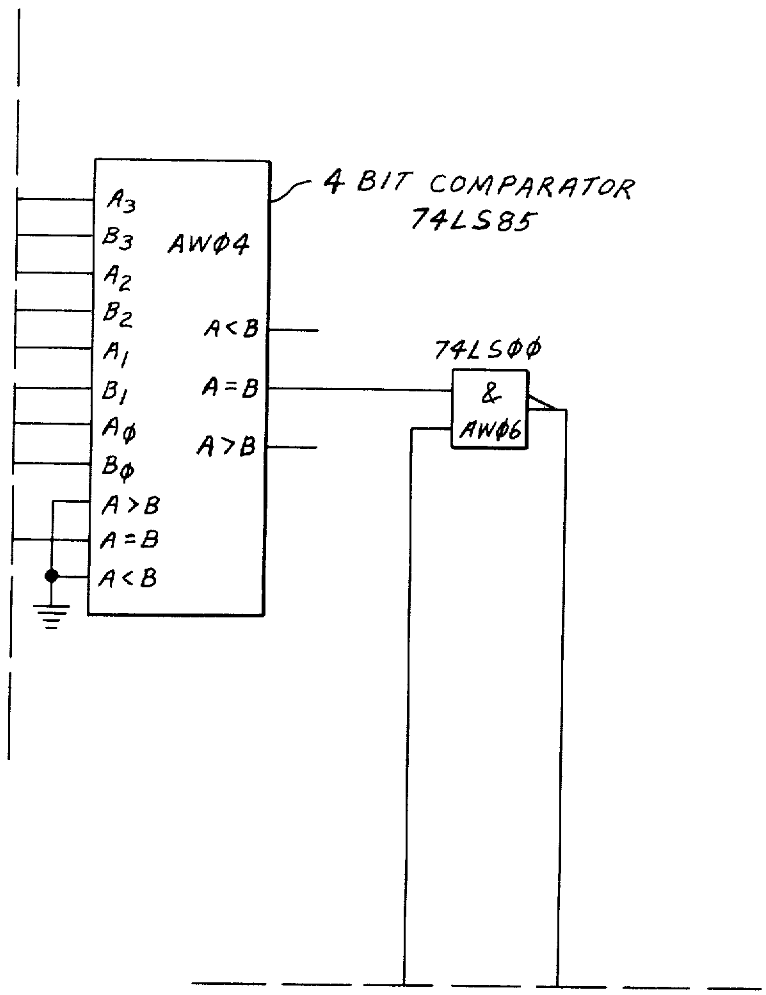
Figure 17C:
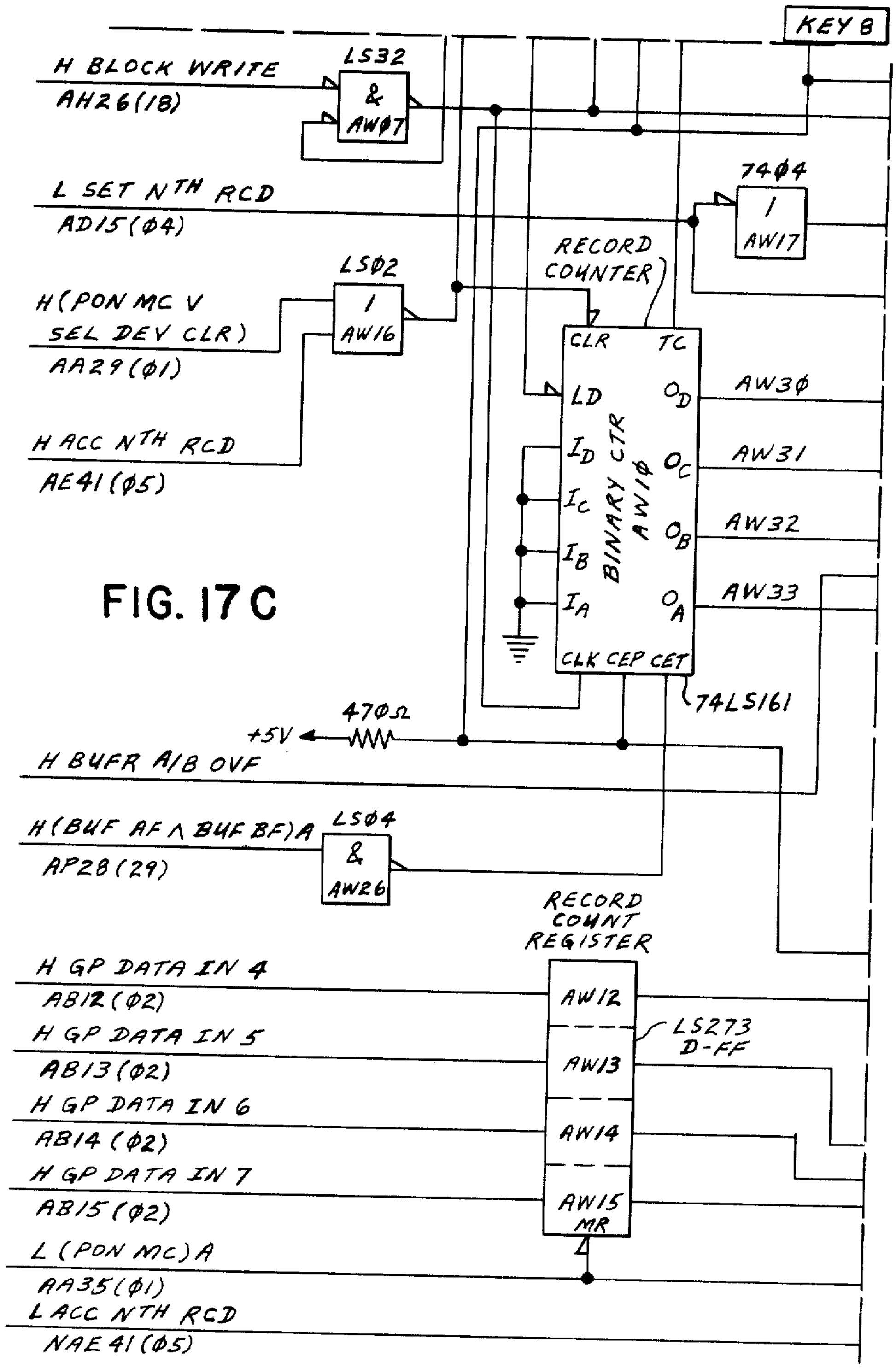
Figure 17D:
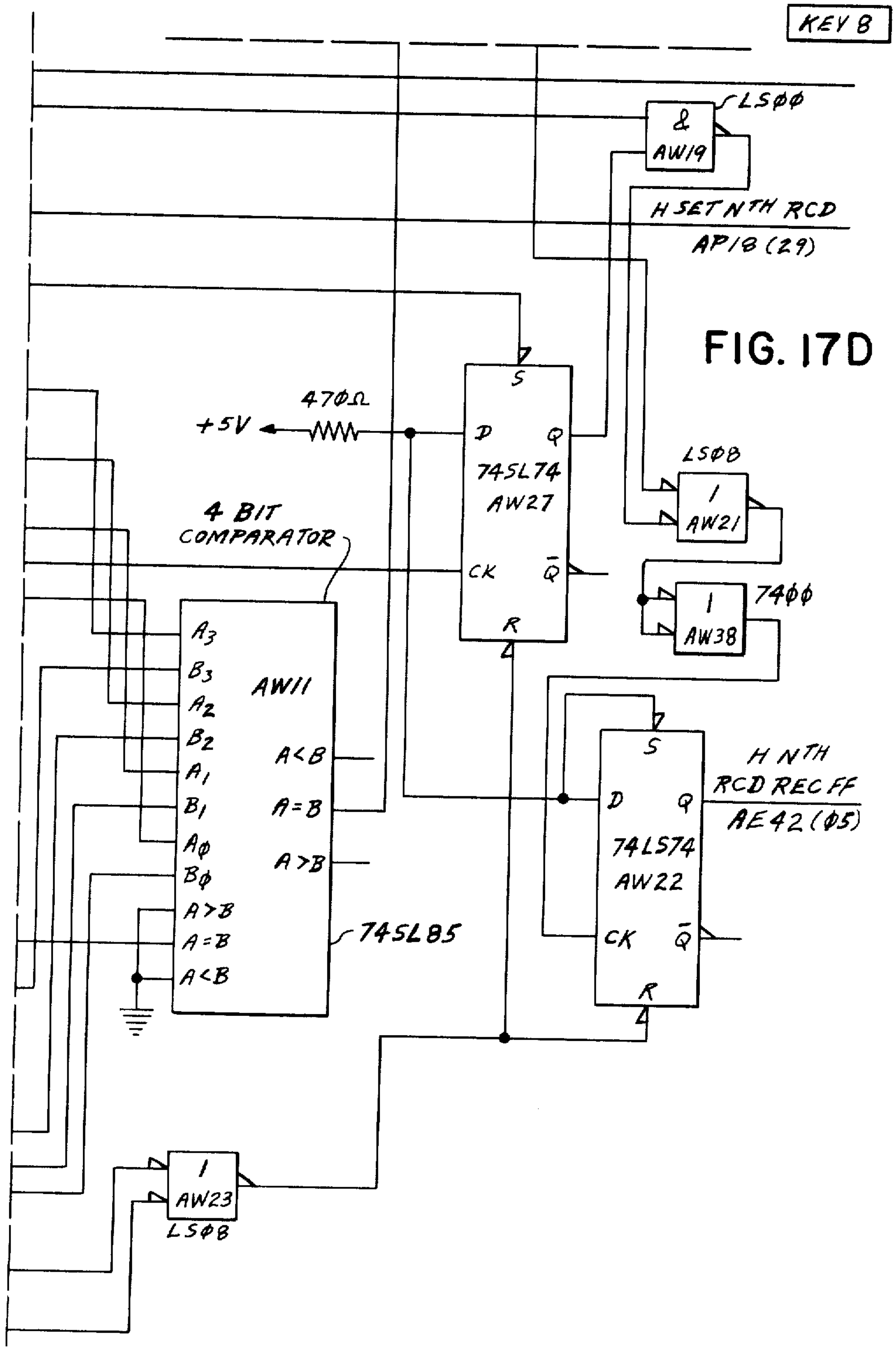
Figure 18A:
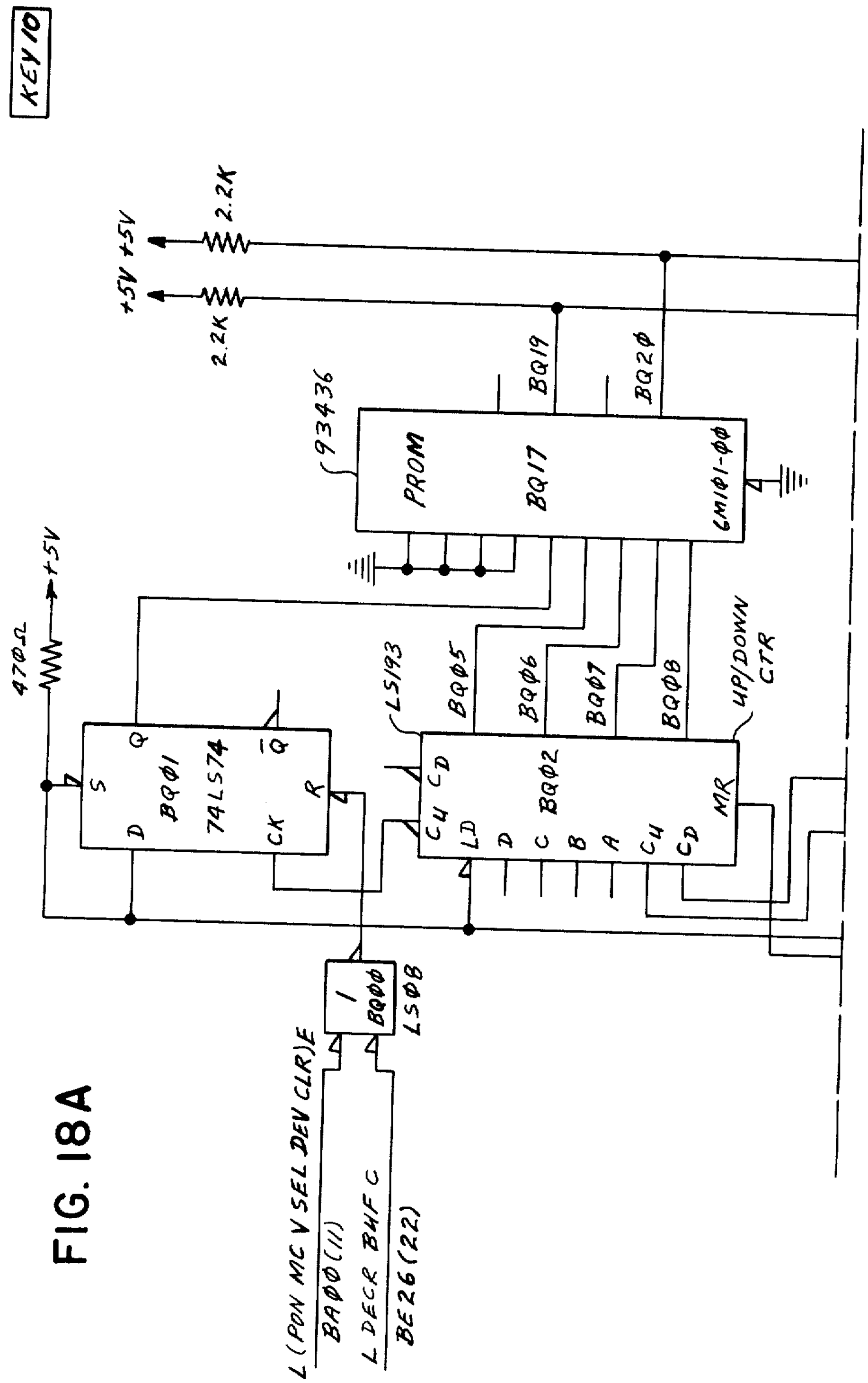
FIGS. 18A and 18B illustrate the preferred embodiment in hardware logic form.
Figure 18B:
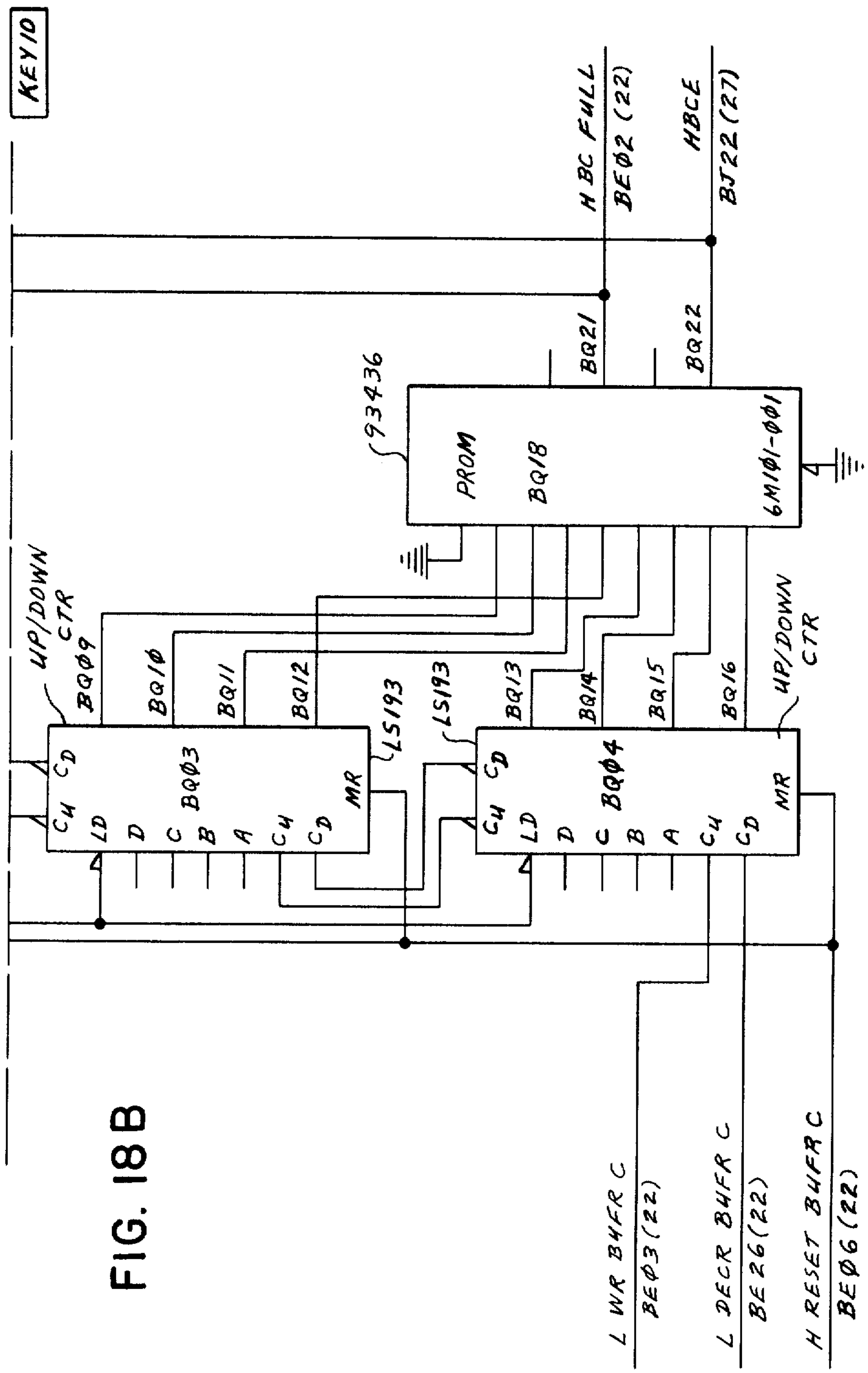
Figure 21:
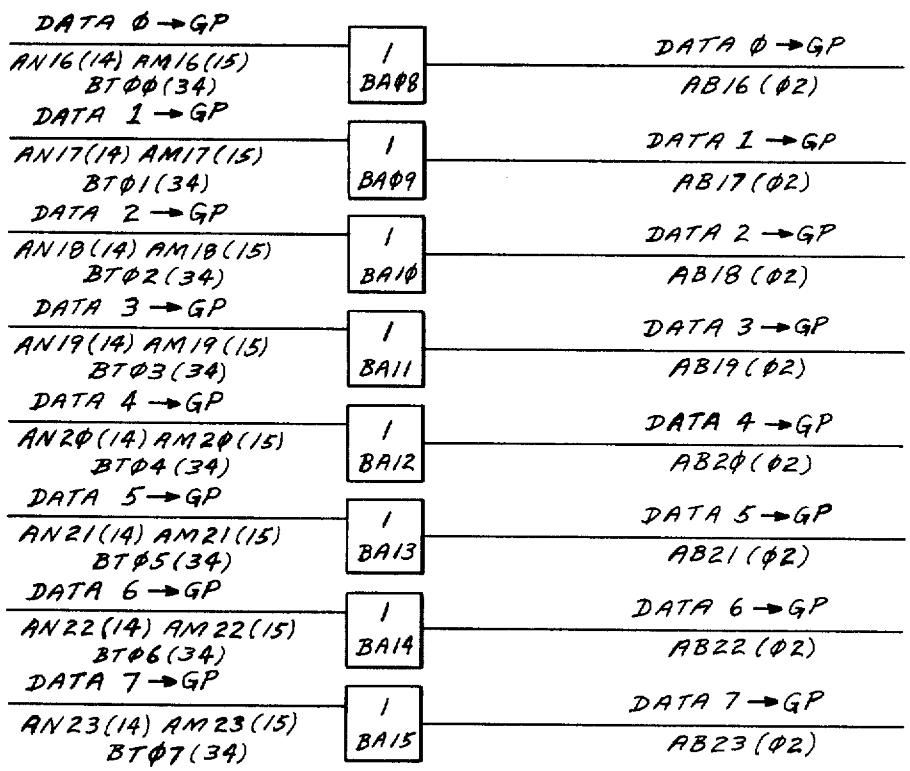
FIG. 21 illustrates the preferred embodiment in hardware logic form.
Figure 22A:
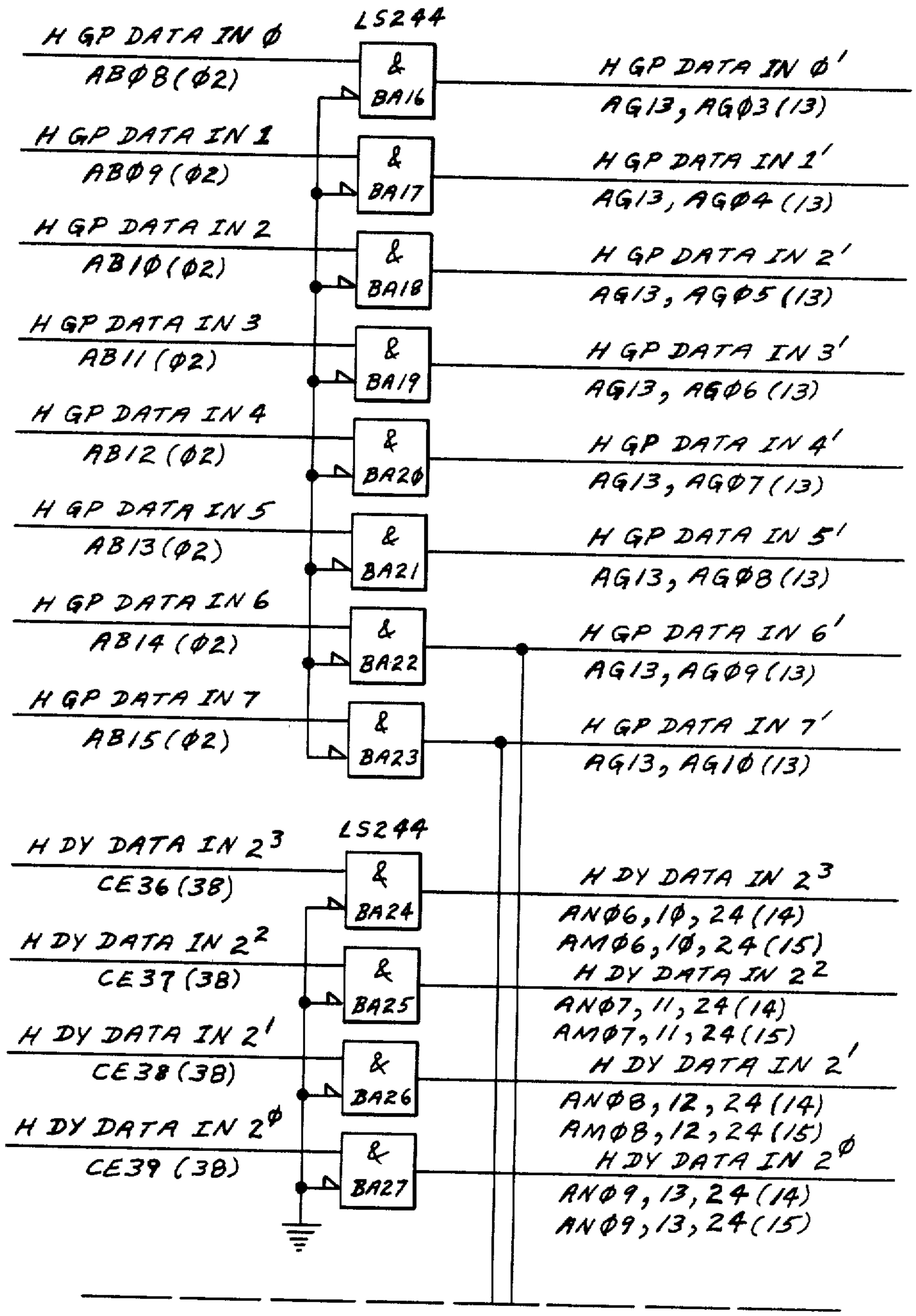
FIGS. 22A and 22B illustrate the preferred embodiment in hardware logic form.
Figure 22B:
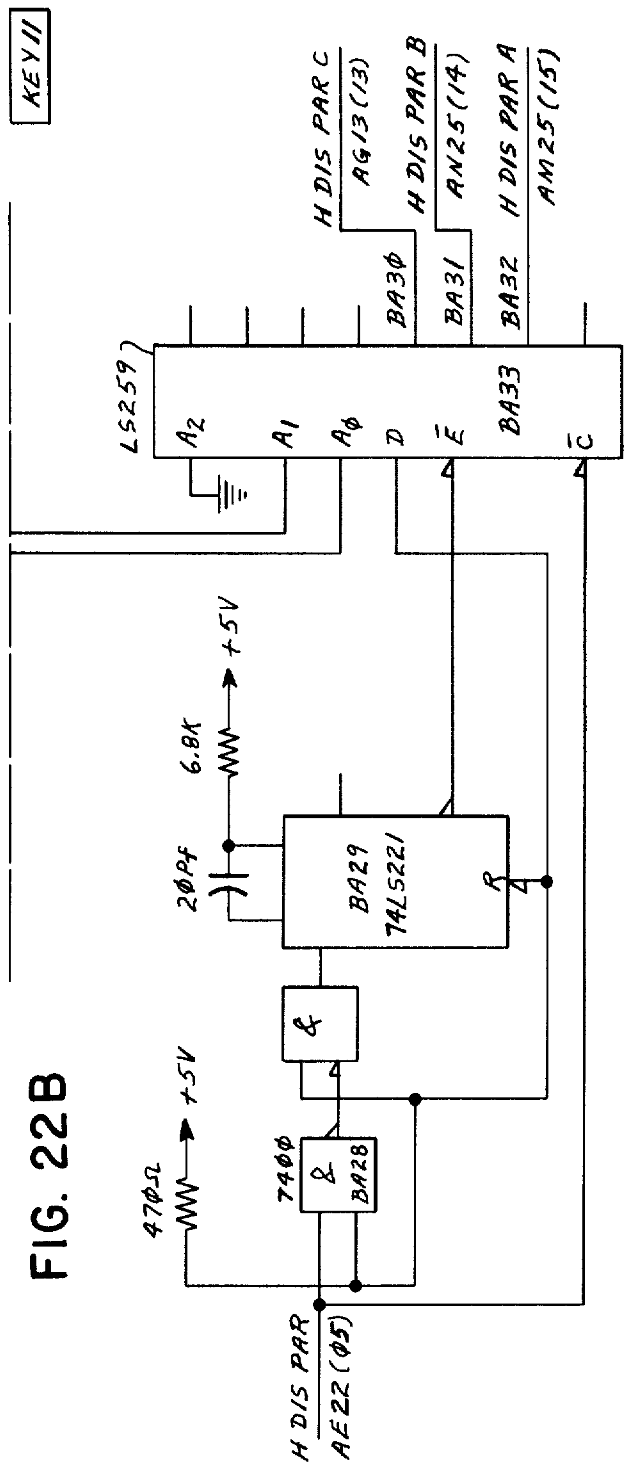
Figure 23:
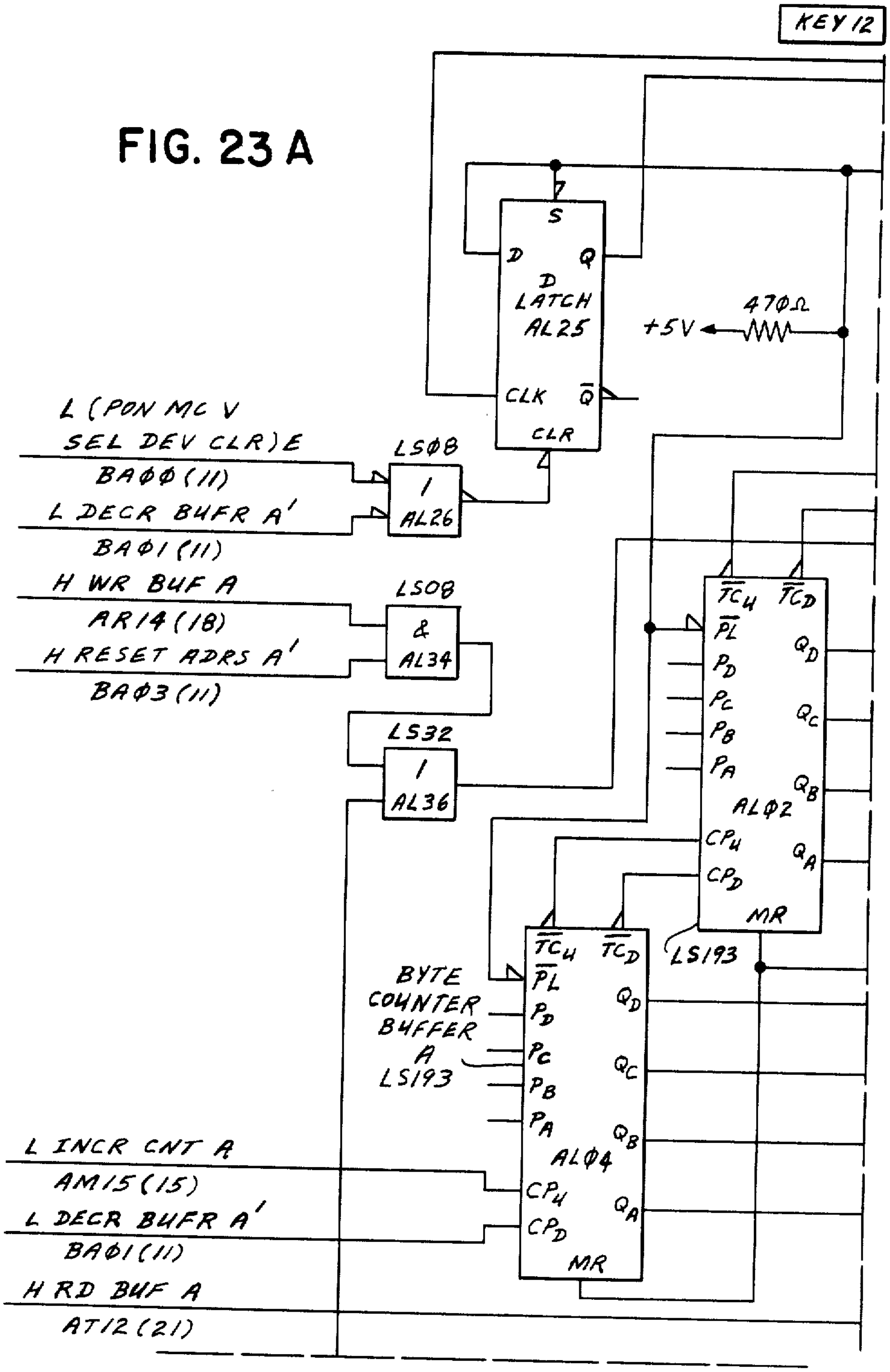
FIGS. 23A, 23B, 23C and 23D illustrate the preferred embodiment in hardware logic form.
Figure 23B:
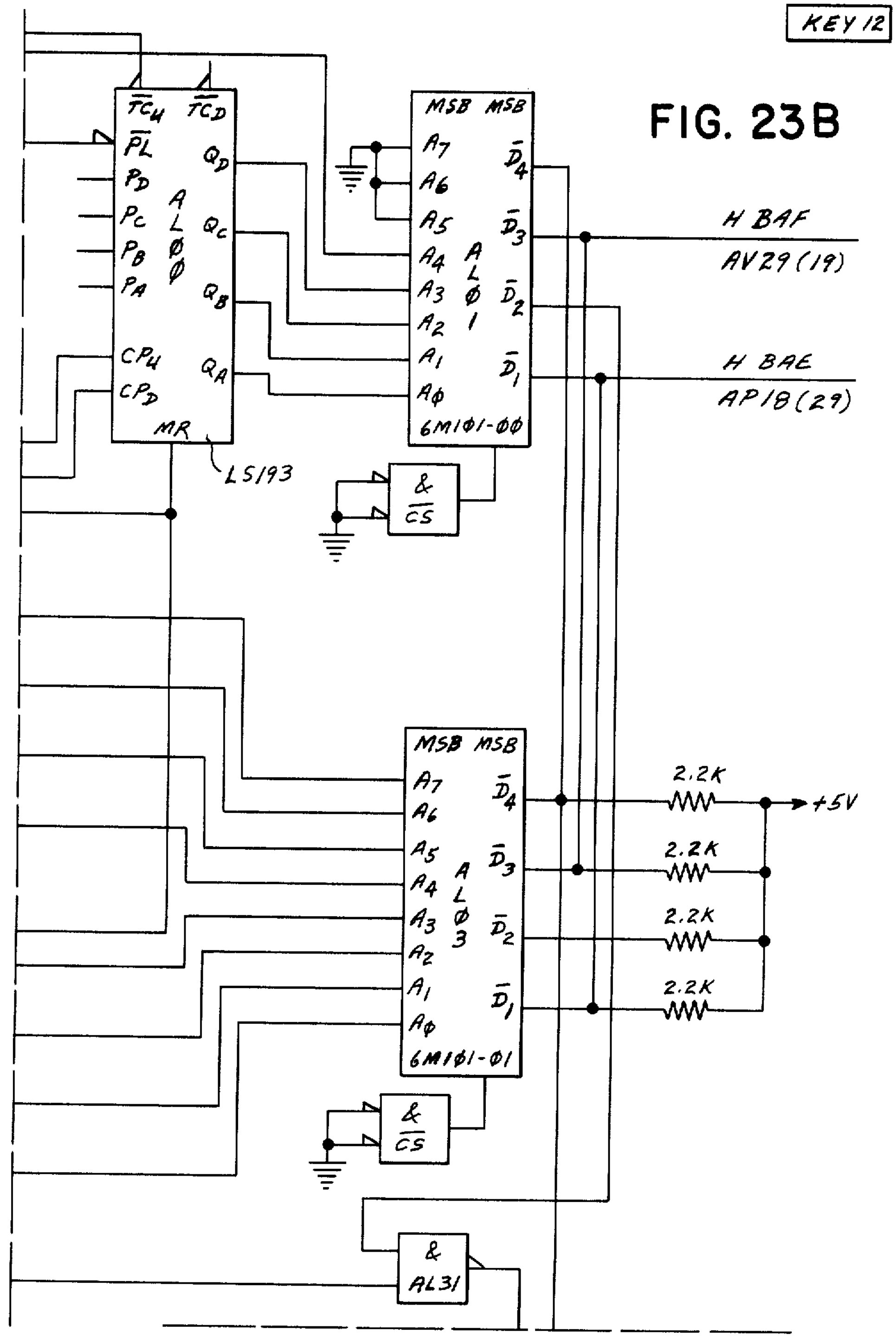
Figure 23C:
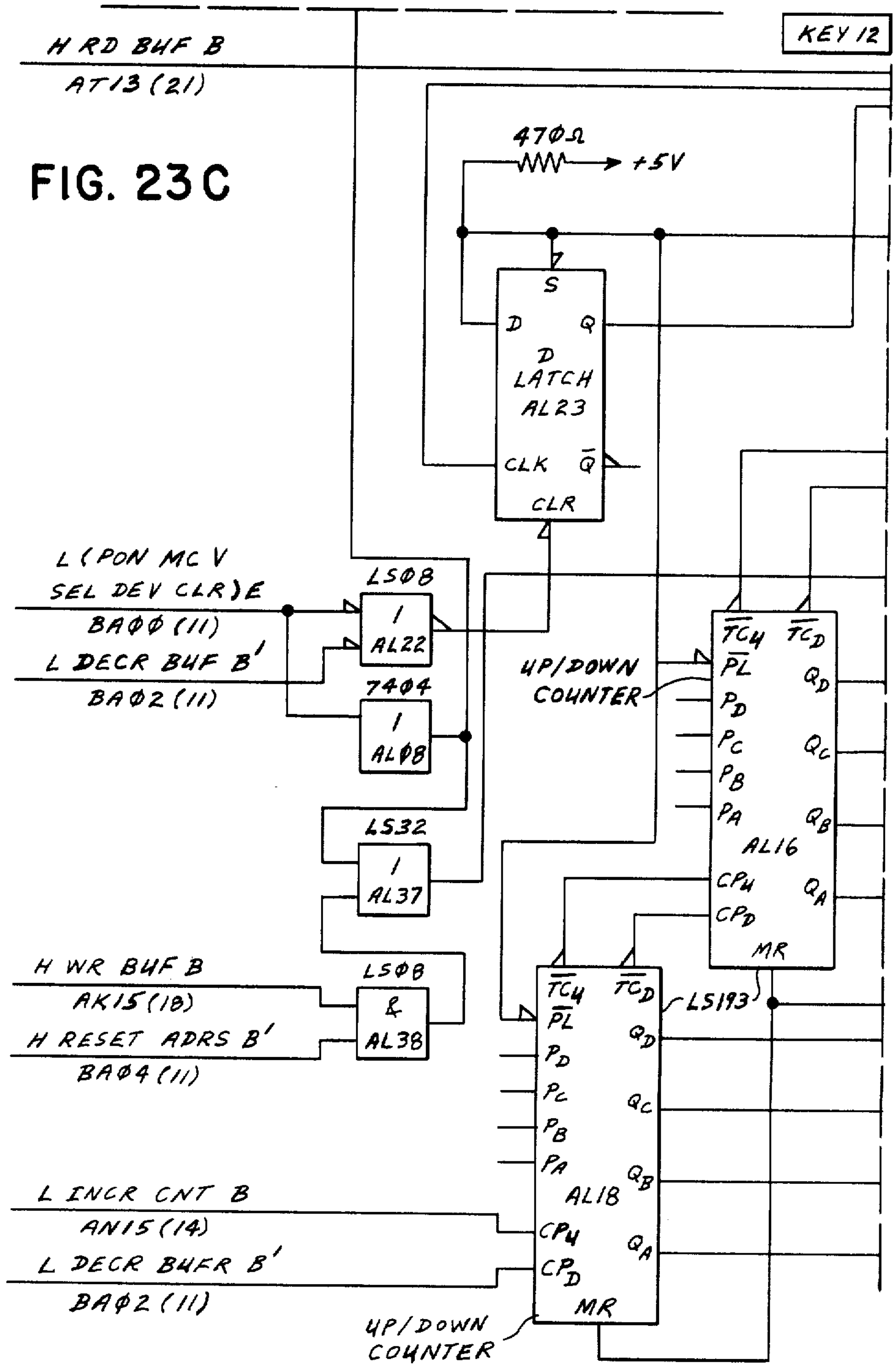
Figure 23D:
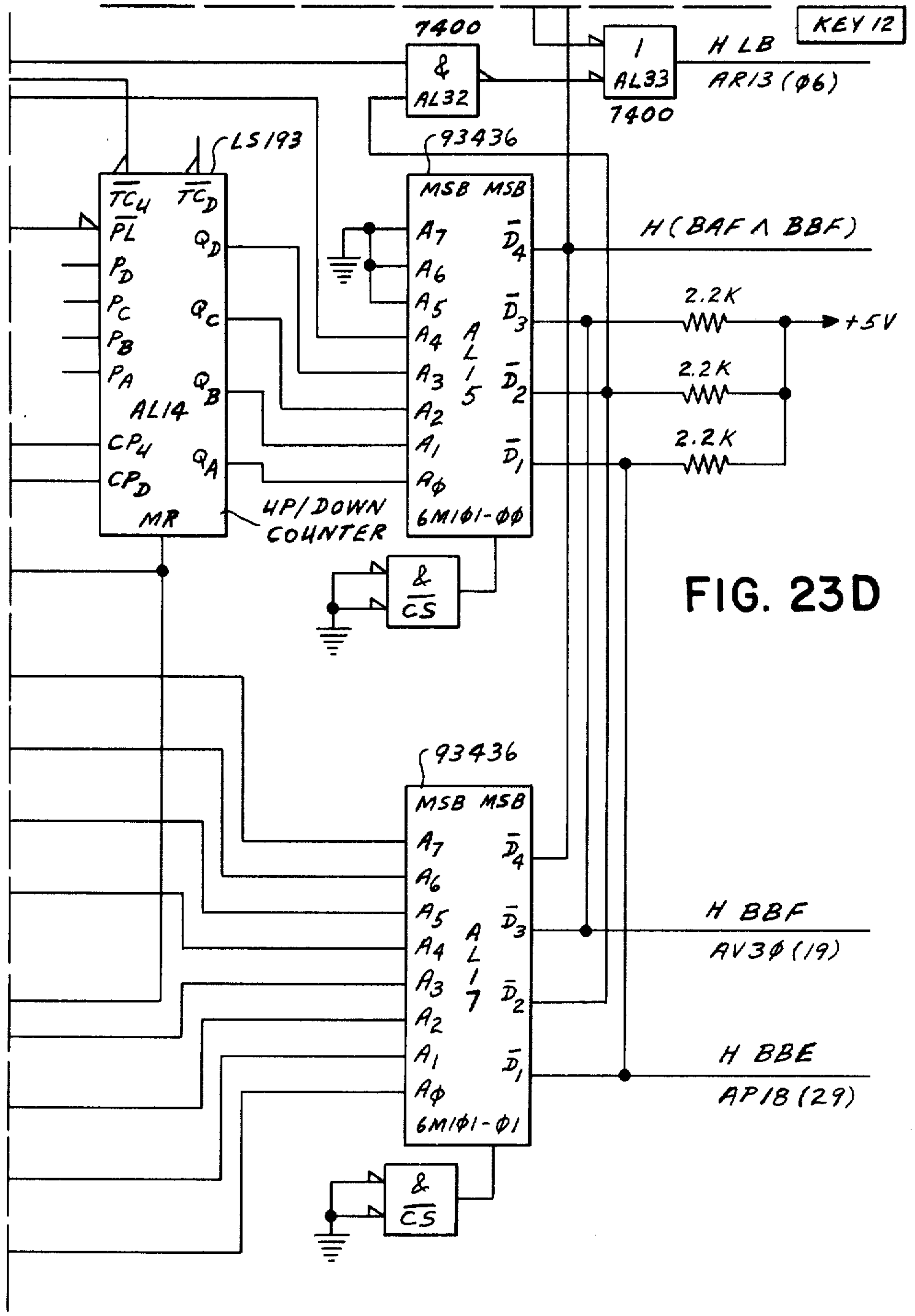
Figure 24A:
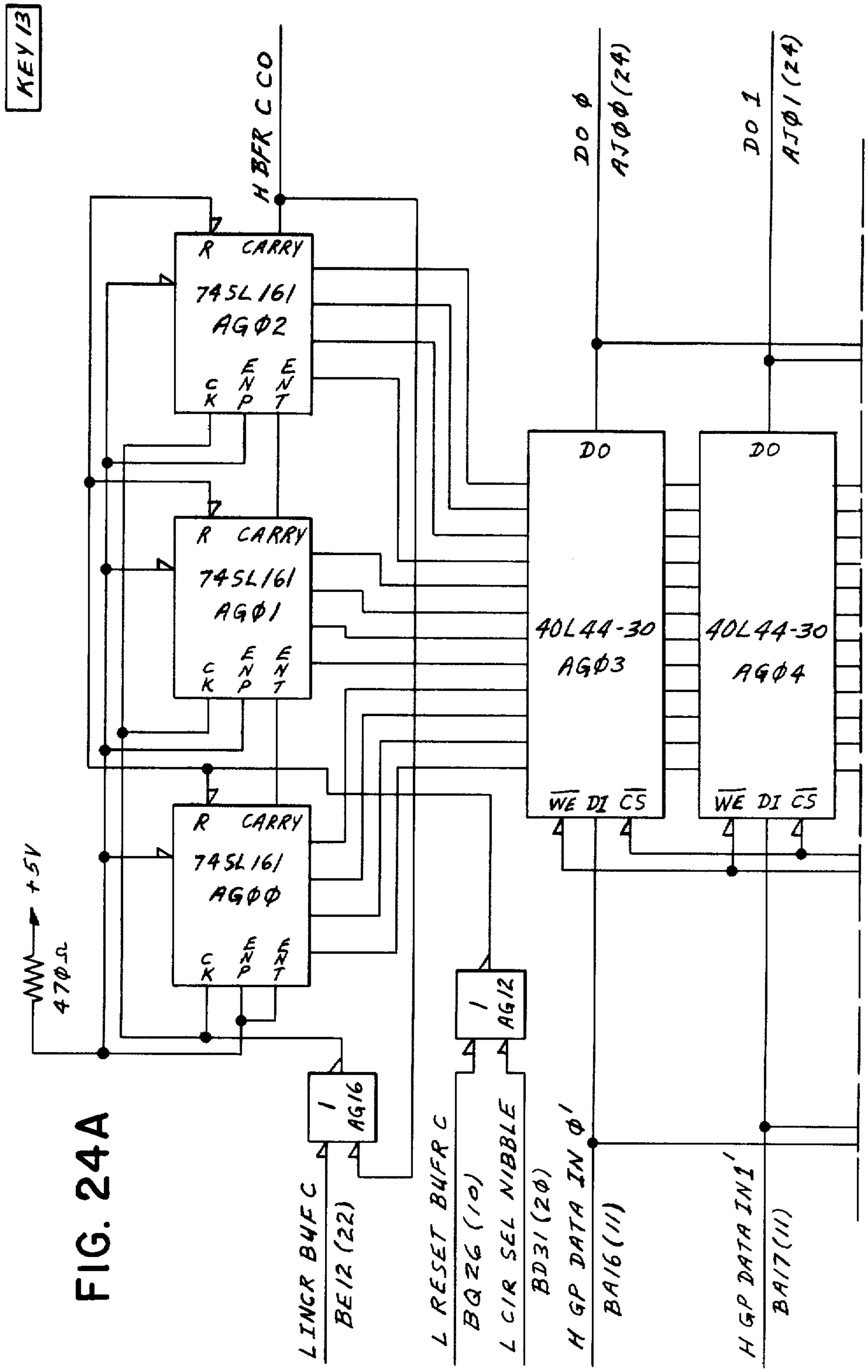
FIGS. 24A, 24B and 24C illustrate the preferred embodiment in hardware logic form.
Figure 24B:
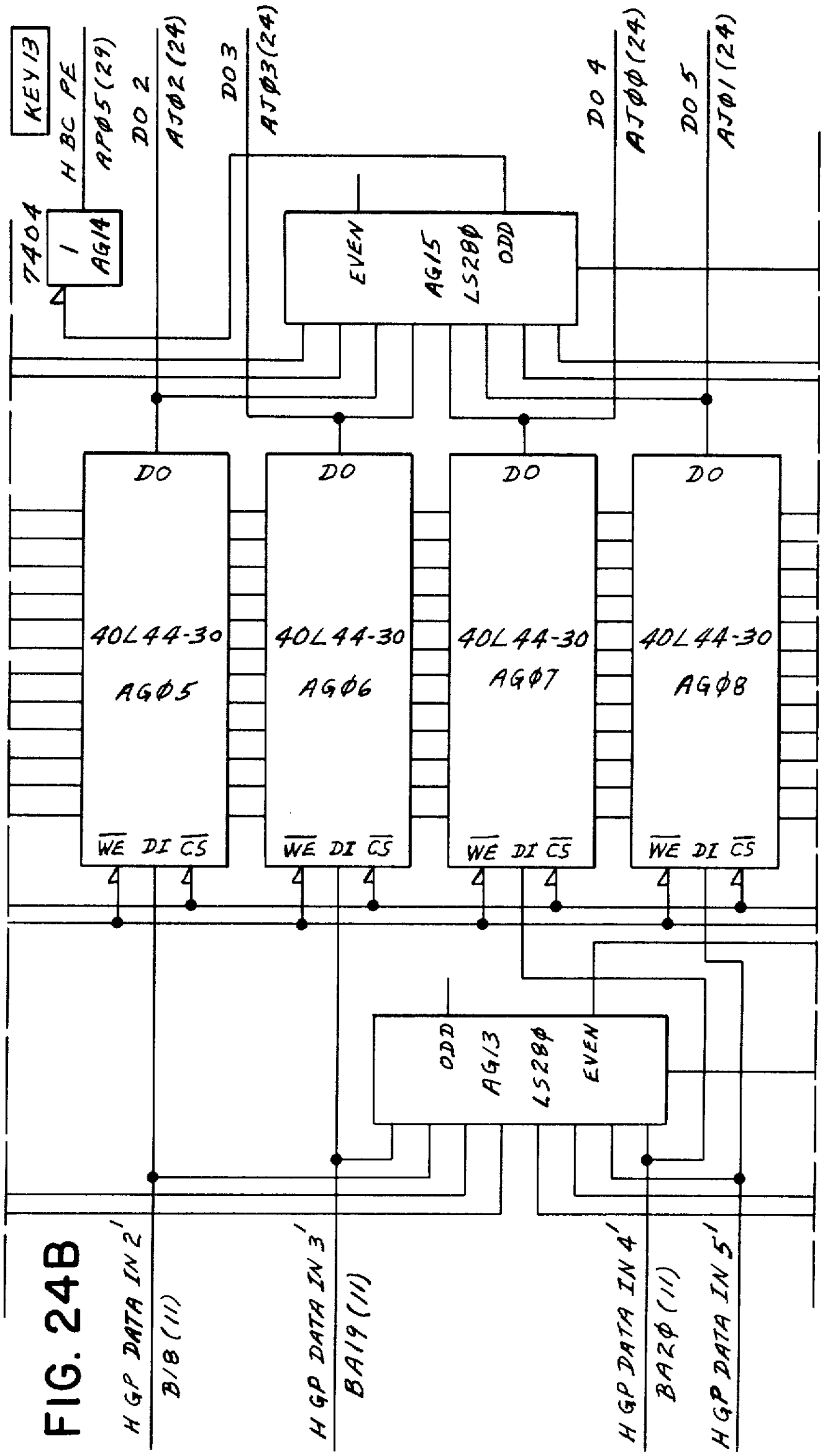
Figure 24C:
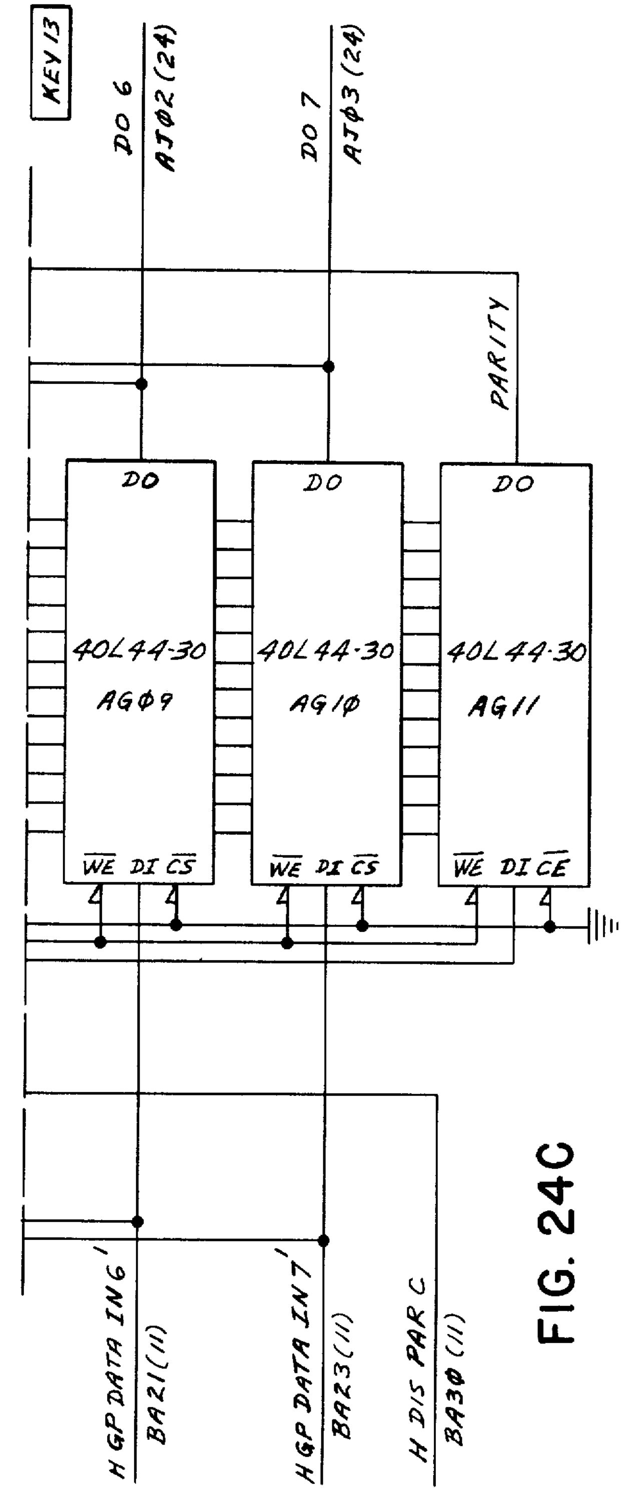
Figure 25A:
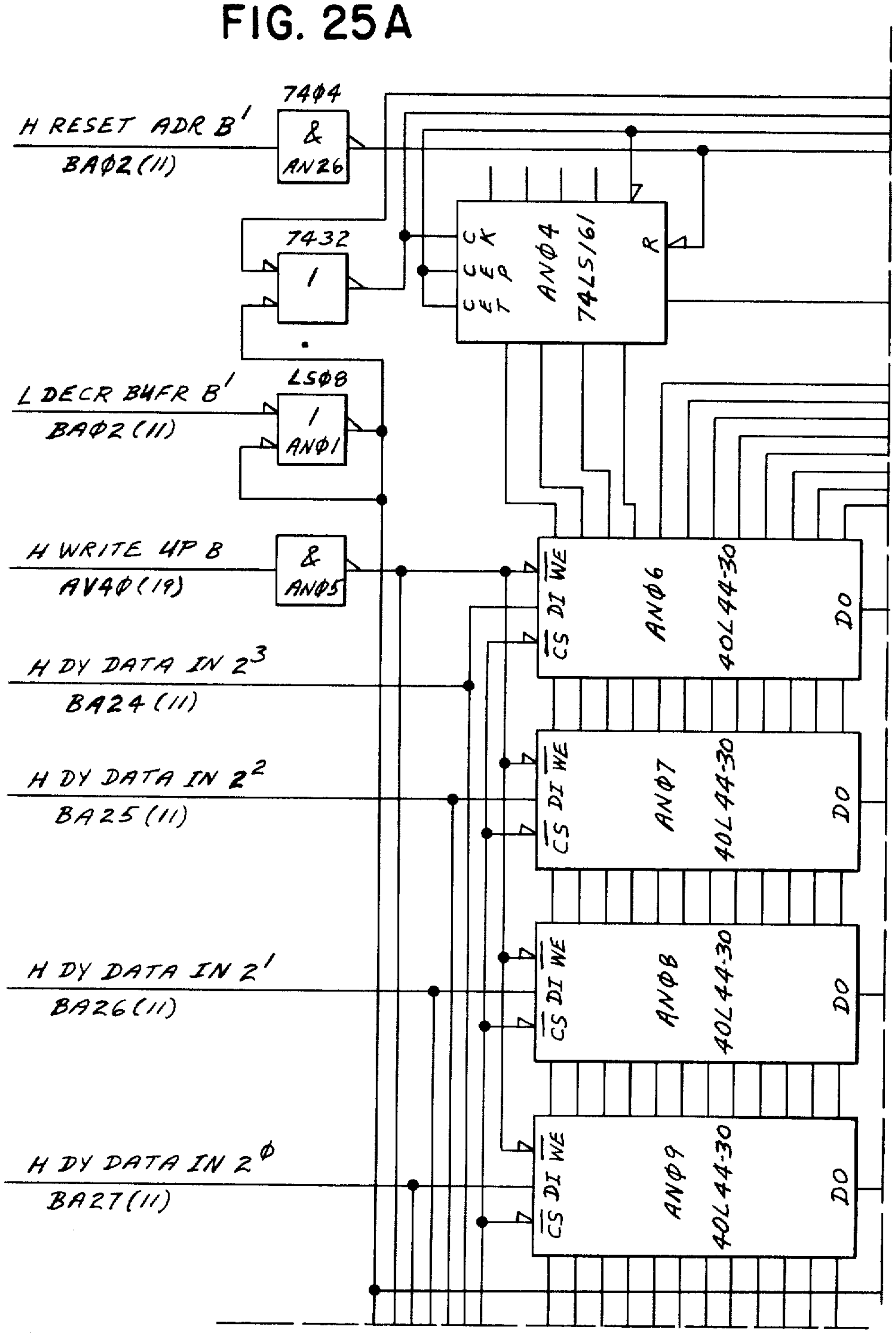
FIGS. 25A, 25B, 25C and 25D illustrate the preferred embodiment in hardware logic form.
Figure 25B:
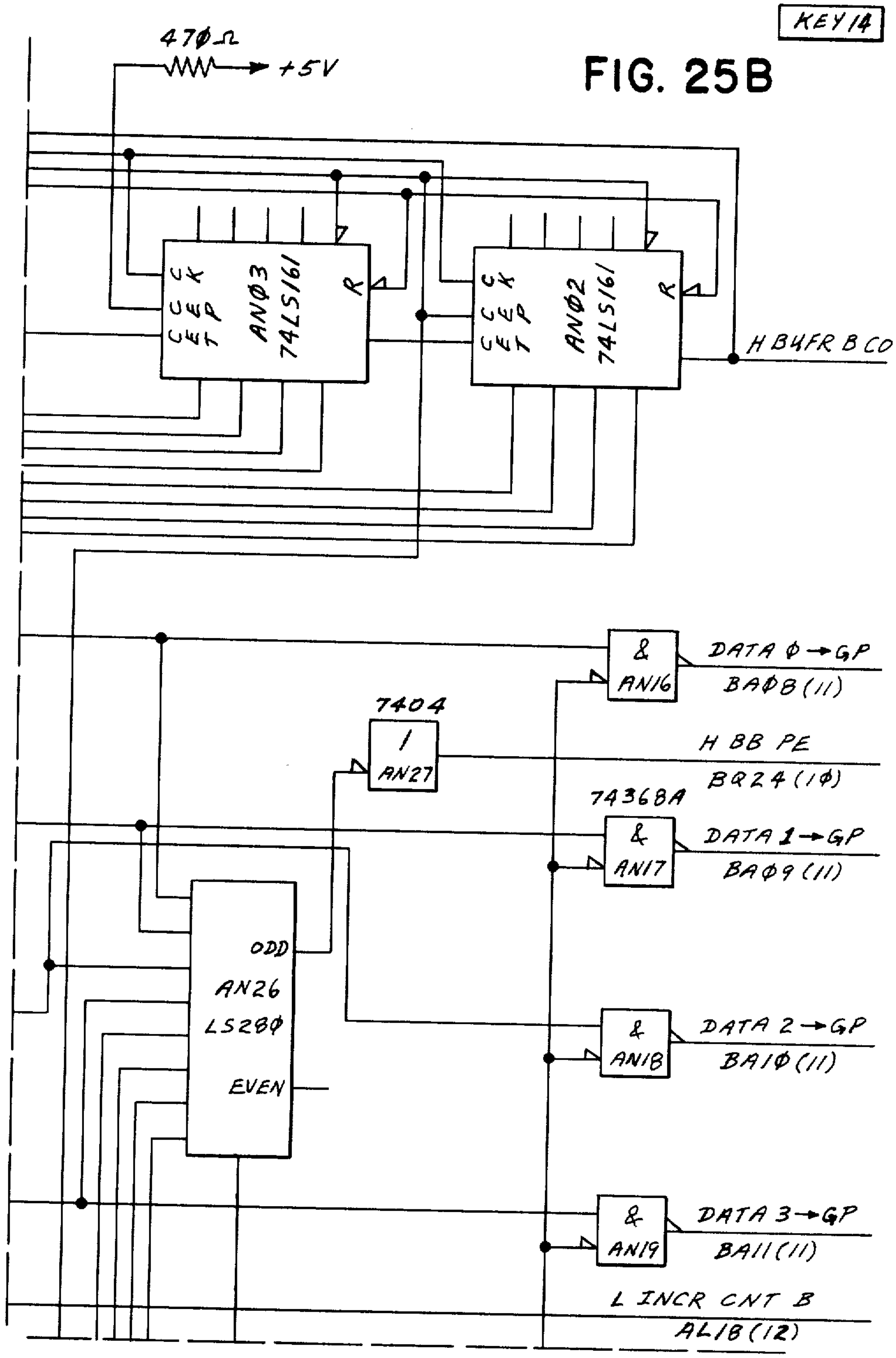
Figure 25C:
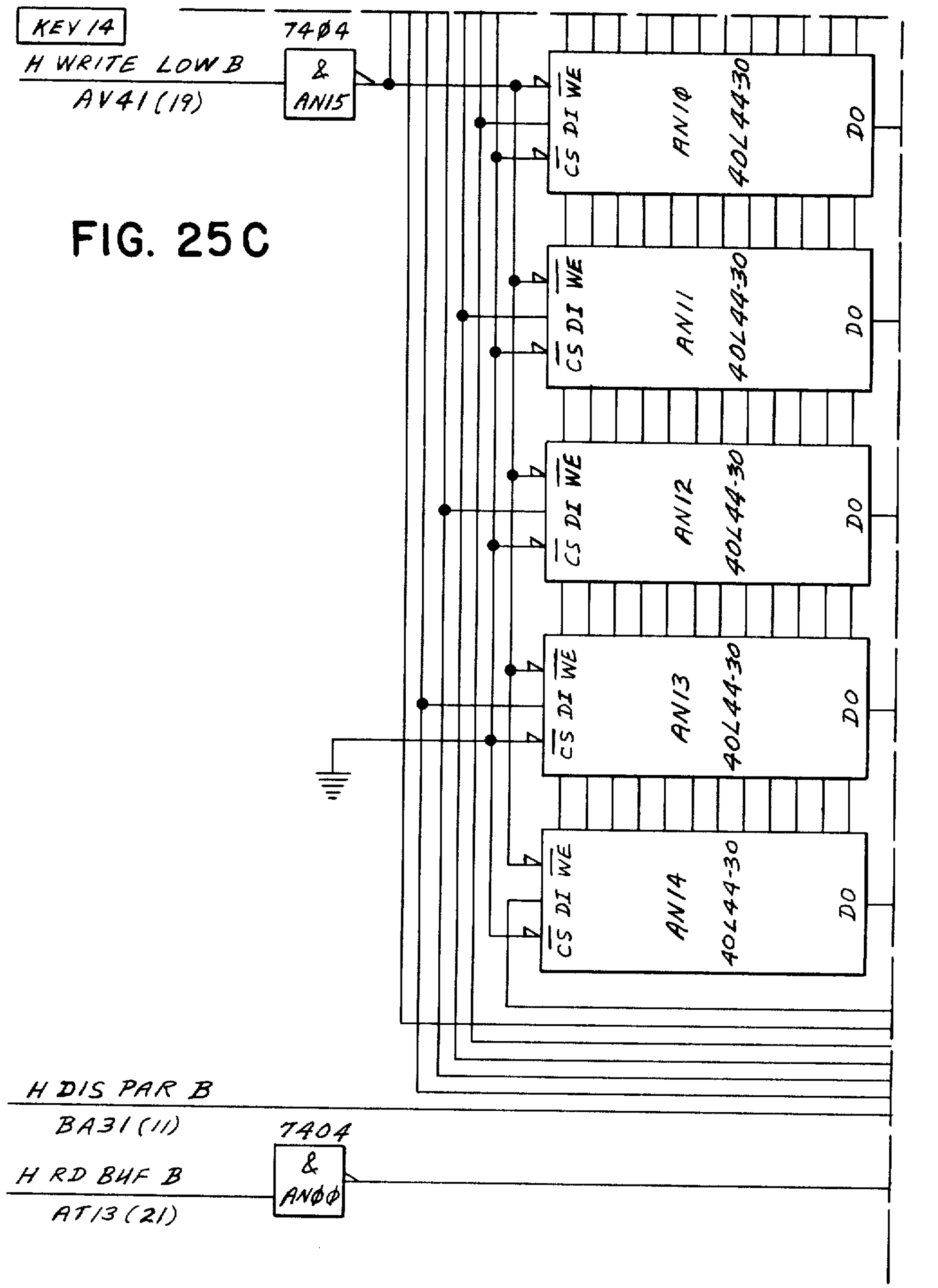
Figure 25D:
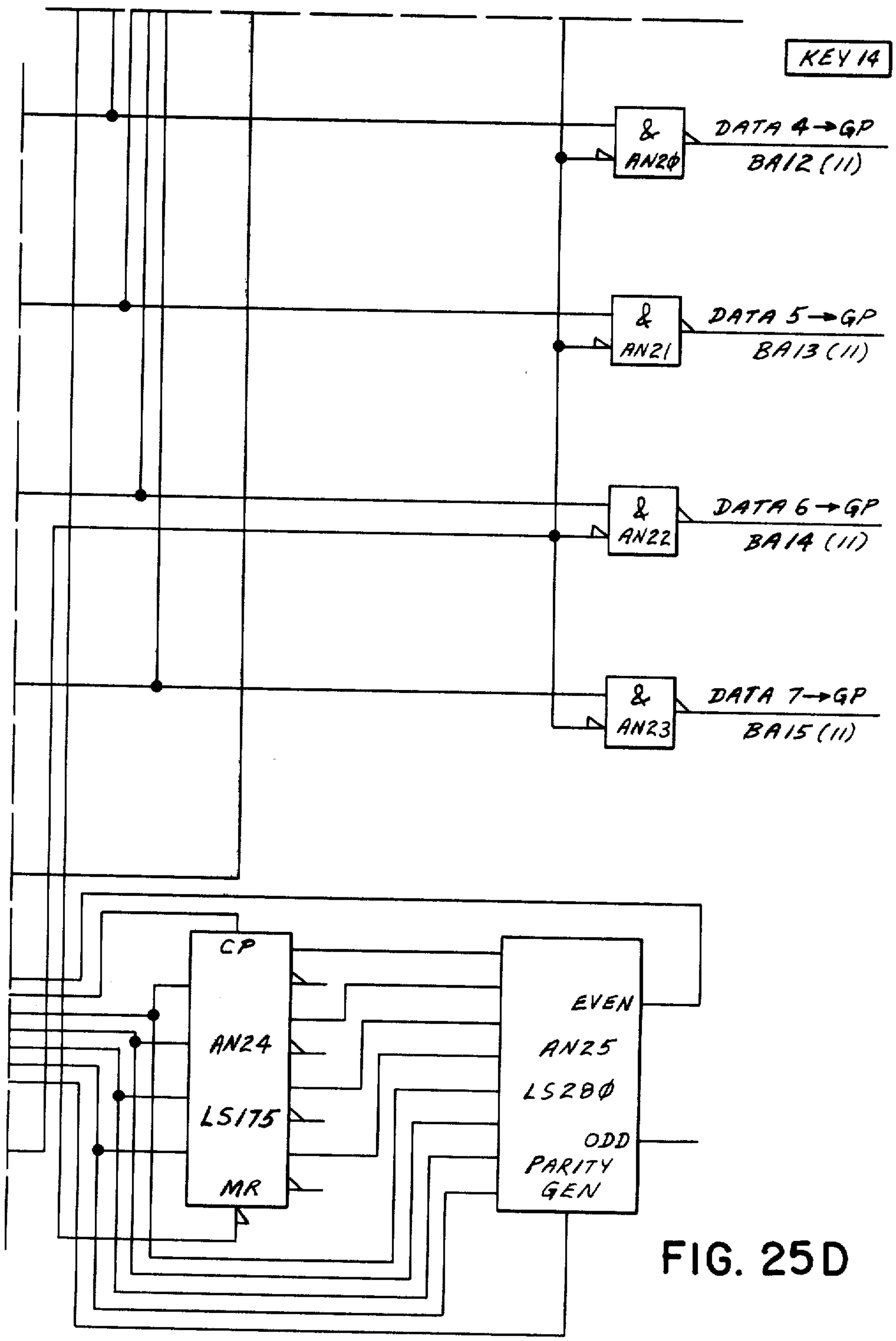
Figure 26A:
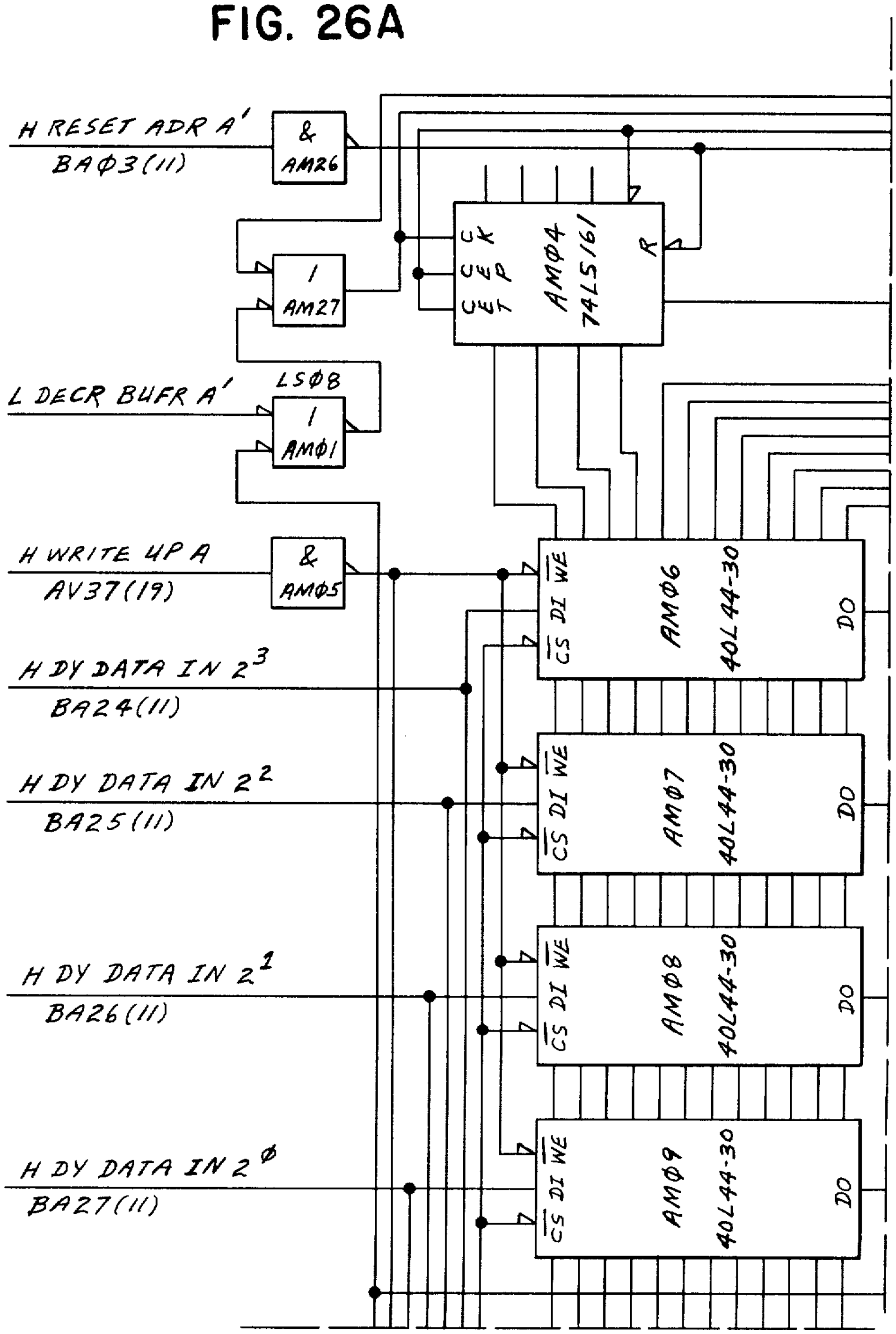
FIGS. 26A, 26B, 26C and 26D illustrate the preferred embodiment in hardware logic form.
Figure 26B:
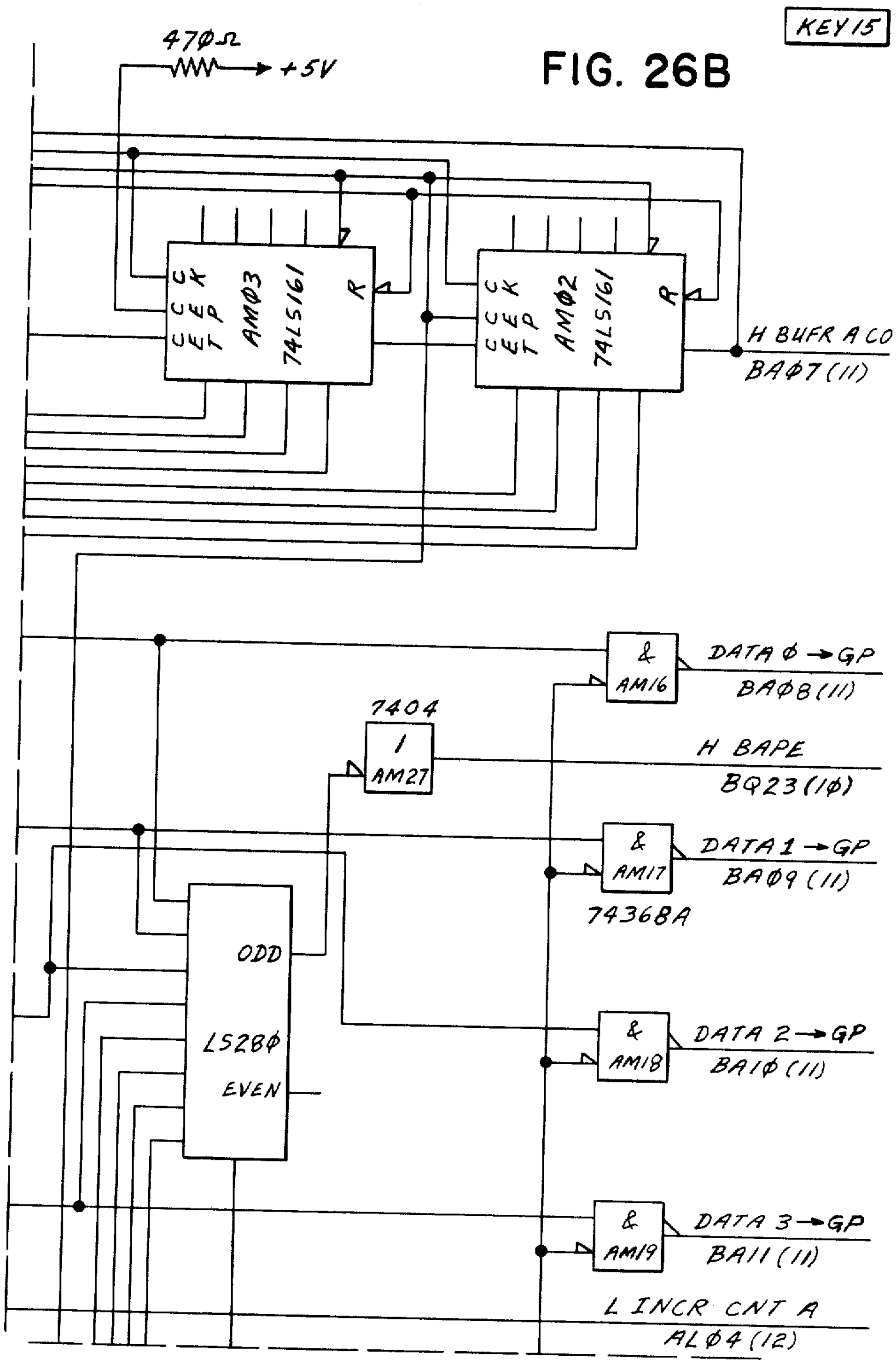
Figure 26C:
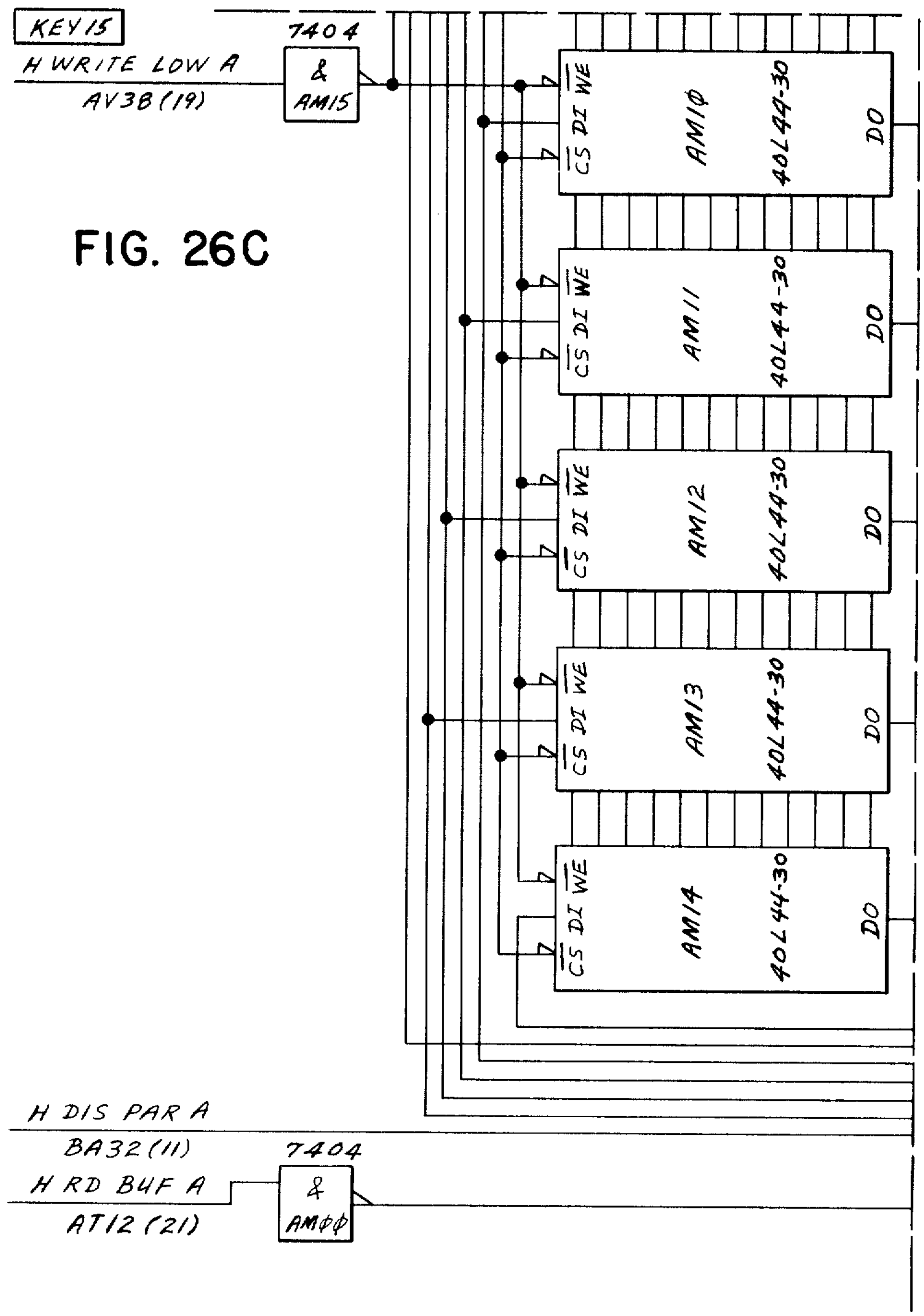
Figure 26D:
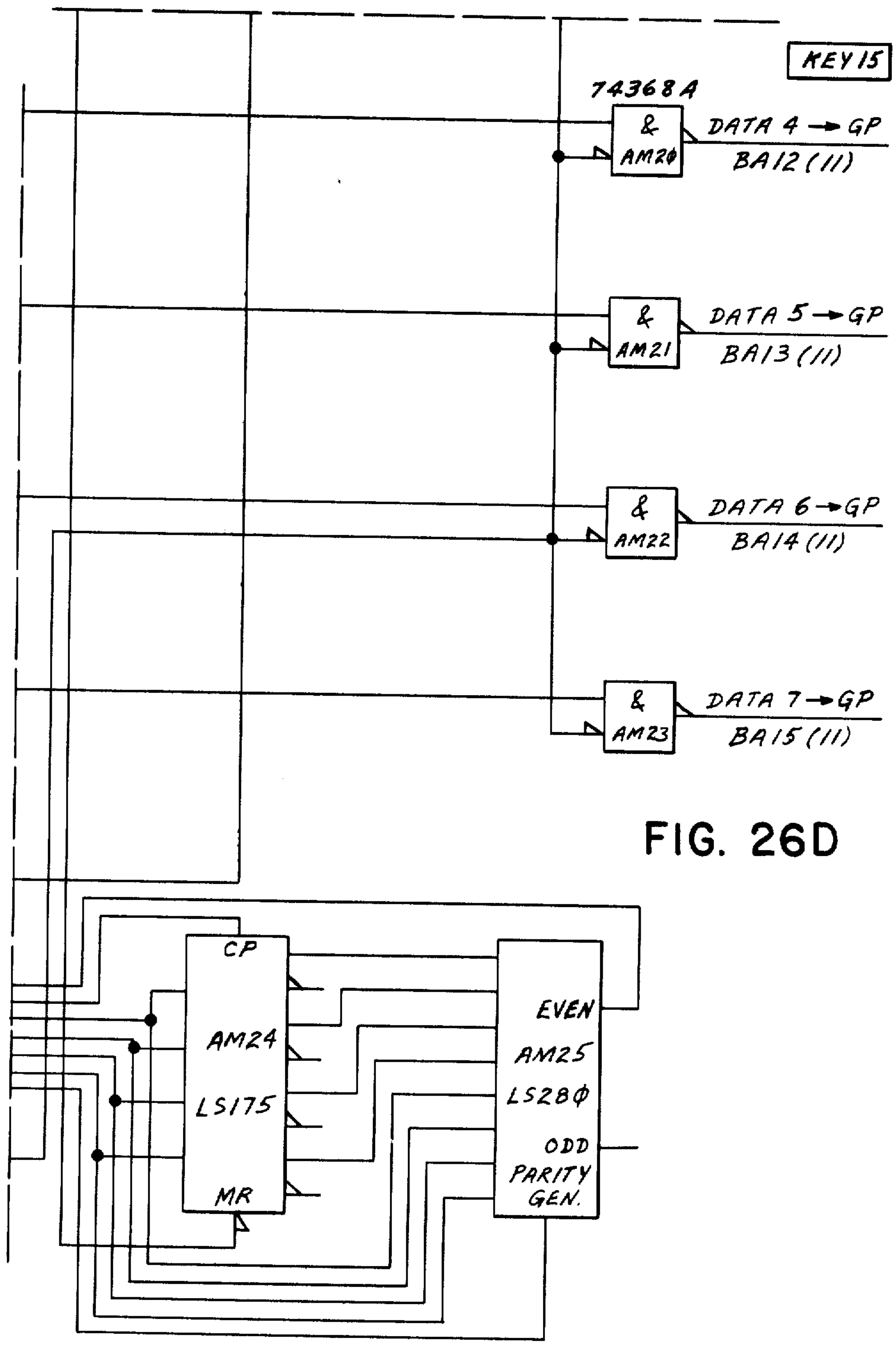
Figure 27:
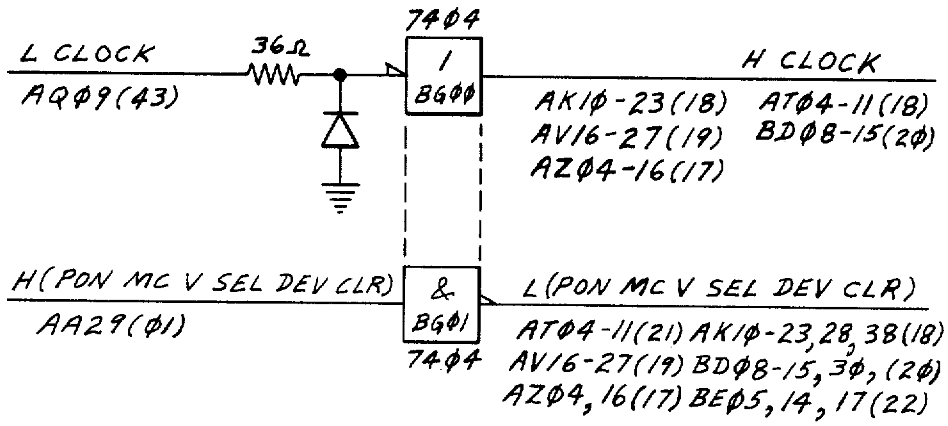
FIG. 27 illustrates the preferred embodiment in hardware logic form.
Figure 28:
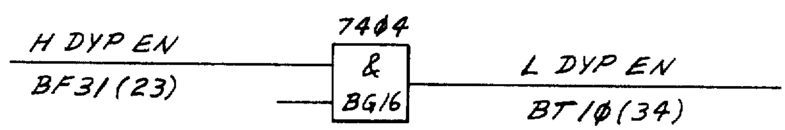
FIG. 28 illustrates the preferred embodiment in hardware logic form.
Figure 29A:
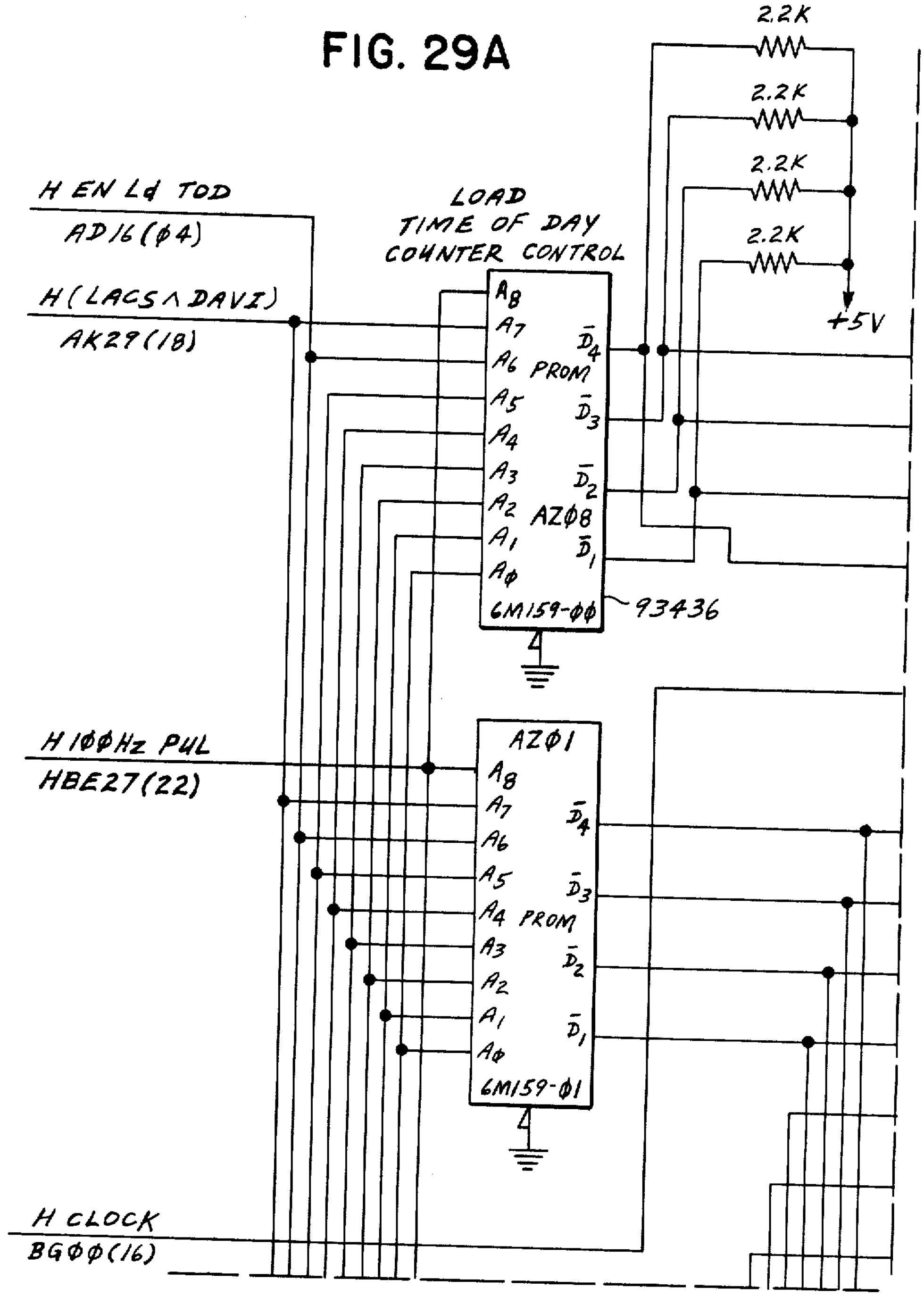
FIGS. 29A, 29B, 29C and 29D illustrate the preferred embodiment in hardware logic form.
Figure 29B:
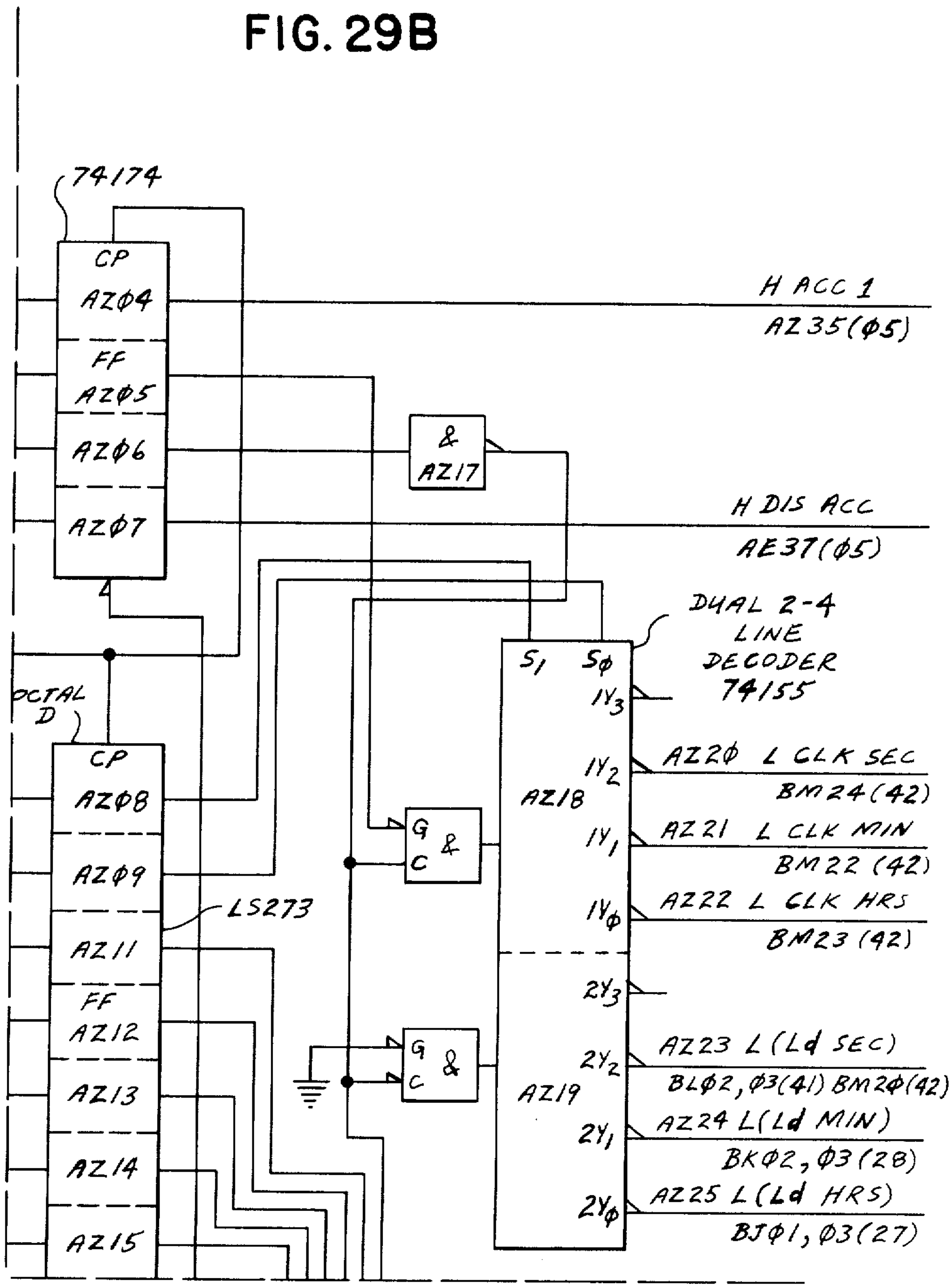
Figure 29C:
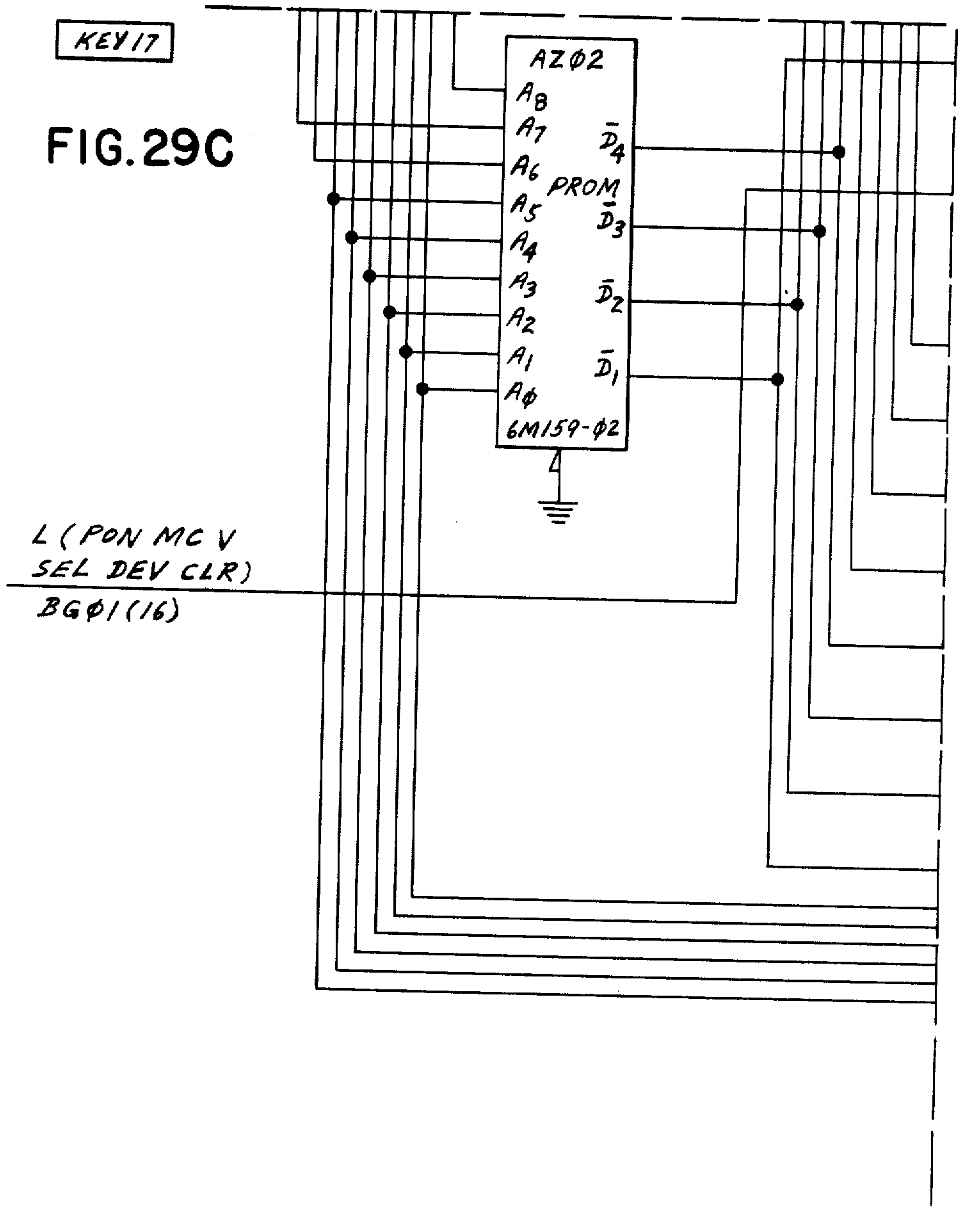
Figure 29D:
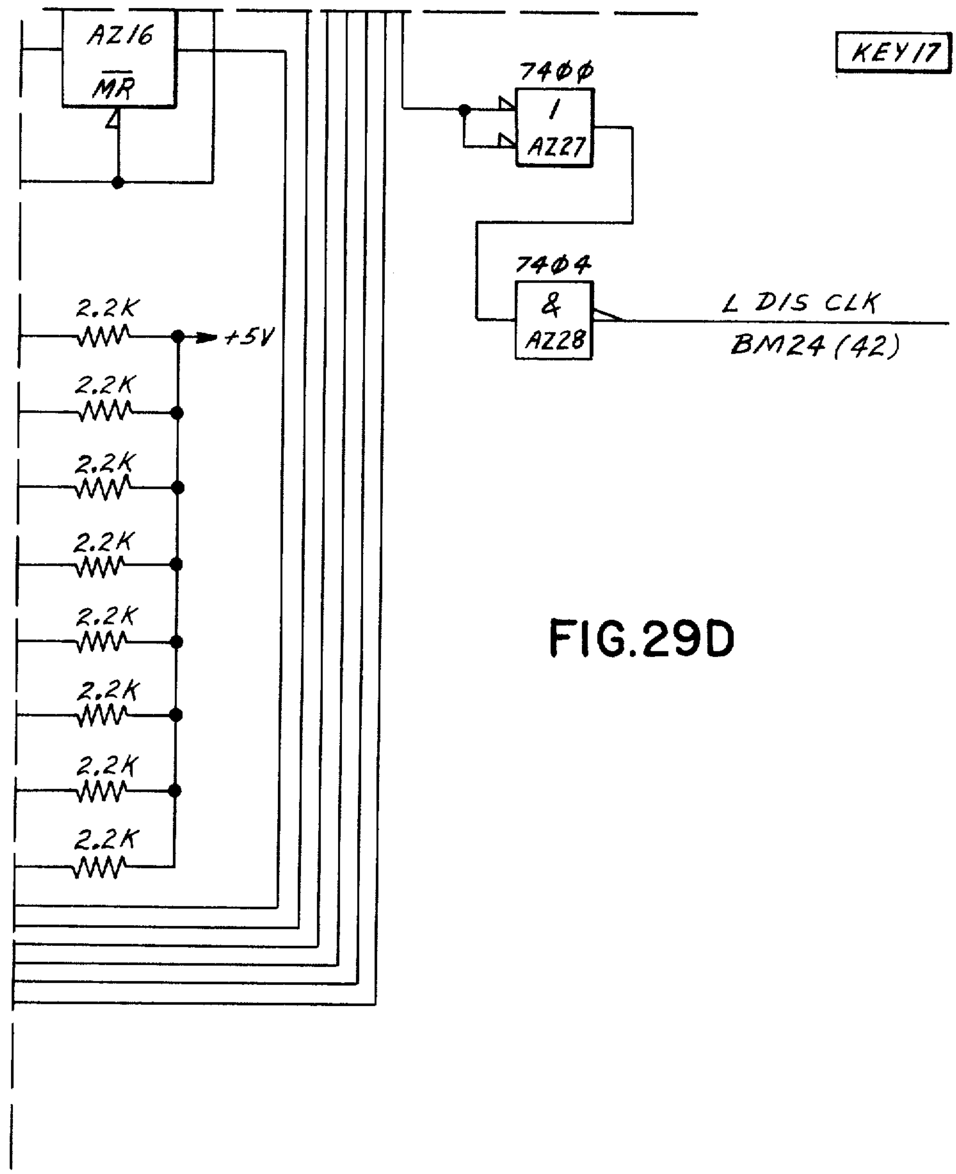
Figure 30A:
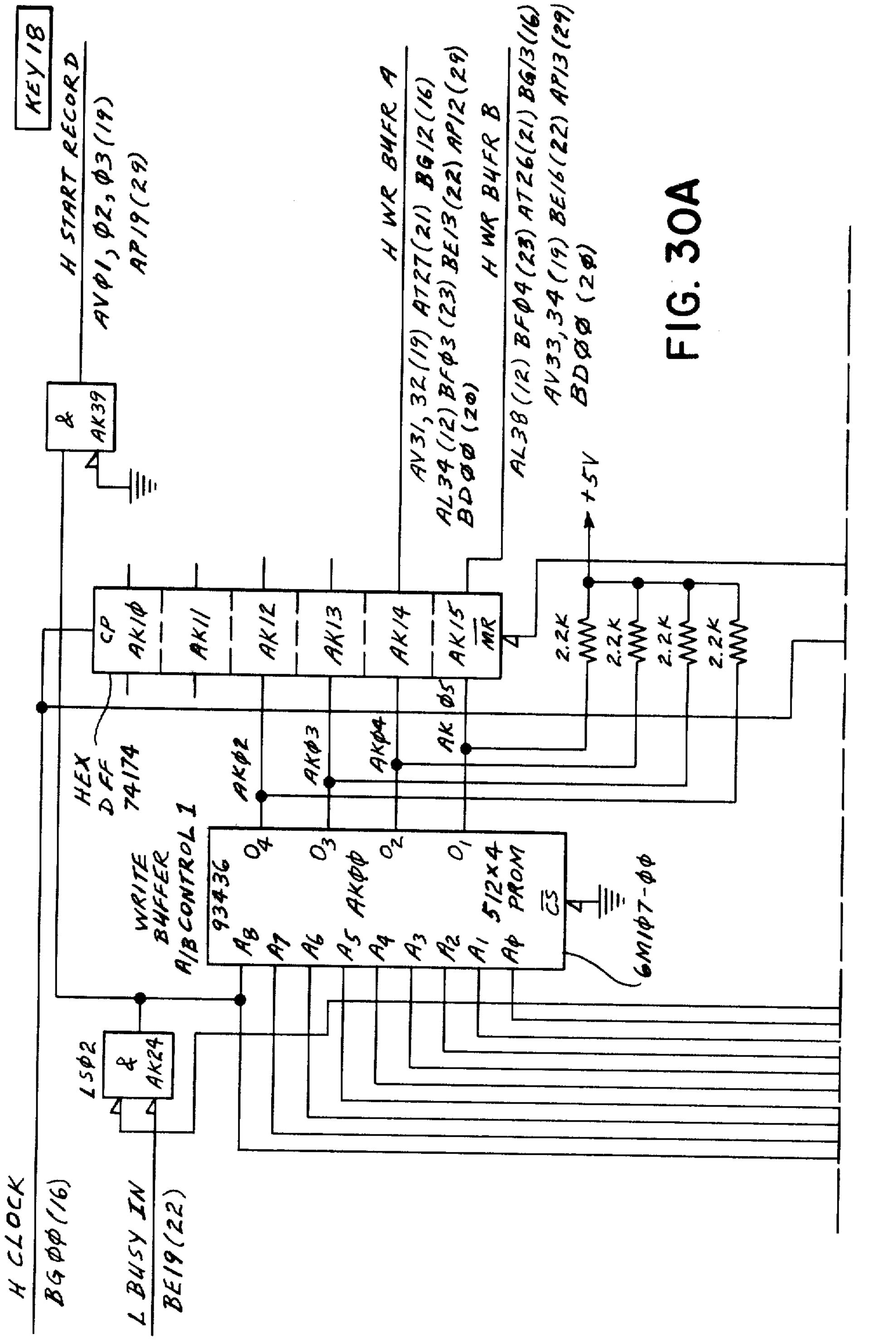
FIGS. 30A, 30B and 30C illustrate the preferred embodiment in hardware logic form.
Figure 30B:
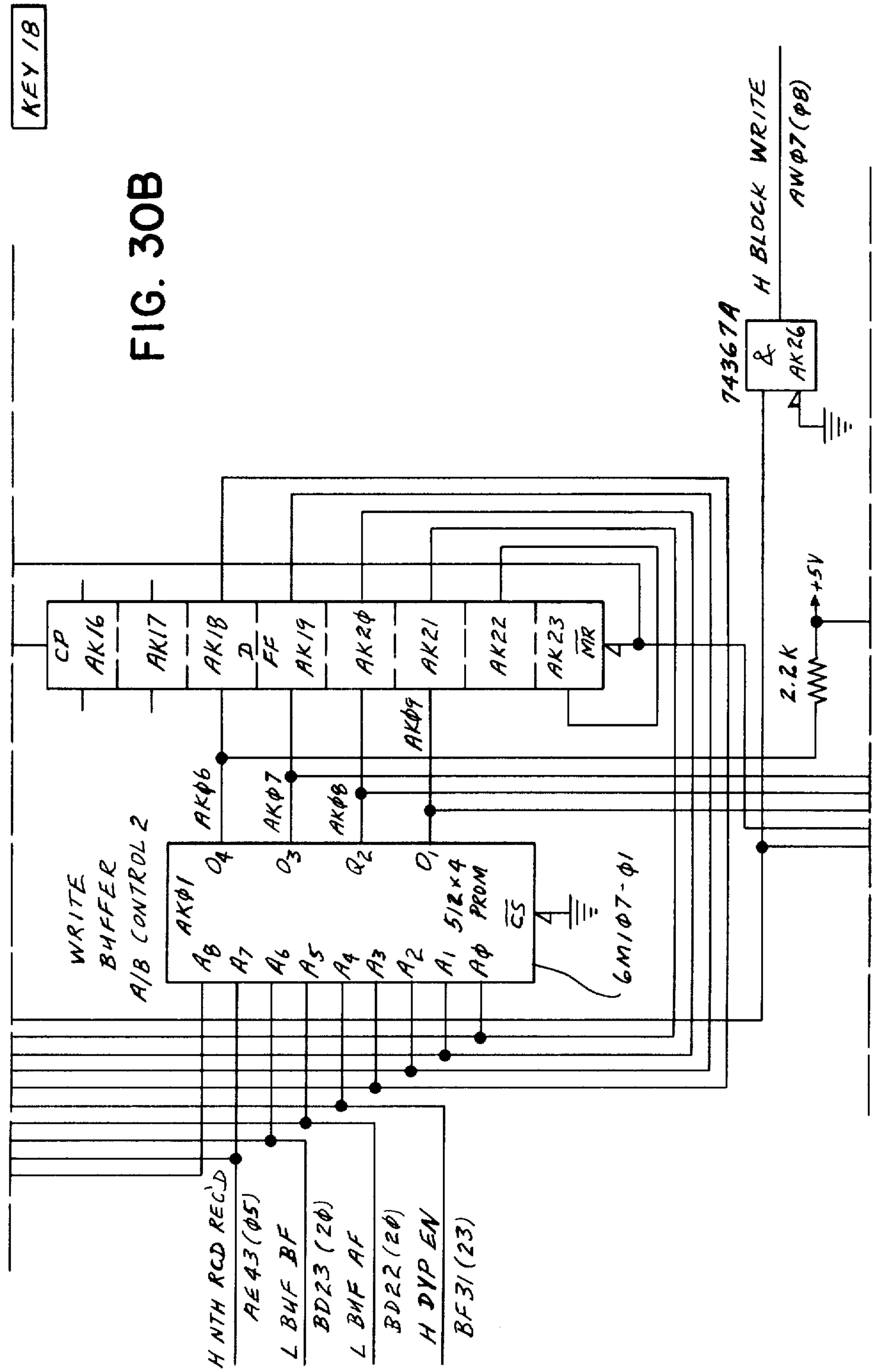
Figure 30C:
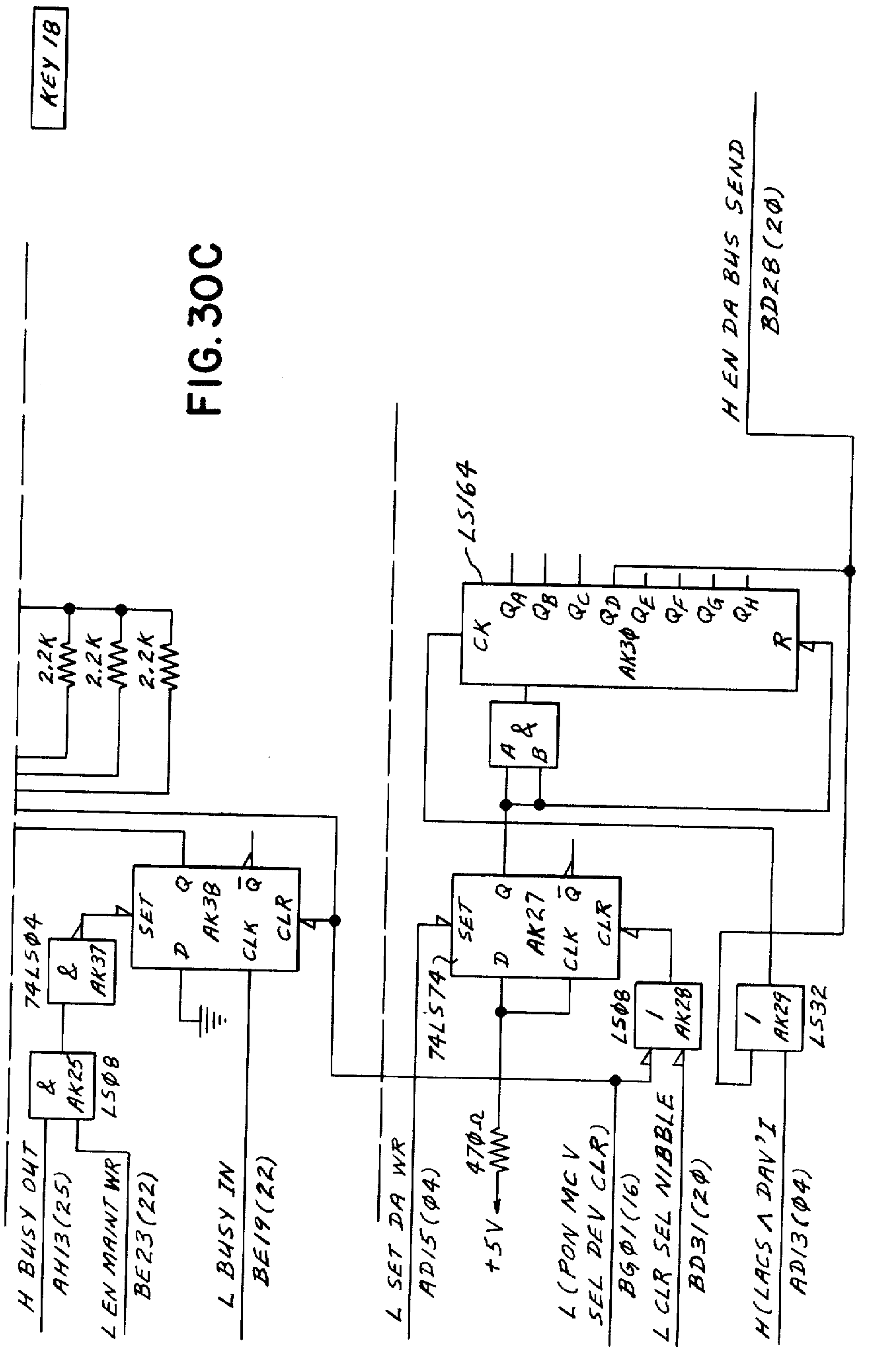
Figure 31A:
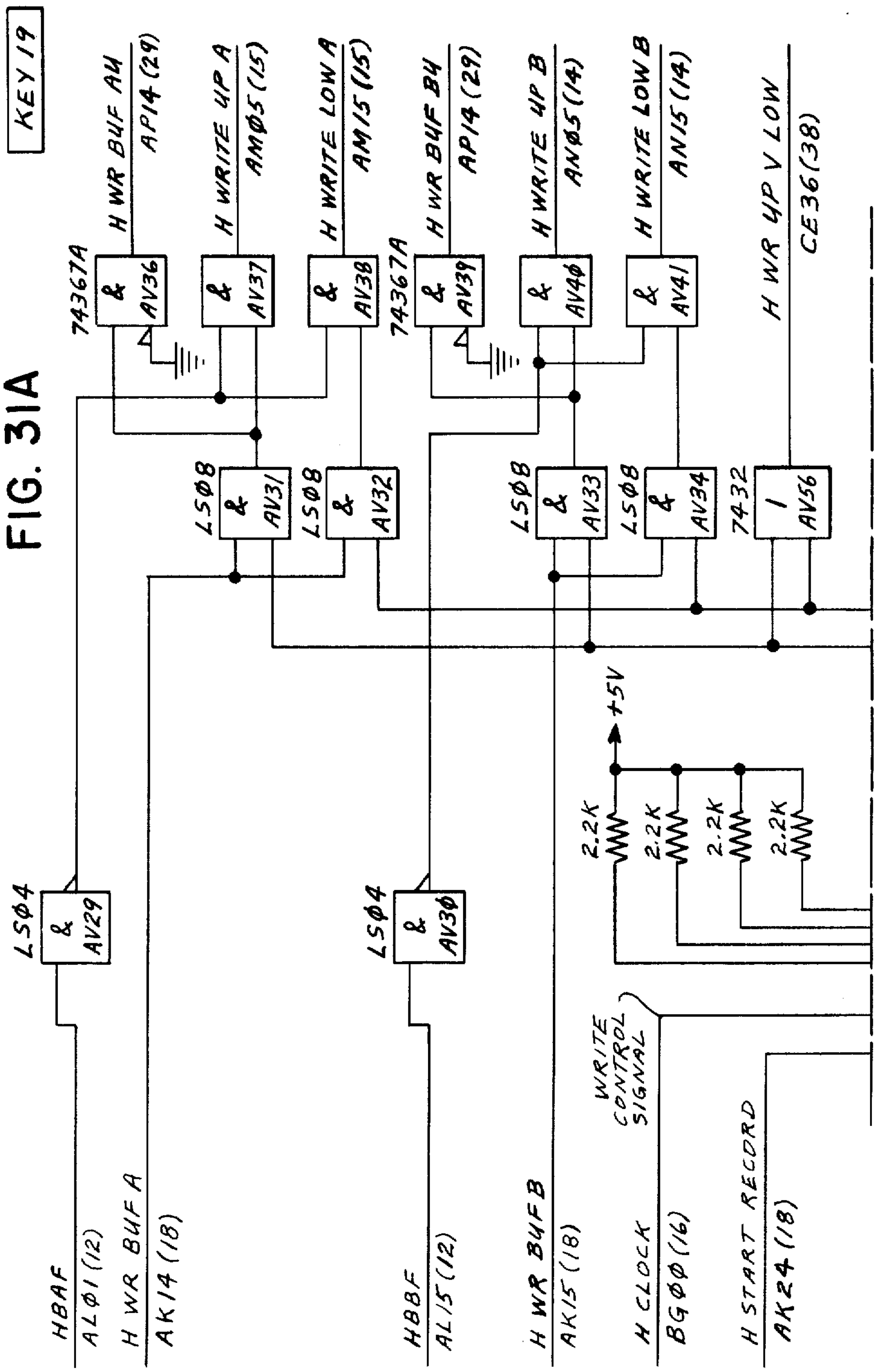
FIGS. 31A, 31B, 31C and 31D illustrate the preferred embodiment in hardware logic form.
Figure 31B:
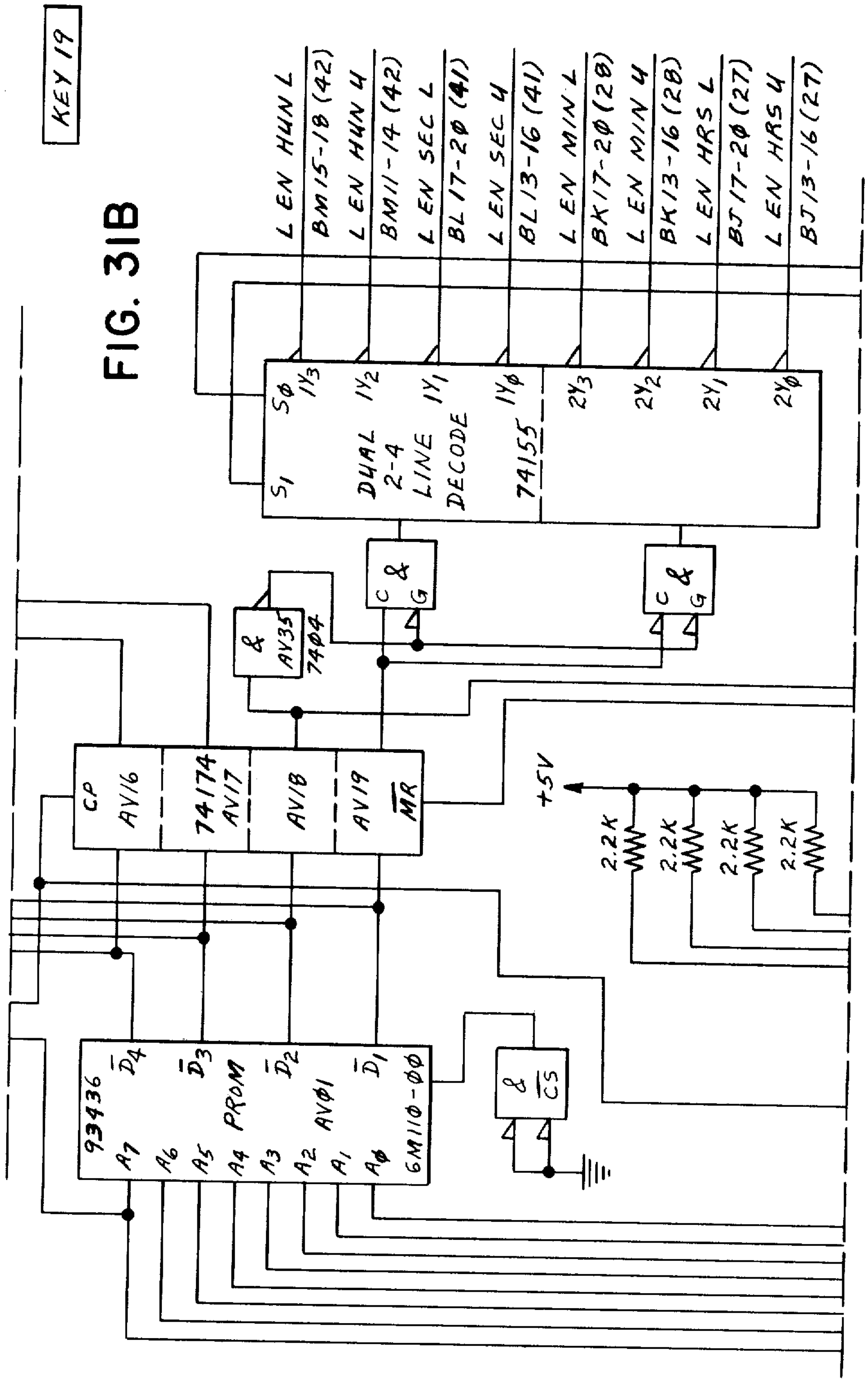
Figure 31C:
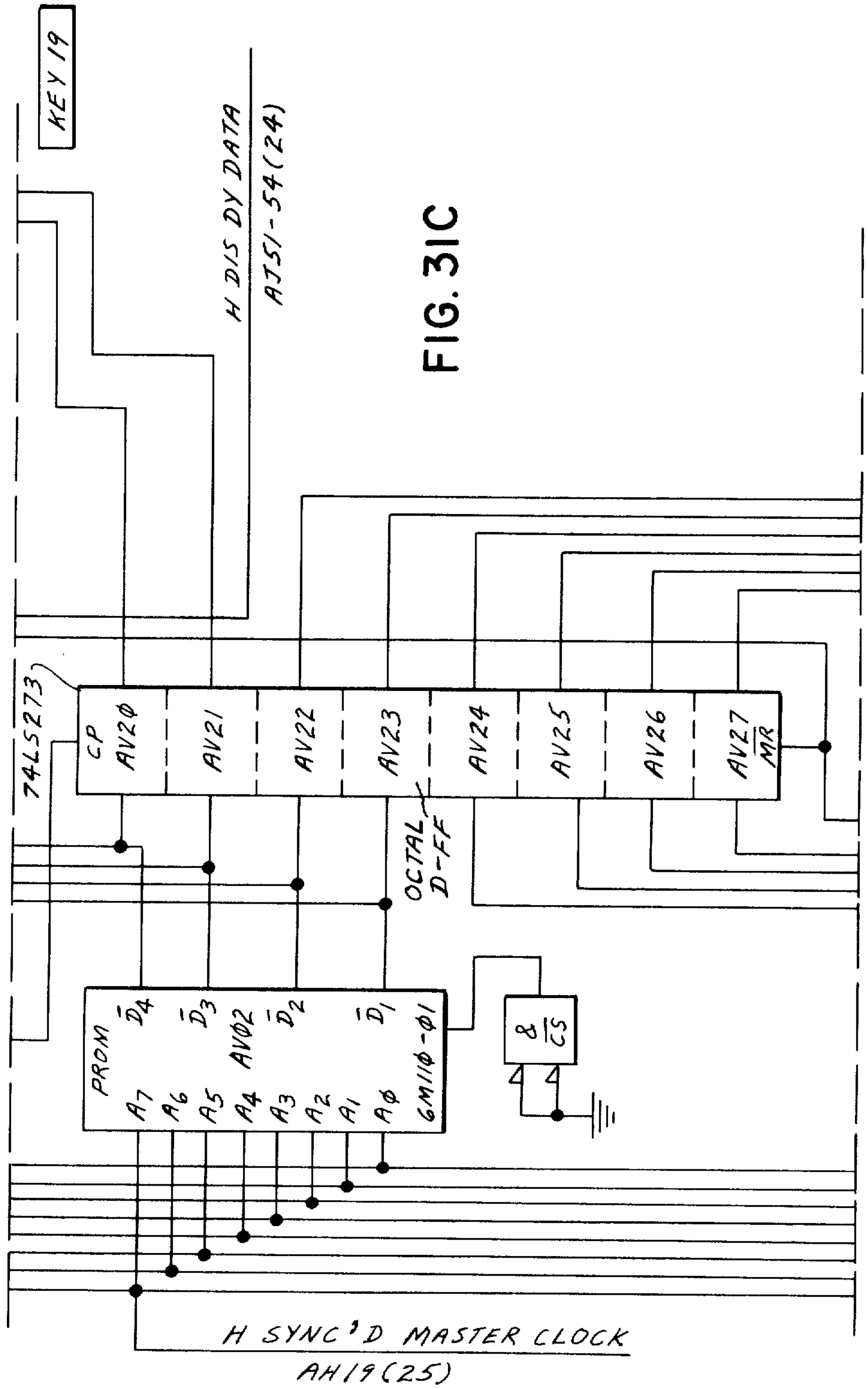
Figure 31D:
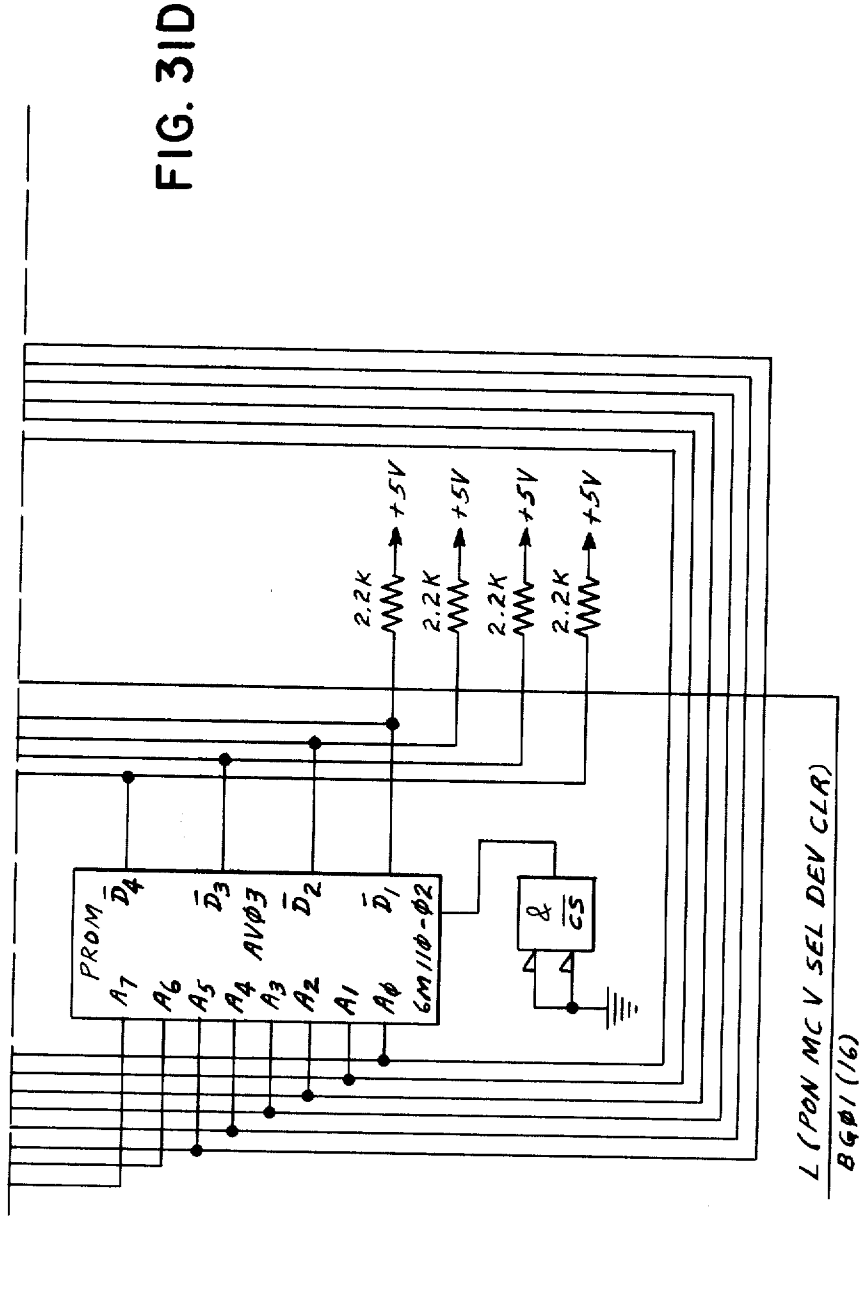
Figure 32A:
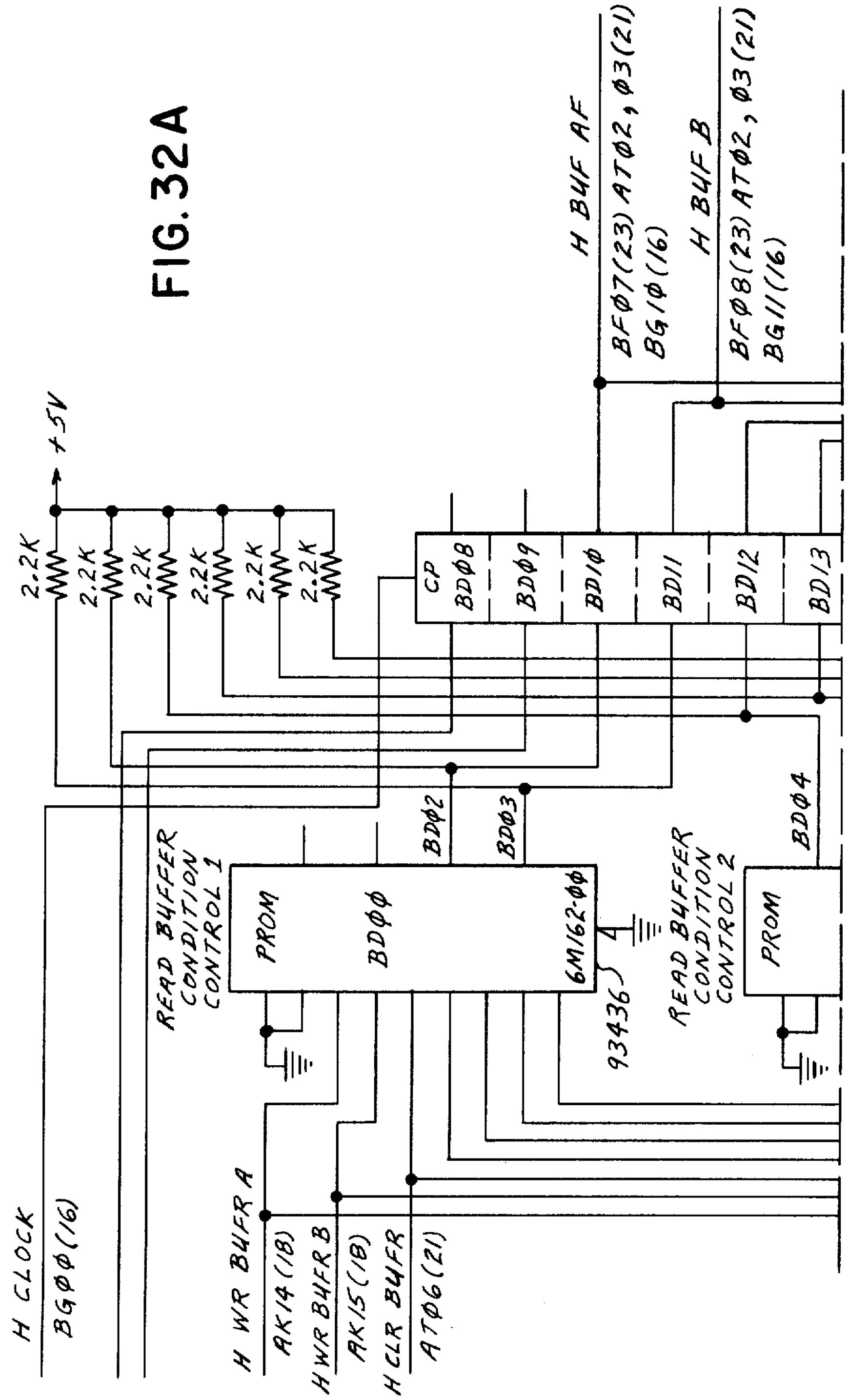
FIGS. 32A and 32B illustrate the preferred embodiment in hardware logic form.
Figure 32B:
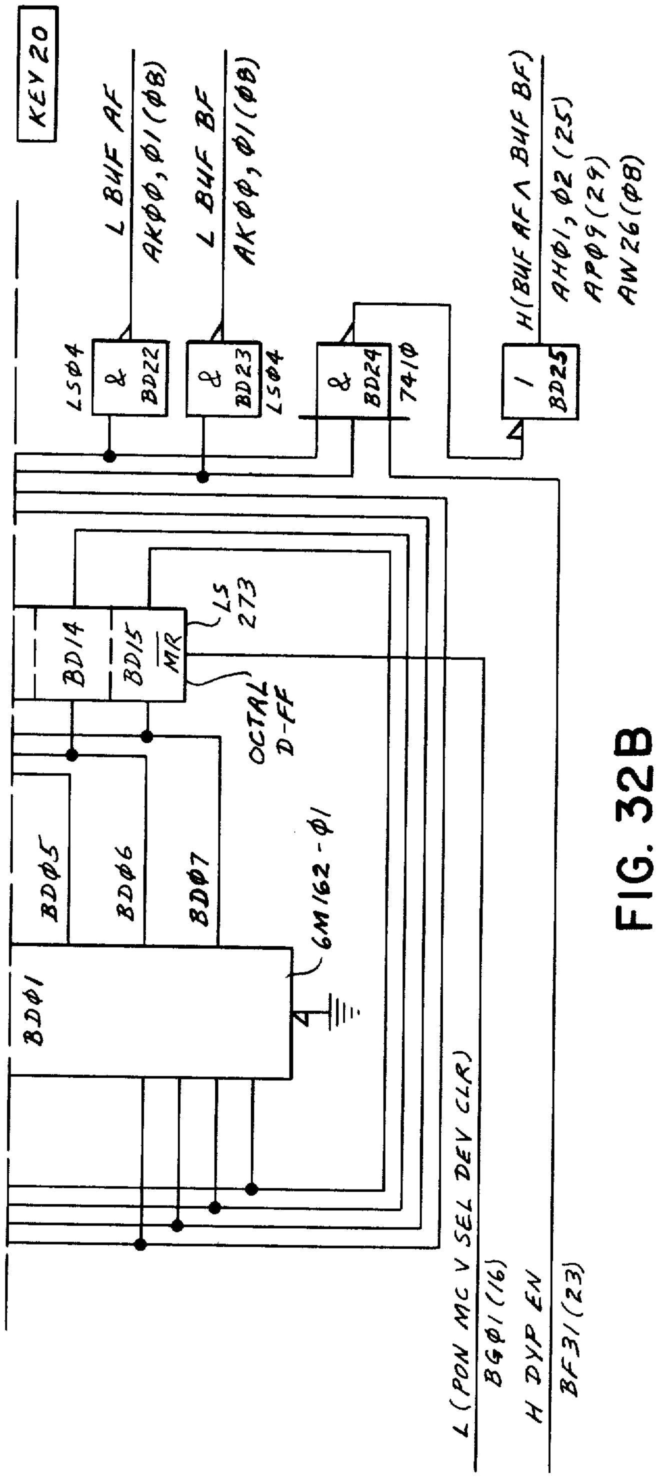
Figure 33:
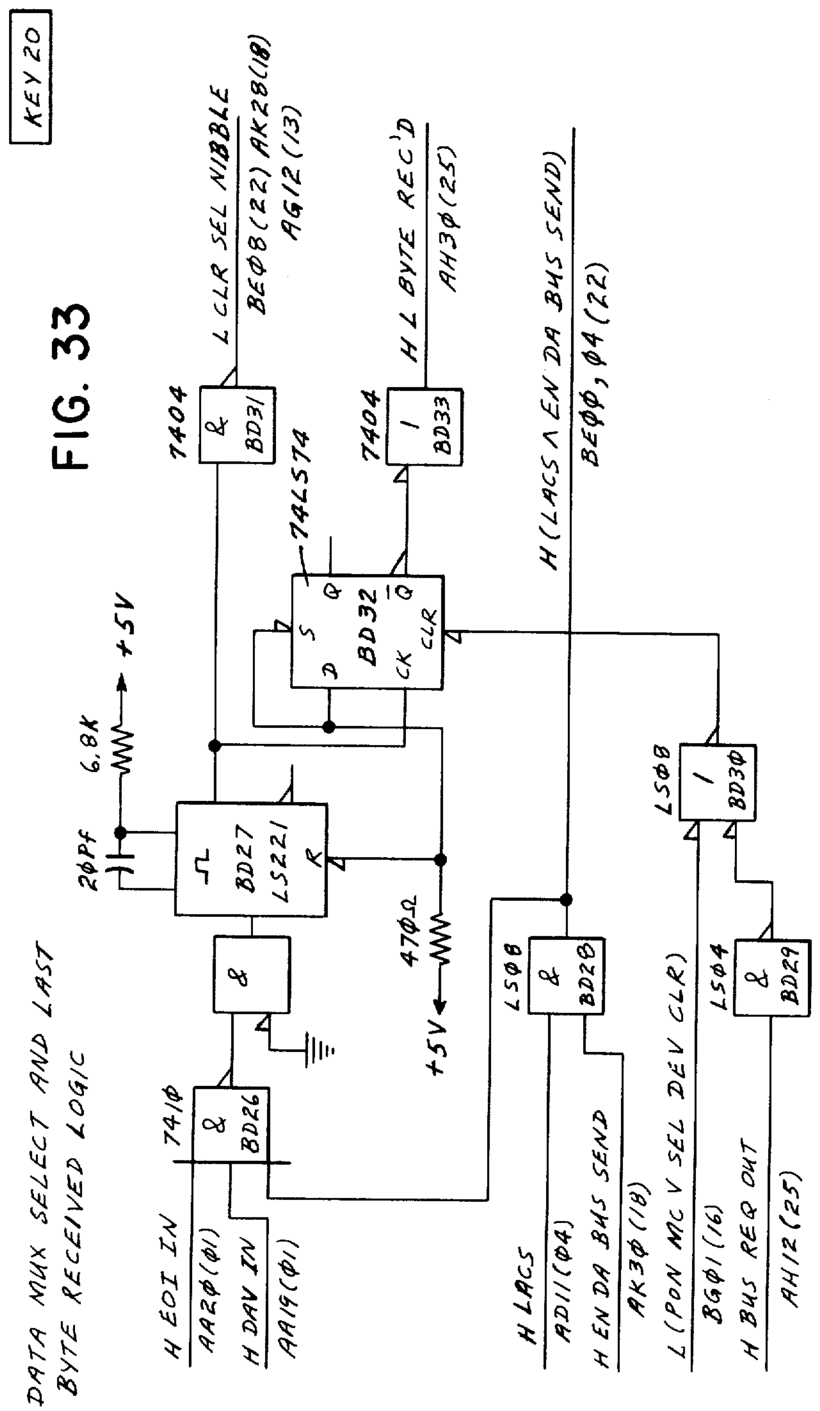
FIG. 33 illustrates the preferred embodiment in hardware logic form.
Figure 34A:
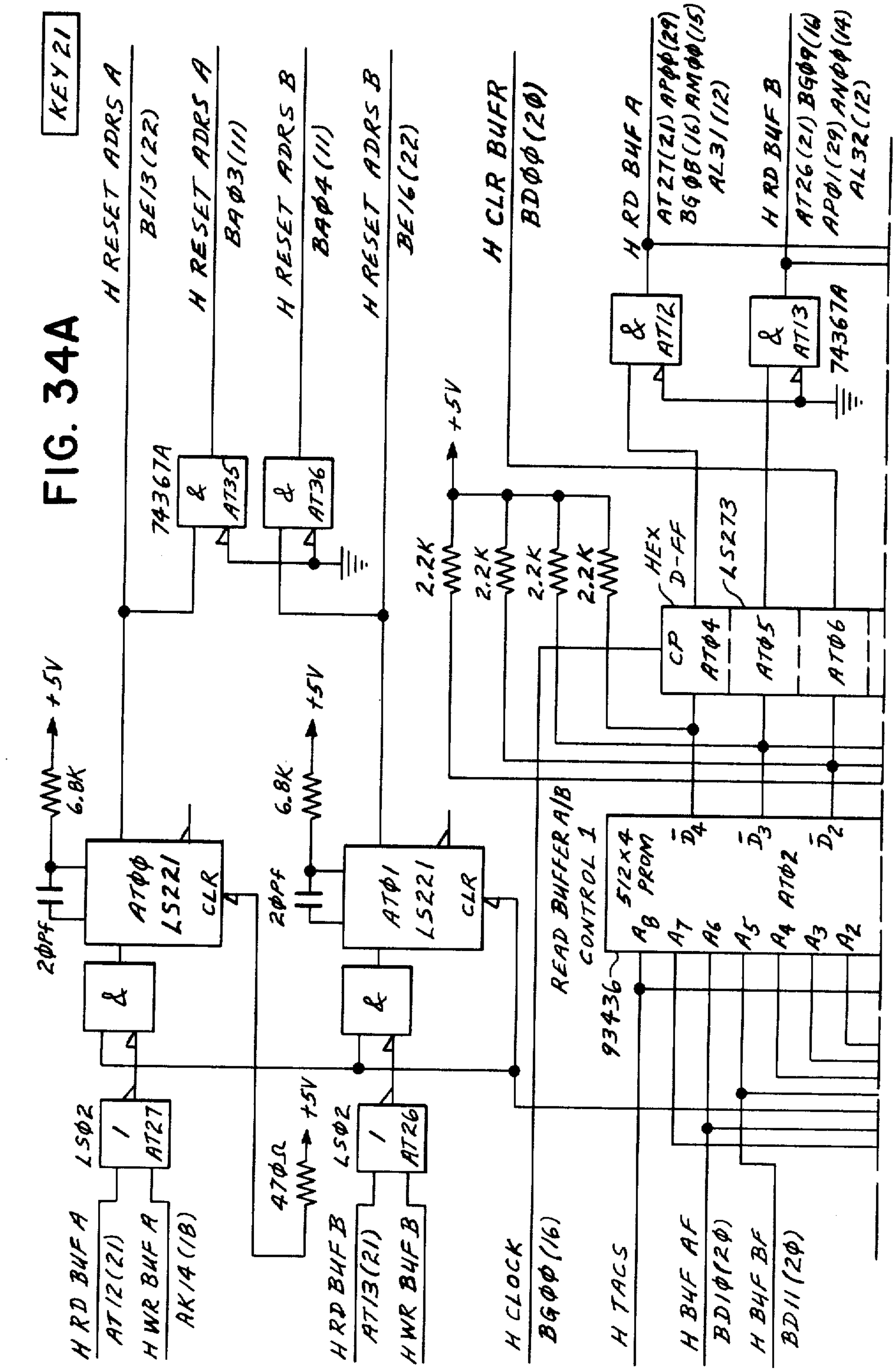
FIGS. 34A, 34B and 34C illustrate the preferred embodiment in hardware logic form.
Figure 34B:
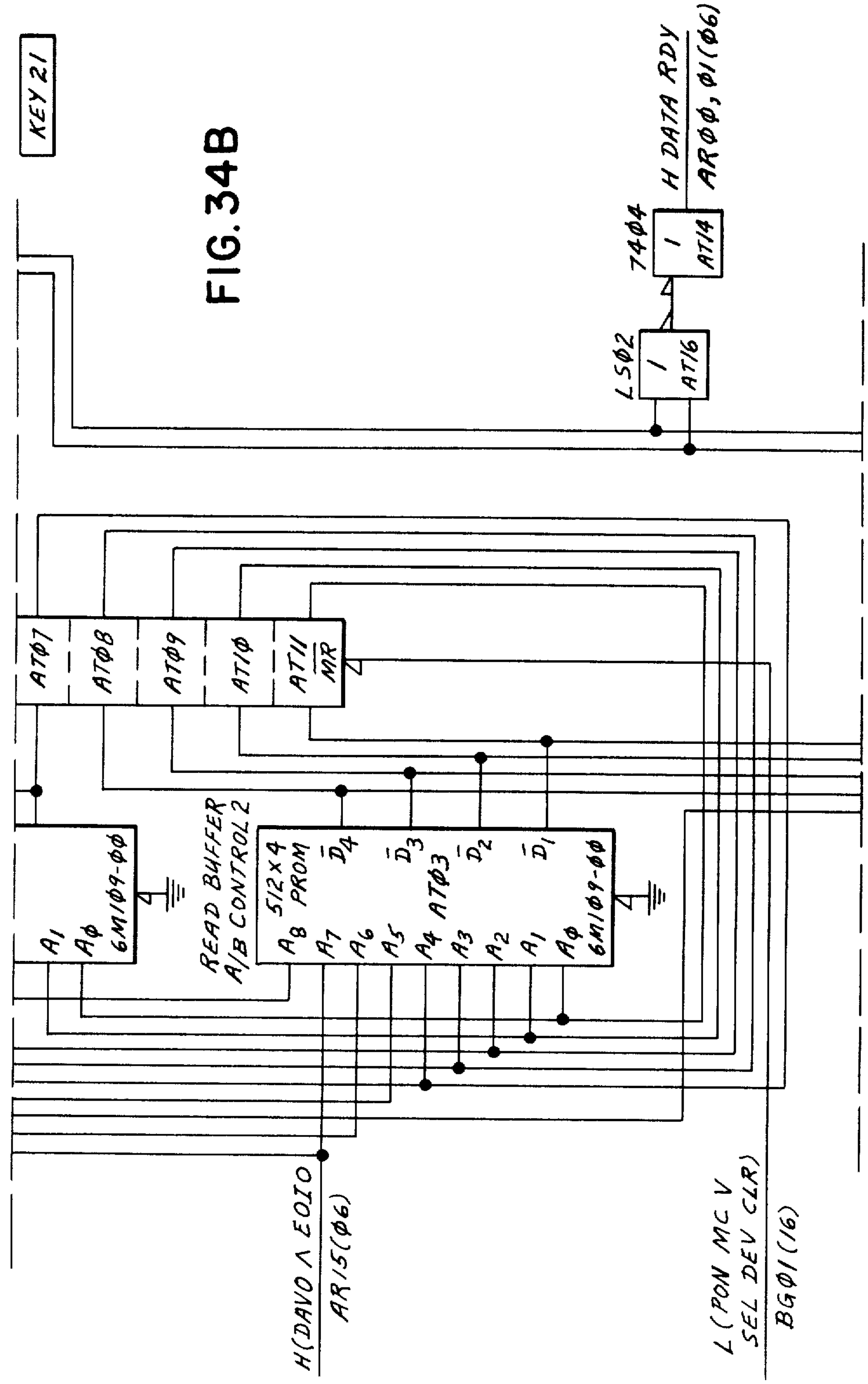
Figure 34C:
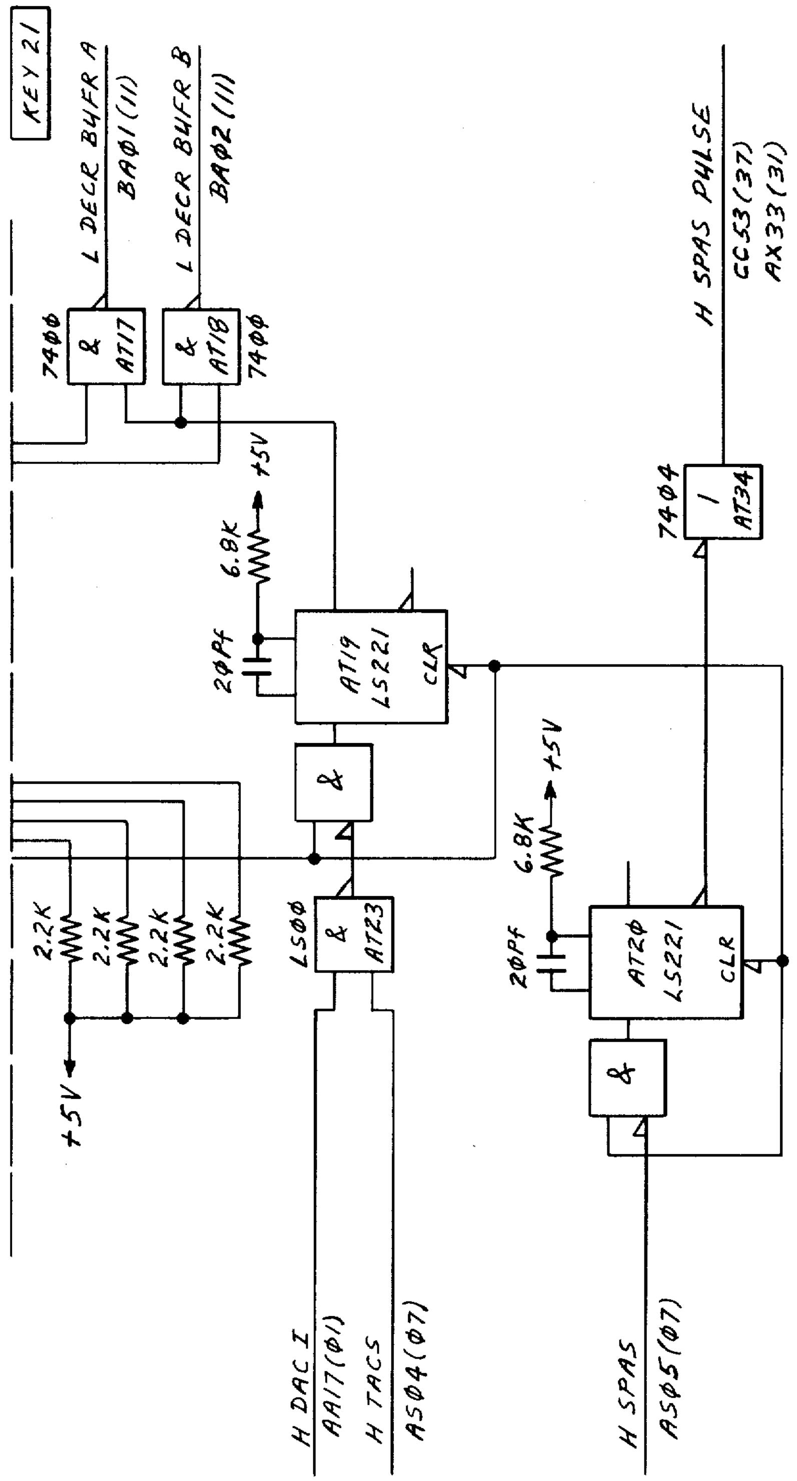
Figure 35A:
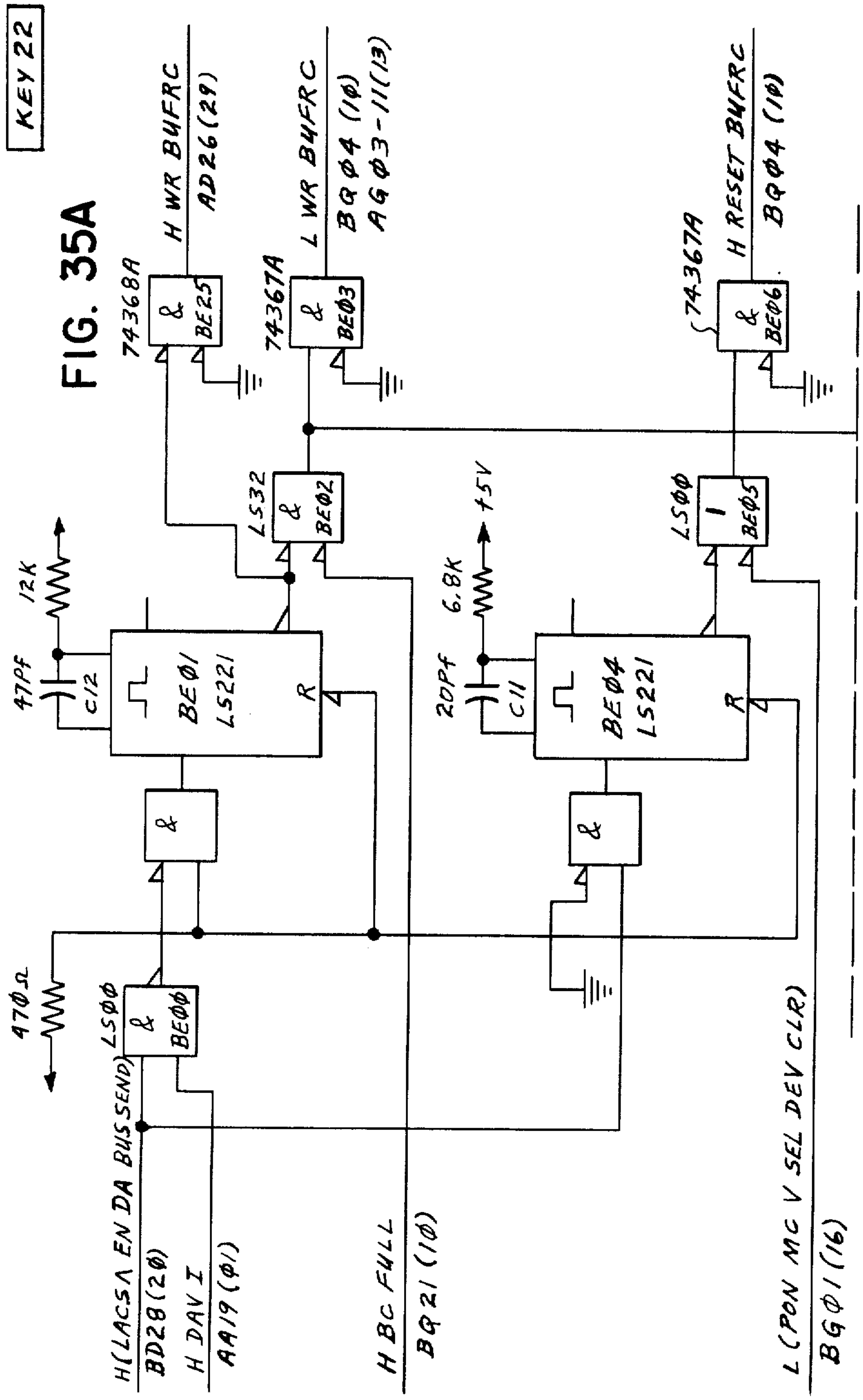
FIGS. 35A and 35B illustrate the preferred embodiment in hardware logic form.
Figure 35B:
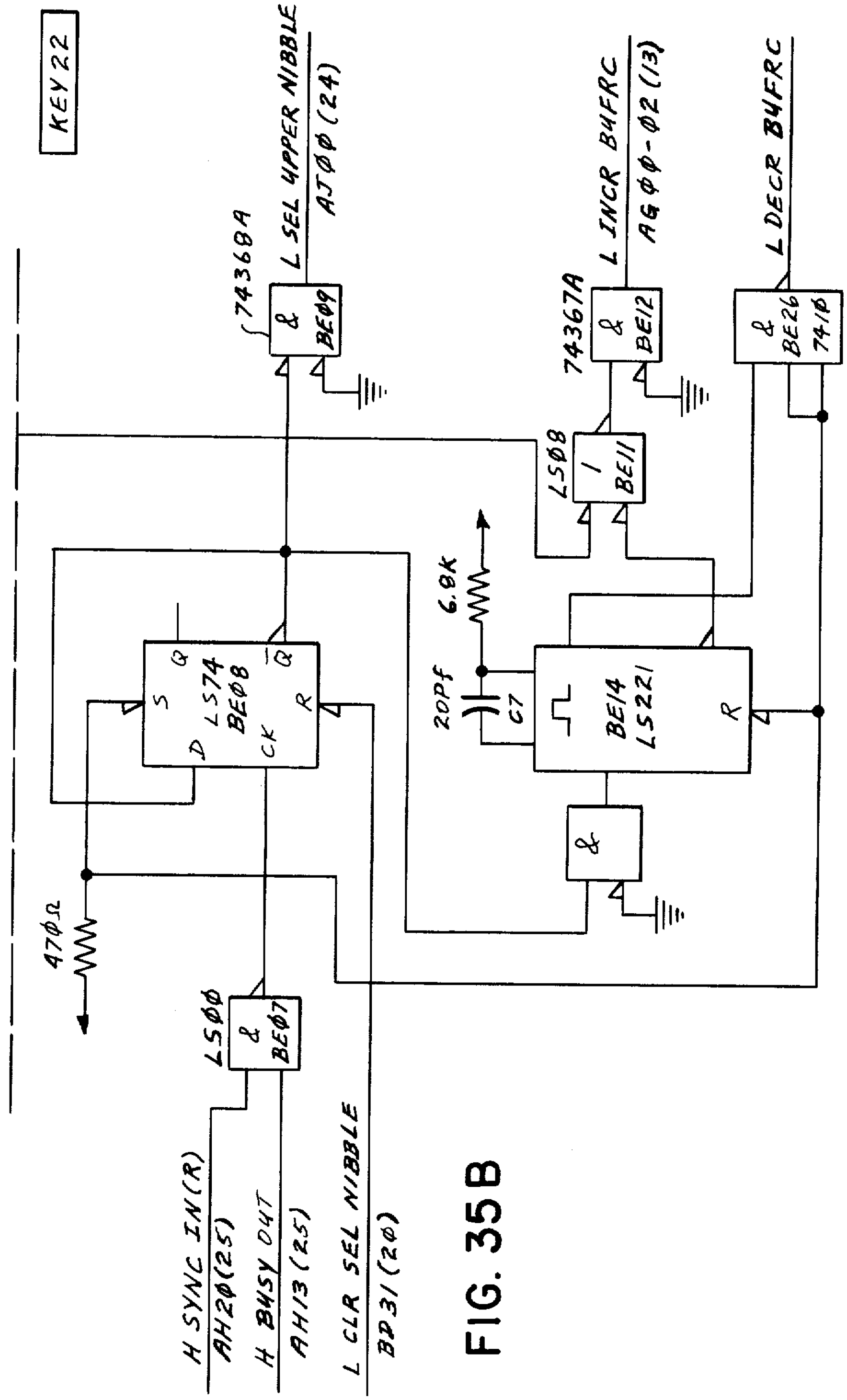
Figure 36:
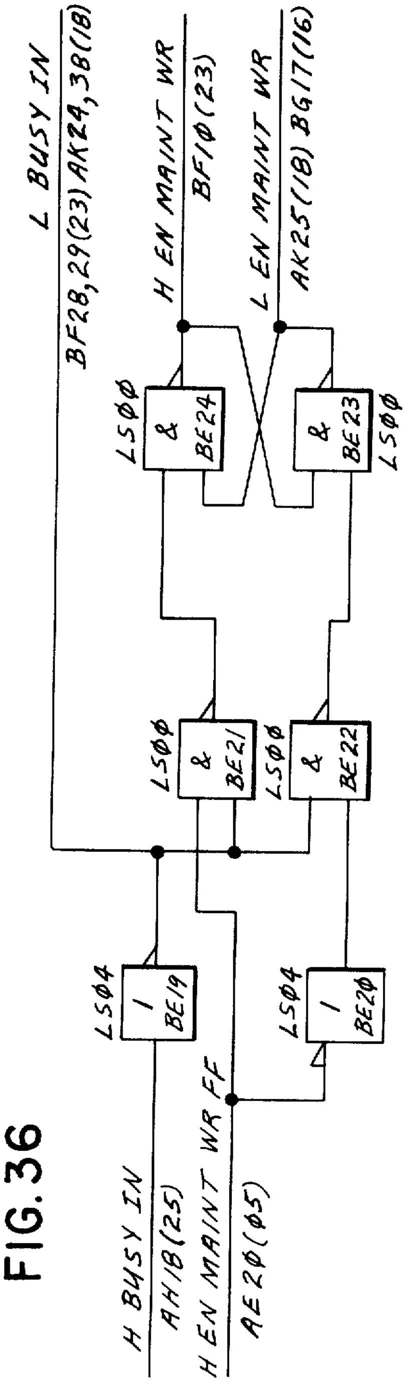
FIG. 36 illustrates the preferred embodiment in hardware logic form.
Figure 37:
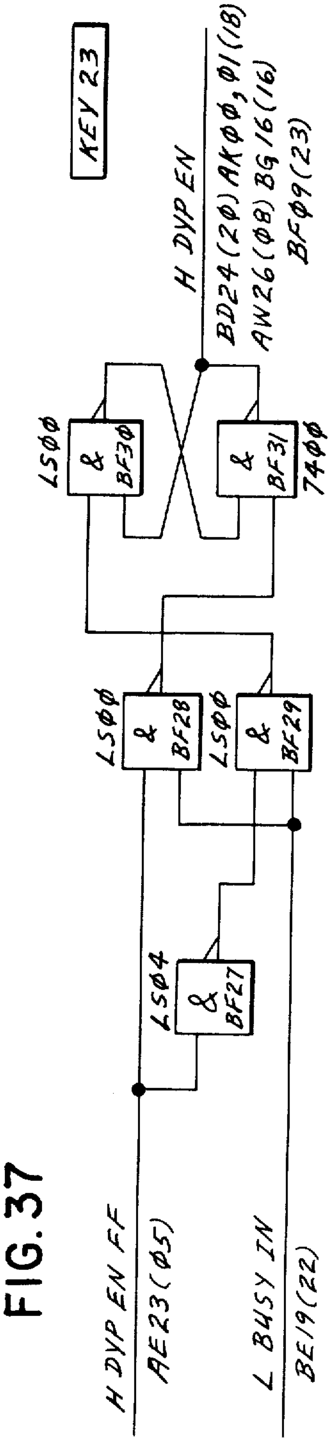
FIG. 37 illustrates the preferred embodiment in hardware logic form.
Figure 38:
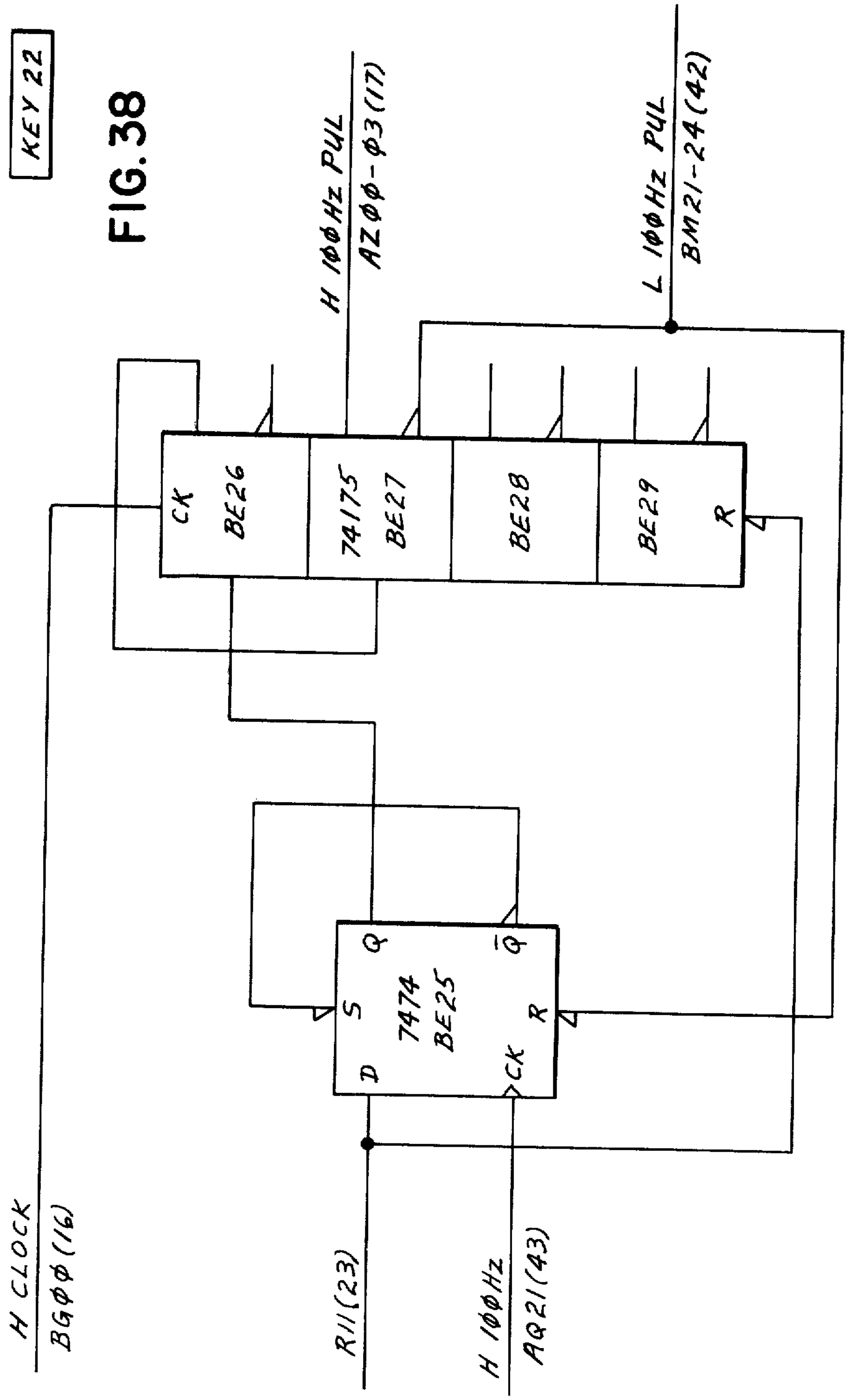
FIG. 38 illustrates the preferred embodiment in hardware logic form.
Figure 39A:
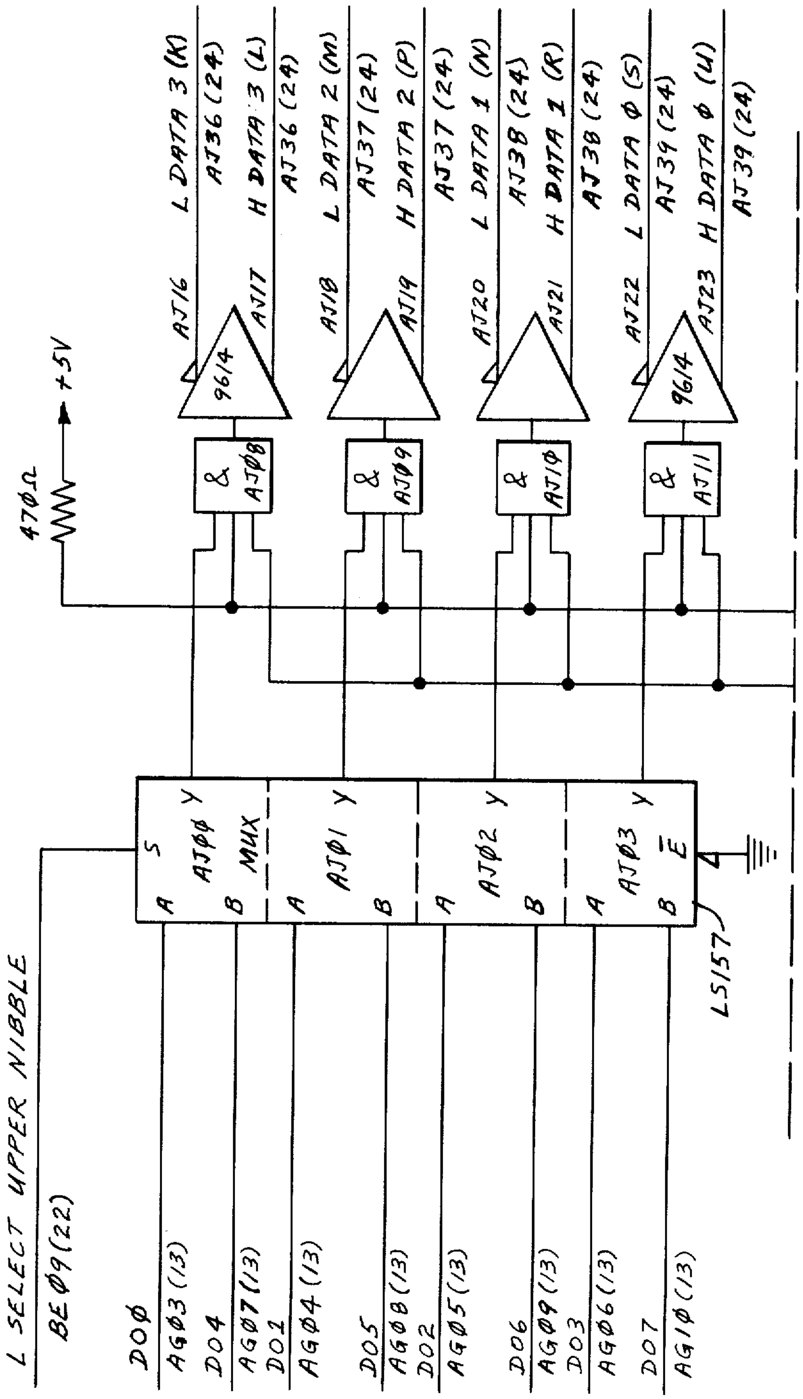
FIGS. 39A, 39B, 39C and 39D illustrate the preferred embodiment in hardware logic form.
Figure 39B:
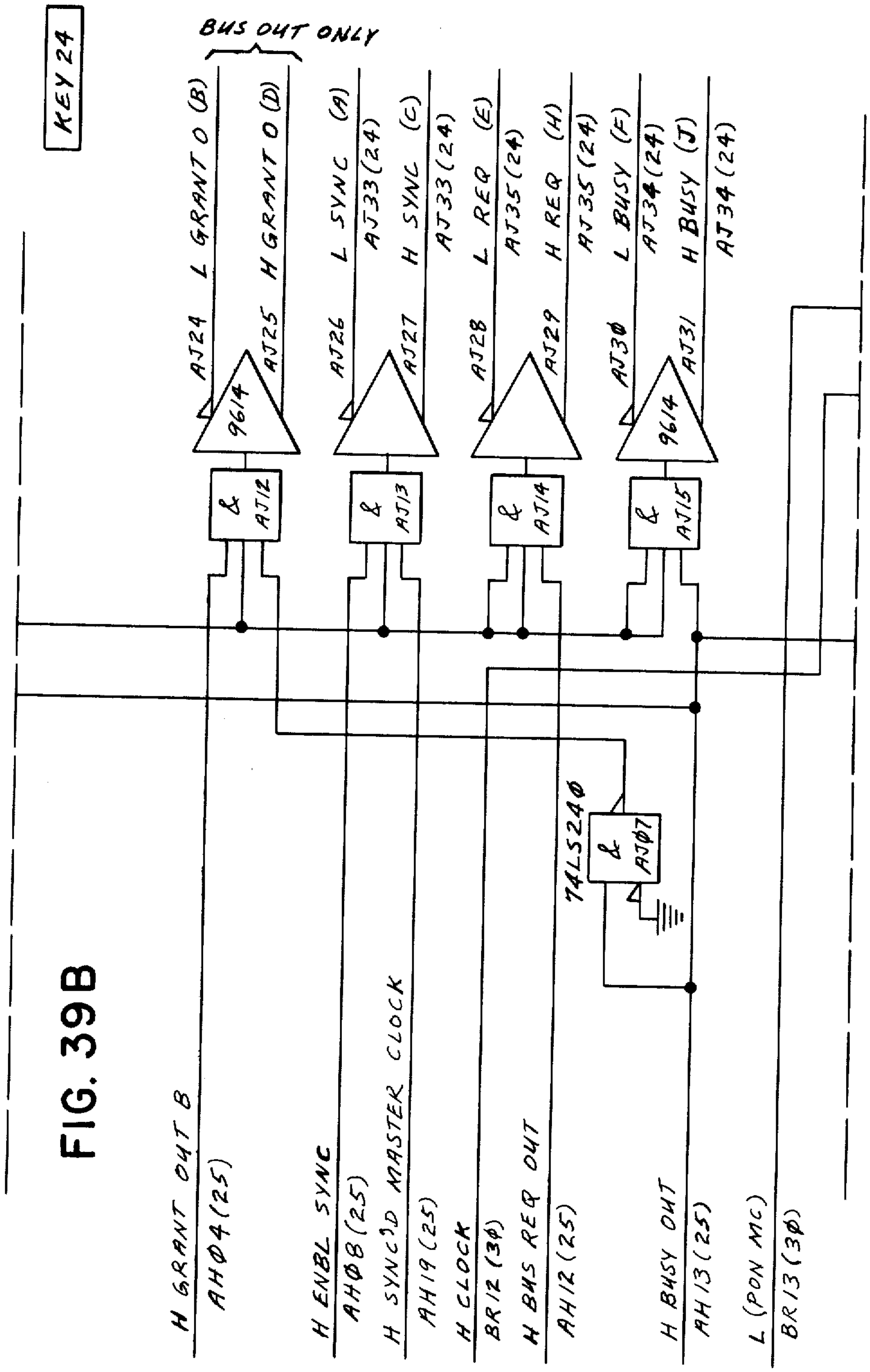
Figure 39C:
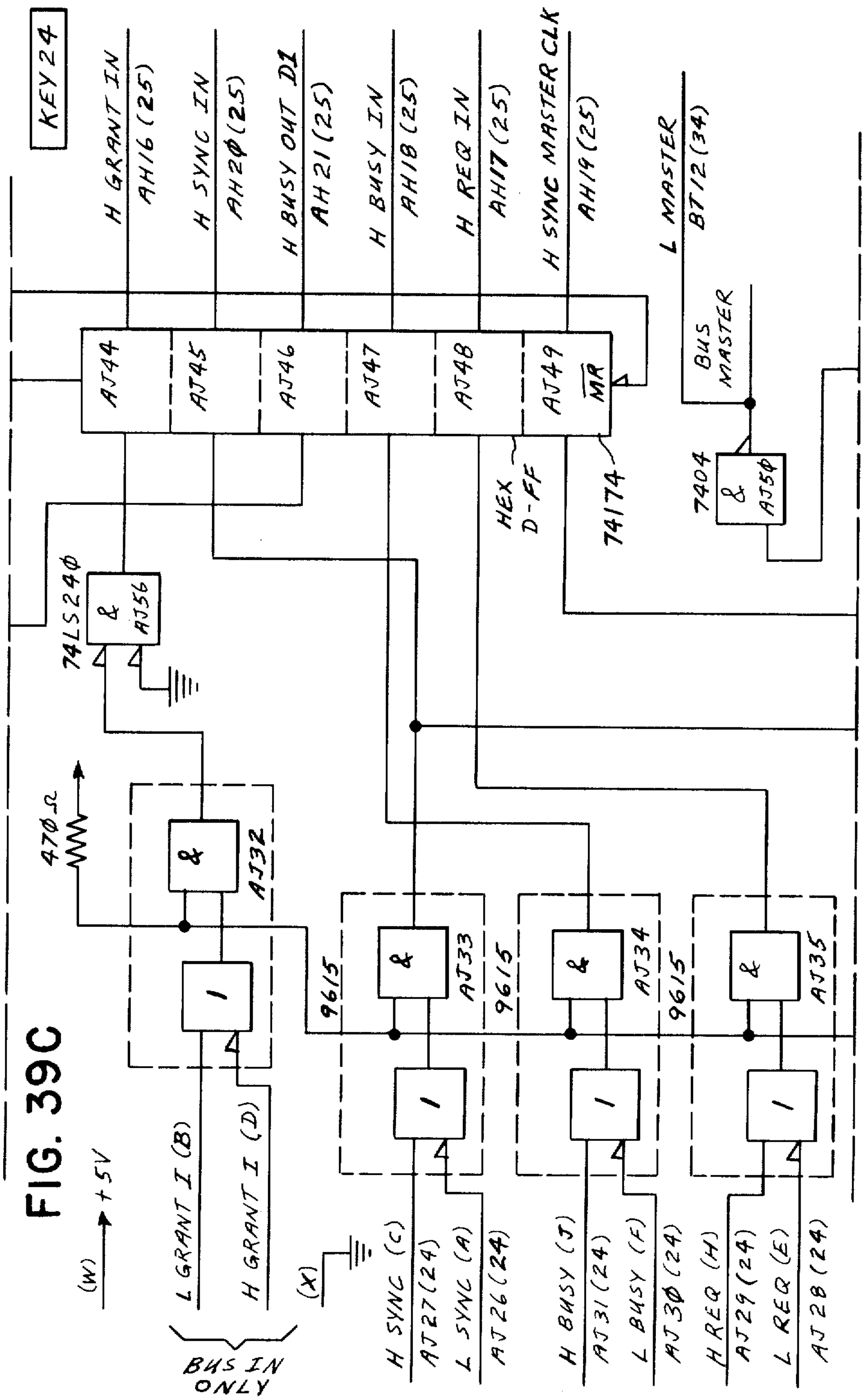
Figure 39D:
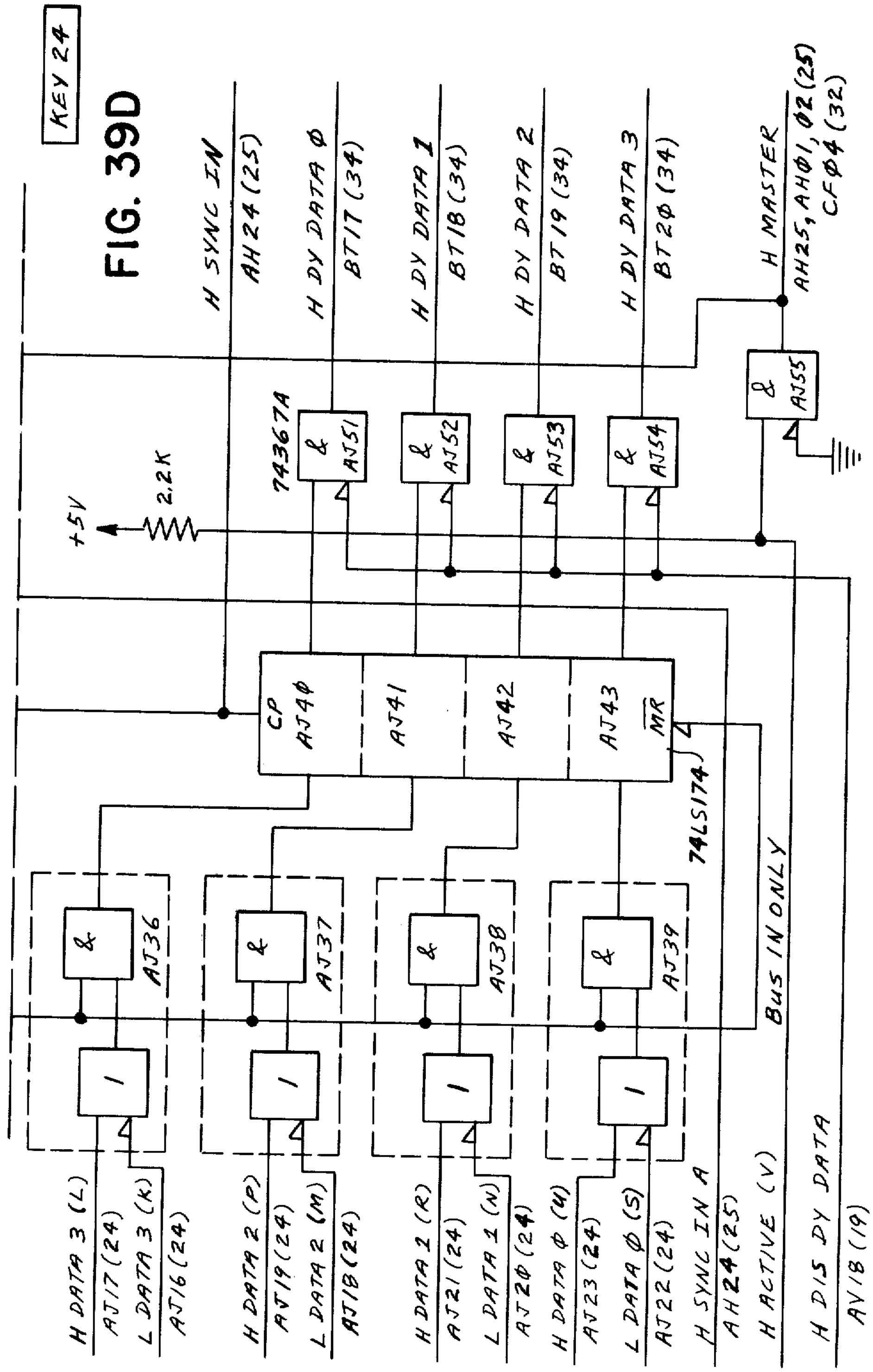
Figure 40A:
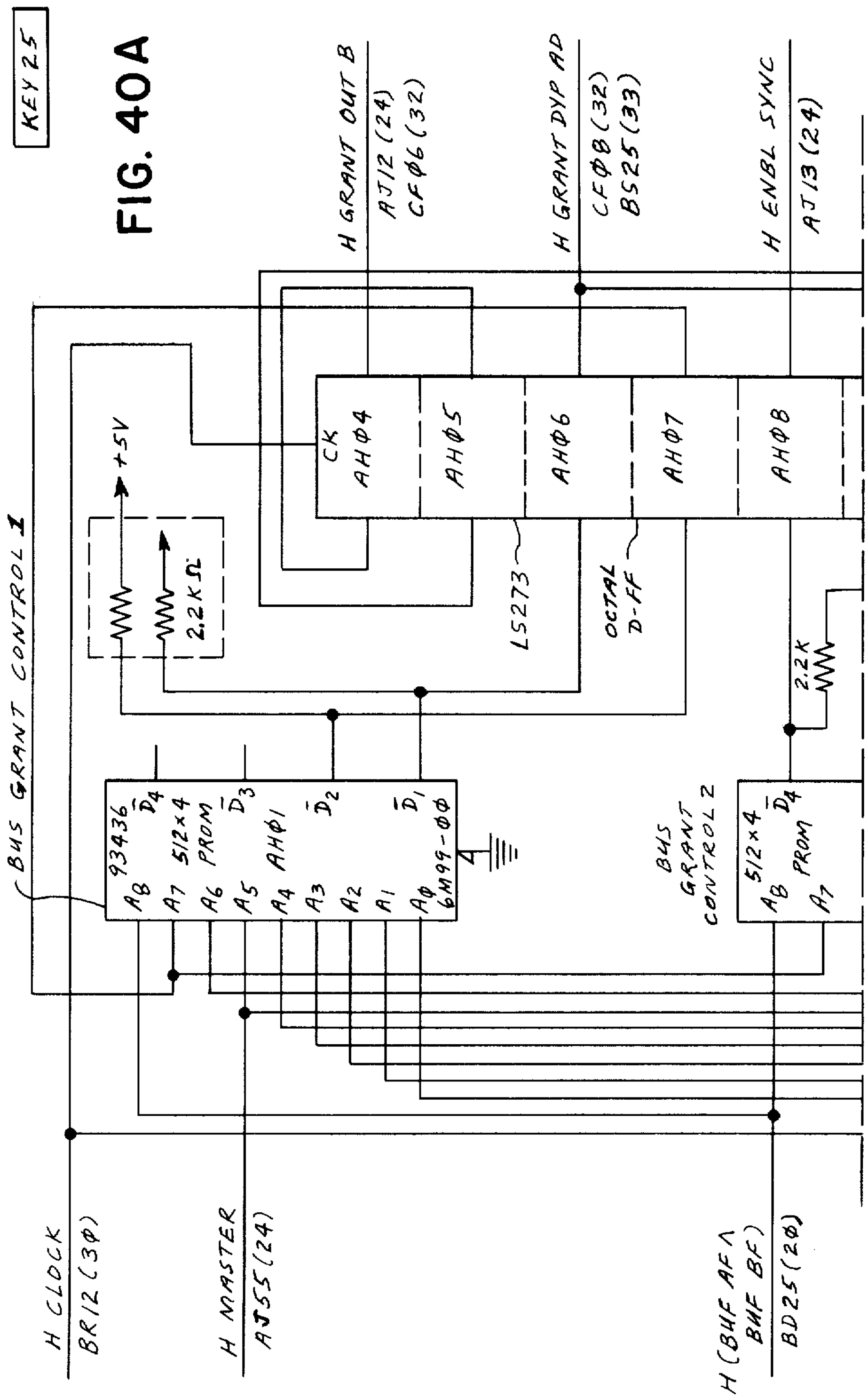
FIGS. 40A, 40B, 40C, 40D and 40E illustrate the preferred embodiment in hardware logic form.
Figure 40B:
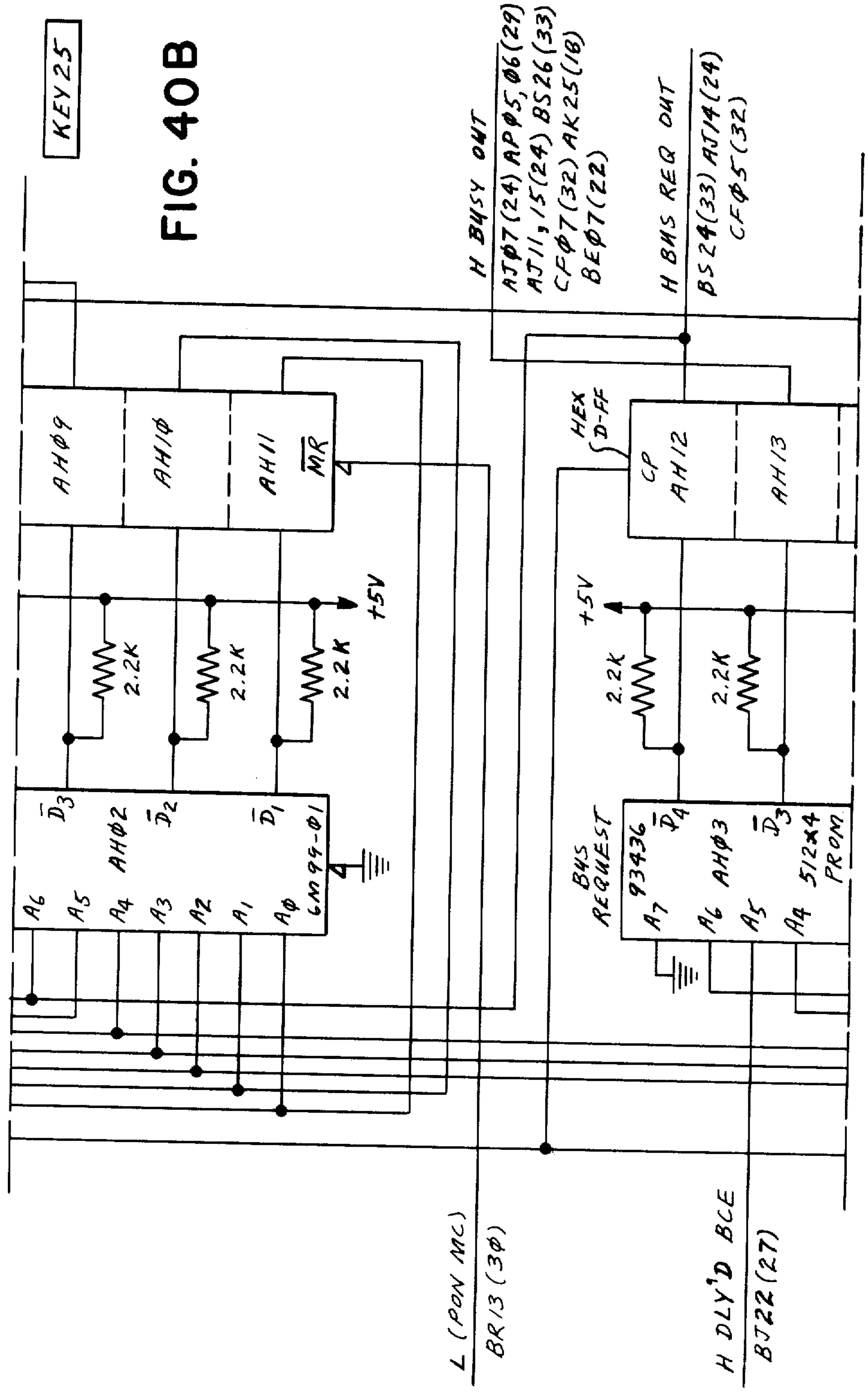
Figure 40C:
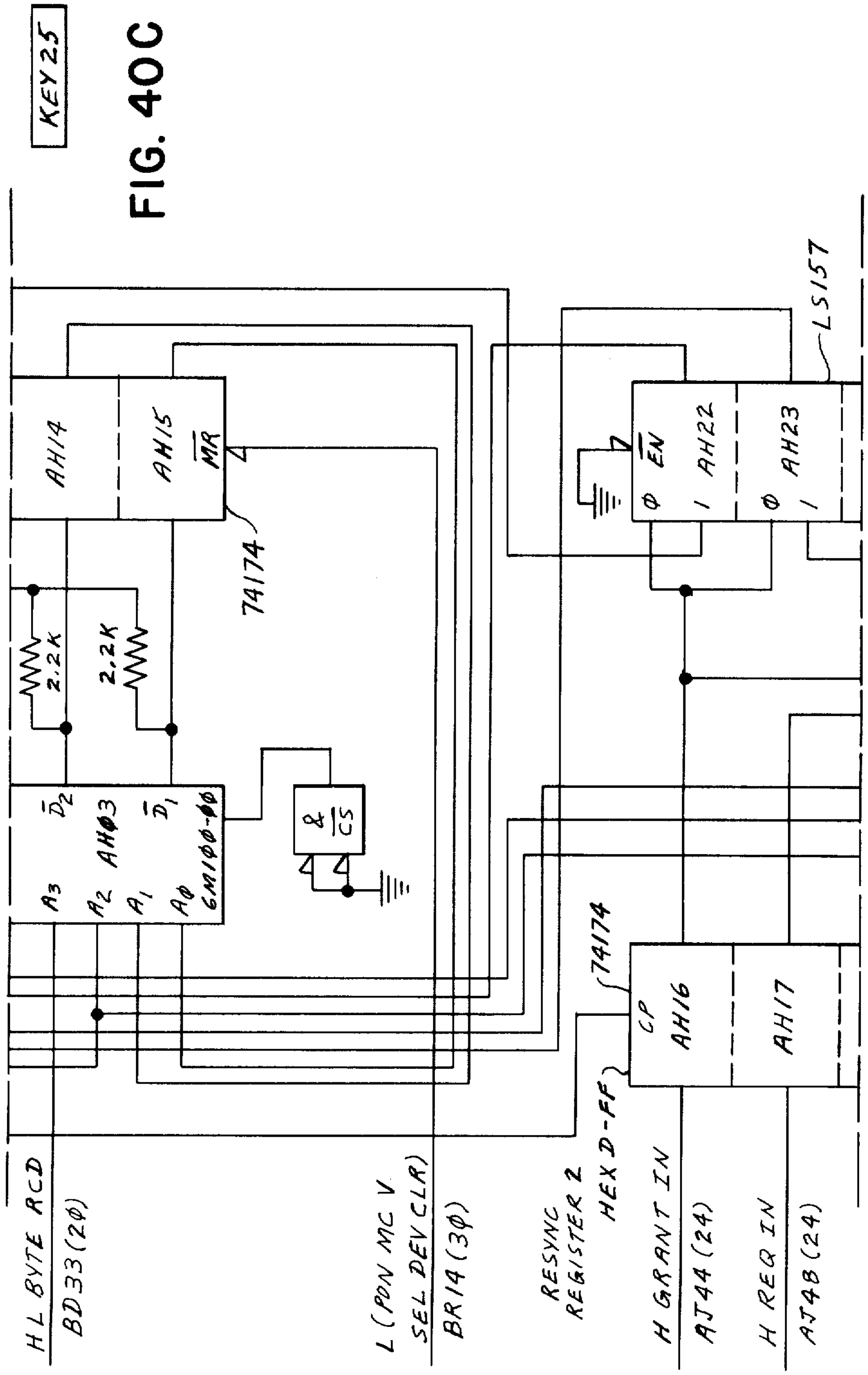
Figure 40D:
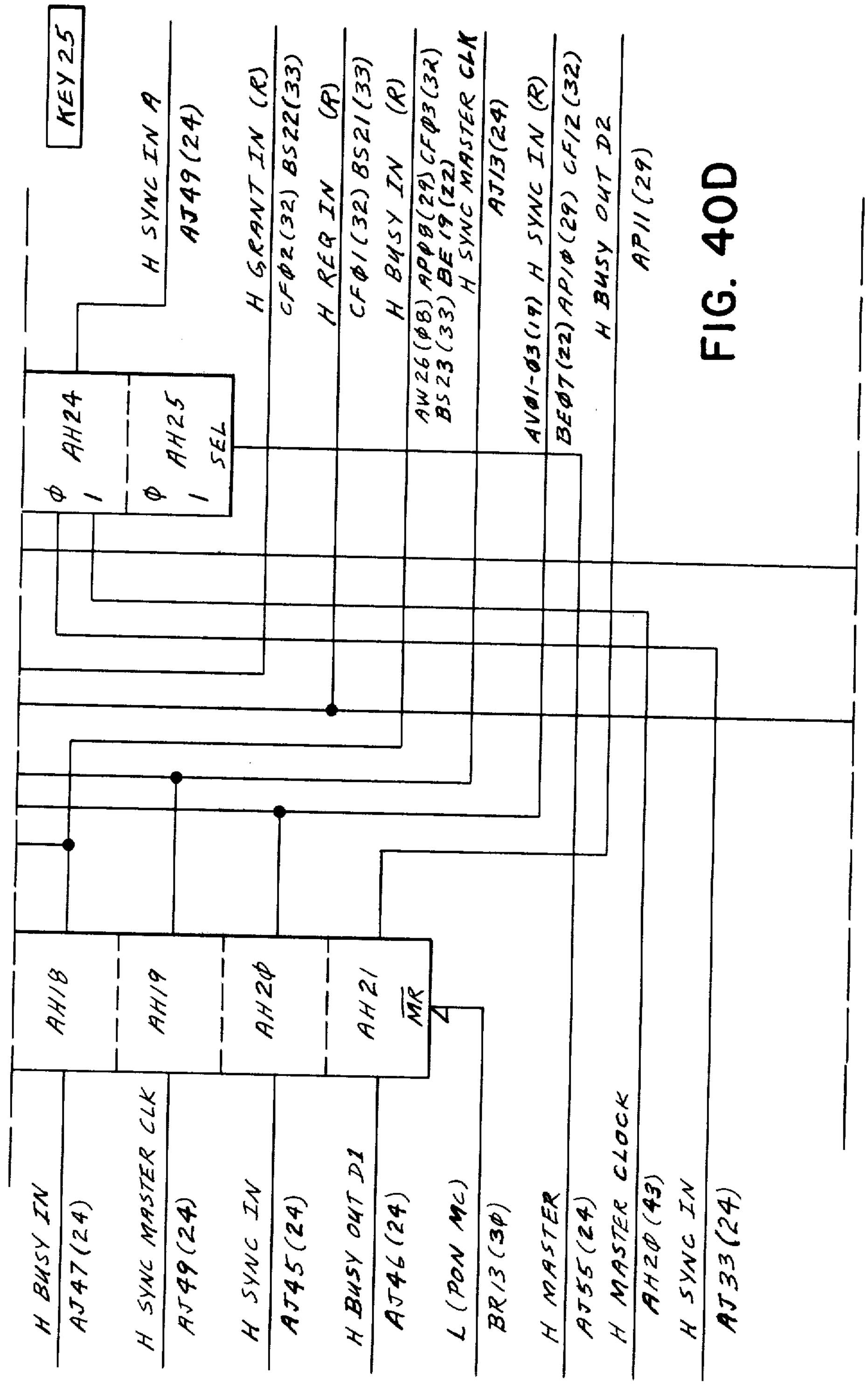
Figure 40E:
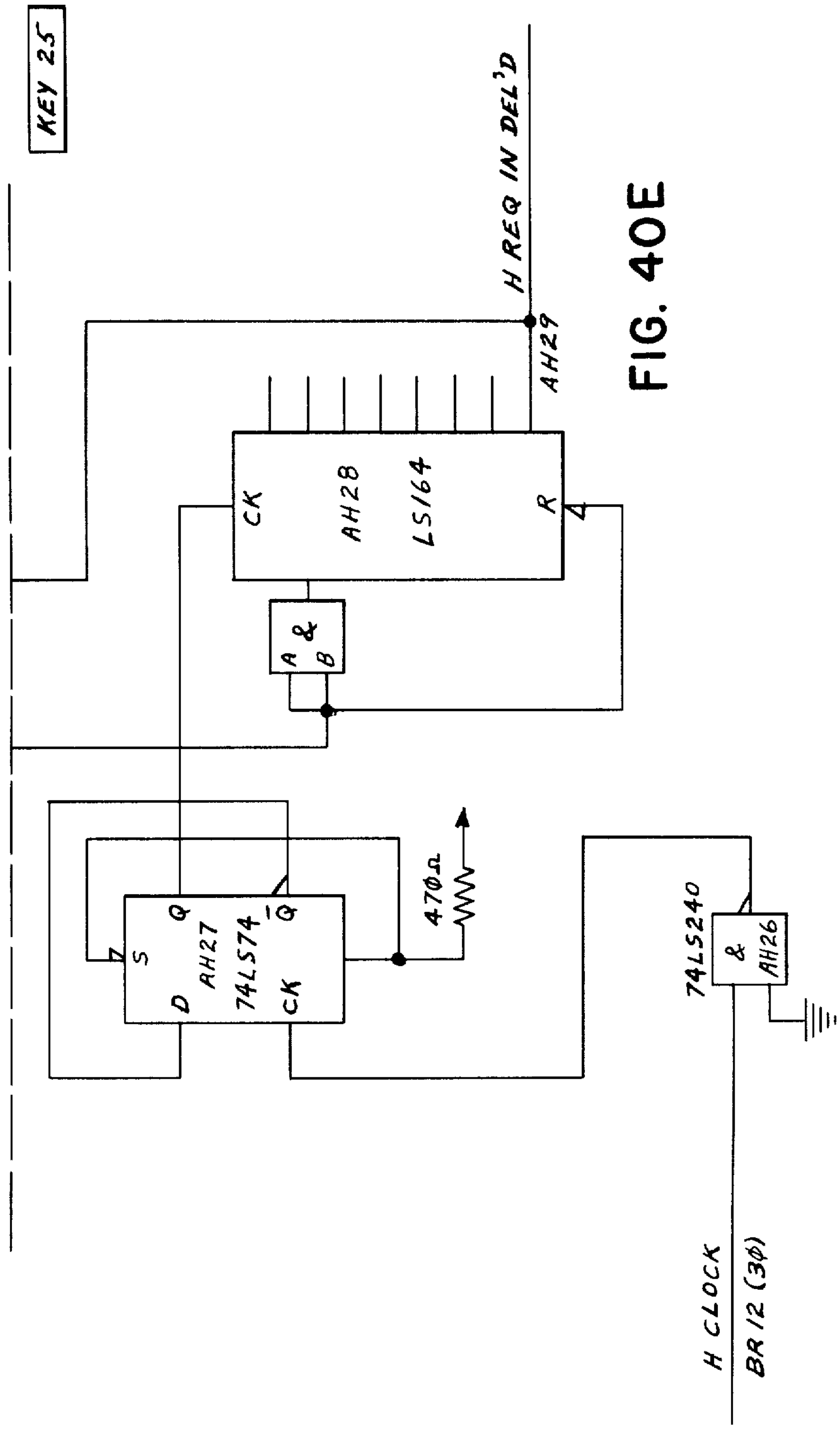
Figure 41A:
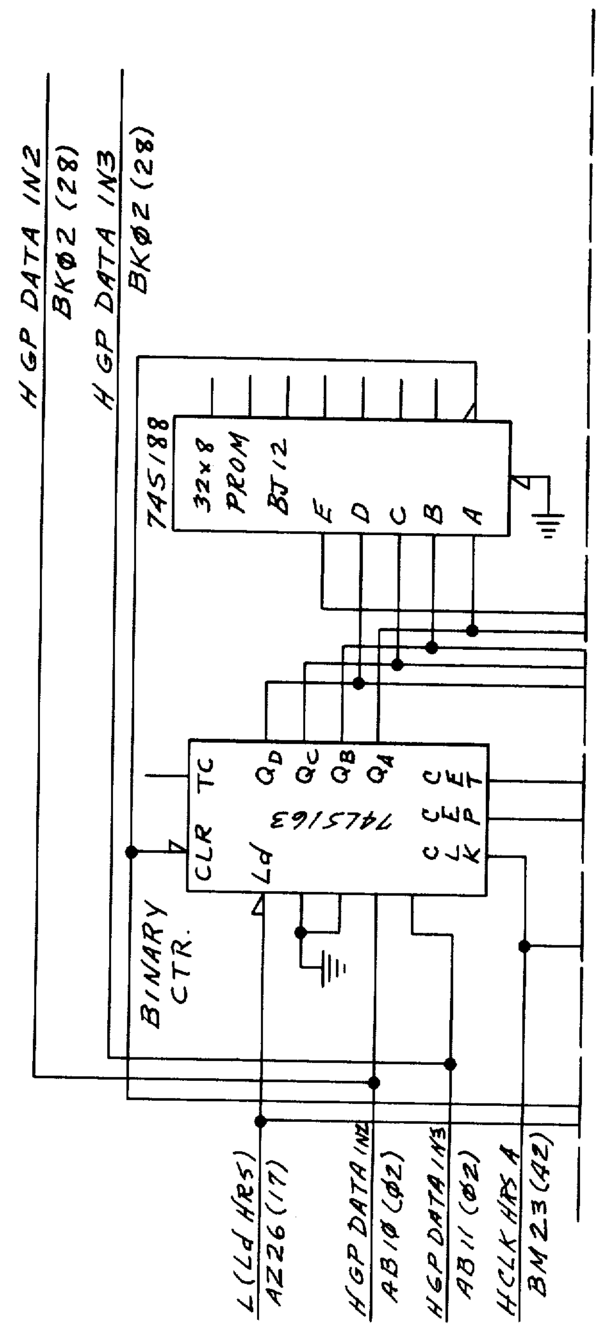
FIGS. 41A, 41B and 41C illustrate the preferred embodiment in hardware logic form.
Figure 41B:
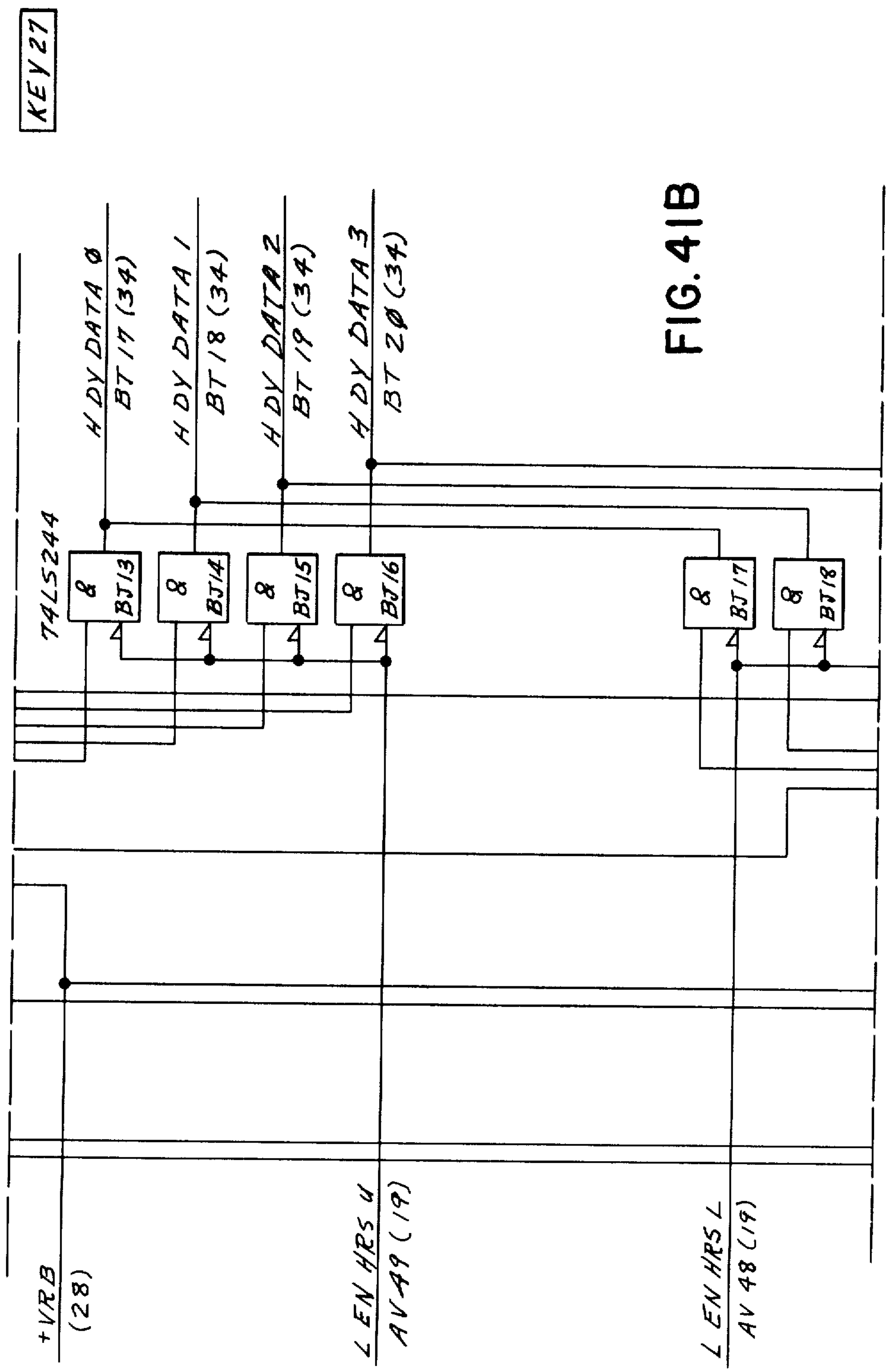
Figure 41C:
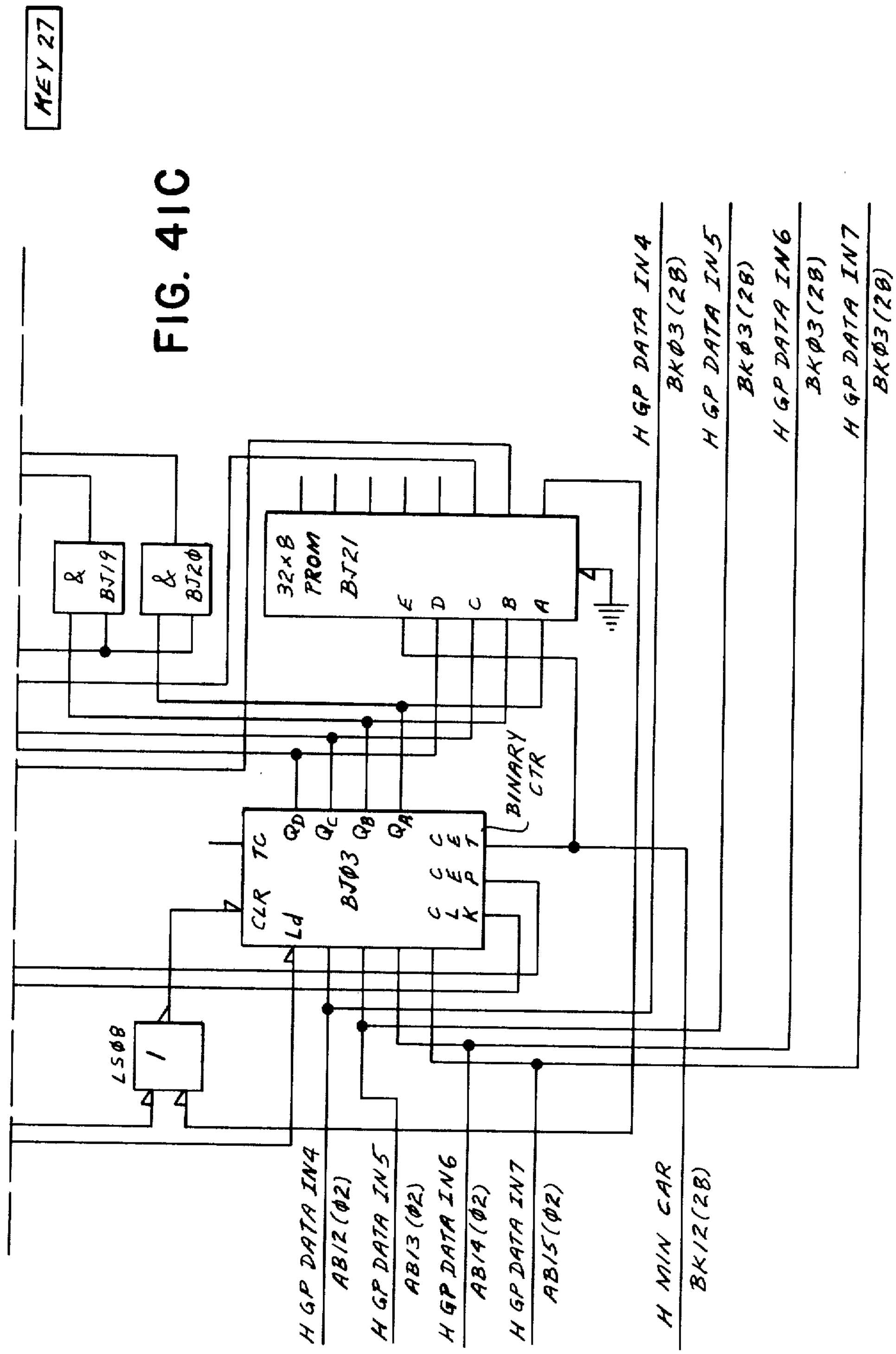
Figure 42:
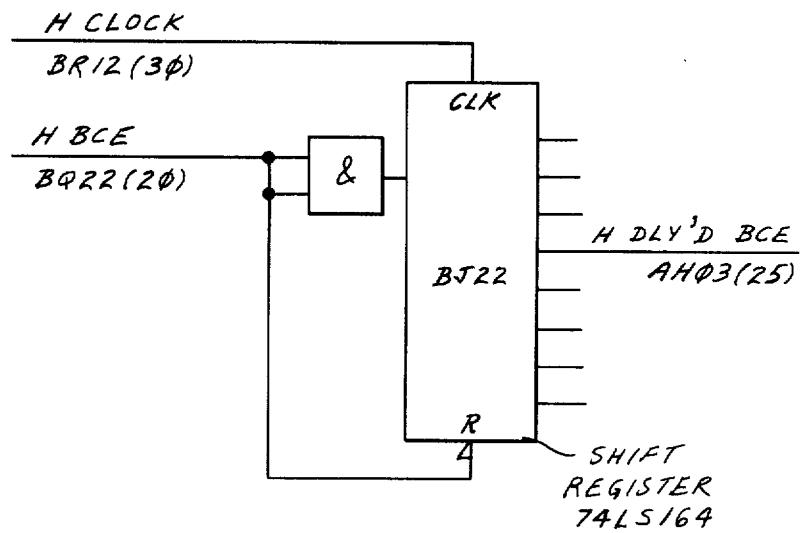
FIG. 42 illustrates the preferred embodiment in hardware logic form.
Figure 50:
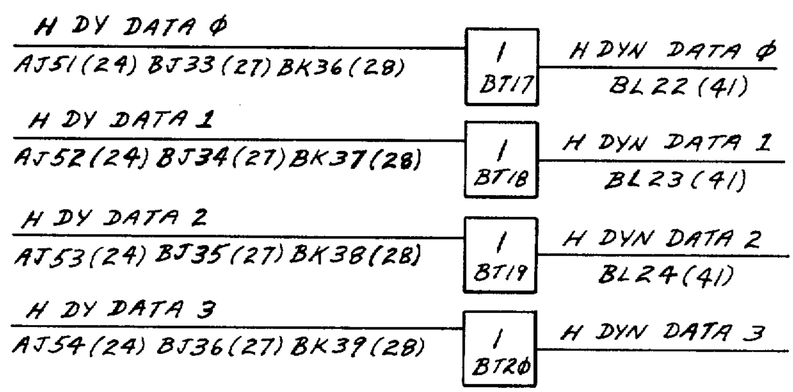
FIG. 50 illustrates the preferred embodiment in hardware logic form.
Figure 43A:
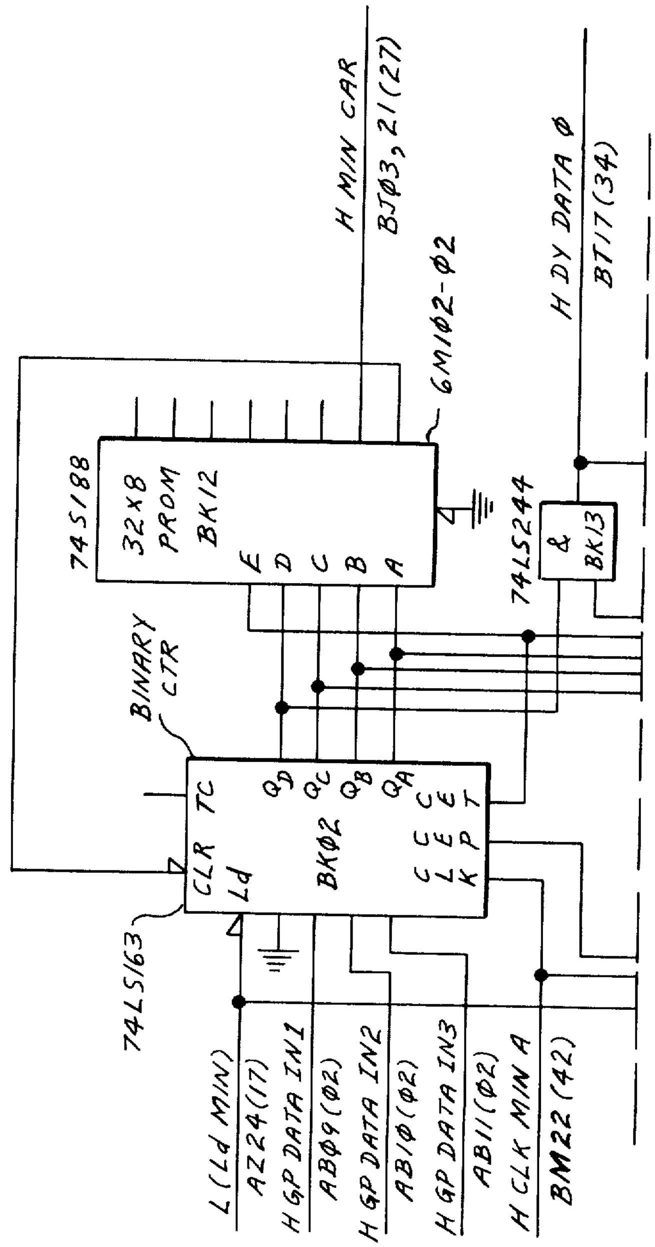
FIGS. 43A, 43B and 43C illustrate the preferred embodiment in hardware logic form.
Figure 43B:
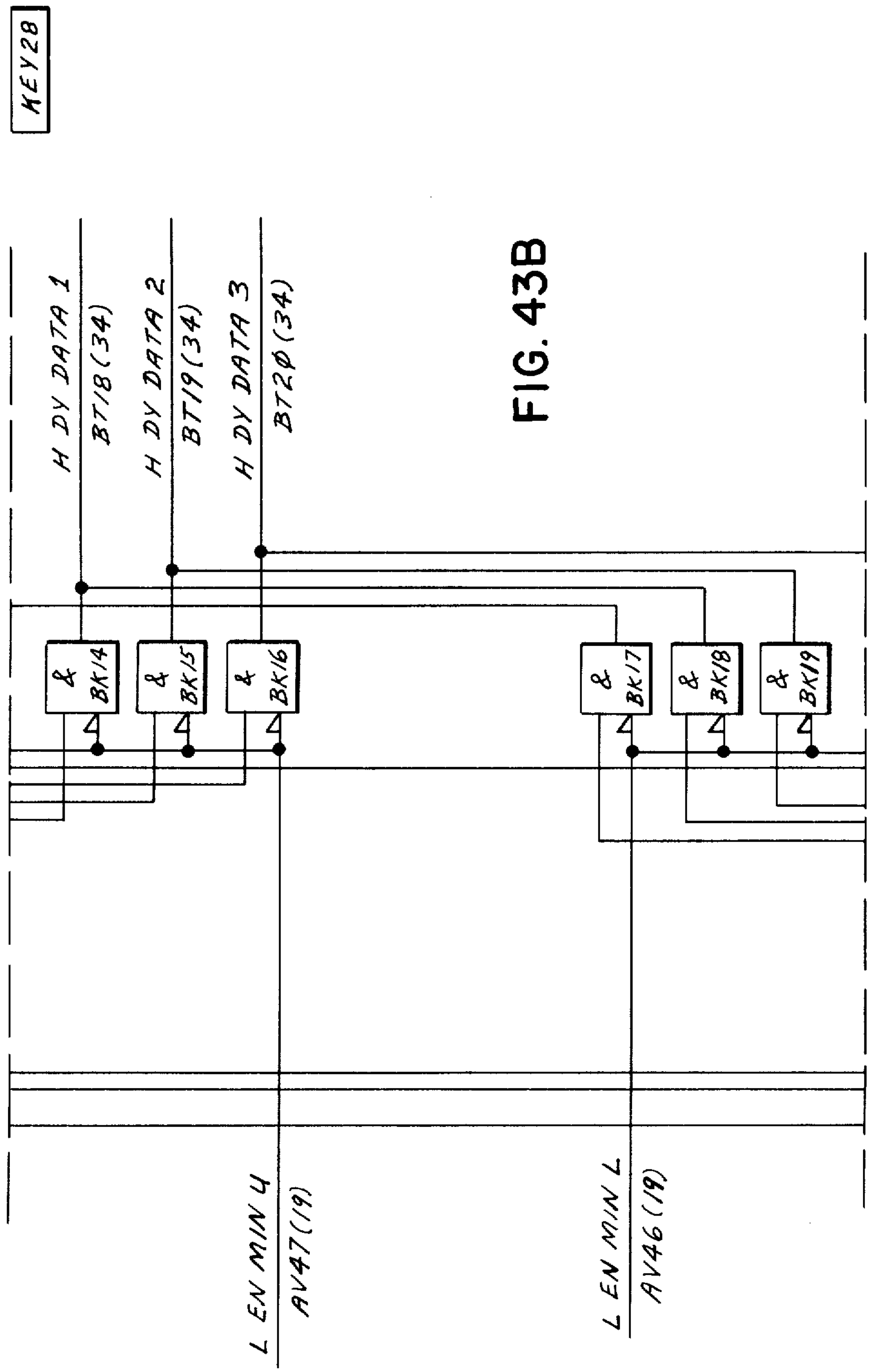
Figure 43C:
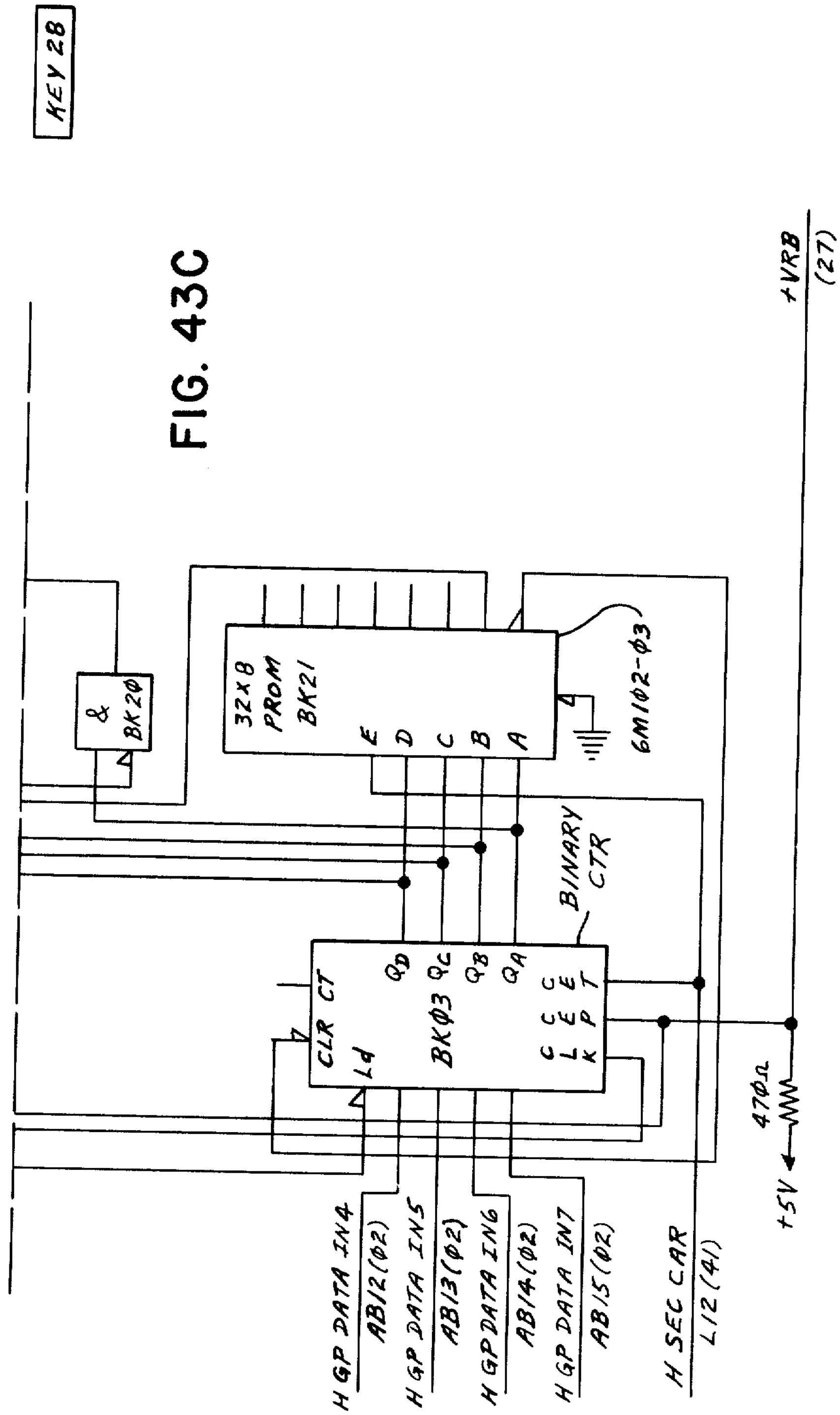
Figures 44, 45A:
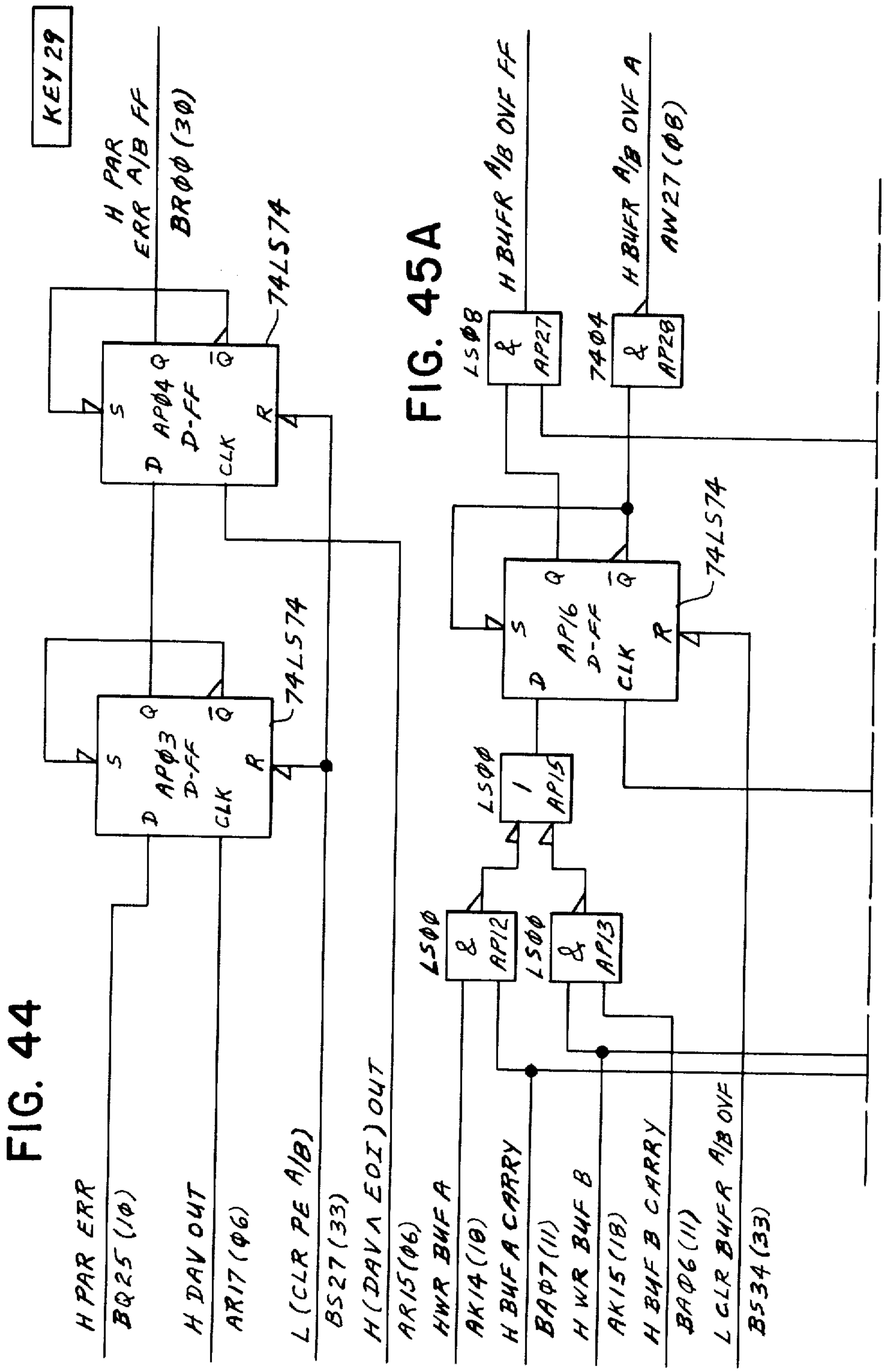
FIG. 44 illustrates the preferred embodiment in hardware logic form.
FIGS. 45A, 45B, 45C and 45D illustrate the preferred embodiment in hardware logic form.
Figure 45B:
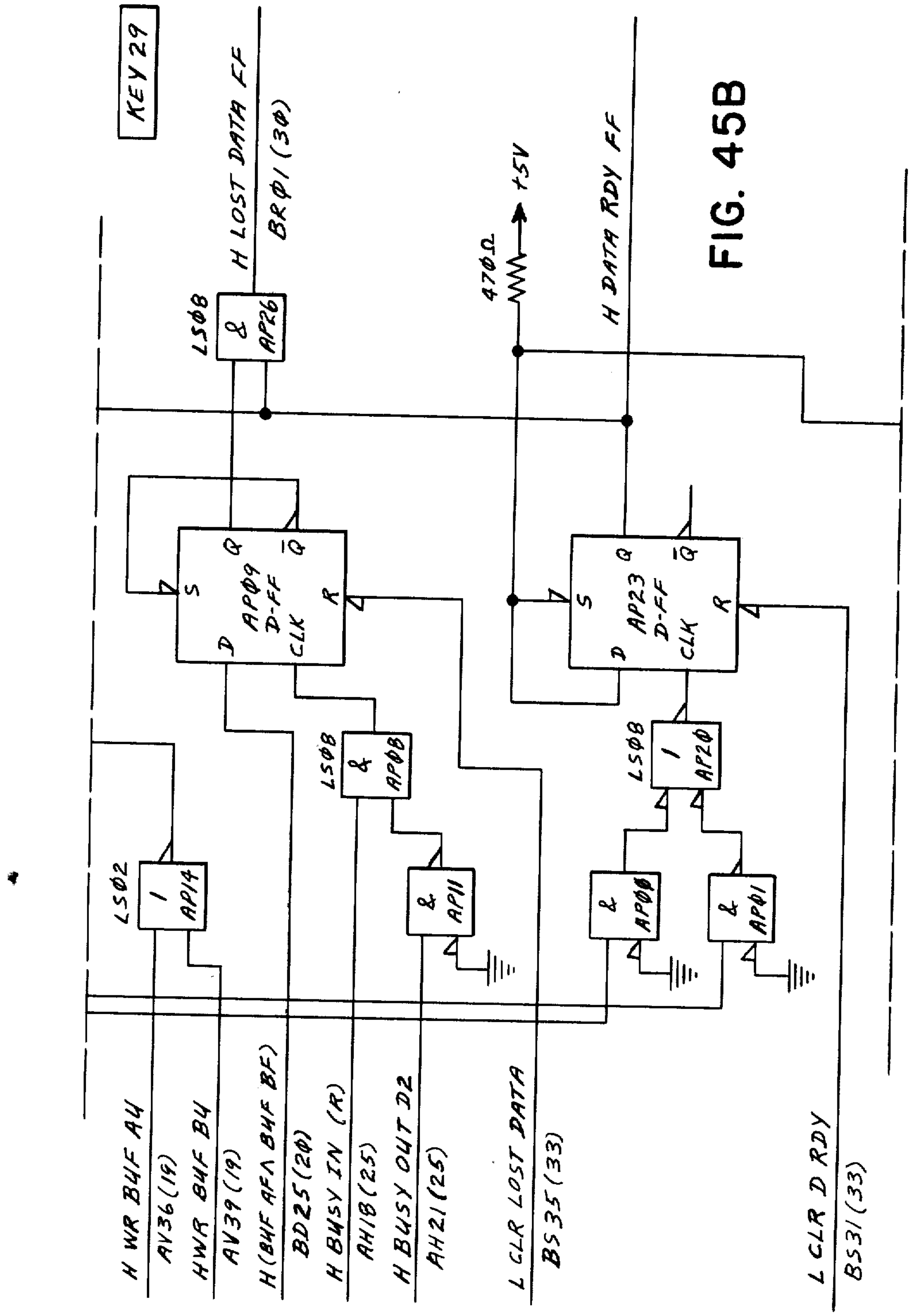
Figure 45C:
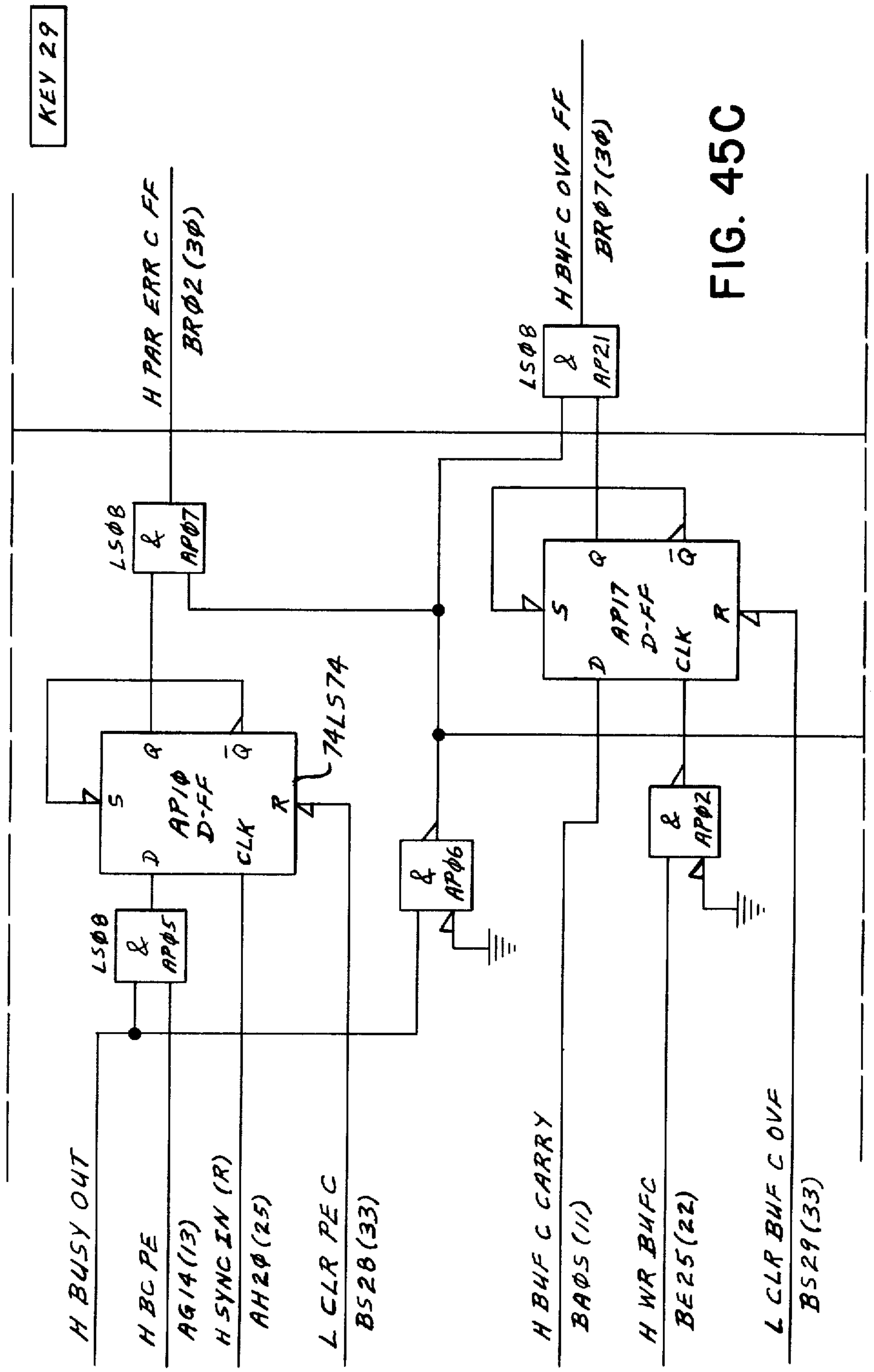
Figure 45D:
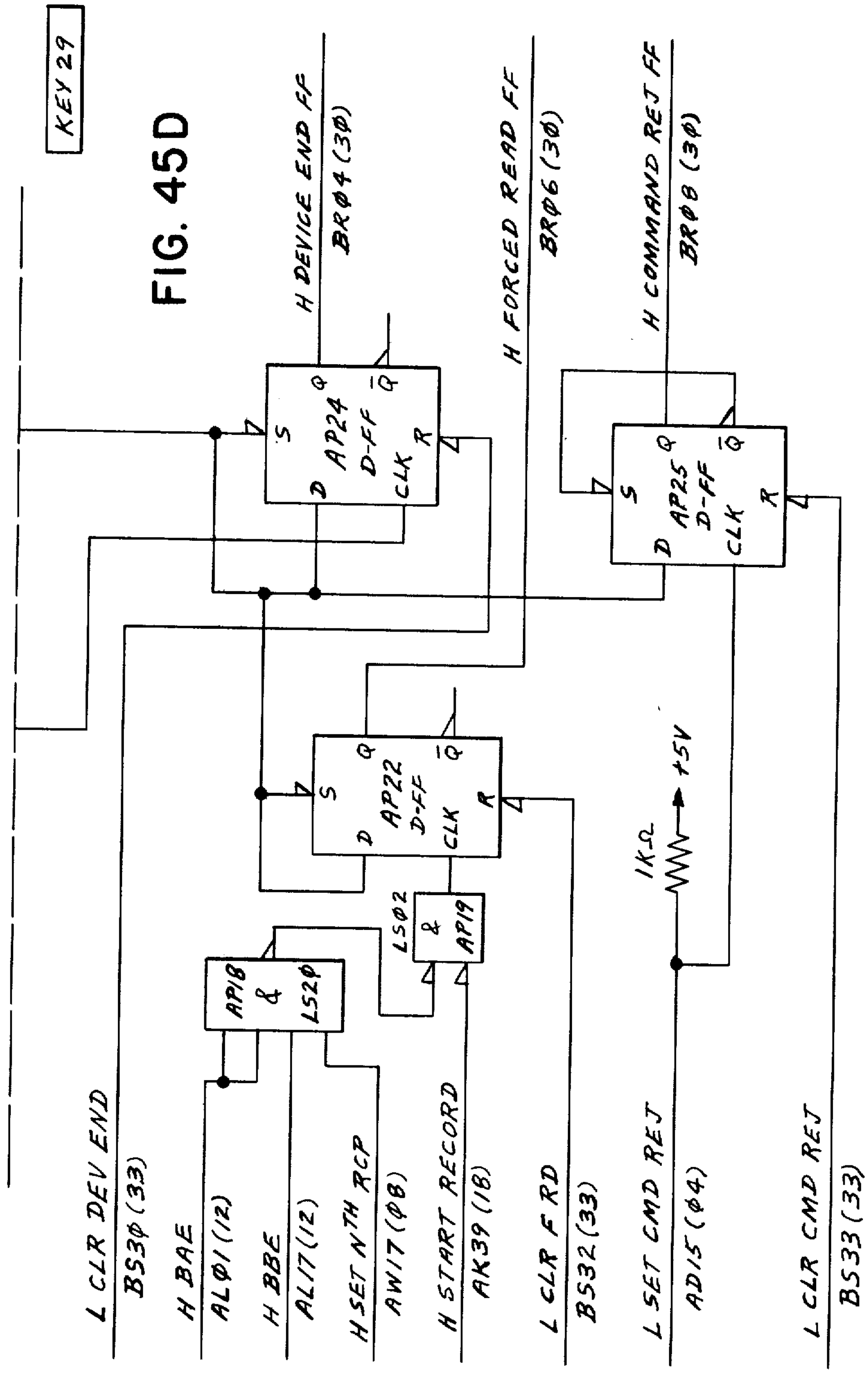
Figure 46A:
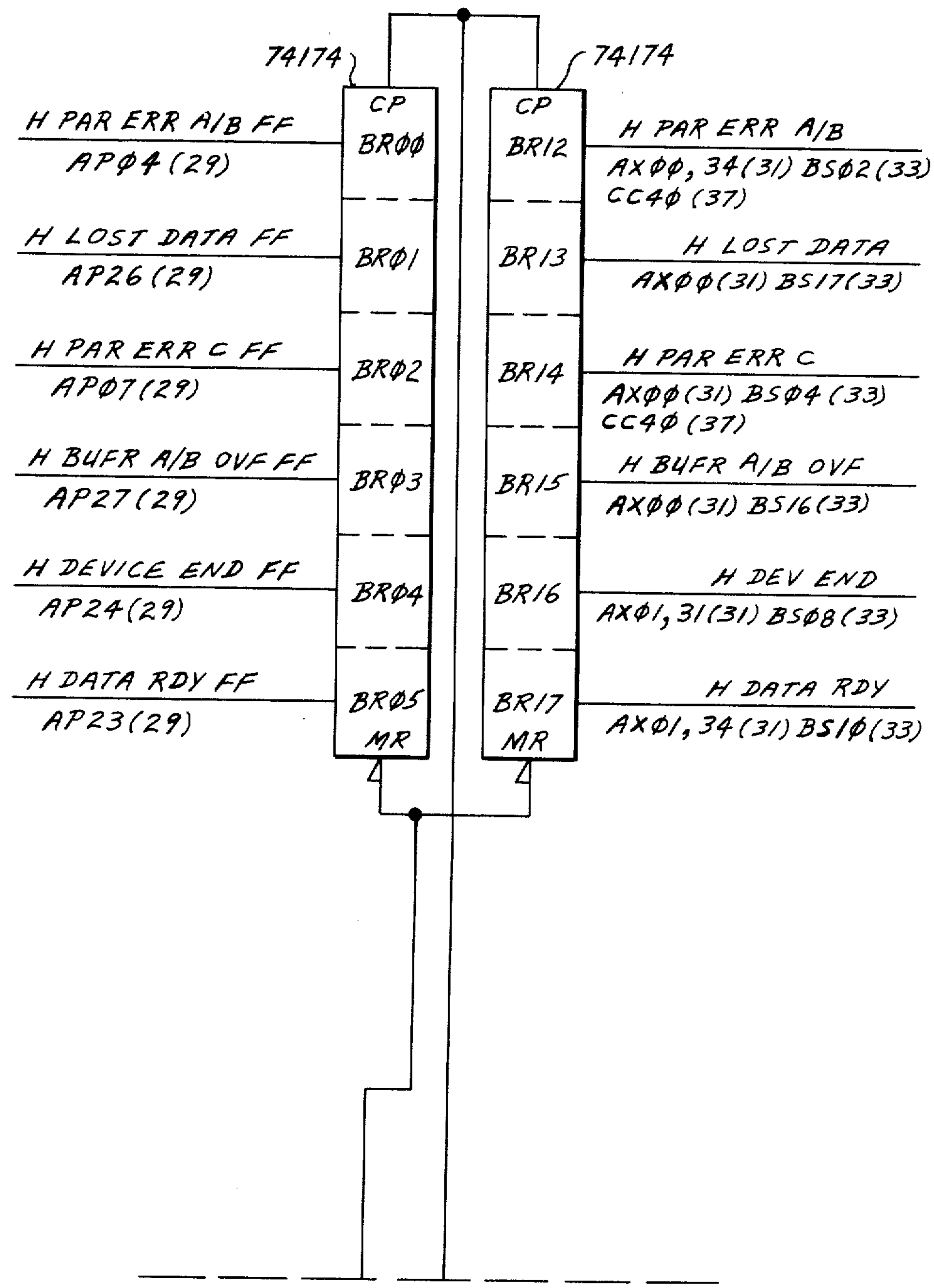
FIGS. 46A and 46B illustrate the preferred embodiment in hardware logic form.
Figure 46B:
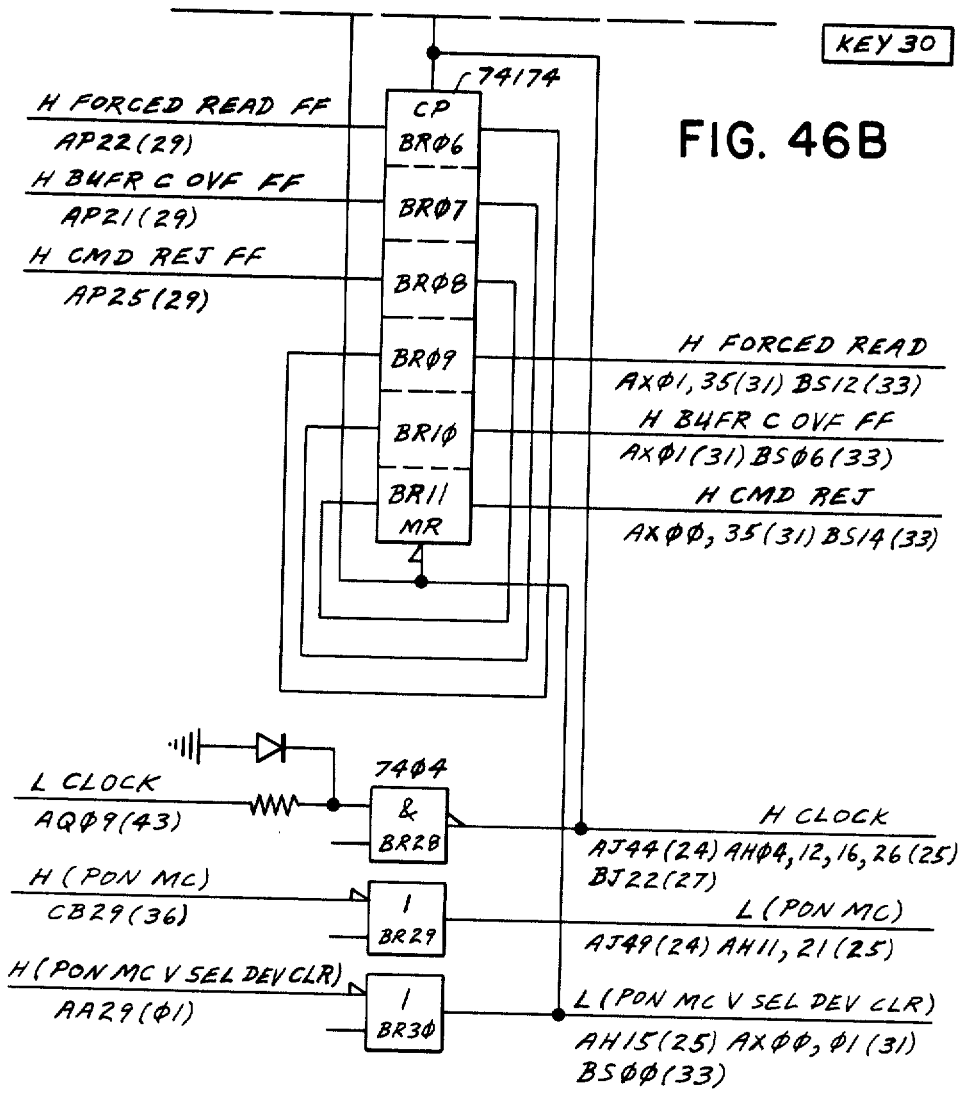
Figure 47A:
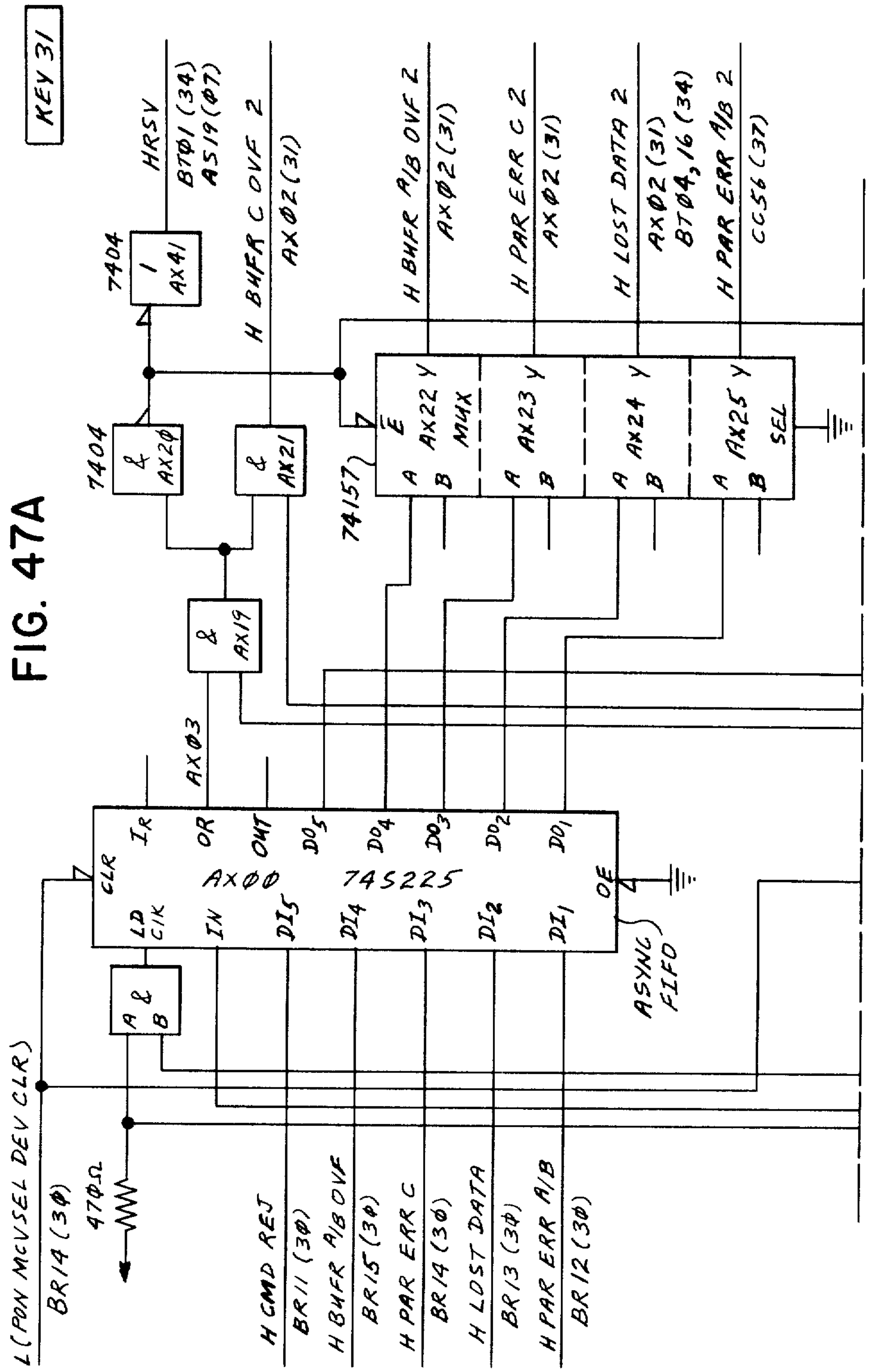
FIGS. 47A, 47B, 47C and 47D illustrate the preferred embodiment in hardware logic form.
Figure 47B:
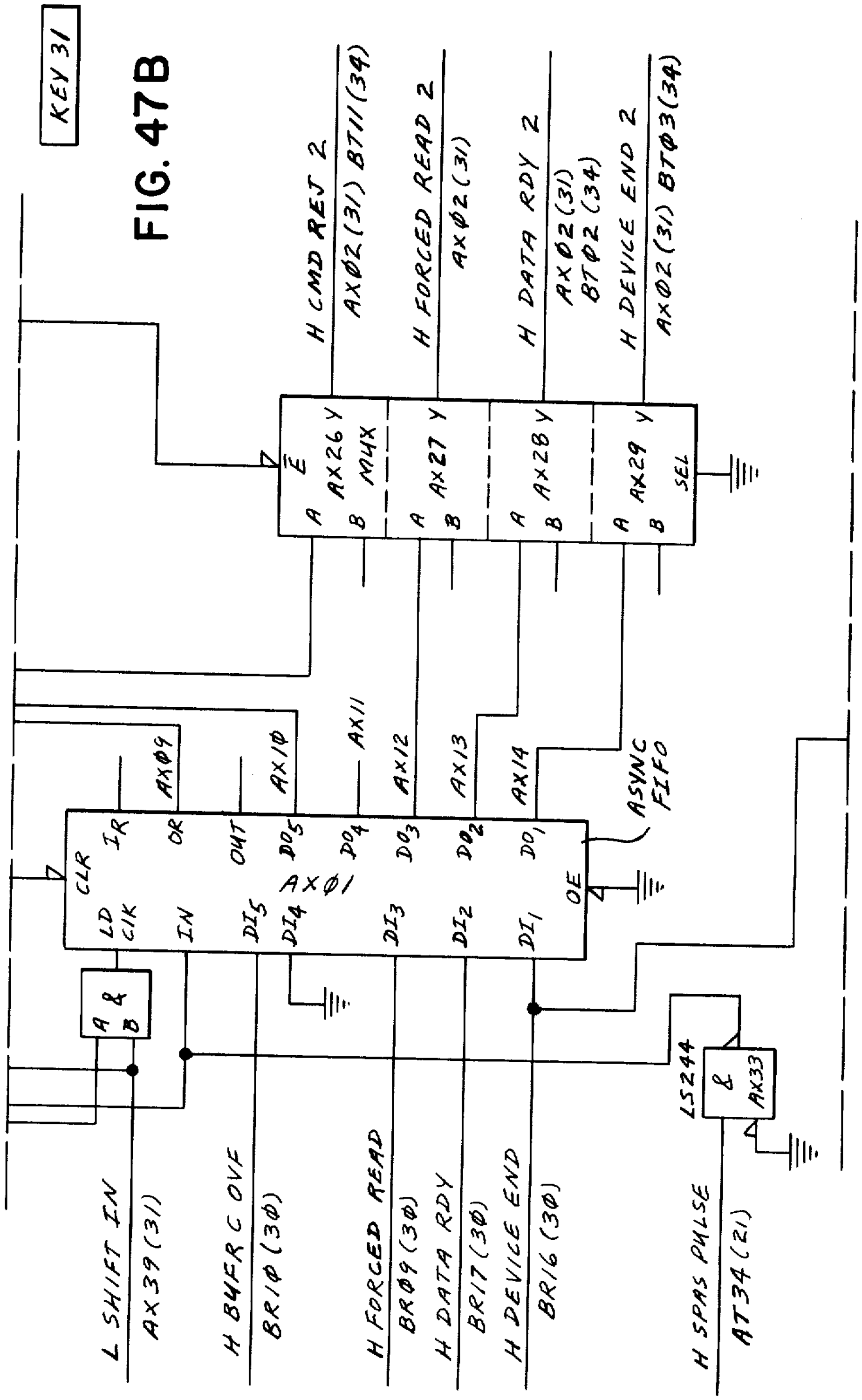
Figure 47C:
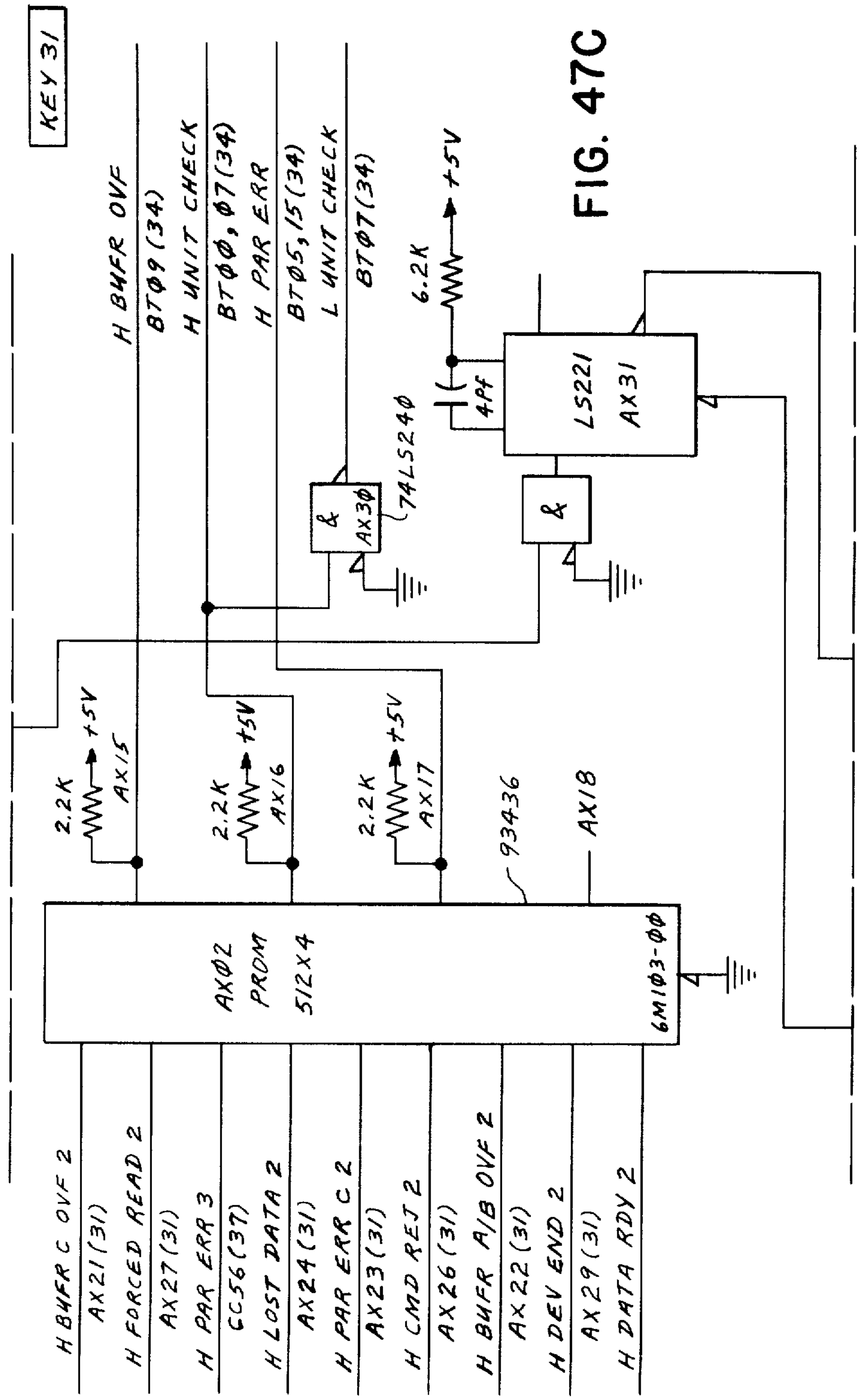
Figure 47D:
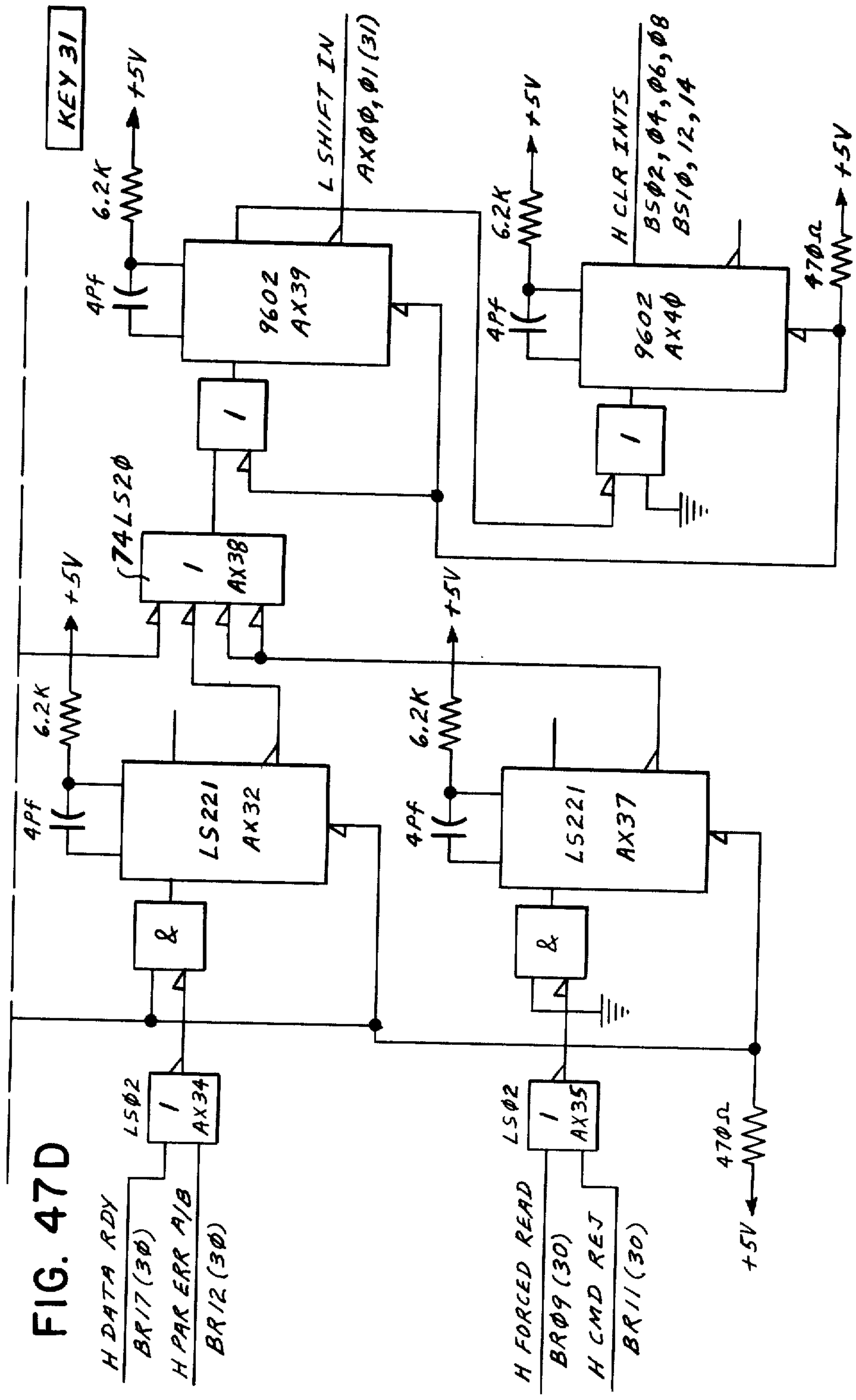
Figure 48A:
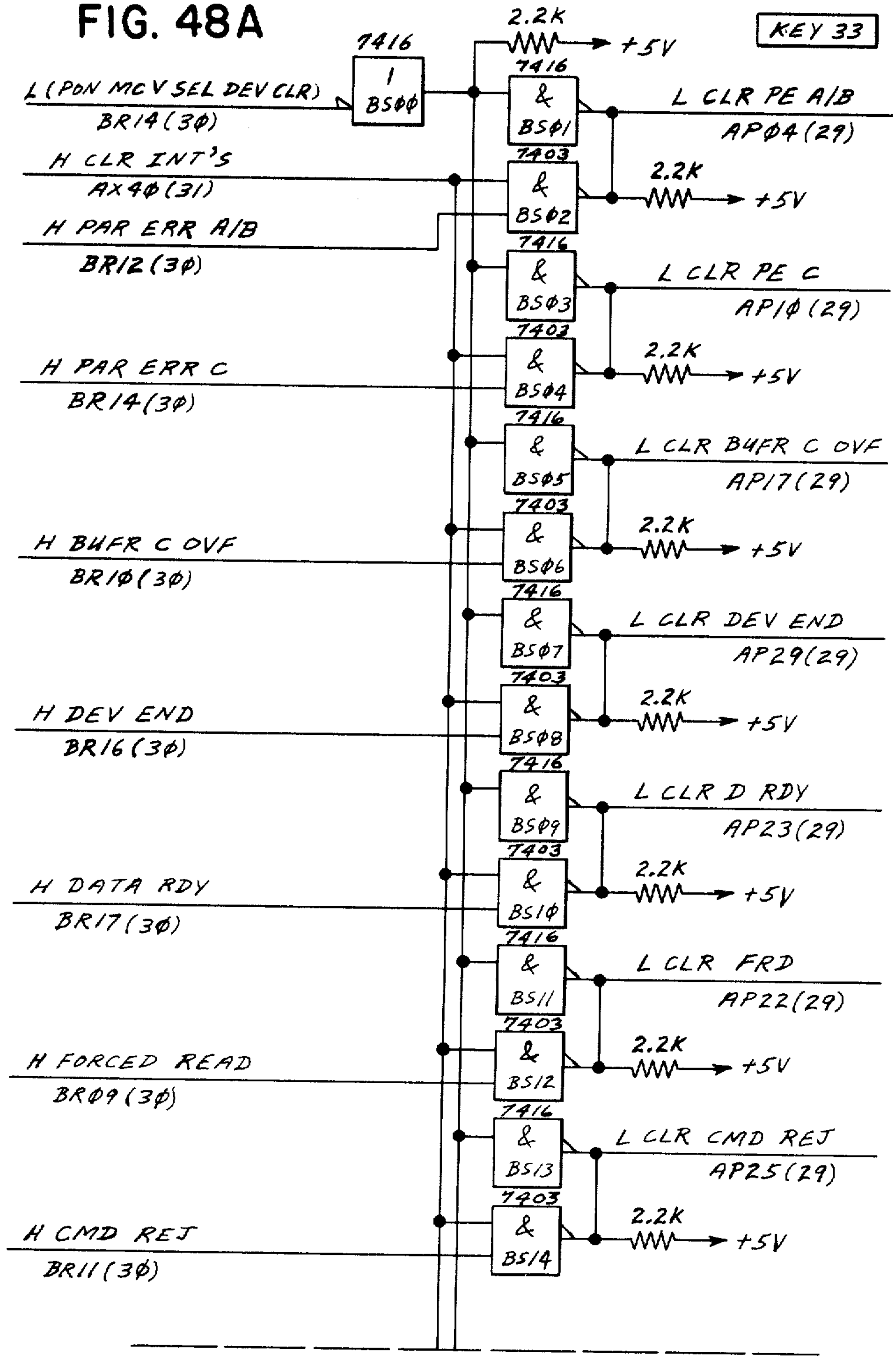
FIGS. 48A and 48B illustrate the preferred embodiment in hardware logic form.
Figure 48B:
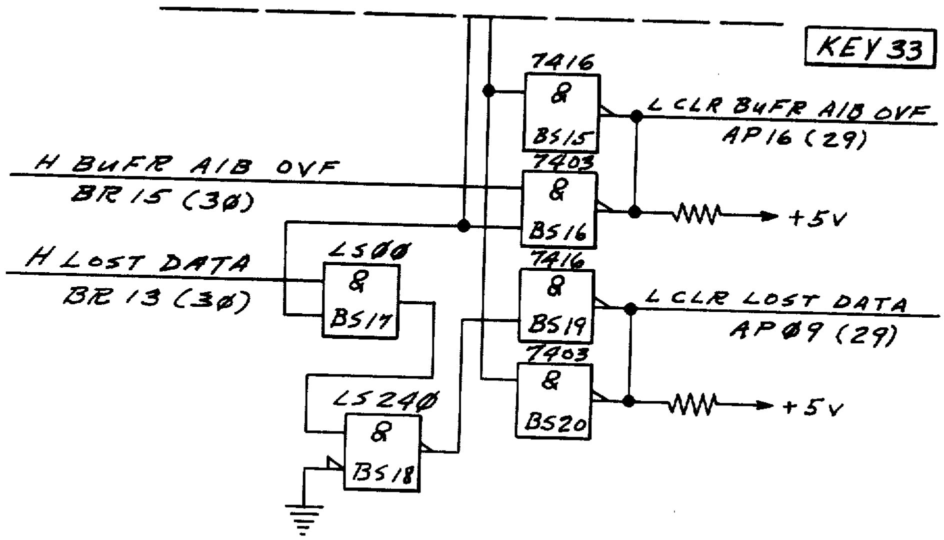
Figure 49:
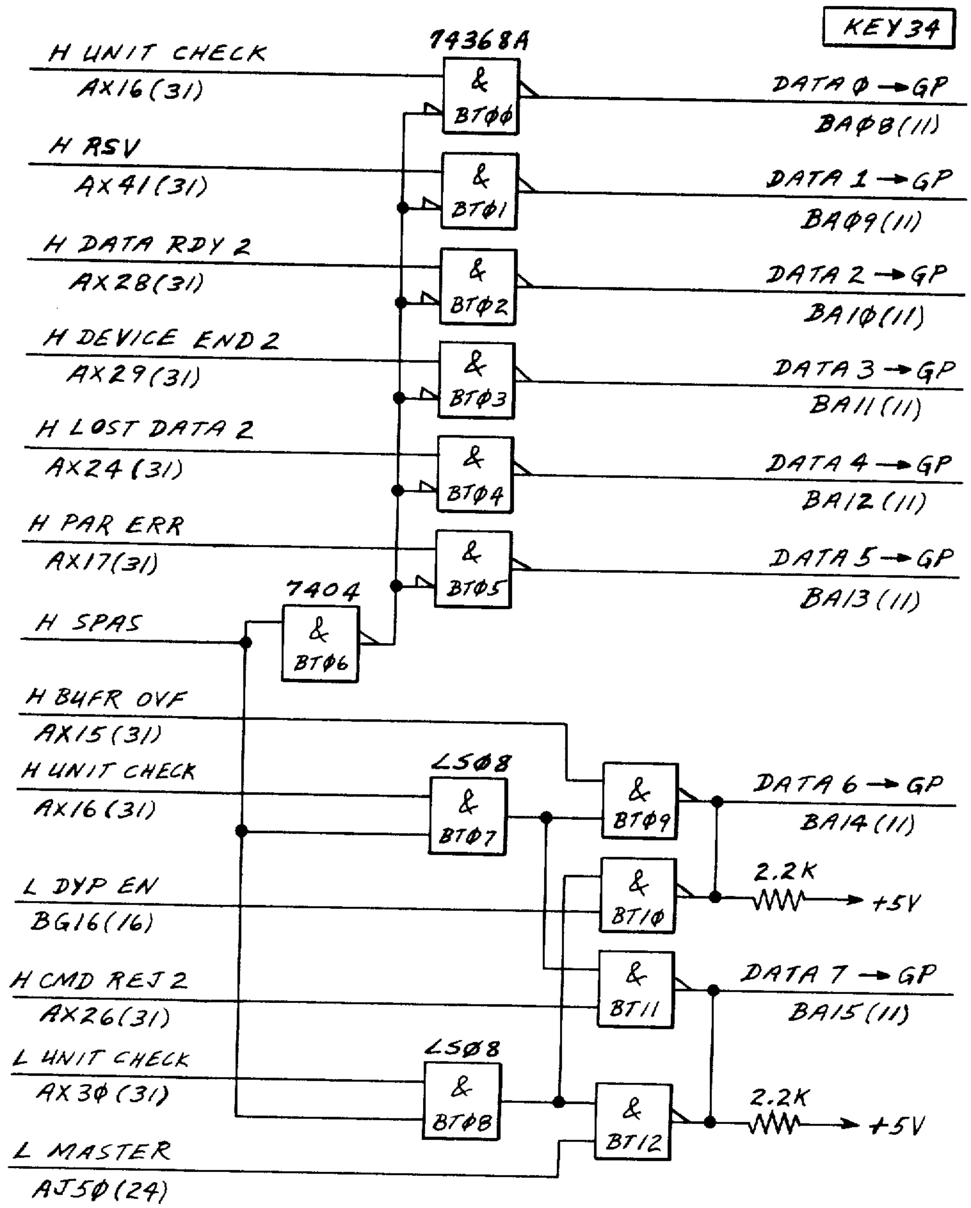
FIG. 49 illustrates the preferred embodiment in hardware logic form.
Figure 51:
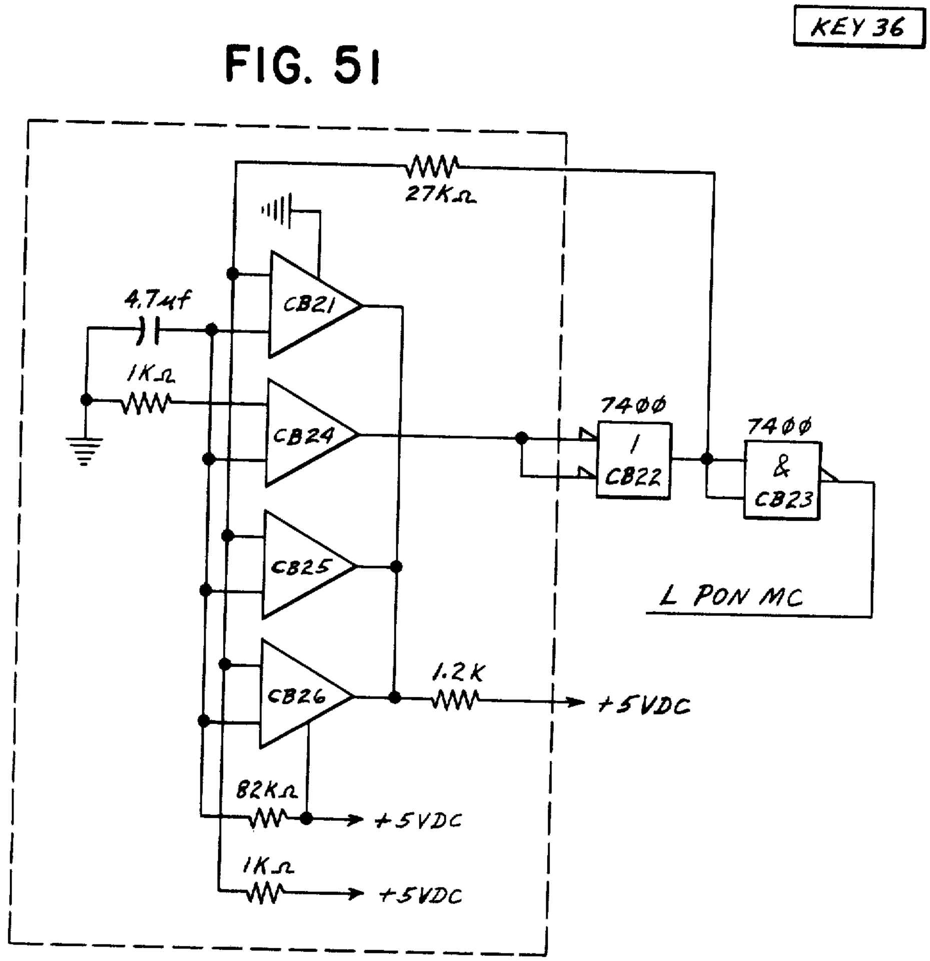
FIG. 51 illustrates the preferred embodiment in hardware logic form.
Figure 52:
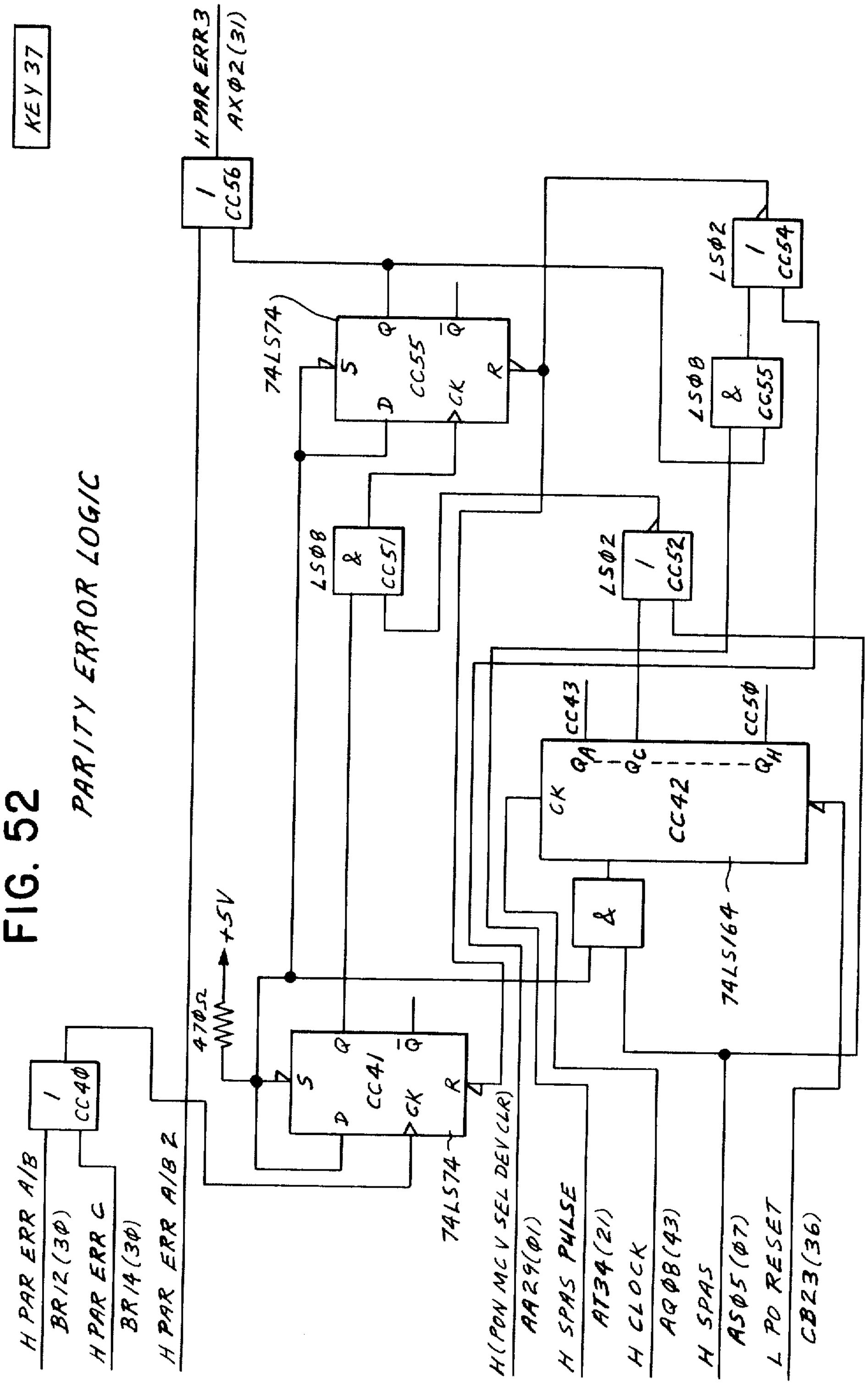
FIG. 52 illustrates the preferred embodiment in hardware logic form.
Figure 53:
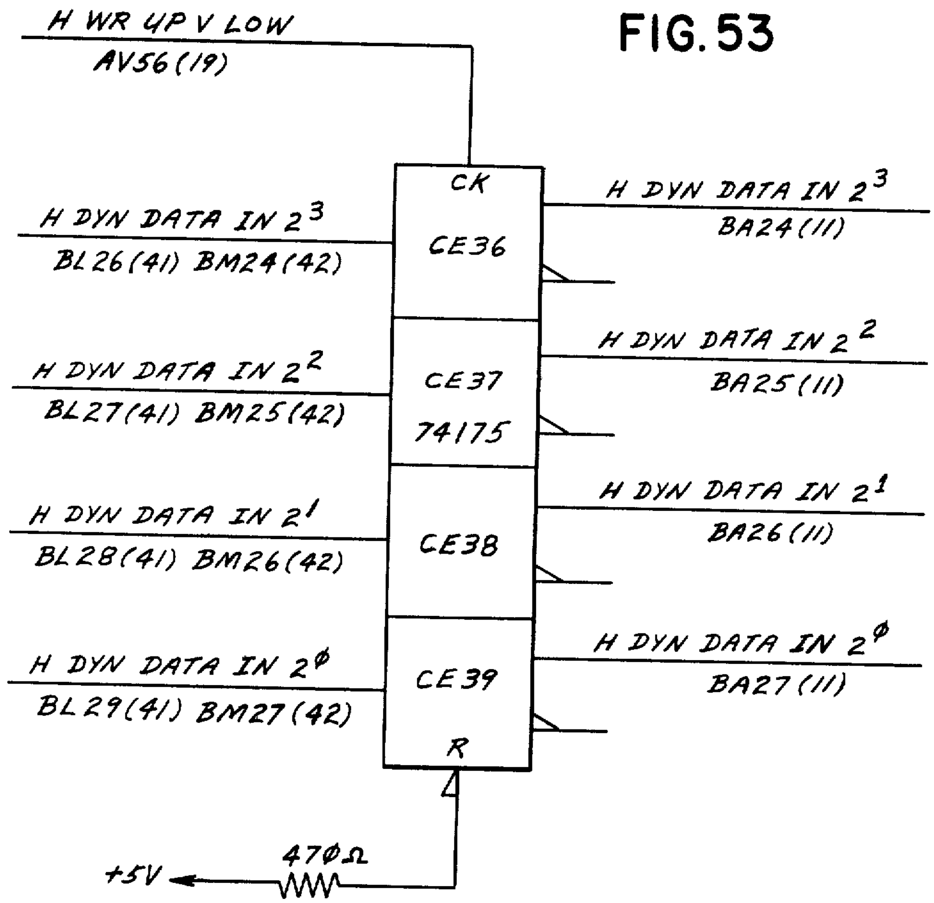
FIG. 53 illustrates the preferred embodiment in hardware logic form.
Figure 54A:
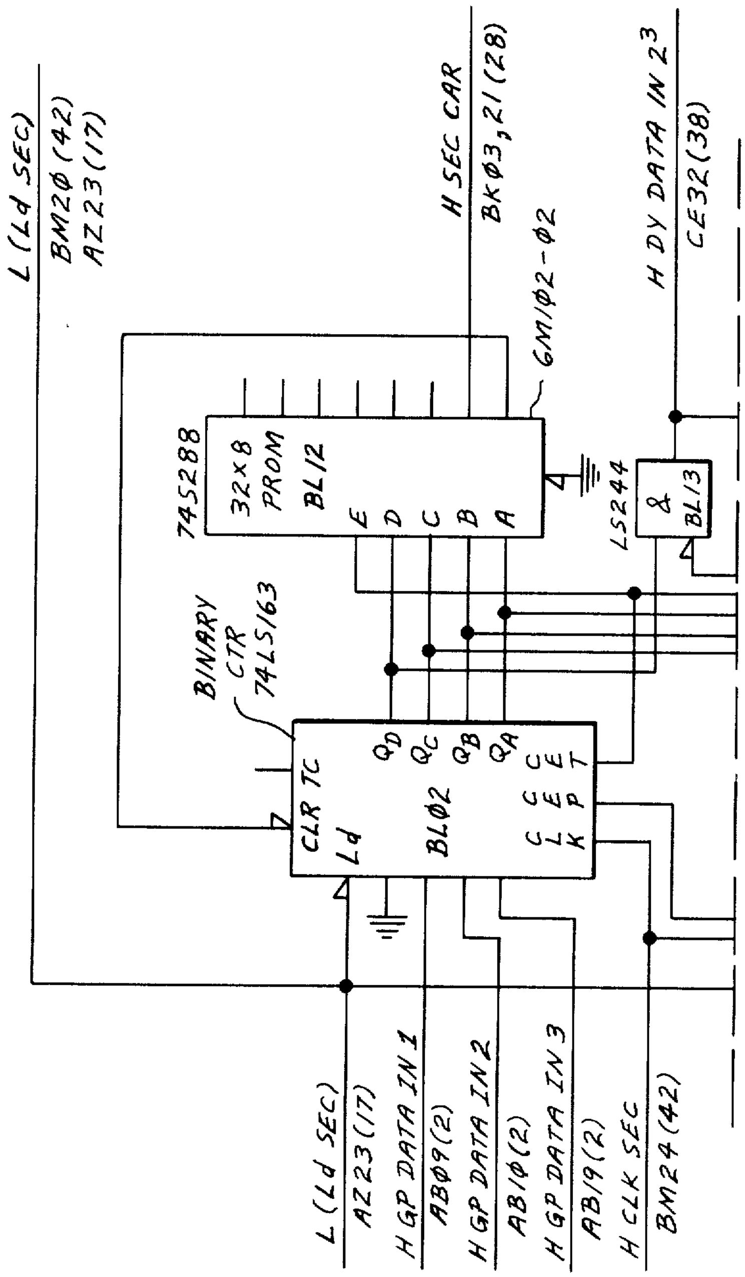
FIGS. 54A, 54B, 54C and 54D illustrate the preferred embodiment in hardware logic form.
Figure 54B:
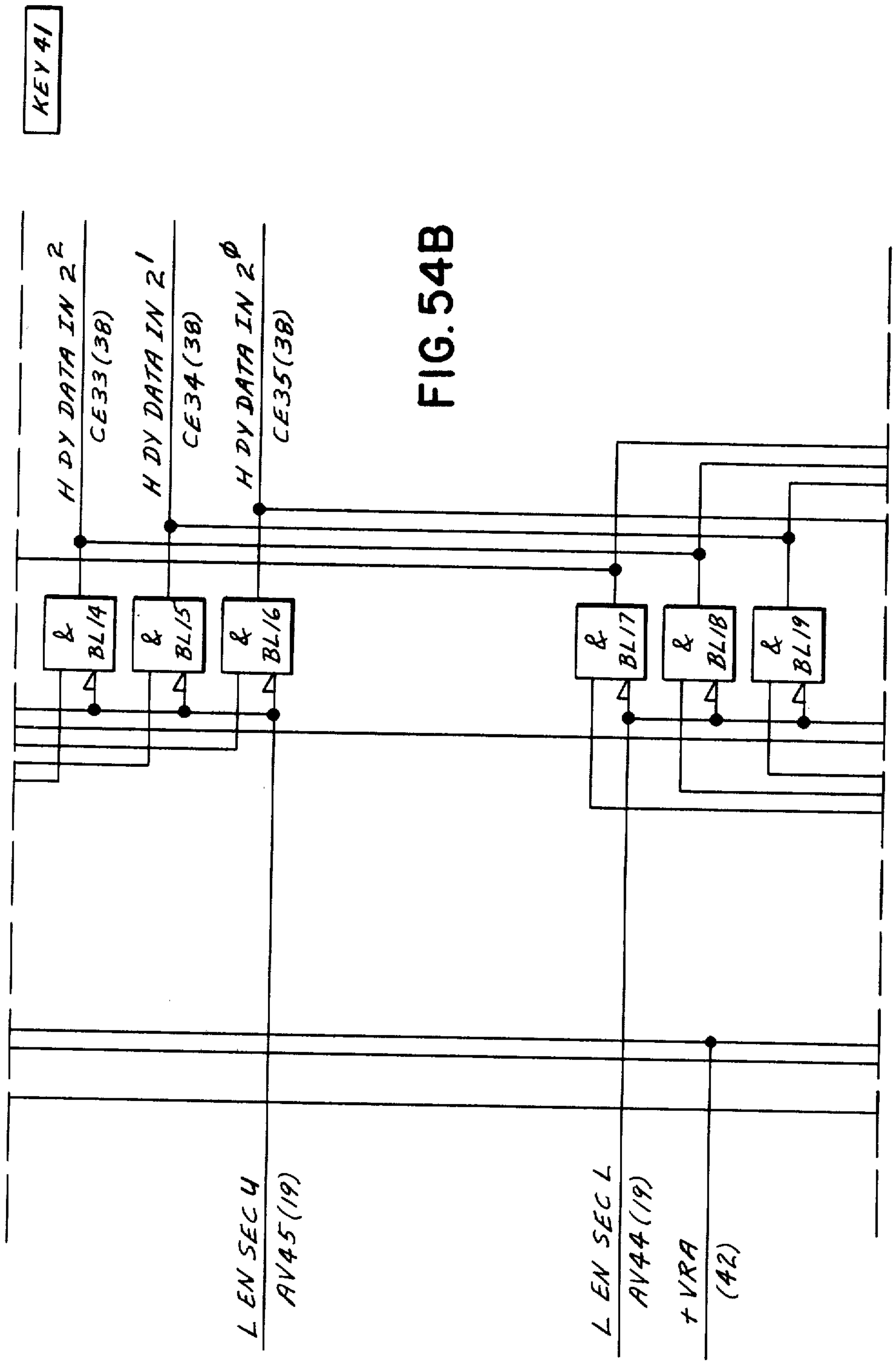
Figure 54C:
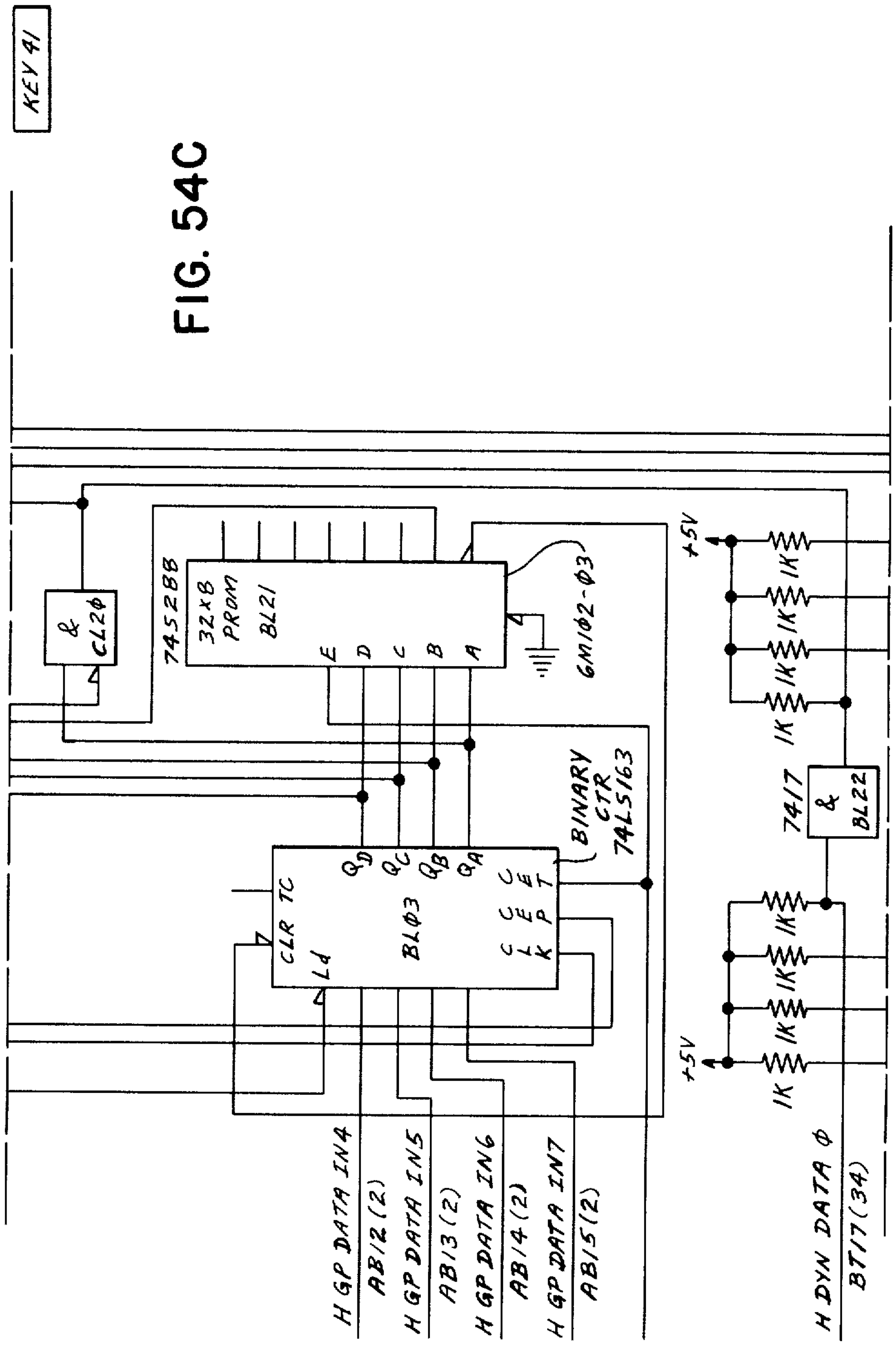
Figure 54D:
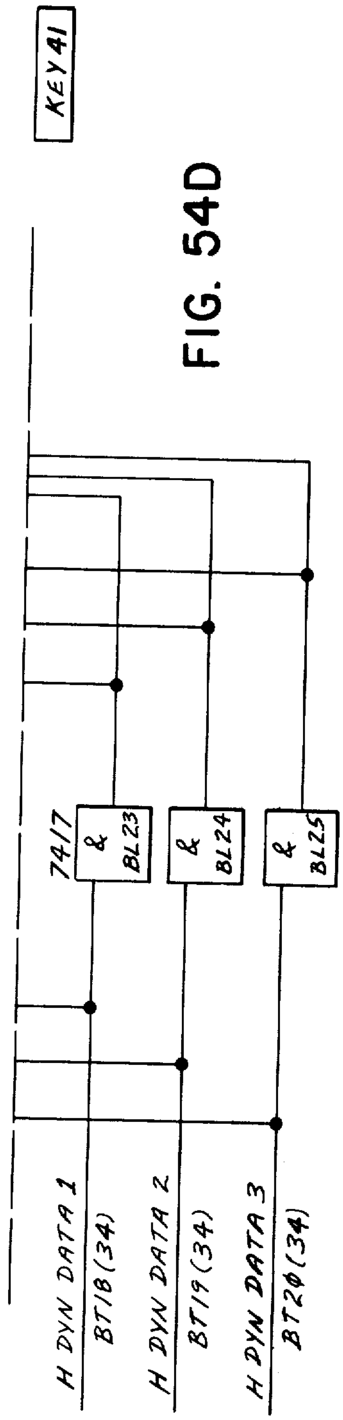
Figure 55A:
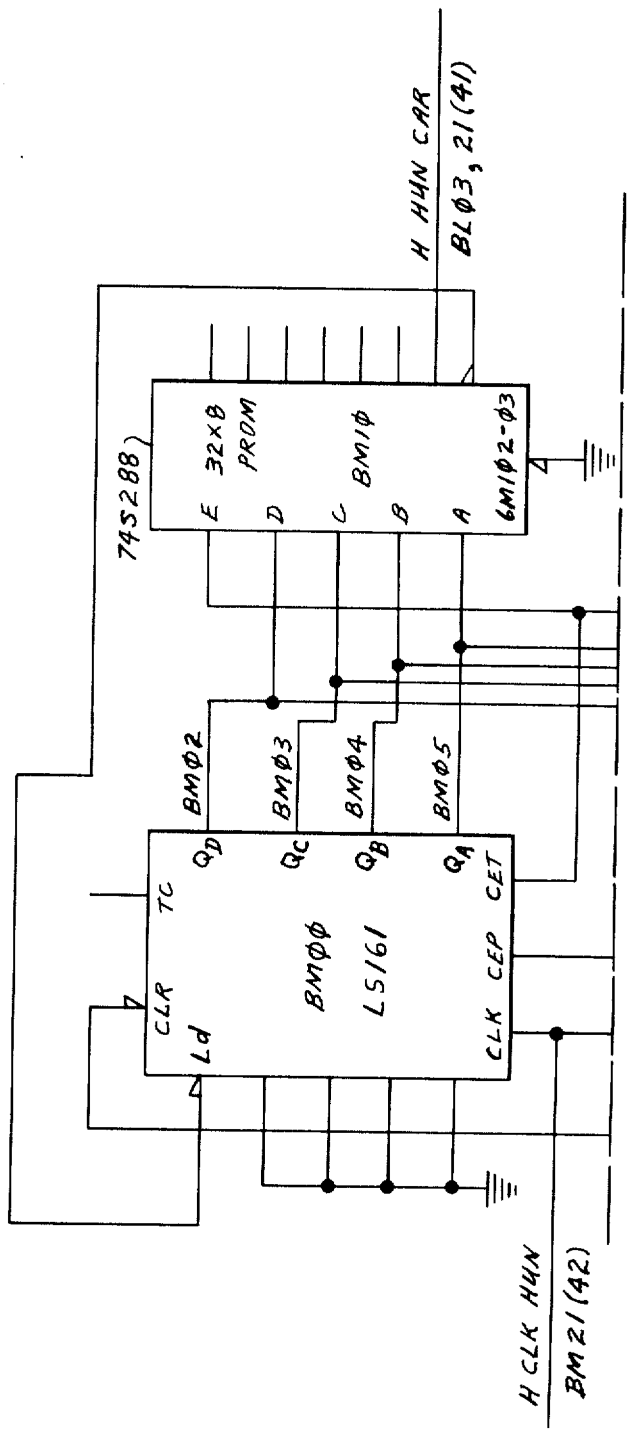
FIGS. 55A, 55B, 55C and 55D illustrate the preferred embodiment in hardware logic form.
Figure 55B:
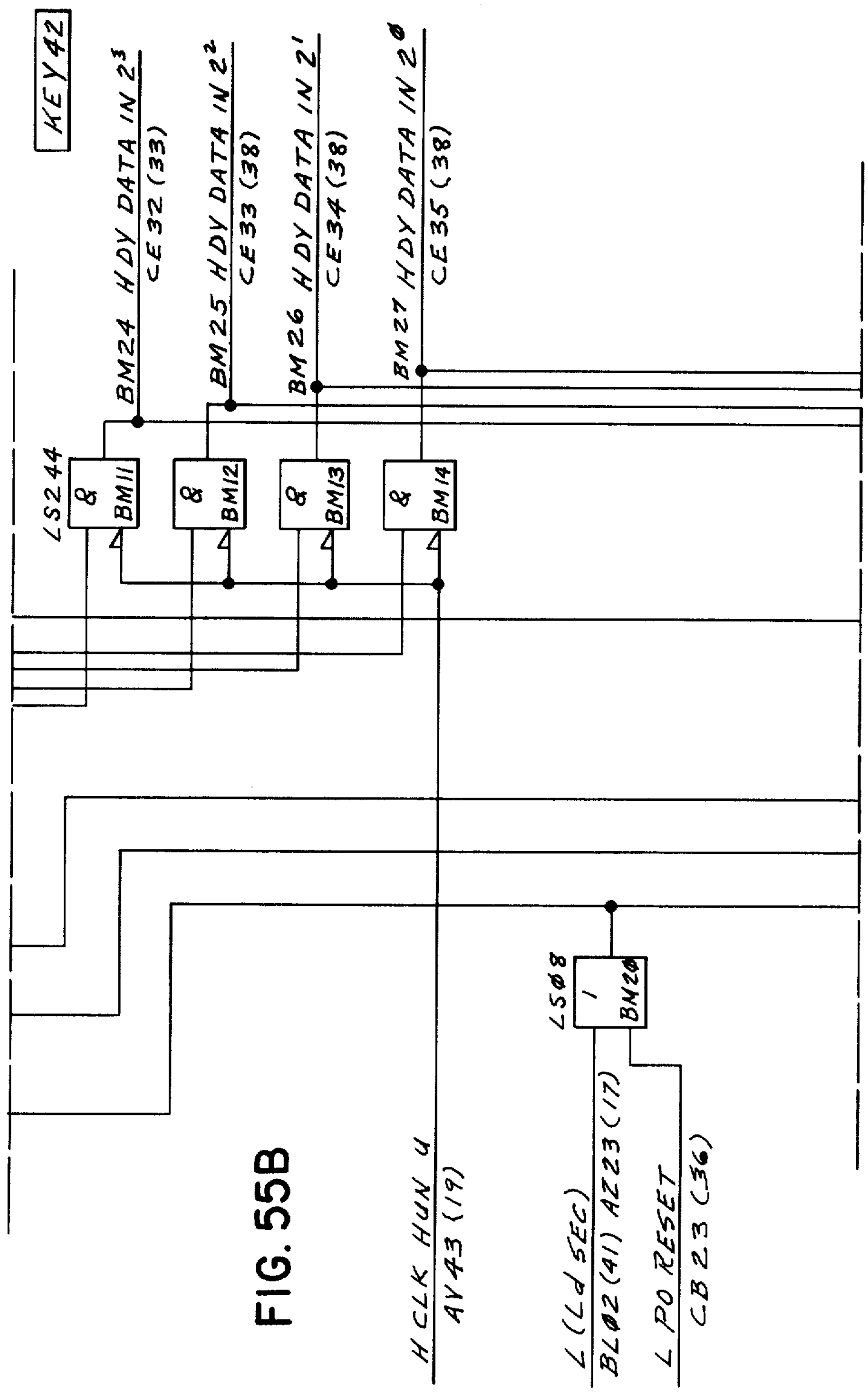
Figure 55C:
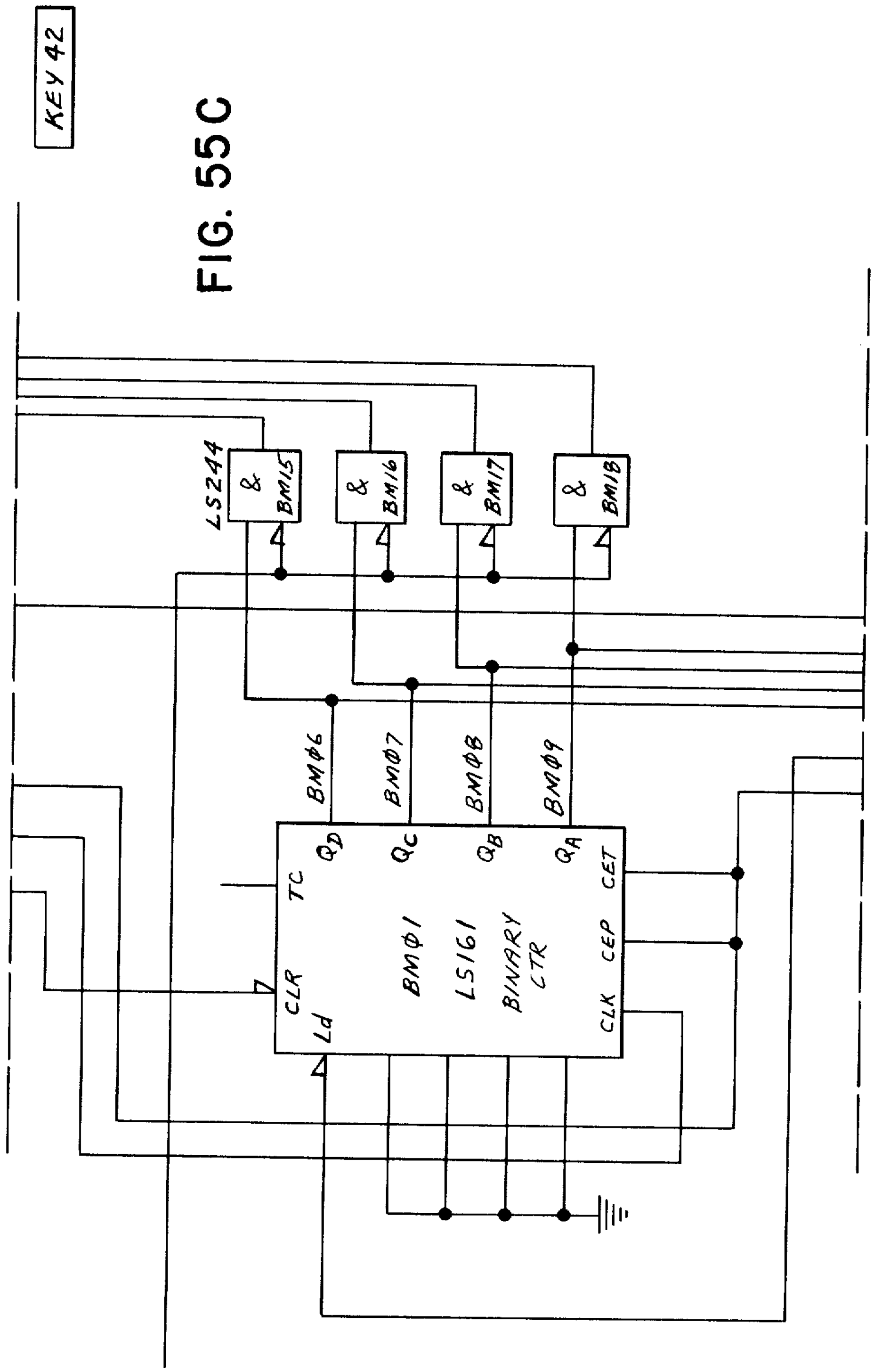
Figure 55D:
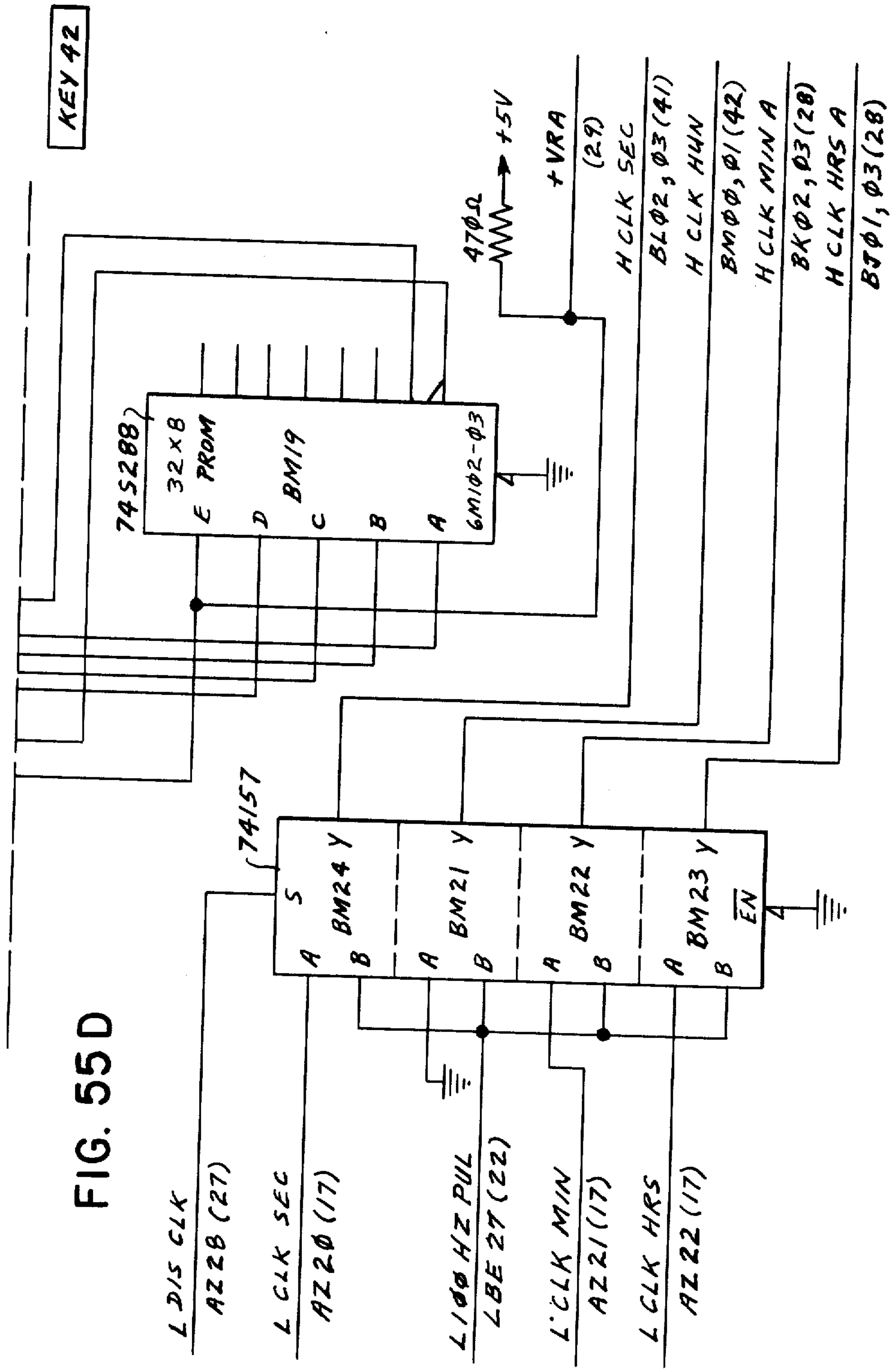
Figure 56A:
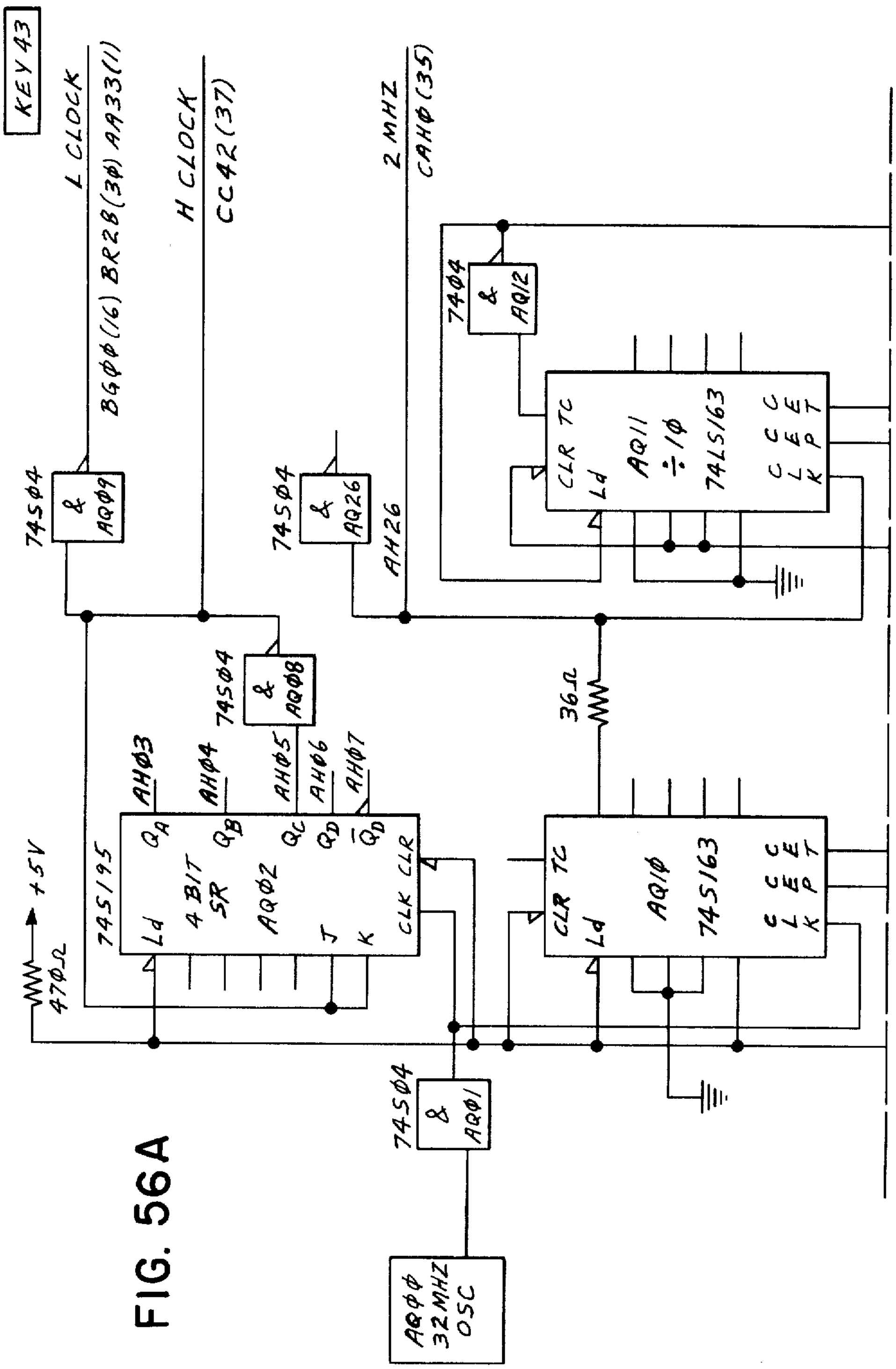
FIGS. 56A and 56B illustrate the preferred embodiment in hardware logic form.
Figure 56B:
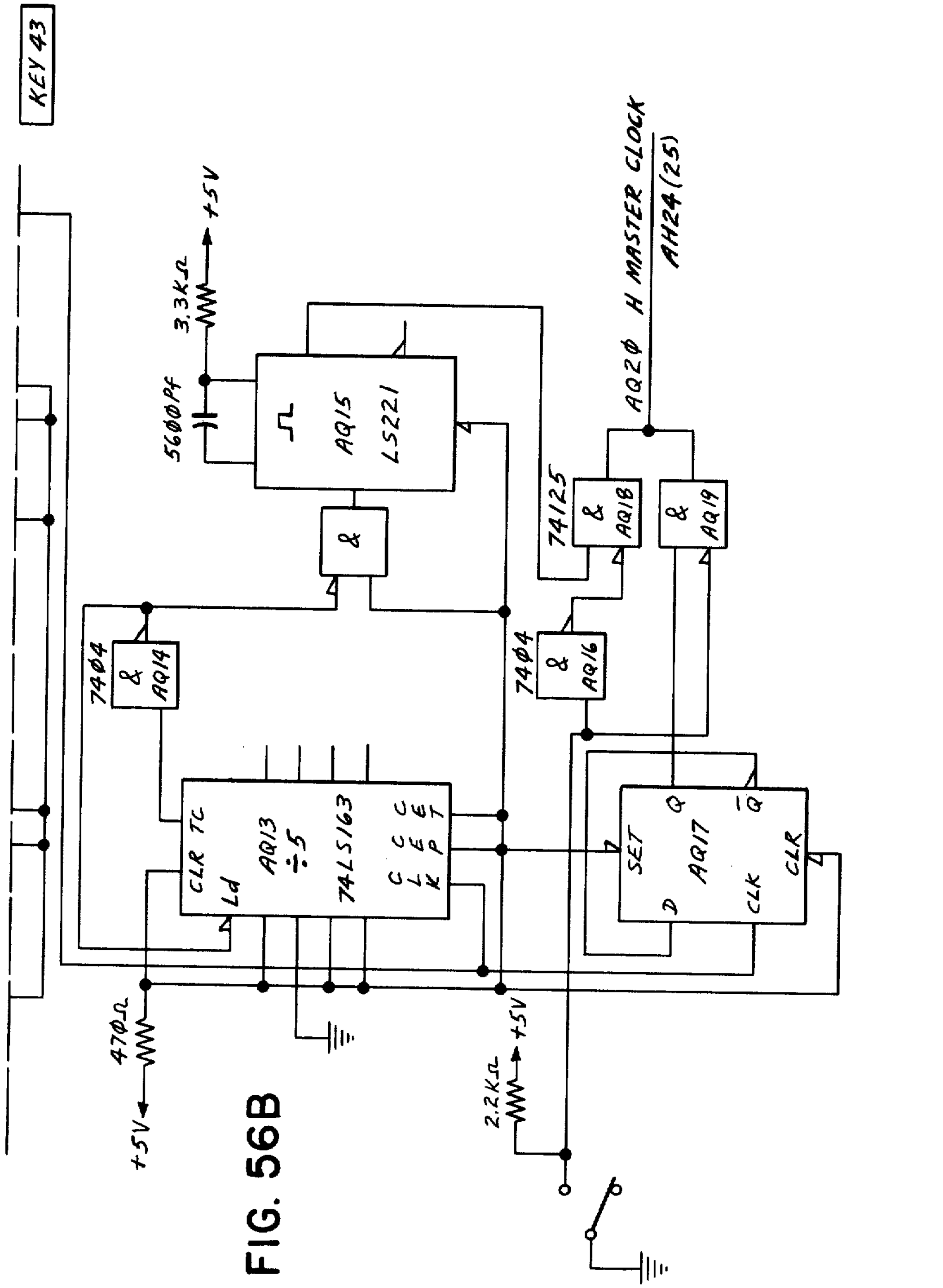
Figures 57, 58:
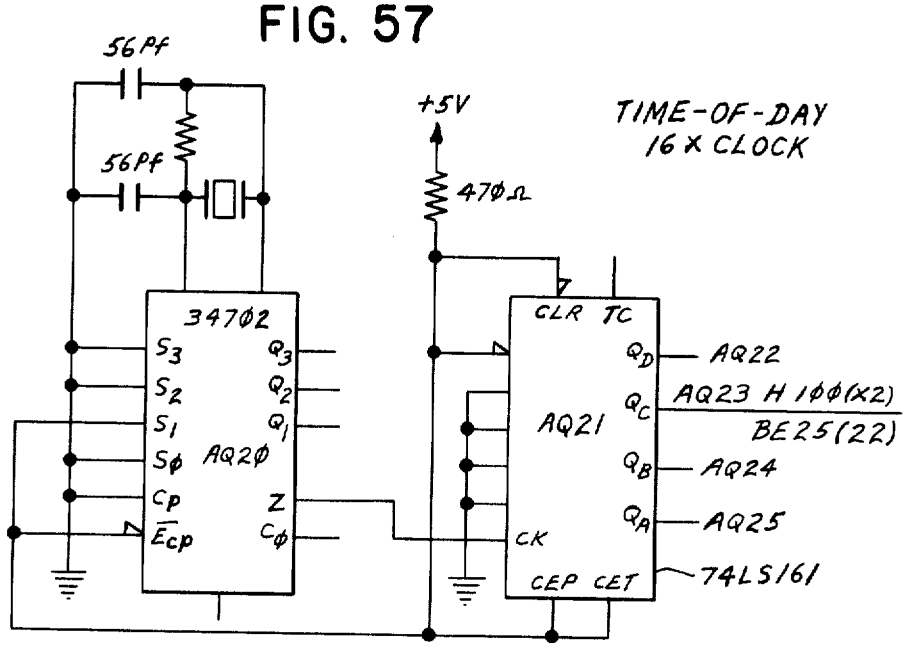
FIG. 57 illustrates the preferred embodiment in hardware logic form.
FIG. 58 illustrates the PROM coding and control signals used in the preferred embodiment of the invention.

The key numbers correspond to line (conductor) interconnects between the conductors shown on one sheet and those shown on other sheets, for example, in FIG. 8A, the output of AND gate AA32 is connected to the inputs to AD∅3 through ∅8, and AD11, AD12 on the sheets having the KEY 4. In addition, the output of AA32 is connected to logic elements AR∅7 and AS13 on the sheets bearing the key legend; KEY 6 and KEY 7, respectively.

The coding sheets for the associated PROMs and PROM sequencers are in FIGS. 48 thru 82. The coding at the top of each table corresponds to a like coding appearing with the associated PROM.

While there has been shown what is considered to be the preferred embodiment of the present invention, it will be manifest that many changes and modifications may be made therein without departing from the essential spirit of the invention. It is intended, therefore, in the annexed claims, to cover all such changes and modifications as may fall within the true scope of the invention.

I claim:

1. An adapter for coupling a data bus to a peripheral data bus, said data bus and said peripheral data bus being bidirectional, and said adapter having the capability of storing messages received from either bus comprising:

a first buffer memory operatively connected between said data bus and said peripheral data bus for communicating data from said data bus to said peripheral data bus;

second and third buffer memories operatively connected between said peripheral data bus and said data bus for communicating data from said peripheral data bus to said data bus;

control means operatively coupled to each buffer memory for controlling the storage and transmission of data to and from said buffer memories; and clock means operatively coupled to said second and third buffer memories for providing a time tag to each message stored in said second and third buffer memories.

2. The adapter according to claim 1 and further comprising means integral with said second and third buffers for counting the messages stored in said second and third buffer memories; and means operatively coupled to said means for counting and to said data bus for requesting data bus service when the number of counted messages reaches a preselected number corresponding to the limit of messages storable in said second and third buffers.

3. The adapter according to claim 2 and further comprising means operatively coupled to said means for counting for denying access to said second and said third buffer memories when said buffer memories are full by not recognizing requests for buffer memory access appearing on said peripheral data bus.

4. The adapter according to claim 3 and further comprising parity error detector means operatively coupled to said buffer memories for detecting errors in the messages stored in said buffer memories; and status means operatively coupled to and responsive to said parity error detecting means for inserting a signal into the message read from said buffer memories indicating the presence or the absence of a parity error.

5. The adapter according to claim 4 and further comprising:

means operatively connected to said second and said third buffer memories for unloading said buffers in the same order that they are loaded.

6. An interface adapter for interfacing between a processor and a peripheral device, said interface adapter being coupled to said processor with a data bus and to said peripheral device with a peripheral data bus, said interface adapter comprising:

a first buffer memory coupled to said peripheral data bus and to said data bus and capable of storing a plurality of variable length data blocks;

means operatively coupled to said first buffer memory for sensing the presence of a preselected number of stored data blocks in said first buffer memory and for initiating a service request condition in the processor coupled to said data bus when said preselected number is sensed;

means operatively coupled to said means for sensing and to said peripheral data bus for denying access to said first buffer memory from said peripheral data bus when the preselected number of data blocks are stored in said first buffer memory;

control means coupled to said data bus and to said first buffer memory and responsive to control signals from said processor for controlling the transfer of data between said buses;

means operatively coupled to said first buffer memory for affixing a time signal to each data block received by said first buffer memory; and a second buffer memory coupled to said peripheral data bus and to said data bus for transferring data from said data bus to said peripheral data bus, said second buffer memory responsive to control signals from said control means for transferring data between said buses.

7. The interface adapter according to claim 6 and further comprising:

parity error detector means operatively connected to at least one of said buffer memory means for detecting errors in the data stored in said at least one of said buffer memories; and status means coupled and responsive to said parity error detecting means for inserting a signal with the data read from said at least one of said buffer memories, which signal indicates the presence or the absence of a parity error.

8. An adapter for interfacing devices coupled to bidirectional buses comprising:

first storage means coupled to said buses and operative to receive and transmit data in a first direction;

second storage means coupled to said buses and operative to receive and transmit data in a second direction;

means coupled to at least one of said storage means for attaching a time tag to data received by said at at least one of said storage means;

means coupled to at least one of said storage means for requesting bus access when said at least one of said storage means has acquired a selected number of blocks of data; and control means operatively coupled to said at least one of said storage means and to said bidirectional buses for effecting a transfer of data from a storage means having a selected number of blocks of data to a bidirectional bus.

9. The adapter according to claim 8 and further comprising:

means operatively coupled to at least one of said storage means to said bidirectional buses for denying access to said at least one of said storage means when said at least one of said storage means has acquired a selected number of blocks of data.

10. The adapter according to claim 8 wherein said first and said second storage means are configured to store variable length data blocks.

11. The adapter according to claim 8 and further comprising:

parity error detector means operatively coupled to at least one of said storage means for detecting errors in the data stored in said at least one of said storage means; and status means operatively coupled to said parity error detecting means and responsive to said parity error detecting means for inserting a signal with the data read from said at least one of said storage means which signal indicates the presence or the absence of a parity error.

12. The adapter according to claim 8 and further comprising:

means for decoding command signals received by said adapter from said buses operatively connected to said first and second storage means and to said means for attaching a time tag for controlling the actuation thereof.

13. The adapter according to claim 8 and further comprising:

means operatively coupled to said buffer memories for synchronizing the data transmitted from said adapter to said bidirectional buses.

* * * * *